US012808839B2

(12) United States Patent
Haupt et al.

(10) Patent No.: US 12,808,839 B2
(45) Date of Patent: Nov. 24, 2026

(54) ELECTROCHEMICAL GAS SENSOR AND ELECTROLYTE FOR AN ELECTROCHEMICAL GAS SENSOR

(71) Applicant: Dräger Safety AG & Co. KGaA, Lübeck (DE)

(72) Inventors: Stephan Haupt, Tangstedt (DE); Rolf Eckhardt, Hamburg (DE)

(73) Assignee: DRÄGER SAFETY AG & CO. KGAA, Lübeck (DE)

(*) Notice: Subject to any disclaimer, the term of this patent is extended or adjusted under 35 U.S.C. 154(b) by 114 days.

(21) Appl. No.: 18/693,588

(22) PCT Filed: Sep. 21, 2022

(86) PCT No.: PCT/EP2022/076139

§ 371 (c)(1),
(2) Date: Mar. 20, 2024

(87) PCT Pub. No.: WO2023/046704

PCT Pub. Date: Mar. 30, 2023

(65) Prior Publication Data

US 2024/0393290 A1 Nov. 28, 2024

(30) Foreign Application Priority Data

Sep. 23, 2021 (EP) .................................... 21198500

(51) Int. Cl.
*G01N 27/413* (2006.01)
*G01N 27/404* (2006.01)

(52) U.S. Cl.
CPC ....... *G01N 27/413* (2013.01); *G01N 27/4045* (2013.01)

(58) Field of Classification Search
CPC . G01N 27/413; G01N 27/404; G01N 27/4045
See application file for complete search history.

(56) References Cited

U.S. PATENT DOCUMENTS

| | | | | |
|---|---|---|---|---|
| 7,060,169 B2 | 6/2006 | Roehrl | | |
| 2004/0005286 A1 | 1/2004 | Giroud | | |
| 2004/0167265 A1* | 8/2004 | Thompson | C09D 5/00 | 524/404 |
| 2012/0330023 A1 | 12/2012 | Taeschler et al. | | |
| 2017/0299542 A1 | 10/2017 | Tabrizi et al. | | |

(Continued)

FOREIGN PATENT DOCUMENTS

| | | |
|---|---|---|
| DE | 4238337 C2 | 6/1994 |
| DE | 102008044240 B4 | 12/2013 |
| EP | 1242670 A1 | 9/2002 |

(Continued)

OTHER PUBLICATIONS

EPO machine-generated English language translation of Hoeffkes et al. WO 2007/006418 A1 , published Jan. 18, 2007 (Year: 2007).*

(Continued)

*Primary Examiner* — Alexander S Noguerola
(74) *Attorney, Agent, or Firm* — McGlew and Tuttle, P.C.

(57) ABSTRACT

An electrolyte for an electrochemical gas sensor and an electrochemical gas sensor are provided. The electrolyte includes at least one cyclic compound based on a pyridinium, piperidinium, pyrrolidinium or pyrrolium ring, as well as at least 5% water.

30 Claims, 19 Drawing Sheets

(56) References Cited

U.S. PATENT DOCUMENTS

| | | | | |
|---|---|---|---|---|
| 2023/0218496 A1* | 7/2023 | Schmidts | ............... | A61Q 15/00<br>424/65 |

FOREIGN PATENT DOCUMENTS

| | | | |
|---|---|---|---|
| EP | 1676894 | A1 | 7/2006 |
| GB | 2395564 | B | 12/2004 |
| WO | 0149925 | A1 | 7/2001 |
| WO | 2004080974 | A1 | 9/2004 |
| WO | 2007006418 | A1 | 1/2007 |
| WO | 2010063624 | A1 | 6/2010 |
| WO | 2021219763 | A1 | 11/2021 |

OTHER PUBLICATIONS

English language translation of the Written Opinion for international application No. PCT/EP2022/076139. Date of mailing of Written Opinion is Jan. 16, 2023 (Year: 2023).*

Rehman Abdul et al: "Methods and Approaches of Utilizing Ionic Liquids as Gas Sensing Materials", Bd. 5, Nr. 72, 1. Jan. 2015 (Jan. 1, 2015), pp. 58371-58392, XP055897096, DOI: 10.1039/C5RA06754E.

* cited by examiner

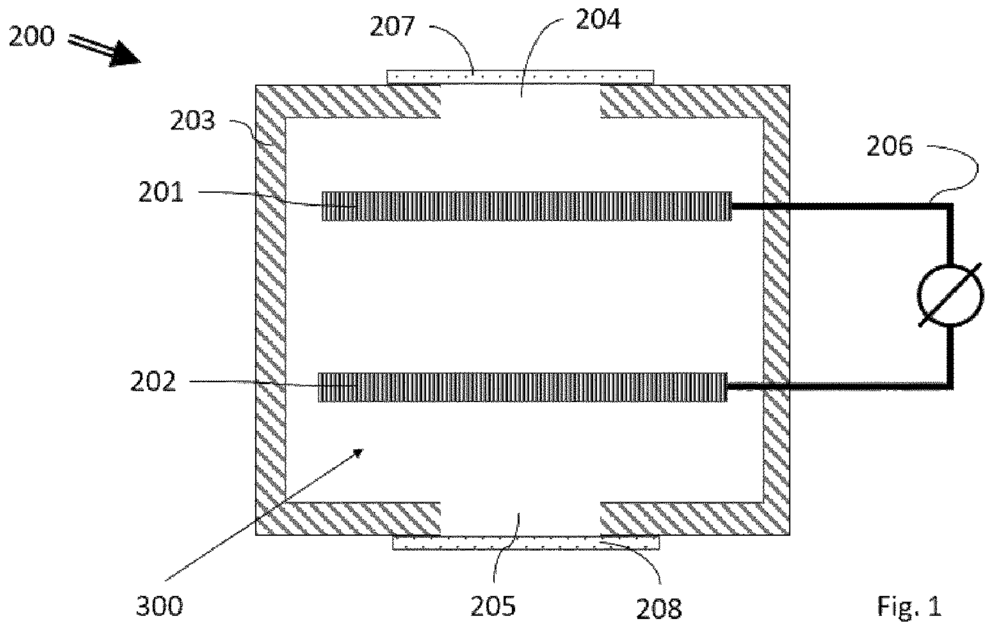
Fig. 1
Fig. 2
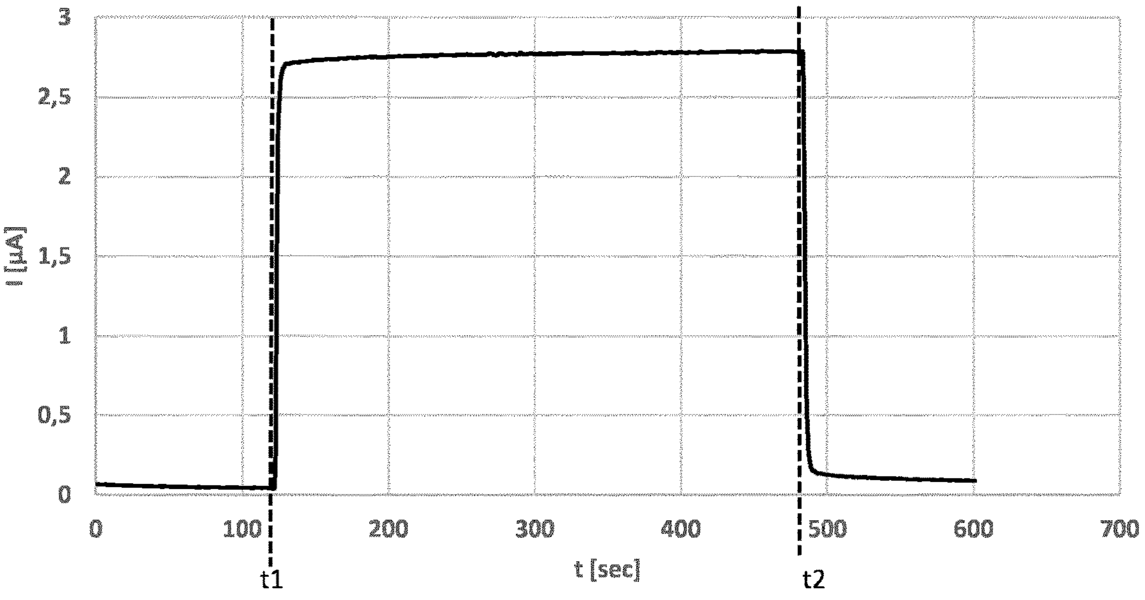

ELECTROCHEMICAL GAS SENSOR AND ELECTROLYTE FOR AN ELECTROCHEMICAL GAS SENSOR

CROSS REFERENCE TO RELATED APPLICATIONS

This application is a United States National Phase Application of International Application PCT/EP2022/076139, filed Sep. 21, 2022, and claims the benefit of priority under 35 U.S.C. § 119 of European Application 21198500.7, filed Sep. 23, 2021, the entire contents of which are incorporated herein by reference.

TECHNICAL FIELD

The present invention pertains to an electrochemical gas sensor and to the use thereof.

BACKGROUND

The Electrochemical gas sensors are generally known. They are used in the widest variety of technical areas. Since especially leak and gas escape warning systems were present a few years ago, then the sensors have in the meantime been increasingly used for monitoring workplace concentrations of harmful gases. Monitoring of production processes by means of such sensors is also conceivable in the meantime.

An electrochemical gas sensor is in this case always an electrochemical cell, especially a fuel cell, which contains at least two electrodes, which are in contact with one another via an ion conductor (electrolyte). The target gas (analyte) is electrochemically reacted at the first electrode (measuring electrode). In this connection, the current generated by this reaction is proportional to the quantity of gas present. The signal, which is outputted, e.g., by a gas warning device, is generated from this current.

The most common electrolyte is usually sulfuric acid. However, since not all gases can be reacted in acidic media, other electrolyte systems were developed, e.g., lithium chloride aqueous solution, organic-solvent-based electrolytes or ionic liquids. Thus, for example, DE 42 38 337 C2 provides a gas sensor for detecting ammonia, the electrolyte of which is an aqueous solution of a hygroscopic salt of an alkali metal or an alkaline earth metal or a mixture thereof. However, a problem when using aqueous electrolytes is that they may dry out.

DE 10 2008 044 240 B4 proposes an electrochemical gas sensor with an ionic liquid as electrolyte, which contains at least one mono-, di- or trialkyl ammonium cation. GB 2 395 564 B proposes an electrolyte based on 1-ethyl-3-methylimidazolium tetrafluoroborate or 1-ethyl-3-methylimidazolium chloride. U.S. Pat. No. 7,060,169 B2 proposes an electrolyte based on an ionic liquid as well, wherein the ionic liquid contains either an imidazolium cation or a pyridinium cation. Such an ionic liquid may, for example, contain an alkyl- or aryl-substituted imidazolium cation. US 2017 299542 A1 discloses an electrochemical gas sensor for chlorine gas with electrolytes containing imidazolium compounds, among others. WO 2010063624 A1 discloses an electrochemical gas sensor with ionic liquids as electrolytes, which additionally contain inorganic additives. Both of these documents do not disclose that the electrolytes comprise at least 5 wt. % water.

All these solutions use precious metal electrodes or carbon electrodes as measuring electrodes. This basically offers the advantage that very low gas concentrations may thus be detectable under ideal conditions. However, this requires the absence of all other gases, to which the sensor is sensitive as well. In addition, the sensitivity of the sensor signal to changes in the ambient humidity of the sensor is problematic in case of carbon electrodes. This may be further exacerbated especially by the presence of hydrophobic anions in the electrolyte, especially when using ionic liquids.

SUMMARY

On that basis, it is an object of the present invention, among others, to overcome these and other drawbacks of the state of the art and to create an improved electrochemical gas sensor, as well as an improved electrolyte for an electrochemical gas sensor. This electrochemical gas sensor shall be manufactured in a cost-effective and simple manner. For example, an electrochemical gas sensor with such an electrolyte shall have an as short as possible reaction time and a high sensitivity. In addition, the electrochemical gas sensor shall be as independent as possible from the ambient humidity. Furthermore, the gas sensor shall have an as low as possible cross sensitivity. A long service life is also desirable. Such a gas sensor shall be usable, for example, for the detection of $SO_2$ or of other electrochemically reactive gases.

To accomplish this object, the present invention proposes an electrochemical gas sensor and the use thereof corresponding to the independent claims. Preferred embodiments are respective subjects of the dependent claims or are described below.

According to the present invention, an electrochemical gas sensor is proposed, comprising a first electrode and a second electrode and an electrolyte, likewise according to the present invention, wherein the electrolyte contains at least one cyclic compound and at least 5 wt. % water, the cyclic compound corresponds to formula (I)

$$[(A)R^1R^2]^+[Y]^-$$

- wherein (A) is a ring structure, which is selected from the group comprising pyridinium, piperidinium, pyrrolidinium;
- wherein the radical $R^1$ is arranged at the nitrogen atom of the ring structure A;
- wherein $R^1$ is a hydrocarbon radical with 1, 2, 3, 4, 5, 6, 7, 8, 9, 10, 11 or 12 C atoms;
- wherein $R^2$ is a hydrogen atom or a hydrocarbon radical with 1, 2, 3 or 4 C atoms; and
- wherein Y is selected from the group comprising halide, cyanide, alkyl sulfonate, halogenated alkyl sulfonate, acetate.

It was shown that an electrochemical gas sensor, in which the electrolyte consists of such a mixture of such a cyclic compound with at least 5 wt. % water, can surprisingly advantageously be operated in a very broad potential range and at the same time in a very broad ambient humidity range over a long period of time.

In particular, it is advantageous here when the cyclic compound of this composition is the substance that is acting as the electrolyte. Hence, it is conceivable that such an electrolyte consists exclusively of the cyclic compound and water. The cyclic compound may therefore make up to 95 wt. % of the electrolyte.

An electrochemical gas sensor (gas sensor) is typically defined here as an electrochemical cell with at least two electrodes, which are in conductive connection with one another by means of an ion-conducting medium (electrolyte). In such an electrochemical cell, an electrochemical reaction takes place in the presence of a gas to be detected (analyte). Therefore, the electrochemical gas sensor corresponds to the functioning principle of a fuel cell. Hence, it is meaningful when the gas sensor has a housing, in which the electrodes and the electrolyte are arranged. Typically, the housing has an access opening, through which the analyte can flow in.

A cyclic compound is defined in this connection as a compound, which has, as a central element, a molecular ring, to which one or more side chains may be bound. According to formula (I), the molecular ring is the ring structure A. The side chains are the radicals $R^1$ and $R^2$. It can be seen that the ring structure is preferably a heteroaryl ring or heteroalkyl ring with 5 or 6 ring atoms, wherein a nitrogen atom in the ring is contained as an impurity atom.

The cyclic compound is preferably present as an organic salt. In this case, the molecular ring with the ring structure A and with the side chains $R^1$ and $R^2$ forms the cation. Therefore, the cation is shown in formula (I) by the component $[(A)R^1R^2]^+$.

The radicals $R^1$ und $R^2$ may be hydrocarbon radicals independently of one another. A hydrocarbon is defined here as a compound, which consists exclusively of carbon and hydrogen. A hydrocarbon radical with 4 C atoms is, in this respect, a radical, which consists of four C atoms and up to nine H atoms. In this case, the number of H atoms depends on how the C atoms of the hydrocarbon radical are connected to one another.

The anion is shown in formula (I) by the component $[Y]^-$. The component $[Y]^-$ may be a halide, a cyanide, an alkyl sulfonate, a halogenated alkyl sulfonate or an acetate. A halide is defined here as the ion of a halogen. A cyanide is defined as the cyanide anion CN. Alkyl sulfonates are defined as the sulfonates of aliphatic sulfonic acids, wherein a sulfonate is defined as the anion of the salt of a sulfonic acid. Halogenated alkyl sulfonates are defined as the sulfonates of aliphatic sulfonic acids, in which one or more of the hydrogen atoms contained was replaced with a halogen. Acetate is defined as the anion of the salts of acetic acid.

The specification of weight percent is always defined within the context of this invention in relation to the total weight of the electrolyte, if not explicitly specified otherwise. The specification weight percent is also abbreviated as wt. % below. Furthermore, the use of % within the context of this application also means weight percent, if not explicitly specified.

An electrolyte having such a composition offers the special advantage that it is highly resistant to drying out. This may make it possible to use it in very low ambient humidity. A corresponding use location may be, for example, a desert. At the same time, the cyclic compounds of the electrolyte proposed according to the present invention are organic salts, which are largely inert to almost all conceivable electrode materials. This offers the advantage that the gas sensor has a very low zero current (current response of the sensor in the absence of analyte gas). Therefore, the signal to noise ratio of the sensor according to the present invention is markedly improved compared to the sensors known from the state of the art. In addition, such an electrolyte can surprisingly be used in a very wide temperature range.

It is also conceivable in this case for the electrolyte to contain at least one additional component. The composition that forms the electrolyte does not necessarily consist exclusively of water and at least one cyclic compound, but rather it may contain additional substances. It is here that the cyclic compound and all additional components can together make up 95 wt. % of the electrolyte. In this connection, the cyclic compound and the additional components may be present in different ratios to one another, e.g., in a ratio of 1:1 or even other ratios.

The additional component may be, for example, a buffer substance, a reaction mediator, an addition or a mixture consisting of two or more of these components.

A buffer substance (buffer) is typically defined here as a substance, which causes the pH value of a mixture of substances, in which it is contained, to change considerably less intensely when an acid or a base is added than this would be the case if the buffer substance were not to be contained in the mixture of substances.

A reaction mediator (mediator) is typically defined as a substance that mediates the reaction of the gas to be detected at the working electrode. In particular, it is defined by a substance, which reacts with a gaseous analyte and is then reconverted into its initial state from the working electrode, with the reconversion reaction supplying the sensor current. The terms reaction mediator and mediator are synonymous below.

An addition is typically defined as a substance, which is contained in a mixture of substances, and it does not participate in the primary reaction or primary reactions of the mixture of substances. The primary reactions of the mixture of substances are in this case the reaction of the gas to be detected with a mediator that is possibly present, the conversion of the gas to be detected or of the product formed due to the reaction with the mediator at the working electrode and the corresponding back reaction of the counterelectrode.

The buffer substance may be selected, for example, from the group comprising potassium hydrogen phthalate, pyridinium formate, 3-morpholinopropanesulfonic acid (MOPS), 4-(2-hydroxyethyl)-piperazinyl-1-ethanesulfonic acid (HEPES), 2,4,5-triamino-6-hydroxylpyrimidine sulfate, bis-(2-hydroxymethyl)aminomethane (Bis-Tris), tris (hydroxymethyl)aminomethane (TRIS), triethanolamine (TEA), 2-(cyclohexylamino)ethanesulfonic acid (CHES), N-[tris-(hydroxymethyl)-methyl]glycine (TRICIN), piperazine-1,4-bis(2-ethanesulfonic acid) (PIPES), N-(2-acetamido)iminodiacetic acid (ADA), ethylenediamine tetraacetate (EDTA), ethylene glycol-tris-aminoethyl ether-NNNN-tetraacetate (EGTA). Other examples are, of course, conceivable. Thus, the buffer substance may also be a carbonate buffer. In other words, it may be advantageous when the buffer substance is selected from the group comprising EDTA, EGTA, TEA, Bis-Tris, ADA, Tris, potassium hydrogen phthalate, pyridinium formate, MOPS, HEPES, CHES, TRICIN, PIPES, carbonate.

The buffer (buffer substance) may be both an acidic buffer and an alkaline buffer here. In other words, it is, for example, conceivable that the electrolyte contains a first cyclic compound, water and an alkaline buffer. As an alternative, it is, for example, also conceivable that the electrolyte contains a first cyclic compound, water and an acidic buffer. An alkaline buffer is defined here as a buffer that buffers the electrolyte in the alkaline range. An acidic buffer is defined here as a buffer that buffers the electrolyte in the acidic range. This shows that one special advantage of the present invention is that an alkaline buffering of the electrolyte is possible, or that the electrolyte may be an alkaline electrolyte, in other words.

The reaction mediator may be selected from the group comprising $CuCl_2$, $CoCl_3$, quinone, quinone derivatives, $MnCl_2$, for example.

The addition may be selected from, including, but not limited to, methane sulfonic acid, potassium acetate, 1-ethyl-3-methylimidazolium acetate (EMIM acetate), pyridinium acetate, $BaCl_2$, $CaCl_2$), $EuCl_2$. Other additions are conceivable. It can be seen that the addition may also have a buffering action, even if this does not necessarily have to be the case.

In other words, it is conceivable in an embodiment variant that the electrolyte contains a first cyclic compound according to formula (I), a buffer substance and water.

In another embodiment variant it is conceivable that the electrolyte contains a first cyclic compound according to formula (I), a reaction mediator and water.

In another embodiment variant it is conceivable that the electrolyte contains a first cyclic compound according to formula (I), an addition and water.

In another embodiment variant it is conceivable that the cyclic compound according to formula (I) contains a second cyclic compound according to formula (I) and water.

In another embodiment variant it is conceivable that the electrolyte contains a first cyclic compound according to formula (I), a second cyclic compound according to formula (I), water and a buffer.

It is conceivable in yet another embodiment variant that the electrolyte contains a first cyclic compound according to formula (I), a second cyclic compound according to formula (I), water and a reaction mediator.

It is conceivable in yet another embodiment variant that the electrolyte contains a first cyclic compound according to formula (I), a second cyclic compound according to formula (I), water and an addition.

It is conceivable in yet another embodiment variant that the electrolyte contains a first cyclic compound according to formula (I), a second cyclic compound according to formula (I), water, a buffer and a reaction mediator.

It is also conceivable in other embodiment variants that the electrolyte contains a first cyclic compound according to formula (I), a second cyclic compound according to formula (I), water, a buffer and an addition, or that the electrolyte contains a first cyclic compound according to formula (I), a second cyclic compound according to formula (I), water, a reaction mediator and an addition, or that the electrolyte contains a first cyclic compound according to formula (I), a second cyclic compound according to formula (I), a buffer, a reaction mediator, water and an addition.

For each of these conceivable embodiment variants the water component at the electrolyte is always at least 5 wt. %.

Moreover, it is both conceivable that the buffer is an acidic buffer and that the buffer is an alkaline buffer for each of these conceivable embodiment variants.

In any case and regardless of whether the electrolyte contains only one cyclic compound or whether it contains a plurality of different cyclic compounds as defined above, it is advantageous when the ring structure is a respective heterocycloalkane structure or a heteroaryl structure. It can especially be seen that it is advantageous when the ring structure (A) is a heterocycloalkane structure or a heteroaryl structure with precisely one impurity atom in the ring. In this case, the impurity atom is a nitrogen atom as appears from the formula. For example, it is conceivable that the ring structure is selected from the group comprising pyrrolidine ring, pyrrole ring, piperidine ring, pyridine ring. The following terms are used and defined synonymously with the designations mentioned above as well: Azolidine synonymously with pyrrolidine, azole synonymously with pyrrole, azinane synonymously with piperidine, azine synonymously with pyridine.

Typically, a pyrrolidine ring is defined as a ring structure according to formula II, a pyrrole ring is defined as a ring structure according to formula III, a piperidine ring is defined as a ring structure according to formula IV, a pyridine ring is defined as a ring structure according to formula V, and, as an alternative, the respective hydrogen atom arranged at the ring nitrogen of formulas II, III, IV and V may in any case also be replaced with a different radical, as appears below from the further description.

[II]

,

[III]

,

[IV]

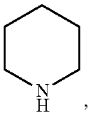
,

[V]

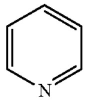

It can be seen in this respect that the cyclic compounds according to formula (I) are especially compounds, which are selected from the group comprising substituted pyrrolidine salts, substituted pyrrole salts, substituted piperidine salts, substituted pyridine salts. At least one substituent in this case is preferably an alkyl radical; therefore, it is conceivable that the compounds are selected from the group comprising alkyl-substituted pyrrolidine salts, alkyl-substituted pyrrole salts, alkyl-substituted piperidine salts, alkyl-substituted pyridine salts. In this case, it is both conceivable that $R^1$ and $R^2$ are both a respective alkyl radical, and that only $R^1$ is an alkyl radical. In other words, it is seen that it is advantageous when $R^1$ is an alkyl group and/or when $R^1$ and $R^2$ are alkyl groups. In another variant, it is also conceivable that $R^1$ and/or $R^2$ are substituted alkyl groups. In this case, $R^1$ and $R^2$ may be both identical and different alkyl radicals here. In any case, at least the heteroatom, namely the nitrogen atom, of the ring structure carries an alkyl radical here. The terms alkyl radical and alkyl substituent are used here synonymously in the sense of the present application. In this case, both terms designate a substitution of a hydrogen atom with an alkyl group. In other words, the cyclic compounds may be selected from the group comprising mono-alkyl-substituted pyrrolidine salts, mono-alkyl-substituted pyrrole salts, mono-alkyl-substituted piperidine salts, mono-alkyl-substituted pyridine salts, di-alkyl-substituted pyrrolidine salts, di-alkyl-substituted pyrrole salts, di-alkyl-substituted piperidine salts, di-alkyl-substituted pyridine salts.

When Y forms the anion of the salt and is selected from the group comprising halide, cyanide, alkyl sulfonate, halogenated alkyl sulfonate, acetate, for example, from the group comprising Cl, F, I, Br, CN, $CH_3SO_3$, $CF_3SO_3$, $CH_3COO$ proved to be advantageous in this case. It is generally true in the context of this application that the anions mentioned in the text are indicated without an additional minus sign, since this is already indicated in the respective general formula, so that when using the respective designations for the variable Y, it can clearly be seen that they are anions, i.e., for example: The Cl mentioned above is a chloride anion, as happens by using Cl for Y in the formulas.

In this respect, it is seen that the cyclic compounds according to formula (I) in a first embodiment variant correspond to formula VI

[VI]

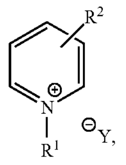

wherein $R^2$ is a hydrogen atom or a hydrocarbon radical with 1, 2, 3 or 4 C atoms, the nitrogen atom of the ring carries the radical $R^1$, $R^1$ is a hydrocarbon radical with 1, 2, 3, 4, 5, 6, 7, 8, 9, 10, 11 or 12 C atoms, and wherein Y is selected from the group comprising halide, cyanide, alkyl sulfonate, halogenated alkyl sulfonate, acetate, for example, from the group comprising Cl, F, I, Br, CN, $CH_3SO_3$, $CF_3SO_3$, $CH_3COO$. In this respect, it is seen that the ring structure A in this case is a ring structure with six atoms; i.e., n=5. Compounds according to formula VI are therefore pyridinium compounds.

The cyclic compounds according to formula (I) correspond to formula VII in another embodiment variant

[VII]

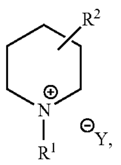

wherein $R^2$ is also a hydrogen atom or a hydrocarbon radical with 1, 2, 3 or 4 C atoms, the nitrogen atom of the ring carries the radical $R^1$, $R^1$ is a hydrocarbon radical with 1, 2, 3, 4, 5, 6, 7, 8, 9, 10, 11 or 12 C atoms, and wherein Y is selected from the group comprising halide, cyanide, alkyl sulfonate, halogenated alkyl sulfonate, acetate, for example, from the group comprising Cl, F, I, Br, CN, $CH_3SO_3$, $CF_3SO_3$, $CH_3COO$. In this respect, it can be seen that the ring structure A in this case is a ring structure with six atoms; i.e., n=5. Compounds of formula VII are therefore piperidinium compounds.

The cyclic compounds according to formula (I) correspond to formula VIII in another embodiment variant

[VIII]

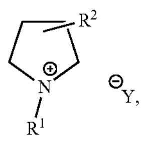

wherein $R^2$ is also a hydrogen atom or a hydrocarbon radical with 1, 2, 3 or 4 C atoms, the nitrogen atom of the ring carries the radical $R^1$, $R^1$ is a hydrocarbon radical with 1, 2, 3, 4, 5, 6, 7, 8, 9, 10, 11 or 12 C atoms, and wherein Y is selected from the group comprising halide, cyanide, alkyl sulfonate, halogenated alkyl sulfonate, acetate. In this respect, it can be seen that the ring structure A in this case is a ring structure with five atoms; i.e., n=4. Compounds according to Formula VIII are therefore pyrrolidinium compounds.

In another embodiment variant, the cyclic compounds correspond to formula IX

[IX]

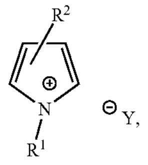

wherein $R^2$ is also a hydrogen atom or a hydrocarbon radical with 1, 2, 3 or 4 C atoms, the nitrogen atom of the ring carries the radical $R^1$, $R^1$ is a hydrocarbon radical with 1, 2, 3, 4, 5, 6, 7, 8, 9, 10, 11 or 12 C atoms, and wherein Y is selected from the group comprising halide, cyanide, alkyl sulfonate, halogenated alkyl sulfonate, acetate. In this respect, it can be seen that the ring structure A in this case is a ring structure with five atoms; i.e., n=4. Compounds according to formula IX are therefore pyrrolium compounds.

In any case, it holds true for all compounds according to one of the formulas VI, VII, VIII or IX that $R^2$ is a hydrogen atom or a hydrocarbon radical with 1, 2, 3 or 4 C atoms, X carries the radical $R^1$, $R^1$ is a hydrocarbon radical with 1, 2, 3, 4, 5, 6, 7, 8, 9, 10, 11 or 12 C atoms, and that Y is selected from the group comprising halide, cyanide, alkyl sulfonate, halogenated alkyl sulfonate, acetate.

It can be seen that especially compounds according to the following formulas (1), (2), (3), (4), (5), (6), (7), (8), (9), (10), (11) or (12)

(1)

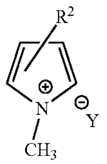

(2)

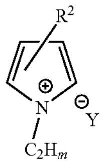

(3)

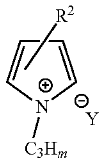

-continued (4)

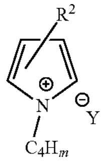

(5)

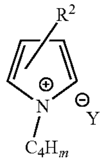

(6)

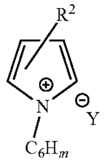

(7)

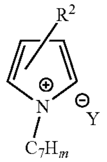

(8)

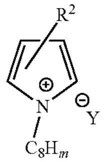

(9)

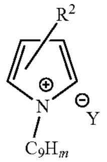

(10)

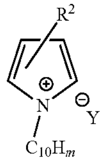

(11)

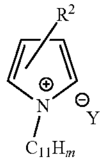

(12)

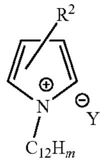

are comprised of formula IX, wherein $R^2$ is a hydrogen atom or a hydrocarbon radical with 1, 2, 3 or 4 C atoms and Y is selected from the group comprising halide, cyanide, alkyl sulfonate, halogenated alkyl sulfonate, acetate, and wherein m is selected from 3 or 5 for formula (2), wherein m is selected from 3, 5 or 7 for formula (3), wherein m is selected from 3, 5, 7 or 9 for formula (4), wherein m is selected from 3, 5, 7, 9 or 11 for formula (5), wherein m is selected from 3, 5, 7, 9, 11 or 13 for formula (6), wherein m is selected from 3, 5, 7, 9, 11, 13 or 15 for formula (7), wherein m is selected from 3, 5, 7, 9, 11, 13, 15 or 17 for formula (8), wherein m is selected from 3, 5, 7, 9, 11, 13, 15, 17 or 19 for formula (9), wherein m is selected from 3, 5, 7, 9, 11, 13, 15, 17, 19 or 21 for formula (10), wherein m is selected from 3, 5, 7, 9, 11, 13, 15, 17, 19, 21 or 23 for formula (11), wherein m is selected from 3, 5, 7, 9, 11, 13, 15, 17, 19, 21, 23 or 25 for formula (12). The radical $R^1$ is preferably either saturated, monounsaturated or diunsaturated, so that m is selected from 3 or 5 for formula (2), m is selected from 3, 5 or 7 for formula (3), m is selected from 5, 7, or 9 for formula (4), m is selected from 7, 9 or 11 for formula (5), m is selected from 9, 11 or 13 for formula (6), m is selected from 11, 13 or 15 for formula (7), m is selected from 13, 15 or 17 for formula (8), m is selected from 15, 17 or 19 for formula (9), m is selected from 17, 19 or 21 for formula (10), m is selected from 19, 21 or 23 for formula (11), and m is selected from 21, 23 or 25 for formula (12).

Radical $R^1$ is especially preferably a saturated alkyl radical, so that formula IX comprises especially compounds according to formula (1) as well as according to the following formulas (13), (14), (15), (16), (17), (18), (19), (20), (21), (22) and (23)

(13)

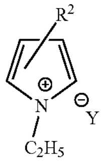

(14)

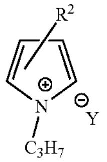

(15)

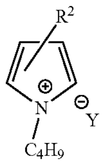

(16)

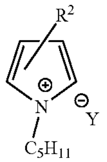

(17)

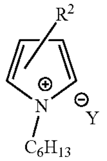

-continued

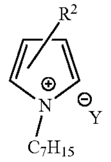

(18)

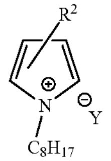

(19)

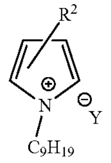

(20)

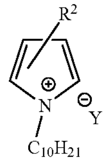

(21)

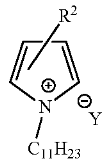

(22)

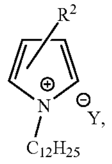

(23)

wherein $R^2$ is a hydrogen atom or a hydrocarbon radical with 1, 2, 3 or 4 C atoms and Y is selected from the group comprising halide, cyanide, alkyl sulfonate, halogenated alkyl sulfonate, acetate.

It can be seen that a compound according to formula (1) may be selected, for example, from the group comprising N-methylpyrrolium chloride, 1,2-dimethylpyrrolium chloride, 1-methyl-2-ethylpyrrolium chloride, 1-methyl-2-propylpyrrolium chloride, 1-methyl-2-butylpyrrolium chloride, 1,3-dimethylpyrrolium chloride, 1-methyl-3-ethylpyrrolium chloride, 1-methyl-3-propylpyrrolium chloride, 1-methyl-3-butylpyrrolium chloride, N-methylpyrrolium fluoride, 1,2-dimethylpyrrolium fluoride, 1-methyl-2-ethylpyrrolium fluoride, 1-methyl-2-propylpyrrolium fluoride, 1-methyl-2-butylpyrrolium fluoride, 1,3-dimethylpyrrolium fluoride, 1-methyl-3-ethylpyrrolium fluoride, 1-methyl-3-propylpyrrolium fluoride, 1-methyl-3-butylpyrrolium fluoride, N-methylpyrrolium triflate, 1,2-dimethylpyrrolium triflate, 1-methyl-2-ethylpyrrolium triflate, 1-methyl-2-propylpyrrolium triflate, 1-methyl-2-butylpyrrolium triflate, 1,3-dimethylpyrrolium triflate, 1-methyl-3-ethylpyrrolium triflate, 1-methyl-3-propylpyrrolium triflate, 1-methyl-3-butylpyrrolium triflate, N-methylpyrrolium methanesulfonate, 1,2-dimethylpyrrolium methanesulfonate, 1-methyl-2-ethylpyrrolium methanesulfonate, 1-methyl-2-propylpyrrolium methanesulfonate, 1-methyl-2-butylpyrrolium methanesulfonate, 1,3-dimethylpyrrolium methanesulfonate, 1-methyl-3-ethylpyrrolium methanesulfonate, 1-methyl-3-propylpyrrolium methanesulfonate, 1-methyl-3-butylpyrrolium methanesulfonate, N-methylpyrrolium acetate, 1,2-dimethylpyrrolium acetate, 1-methyl-2-ethylpyrrolium acetate, 1-methyl-2-propylpyrrolium acetate, 1-methyl-2-butylpyrrolium acetate, 1,3-dimethylpyrrolium acetate, 1-methyl-3-ethylpyrrolium acetate, 1-methyl-3-propylpyrrolium acetate, 1-methyl-3-butylpyrrolium acetate, N-methylpyrrolium cyanide, 1,2-dimethylpyrrolium cyanide, 1-methyl-2-ethylpyrrolium cyanide, 1-methyl-2-propylpyrrolium cyanide, 1-methyl-2-butylpyrrolium cyanide, 1,3-dimethylpyrrolium cyanide, 1-methyl-3-ethylpyrrolium cyanide, 1-methyl-3-propylpyrrolium cyanide, 1-methyl-3-butylpyrrolium cyanide.

It can be seen that a compound according to formula (2) may be selected, for example, from the group comprising N-ethylpyrrolium chloride, 1-ethyl-2-methylpyrrolium chloride, 1,2-diethylpyrrolium chloride, 1-ethyl-2-propylpyrrolium chloride, 1-ethyl-2-butylpyrrolium chloride, 1-ethyl-3-methylpyrrolium chloride, 1,3-diethylpyrrolium chloride, 1-ethyl-3-propylpyrrolium chloride, 1-ethyl-3-butylpyrrolium chloride, N-ethylpyrrolium fluoride, 1-ethyl-2-methylpyrrolium fluoride, 1,2-diethylpyrrolium fluoride, 1-ethyl-2-propylpyrrolium fluoride, 1-ethyl-2-butylpyrrolium fluoride, 1-ethyl-3-methylpyrrolium fluoride, 1,3-diethylpyrrolium fluoride, 1-ethyl-3-propylpyrrolium fluoride, 1-ethyl-3-butylpyrrolium fluoride, N-ethylpyrrolium triflate, 1-ethyl-2-methylpyrrolium triflate, 1,2-diethylpyrrolium triflate, 1-ethyl-2-propylpyrrolium triflate, 1-ethyl-2-butylpyrrolium triflate, 1-ethyl-3-methylpyrrolium triflate, 1,3-diethylpyrrolium triflate, 1-ethyl-3-propylpyrrolium triflate, 1-ethyl-3-butylpyrrolium triflate, N-ethylpyrrolium methanesulfonate, 1-ethyl-2-methylpyrrolium methanesulfonate, 1,2-diethylpyrrolium methanesulfonate, 1-ethyl-2-propylpyrrolium methanesulfonate, 1-ethyl-2-butylpyrrolium methanesulfonate, 1-ethyl-3-methylpyrrolium methanesulfonate, 1,3-diethylpyrrolium methanesulfonate, 1-ethyl-3-propylpyrrolium methanesulfonate, 1-ethyl-3-butylpyrrolium methanesulfonate, N-ethylpyrrolium acetate, 1-ethyl-2-methylpyrrolium acetate, 1,2-diethylpyrrolium acetate, 1-ethyl-2-propylpyrrolium acetate, 1-ethyl-2-butylpyrrolium acetate, 1-ethyl-3-methylpyrrolium acetate, 1,3-diethylpyrrolium acetate, 1-ethyl-3-propylpyrrolium acetate, 1-ethyl-3-butylpyrrolium acetate, N-ethylpyrrolium cyanide, 1-ethyl-2-methylpyrrolium cyanide, 1,2-diethylpyrrolium cyanide, 1-ethyl-2-propylpyrrolium cyanide, 1-ethyl-2-butylpyrrolium cyanide, 1-ethyl-3-methylpyrrolium cyanide, 1,3-diethylpyrrolium cyanide, 1-ethyl-3-propylpyrrolium cyanide, 1-ethyl-3-butylpyrrolium cyanide.

It can be seen that a compound according to formula (3) may be selected, for example, from the group comprising N-propylpyrrolium chloride, 1-propyl-2-methylpyrrolium chloride, 1-propyl-2-ethylpyrrolium chloride, 1,2-dipropylpyrrolium chloride, 1-propyl-2-butylpyrrolium chloride, 1-propyl-3-methylpyrrolium chloride, 1-propyl-3-ethylpyrrolium chloride, 1,3-dipropylpyrrolium chloride, 1-propyl-3-butylpyrrolium chloride, N-propylpyrrolium fluoride, 1-propyl-2-methylpyrrolium fluoride, 1-propyl-2-ethylpyrrolium fluoride, 1,2-dipropylpyrrolium fluoride, 1-propyl-2-butylpyrrolium fluoride, 1-propyl-3-methylpyrrolium fluoride, 1-propyl-3-ethylpyrrolium fluoride, 1,3-dipropylpyrrolium fluoride, 1-propyl-3-butylpyrrolium fluoride, N-propylpyrrolium triflate, 1-propyl-2-methylpyrrolium triflate, 1-propyl-2-ethylpyrrolium triflate, 1,2-dipropylpyrrolium triflate, 1-propyl-2-butylpyrrolium triflate, 1-propyl-3-methylpyrrolium triflate, 1-propyl-3-ethylpyrrolium triflate, 1,3-dipropylpyrrolium triflate, 1-propyl-3-butylpyrrolium triflate, N-propylpyrrolium methanesulfonate, 1-propyl-2-methylpyrrolium methanesulfonate, 1-propyl-2-ethylpyrrolium methanesulfonate, 1,2-dipropylpyrrolium methanesulfonate, 1-propyl-2-butylpyrrolium methanesulfonate, 1-propyl-3-methylpyrrolium methanesulfonate, 1-propyl-3-ethylpyrrolium methanesulfonate, 1,3-dipropylpyrrolium methanesulfonate, 1-propyl-3-butylpyrrolium methanesulfonate, N-propylpyrrolium acetate, 1-propyl-2-methylpyrrolium acetate, 1-propyl-2-ethylpyrrolium acetate, 1,2-dipropylpyrrolium acetate, 1-propyl-2-butylpyrrolium acetate, 1-propyl-3-methylpyrrolium acetate, 1-propyl-3-ethylpyrrolium acetate, 1,3-dipropylpyrrolium acetate, 1-propyl-3-butylpyrrolium acetate, N-propylpyrrolium cyanide, 1-propyl-2-methylpyrrolium cyanide, 1-propyl-2-ethylpyrrolium cyanide, 1,2-dipropylpyrrolium cyanide, 1-propyl-2-butylpyrrolium cyanide, 1-propyl-3-methylpyrrolium cyanide, 1-propyl-3-ethylpyrrolium cyanide, 1,3-dipropylpyrrolium cyanide, 1-propyl-3-butylpyrrolium cyanide.

It can be seen that a compound according to formula (4) may be selected, for example, from the group comprising N-butylpyrrolium chloride, 1-butyl-2-methylpyrrolium chloride, 1-butyl-2-ethylpyrrolium chloride, 1-butyl-2-propylpyrrolium chloride, 1,2-dibutylpyrrolium chloride, 1-butyl-3-methylpyrrolium chloride, 1-butyl-3-ethylpyrrolium chloride, 1-butyl-3-propylpyrrolium chloride, 1,3-dibutylpyrrolium chloride, N-butylpyrrolium fluoride, 1-butyl-2-methylpyrrolium fluoride, 1-butyl-2-ethylpyrrolium fluoride, 1-butyl-2-propylpyrrolium fluoride, 1,2-dibutylpyrrolium fluoride, 1-butyl-3-methylpyrrolium fluoride, 1-butyl-3-ethylpyrrolium fluoride, 1-butyl-3-propylpyrrolium fluoride, 1,3-dibutylpyrrolium fluoride, N-butylpyrrolium triflate, 1-butyl-2-methylpyrrolium triflate, 1-butyl-2-ethylpyrrolium triflate, 1-butyl-2-propylpyrrolium triflate, 1,2-dibutylpyrrolium triflate, 1-butyl-3-methylpyrrolium triflate, 1-butyl-3-ethylpyrrolium triflate, 1-butyl-3-propylpyrrolium triflate, 1,3-dibutylpyrrolium triflate, N-butylpyrrolium methanesulfonate, 1-butyl-2-methylpyrrolium methanesulfonate, 1-butyl-2-ethylpyrrolium methanesulfonate, 1-butyl-2-propylpyrrolium methanesulfonate, 1,2-dibutylpyrrolium methanesulfonate, 1-butyl-3-methylpyrrolium methanesulfonate, 1-butyl-3-ethylpyrrolium methanesulfonate, 1-butyl-3-propylpyrrolium methanesulfonate, 1,3-dibutylpyrrolium methanesulfonate, N-butylpyrrolium acetate, 1-butyl-2-methylpyrrolium acetate, 1-butyl-2-ethylpyrrolium acetate, 1-butyl-2-propylpyrrolium acetate, 1,2-dibutylpyrrolium acetate, 1-butyl-3-methylpyrrolium acetate, 1-butyl-3-ethylpyrrolium acetate, 1-butyl-3-propylpyrrolium acetate, 1,3-dibutylpyrrolium acetate, N-butylpyrrolium cyanide, 1-butyl-2-methylpyrrolium cyanide, 1-butyl-2-ethylpyrrolium cyanide, 1-butyl-2-propylpyrrolium cyanide, 1,2-dibutylpyrrolium cyanide, 1-butyl-3-methylpyrrolium cyanide, 1-butyl-3-ethylpyrrolium cyanide, 1-butyl-3-propylpyrrolium cyanide, 1,3-dibutylpyrrolium cyanide.

It can be seen that a compound according to formula (5) may be selected, for example, from the group comprising N-pentylpyrrolium chloride, 1-pentyl-2-methylpyrrolium chloride, 1-pentyl-2-ethylpyrrolium chloride, 1-pentyl-2-propylpyrrolium chloride, 1-pentyl-2-butylpyrrolium chloride, 1-pentyl-3-methylpyrrolium chloride, 1-pentyl-3-ethylpyrrolium chloride, 1-pentyl-3-propylpyrrolium chloride, 1-pentyl-3-butylpyrrolium chloride, N-pentylpyrrolium fluoride, 1-pentyl-2-methylpyrrolium fluoride, 1-pentyl-2-ethylpyrrolium fluoride, 1-pentyl-2-propylpyrrolium fluoride, 1-pentyl-2-butylpyrrolium fluoride, 1-pentyl-3-methylpyrrolium fluoride, 1-pentyl-3-ethylpyrrolium fluoride, 1-pentyl-3-propylpyrrolium fluoride, 1-pentyl-3-butylpyrrolium fluoride, N-pentylpyrrolium triflate, 1-pentyl-2-methylpyrrolium triflate, 1-pentyl-2-ethylpyrrolium triflate, 1-pentyl-2-propylpyrrolium triflate, 1-pentyl-2-butylpyrrolium triflate, 1-pentyl-3-methylpyrrolium triflate, 1-pentyl-3-ethylpyrrolium triflate, 1-pentyl-3-propylpyrrolium triflate, 1-pentyl-3-butylpyrrolium triflate, N-pentylpyrrolium methanesulfonate, 1-pentyl-2-methylpyrrolium methanesulfonate, 1-pentyl-2-ethylpyrrolium methanesulfonate, 1-pentyl-2-propylpyrrolium methanesulfonate, 1-pentyl-2-butylpyrrolium methanesulfonate, 1-pentyl-3-methylpyrrolium methanesulfonate, 1-pentyl-3-ethylpyrrolium methanesulfonate, 1-pentyl-3-propylpyrrolium methanesulfonate, 1-pentyl-3-butylpyrrolium methanesulfonate, N-pentylpyrrolium acetate, 1-pentyl-2-methylpyrrolium acetate, 1-pentyl-2-ethylpyrrolium acetate, 1-pentyl-2-propylpyrrolium acetate, 1-pentyl-2-butylpyrrolium acetate, 1-pentyl-3-methylpyrrolium acetate, 1-pentyl-3-ethylpyrrolium acetate, 1-pentyl-3-propylpyrrolium acetate, 1-pentyl-3-butylpyrrolium acetate, N-pentylpyrrolium cyanide, 1-pentyl-2-methylpyrrolium cyanide, 1-pentyl-2-ethylpyrrolium cyanide, 1-pentyl-2-propylpyrrolium cyanide, 1-pentyl-2-butylpyrrolium cyanide, 1-pentyl-3-methylpyrrolium cyanide, 1-pentyl-3-ethylpyrrolium cyanide, 1-pentyl-3-propylpyrrolium cyanide, 1-pentyl-3-butylpyrrolium cyanide.

It can further be seen that a compound according to formula (6) may be selected from the group comprising N-hexylpyrrolium chloride, 1-hexyl-2-methylpyrrolium chloride, 1-hexyl-2-ethylpyrrolium chloride, 1-hexyl-2-propylpyrrolium chloride, 1-hexyl-2-butylpyrrolium chloride, 1-hexyl-3-methylpyrrolium chloride, 1-hexyl-3-ethylpyrrolium chloride, 1-hexyl-3-propylpyrrolium chloride, 1-hexyl-3-butylpyrrolium chloride, N-hexylpyrrolium fluoride, 1-hexyl-2-methylpyrrolium fluoride, 1-hexyl-2-ethylpyrrolium fluoride, 1-hexyl-2-propylpyrrolium fluoride, 1-hexyl-2-butylpyrrolium fluoride, 1-hexyl-3-methylpyrrolium fluoride, 1-hexyl-3-ethylpyrrolium fluoride, 1-hexyl-3-propylpyrrolium fluoride, 1-hexyl-3-butylpyrrolium fluoride, N-hexylpyrrolium triflate, 1-hexyl-2-methylpyrrolium triflate, 1-hexyl-2-ethylpyrrolium triflate, 1-hexyl-2-propylpyrrolium triflate, 1-hexyl-2-butylpyrrolium triflate, 1-hexyl-3-methylpyrrolium triflate, 1-hexyl-3-ethylpyrrolium triflate, 1-hexyl-3-propylpyrrolium triflate, 1-hexyl-3-butylpyrrolium triflate, N-hexylpyrrolium methanesulfonate, 1-hexyl-2-methylpyrrolium methanesulfonate, 1-hexyl-2-ethylpyrrolium methanesulfonate, 1-hexyl-2-propylpyrrolium methanesulfonate, 1-hexyl-2-butylpyrrolium methanesulfonate, 1-hexyl-3-methylpyrrolium methanesulfonate, 1-hexyl-3-ethylpyrrolium methanesulfonate, 1-hexyl-3-propylpyrrolium methanesulfonate, 1-hexyl-3-butylpyrrolium methanesulfonate, N-hexylpyrrolium acetate, 1-hexyl-2-methylpyrrolium acetate, 1-hexyl-2-ethylpyrrolium acetate, 1-hexyl-2-propylpyrrolium acetate, 1-hexyl-2-butylpyrrolium acetate, 1-hexyl-3-methylpyrrolium acetate, 1-hexyl-3-ethylpyrrolium acetate, 1-hexyl-3-propylpyrrolium acetate, 1-hexyl-3-butylpyrrolium acetate, N-hexylpyrrolium cyanide, 1-hexyl-2-methylpyrrolium cyanide, 1-hexyl-2-ethylpyrrolium cyanide, 1-hexyl-2-propylpyrrolium cyanide, 1-hexyl-2-butylpyrrolium cyanide, 1-hexyl-3-methylpyrrolium cyanide, 1-hexyl-3-ethylpyrrolium cyanide, 1-hexyl-3-propylpyrrolium cyanide, 1-hexyl-3-butylpyrrolium cyanide.

It can further be seen that a compound according to formula (7) may be selected from the group comprising N-heptylpyrrolium chloride, 1-heptyl-2-methylpyrrolium chloride, 1-heptyl-2-ethylpyrrolium chloride, 1-heptyl-2-propylpyrrolium chloride, 1-heptyl-2-butylpyrrolium chloride, 1-heptyl-3-methylpyrrolium chloride, 1-heptyl-3-ethylpyrrolium chloride, 1-heptyl-3-propylpyrrolium chloride, 1-heptyl-3-butylpyrrolium chloride, N-heptylpyrrolium fluoride, 1-heptyl-2-methylpyrrolium fluoride, 1-heptyl-2-ethylpyrrolium fluoride, 1-heptyl-2-propylpyrrolium fluoride, 1-heptyl-2-butylpyrrolium fluoride, 1-heptyl-3-methylpyrrolium fluoride, 1-heptyl-3-ethylpyrrolium fluoride, 1-heptyl-3-propylpyrrolium fluoride, 1-heptyl-3-butylpyrrolium fluoride, N-heptylpyrrolium triflate, 1-heptyl-2-methylpyrrolium triflate, 1-heptyl-2-ethylpyrrolium triflate, 1-heptyl-2-propylpyrrolium triflate, 1-heptyl-2-butylpyrrolium triflate, 1-heptyl-3-methylpyrrolium triflate, 1-heptyl-3-ethylpyrrolium triflate, 1-heptyl-3-propylpyrrolium triflate, 1-heptyl-3-butylpyrrolium triflate, N-heptylpyrrolium methanesulfonate, 1-heptyl-2-methylpyrrolium methanesulfonate, 1-heptyl-2-ethylpyrrolium methanesulfonate, 1-heptyl-2-propylpyrrolium methanesulfonate, 1-heptyl-2-butylpyrrolium methanesulfonate, 1-heptyl-3-methylpyrrolium methanesulfonate, 1-heptyl-3-ethylpyrrolium methanesulfonate, 1-heptyl-3-propylpyrrolium methanesulfonate, 1-heptyl-3-butylpyrrolium methanesulfonate, N-heptylpyrrolium acetate, 1-heptyl-2-methylpyrrolium acetate, 1-heptyl-2-ethylpyrrolium acetate, 1-heptyl-2-propylpyrrolium acetate, 1-heptyl-2-butylpyrrolium acetate, 1-heptyl-3-methylpyrrolium acetate, 1-heptyl-3-ethylpyrrolium acetate, 1-heptyl-3-propylpyrrolium acetate, 1-heptyl-3-butylpyrrolium acetate, N-heptylpyrrolium cyanide, 1-heptyl-1-methylpyrrolium cyanide, 1-heptyl-2-methylpyrrolium cyanide, 1-heptyl-2-ethylpyrrolium cyanide, 1-heptyl-2-propylpyrrolium cyanide, 1-heptyl-2-butylpyrrolium cyanide, 1-heptyl-3-methylpyrrolium cyanide, 1-heptyl-3-ethylpyrrolium cyanide, 1-heptyl-3-propylpyrrolium cyanide, 1-heptyl-3-butylpyrrolium cyanide.

It can further be seen that a compound according to formula (8) may be selected from the group comprising N-octylpyrrolium chloride, 1-octyl-2-methylpyrrolium chloride, 1-octyl-2-ethylpyrrolium chloride, 1-octyl-2-propylpyrrolium chloride, 1-octyl-2-butylpyrrolium chloride, 1-octyl-3-methylpyrrolium chloride, 1-octyl-3-ethylpyrrolium chloride, 1-octyl-3-propylpyrrolium chloride, 1-octyl-3-butylpyrrolium chloride, N-octylpyrrolium fluoride, 1-octyl-2-methylpyrrolium fluoride, 1-octyl-2-ethylpyrrolium fluoride, 1-octyl-2-propylpyrrolium fluoride, 1-octyl-2-butylpyrrolium fluoride, 1-octyl-3-methylpyrrolium fluoride, 1-octyl-3-ethylpyrrolium fluoride, 1-octyl-3-propylpyrrolium fluoride, 1-octyl-3-butylpyrrolium fluoride, N-octylpyrrolium triflate, 1-octyl-2-methylpyrrolium triflate, 1-octyl-2-ethylpyrrolium triflate, 1-octyl-2-propylpyrrolium triflate, 1-octyl-2-butylpyrrolium triflate, 1-octyl-3-methylpyrrolium triflate, 1-octyl-3-ethylpyrrolium triflate, 1-octyl-3-propylpyrrolium triflate, 1-octyl-3-butylpyrrolium triflate, N-octylpyrrolium methanesulfonate, 1-octyl-2-methylpyrrolium methanesulfonate, 1-octyl-2-ethylpyrrolium methanesulfonate, 1-octyl-2-propylpyrrolium methanesulfonate, 1-octyl-2-butylpyrrolium methanesulfonate, 1-octyl-3-methylpyrrolium methanesulfonate, 1-octyl-3-ethylpyrrolium methanesulfonate, 1-octyl-3-propylpyrrolium methanesulfonate, 1-octyl-3-butylpyrrolium methanesulfonate, N-octylpyrrolium acetate, 1-octyl-2-methylpyrrolium acetate, 1-octyl-2-ethylpyrrolium acetate, 1-octyl-2-propylpyrrolium acetate, 1-octyl-2-butylpyrrolium acetate, 1-octyl-3-methylpyrrolium acetate, 1-octyl-3-ethylpyrrolium acetate, 1-octyl-3-propylpyrrolium acetate, 1-octyl-3-butylpyrrolium acetate, N-octylpyrrolium cyanide, 1-octyl-2-methylpyrrolium cyanide, 1-octyl-2-ethylpyrrolium cyanide, 1-octyl-2-propylpyrrolium cyanide, 1-octyl-2-butylpyrrolium cyanide, 1-octyl-3-methylpyrrolium cyanide, 1-octyl-3-ethylpyrrolium cyanide, 1-octyl-3-propylpyrrolium cyanide, 1-octyl-3-butylpyrrolium cyanide.

It can further be seen that a compound according to formula (9) may be selected from the group comprising N-nonylpyrrolium chloride, 1-nonyl-2-methylpyrrolium chloride, 1-nonyl-2-ethylpyrrolium chloride, 1-nonyl-2-propylpyrrolium chloride, 1-nonyl-2-butylpyrrolium chloride, 1-nonyl-3-methylpyrrolium chloride, 1-nonyl-3-ethylpyrrolium chloride, 1-nonyl-3-propylpyrrolium chloride, 1-nonyl-3-butylpyrrolium chloride, N-nonylpyrrolium fluoride, 1-nonyl-2-methylpyrrolium fluoride, 1-nonyl-2-ethylpyrrolium fluoride, 1-nonyl-2-propylpyrrolium fluoride, 1-nonyl-2-butylpyrrolium fluoride, 1-nonyl-3-methylpyrrolium fluoride, 1-nonyl-3-ethylpyrrolium fluoride, 1-nonyl-3-propylpyrrolium fluoride, 1-nonyl-3-butylpyrrolium fluoride, N-nonylpyrrolium triflate, 1-nonyl-2-methylpyrrolium triflate, 1-nonyl-2-ethylpyrrolium triflate, 1-nonyl-2-propylpyrrolium triflate, 1-nonyl-2-butylpyrrolium triflate, 1-nonyl-3-methylpyrrolium triflate, 1-nonyl-3-ethylpyrrolium triflate, 1-nonyl-3-propylpyrrolium triflate, 1-nonyl-3-butylpyrrolium triflate, N-nonylpyrrolium methanesulfonate, 1-nonyl-2-methylpyrrolium methanesulfonate, 1-nonyl-2-ethylpyrrolium methanesulfonate, 1-nonyl-2-propylpyrrolium methanesulfonate, 1-nonyl-2-butylpyrrolium methanesulfonate, 1-nonyl-3-methylpyrrolium methanesulfonate, 1-nonyl-3-ethylpyrrolium methanesulfonate, 1-nonyl-3-propylpyrrolium methanesulfonate, 1-nonyl-3-butylpyrrolium methanesulfonate, N-nonylpyrrolium acetate, 1-nonyl-2-methylpyrrolium acetate, 1-nonyl-2-ethylpyrrolium acetate, 1-nonyl-2-propylpyrrolium acetate, 1-nonyl-2-butylpyrrolium acetate, 1-nonyl-3-methylpyrrolium acetate, 1-nonyl-3-ethylpyrrolium acetate, 1-nonyl-3-propylpyrrolium acetate, 1-nonyl-3-butylpyrrolium acetate, N-nonylpyrrolium cyanide, 1-nonyl-2-methylpyrrolium cyanide, 1-nonyl-2-ethylpyrrolium cyanide, 1-nonyl-2-propylpyrrolium cyanide, 1-nonyl-2-butylpyrrolium cyanide, 1-nonyl-3-methylpyrrolium cyanide, 1-nonyl-3-ethylpyrrolium cyanide, 1-nonyl-3-propylpyrrolium cyanide, 1-nonyl-3-butylpyrrolium cyanide.

It can further be seen that a compound according to formula (10) may be selected from the group comprising N-decylpyrrolium chloride, 1-decyl-2-methylpyrrolium chloride, 1-decyl-2-ethylpyrrolium chloride, 1-decyl-2-propylpyrrolium chloride, 1-decyl-2-butylpyrrolium chloride, 1-decyl-3-methylpyrrolium chloride, 1-decyl-3-ethylpyrrolium chloride, 1-decyl-3-propylpyrrolium chloride, 1-decyl-3-butylpyrrolium chloride, N-decylpyrrolium fluoride, 1-decyl-1-butylpyrrolium fluoride, 1-decyl-2-methylpyrrolium fluoride, 1-decyl-2-ethylpyrrolium fluoride, 1-decyl-2-propylpyrrolium fluoride, 1-decyl-2-butylpyrrolium fluoride, 1-decyl-3-methylpyrrolium fluoride, 1-decyl-3-ethylpyrrolium fluoride, 1-decyl-3-propylpyrrolium fluoride, 1-decyl-3-butylpyrrolium fluoride, N-decylpyrrolium triflate, 1-decyl-2-methylpyrrolium triflate, 1-decyl-2-ethylpyrrolium triflate, 1-decyl-2-propylpyrrolium triflate, 1-decyl-2-butylpyrrolium triflate, 1-decyl-3-methylpyrrolium triflate, 1-decyl-3-ethylpyrrolium triflate, 1-decyl-3-propylpyrrolium triflate, 1-decyl-3-butylpyrrolium triflate, N-decylpyrrolium methanesulfonate, 1-decyl-2-methylpyrrolium methanesulfonate, 1-decyl-2-ethylpyrrolium methanesulfonate, 1-decyl-2-propylpyrrolium methanesulfonate, 1-decyl-2-butylpyrrolium methanesulfonate, 1-decyl-3-methylpyrrolium methanesulfonate, 1-decyl-3-ethylpyrrolium methanesulfonate, 1-decyl-3-propylpyrrolium methanesulfonate, 1-decyl-3-butylpyrrolium methanesulfonate, N-decylpyrrolium acetate, 1-decyl-2-methylpyrrolium acetate, 1-decyl-2-ethylpyrrolium acetate, 1-decyl-2-propylpyrrolium acetate, 1-decyl-2-butylpyrrolium acetate, 1-decyl-3-methylpyrrolium acetate, 1-decyl-3-ethylpyrrolium acetate, 1-decyl-3-propylpyrrolium acetate, 1-decyl-3-butylpyrrolium acetate, N-decylpyrrolium cyanide, 1-decyl-2-methylpyrrolium cyanide, 1-decyl-2-ethylpyrrolium cyanide, 1-decyl-2-propylpyrrolium cyanide, 1-decyl-2-butylpyrrolium cyanide, 1-decyl-3-methylpyrrolium cyanide, 1-decyl-3-ethylpyrrolium cyanide, 1-decyl-3-propylpyrrolium cyanide, 1-decyl-3-butylpyrrolium cyanide.

It can further be seen that a compound according to formula (11) may be selected from the group comprising N-undecylpyrrolium chloride, 1-undecyl-2-methylpyrrolium chloride, 1-undecyl-2-ethylpyrrolium chloride, 1-undecyl-2-propylpyrrolium chloride, 1-undecyl-2-butylpyrrolium chloride, 1-undecyl-3-methylpyrrolium chloride, 1-undecyl-3-ethylpyrrolium chloride, 1-undecyl-3-propylpyrrolium chloride, 1-undecyl-3-butylpyrrolium chloride, N-undecylpyrrolium fluoride, 1-undecyl-2-methylpyrrolium fluoride, 1-undecyl-2-ethylpyrrolium fluoride, 1-undecyl-2-propylpyrrolium fluoride, 1-undecyl-2-butylpyrrolium fluoride, 1-undecyl-3-methylpyrrolium fluoride, 1-undecyl-3-ethylpyrrolium fluoride, 1-undecyl-3-propylpyrrolium fluoride, 1-undecyl-3-butylpyrrolium fluoride, N-undecylpyrrolium triflate, 1-undecyl-2-methylpyrrolium triflate, 1-undecyl-2-ethylpyrrolium triflate, 1-undecyl-2-propylpyrrolium triflate, 1-undecyl-2-butylpyrrolium triflate, 1-undecyl-3-methylpyrrolium triflate, 1-undecyl-3-ethylpyrrolium triflate, 1-undecyl-3-propylpyrrolium triflate, 1-undecyl-3-butylpyrrolium triflate, N-undecylpyrrolium methanesulfonate, 1-undecyl-2-ethylpyrrolium methanesulfonate, 1-undecyl-2-propylpyrrolium methanesulfonate, 1-undecyl-2-butylpyrrolium methanesulfonate, 1-undecyl-3-methylpyrrolium methanesulfonate, 1-undecyl-3-ethylpyrrolium methanesulfonate, 1-undecyl-3-propylpyrrolium methanesulfonate, 1-undecyl-3-butylpyrrolium methanesulfonate, N-undecylpyrrolium acetate, 1-undecyl-2-methylpyrrolium acetate, 1-undecyl-2-ethylpyrrolium acetate, 1-undecyl-2-propylpyrrolium acetate, 1-undecyl-2-butylpyrrolium acetate, 1-undecyl-3-methylpyrrolium acetate, 1-undecyl-3-ethylpyrrolium acetate, 1-undecyl-3-propylpyrrolium acetate, 1-undecyl-3-butylpyrrolium acetate, N-undecylpyrrolium cyanide, 1-undecyl-2-methylpyrrolium cyanide, 1-undecyl-2-ethylpyrrolium cyanide, 1-undecyl-2-propylpyrrolium cyanide, 1-undecyl-2-butylpyrrolium cyanide, 1-undecyl-3-methylpyrrolium cyanide, 1-undecyl-3-ethylpyrrolium cyanide, 1-undecyl-3-propylpyrrolium cyanide, 1-undecyl-3-butylpyrrolium cyanide.

It can further be seen that a compound according to formula (12) may be selected from the group comprising N-dodecylpyrrolium chloride, 1-dodecyl-2-methylpyrrolium chloride, 1-dodecyl-2-ethylpyrrolium chloride, 1-dodecyl-2-propylpyrrolium chloride, 1-dodecyl-2-butylpyrrolium chloride, 1-dodecyl-3-methylpyrrolium chloride, 1-dodecyl-3-ethylpyrrolium chloride, 1-dodecyl-3-propylpyrrolium chloride, 1-dodecyl-3-butylpyrrolium chloride, N-dodecylpyrrolium fluoride, 1-dodecyl-2-methylpyrrolium fluoride, 1-dodecyl-2-ethylpyrrolium fluoride, 1-dodecyl-2-propylpyrrolium fluoride, 1-dodecyl-2-butylpyrrolium fluoride, 1-dodecyl-3-methylpyrrolium fluoride, 1-dodecyl-3-ethylpyrrolium fluoride, 1-dodecyl-3-propylpyrrolium fluoride, 1-dodecyl-3-butylpyrrolium fluoride, N-dodecylpyrrolium triflate, 1-dodecyl-2-methylpyrrolium triflate, 1-dodecyl-2-ethylpyrrolium triflate, 1-dodecyl-2-propylpyrrolium triflate, 1-dodecyl-2-butylpyrrolium triflate, 1-dodecyl-3-methylpyrrolium triflate, 1-dodecyl-3-ethylpyrrolium triflate, 1-dodecyl-3-propylpyrrolium triflate, 1-dodecyl-3-butylpyrrolium triflate, N-dodecylpyrrolium methanesulfonate, 1-dodecyl-2-methylpyrrolium methanesulfonate, 1-dodecyl-2-ethylpyrrolium methanesulfonate, 1-dodecyl-2-propylpyrrolium methanesulfonate, 1-dodecyl-2-butylpyrrolium methanesulfonate, 1-dodecyl-3-methylpyrrolium methanesulfonate, 1-dodecyl-3-ethylpyrrolium methanesulfonate, 1-dodecyl-3-propylpyrrolium methanesulfonate, 1-dodecyl-3-butylpyrrolium methanesulfonate, N-dodecylpyrrolium acetate, 1-dodecyl-2-methylpyrrolium acetate, 1-dodecyl-2-ethylpyrrolium acetate, 1-dodecyl-2-propylpyrrolium acetate, 1-dodecyl-2-butylpyrrolium acetate, 1-dodecyl-3-methylpyrrolium acetate, 1-dodecyl-3-ethylpyrrolium acetate, 1-dodecyl-3-propylpyrrolium acetate, 1-dodecyl-3-butylpyrrolium acetate, N-dodecylpyrrolium cyanide, 1-dodecyl-2-methylpyrrolium cyanide, 1-dodecyl-2-ethylpyrrolium cyanide, 1-dodecyl-2-propylpyrrolium cyanide, 1-dodecyl-2-butylpyrrolium cyanide, 1-dodecyl-3-methylpyrrolium cyanide, 1-dodecyl-3-ethylpyrrolium cyanide, 1-dodecyl-3-propylpyrrolium cyanide, 1-dodecyl-3-butylpyrrolium cyanide.

Furthermore, it can be seen that especially compounds according to the following formulas (24), (25), (26), (27), (28), (29), (30), (31), (32), (33), (34) or (35)

(24)

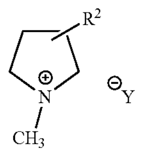

(25)

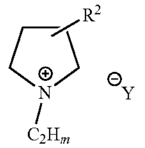

(26)

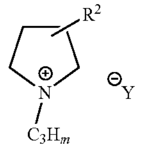

(27)

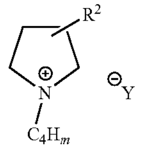

(28)

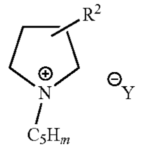

-continued (29)

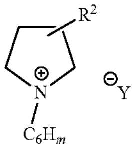

(30)

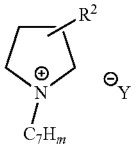

(31)

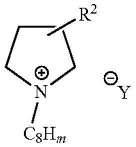

(32)

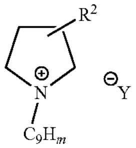

(33)

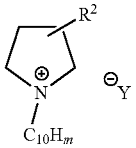

(34)

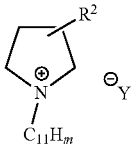

(35)

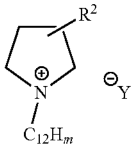

are comprised of formula VIII, wherein $R^2$ is a hydrogen atom or a hydrocarbon radical with 1, 2, 3 or 4 C atoms and Y is selected from the group comprising halide, cyanide, alkyl sulfonate, halogenated alkyl sulfonate, acetate and wherein m is selected from 3 or 5 for formula (25), wherein m is selected from 3, 5 or 7 for formula (26), wherein m is selected from 3, 5, 7, or 9 for formula (27), wherein m is selected from 3, 5, 7, 9 or 11 for formula (28), wherein m is selected from 3, 5, 7, 9, 11 or 13 for formula (29), wherein m is selected from 3, 5, 7, 9, 11, 13 or 15 for formula (30), wherein m is selected from 3, 5, 7, 9, 11, 13, 15 or 17 for formula (31), wherein m is selected from 3, 5, 7, 9, 11, 13, 15, 17 or 19 for formula (32), wherein m is selected from 3, 5, 7, 9, 11, 13, 15, 17, 19 or 21 for formula (33), wherein m is selected from 3, 5, 7, 9, 11, 13, 15, 17, 19, 21 or 23 for formula (34), and wherein m is selected from 3, 5, 7, 9, 11, 13, 15, 17, 19, 21, 23 or 25 for formula (35). The radical $R^1$ is preferably either saturated, monounsaturated or diunsaturated, so that m is selected from 3 or 5 for formula (25), m is selected from 3, 5 or 7 for formula (26), m is selected from 5, 7 or 9 for formula (27), m is selected from 7, 9 or 11 for formula (28), m is selected from 9, 11 or 13 for formula (29), m is selected from 11, 13 or 15 for formula (30), m is selected from 13, 15 or 17 for formula (31), m is selected from 15, 17 or 19 for formula (32), m is selected from 17, 19 or 21 for formula (33), m is selected from 19, 21 or 23 for formula (34), and m is selected from 21, 23 or 25 for formula (35).

The radical $R^1$ is especially preferably a saturated alkyl radical, so that formula VII comprises especially compounds according to formula (25) as well as according to the following formulas (36), (37), (38), (39), (40), (41), (42), (43), (44), (45) and (46)

(36)

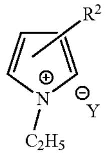

(37)

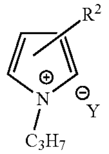

(38)

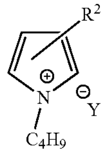

(39)

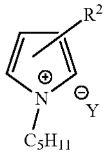

(40)

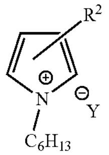

(41)

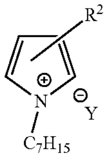

(42)

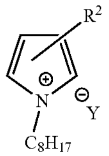

-continued (43)

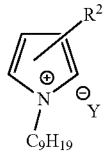

(44)

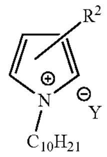

(45)

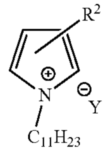

(46)

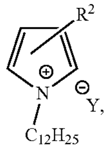

wherein $R^2$ is a hydrogen atom or a hydrocarbon radical with 1, 2, 3 or 4 C atoms and Y is selected from the group comprising halide, cyanide, alkyl sulfonate, halogenated alkyl sulfonate, acetate.

It can be seen that a compound according to Formula (24) may, for example, be selected from the group comprising N-methylpyrrolidinium chloride, 1,1-dimethylpyrrolidinium chloride, 1-methyl-1-ethylpyrrolidinium chloride, 1-methyl-1-propylpyrrolidinium chloride, 1-methyl-1-butylpyrrolidinium chloride, 1,2-dimethylpyrrolidinium chloride, 1-methyl-2-ethylpyrrolidinium chloride, 1-methyl-2-propylpyrrolidinium chloride, 1-methyl-2-butylpyrrolidinium chloride, 1,3-dimethylpyrrolidinium chloride, 1-methyl-3-ethylpyrrolidinium chloride, 1-methyl-3-propylpyrrolidinium chloride, 1-methyl-3-butylpyrrolidinium chloride, N-methylpyrrolidinium fluoride, 1,1-dimethylpyrrolidinium fluoride, 1-methyl-1-ethylpyrrolidinium fluoride, 1-methyl-1-propylpyrrolidinium fluoride, 1-methyl-1-butylpyrrolidinium fluoride, 1,2-dimethylpyrrolidinium fluoride, 1-methyl-2-ethylpyrrolidinium fluoride, 1-methyl-2-propylpyrrolidinium fluoride, 1-methyl-2-butylpyrrolidinium fluoride, 1,3-dimethylpyrrolidinium fluoride, 1-methyl-3-ethylpyrrolidinium fluoride, 1-methyl-3-propylpyrrolidinium fluoride, 1-methyl-3-butylpyrrolidinium fluoride, N-methylpyrrolidinium triflate, 1,1-dimethylpyrrolidinium triflate, 1-methyl-1-ethylpyrrolidinium triflate, 1-methyl-1-propylpyrrolidinium triflate, 1-methyl-1-butylpyrrolidinium triflate, 1,2-dimethylpyrrolidinium triflate, 1-methyl-2-ethylpyrrolidinium triflate, 1-methyl-2-propylpyrrolidinium triflate, 1-methyl-2-butylpyrrolidinium triflate, 1,3-dimethylpyrrolidinium triflate, 1-methyl-3-ethylpyrrolidinium triflate, 1-methyl-3-propylpyrrolidinium triflate, 1-methyl-3-butylpyrrolidinium triflate, N-methylpyrrolidinium methanesulfonate, 1,1-dimethylpyrrolidinium methanesulfonate, 1-methyl-1-ethylpyrrolidinium methanesulfonate, 1-methyl-1-propylpyrrolidinium methanesulfonate, 1-methyl-1-butylpyrrolidinium methanesulfonate, 1,2-dimethylpyrrolidinium methanesulfonate, 1-methyl-2-ethylpyrrolidinium methanesulfonate, 1-methyl-2-propylpyrrolidinium methanesulfonate, 1-methyl-2-butylpyrrolidinium methanesulfonate, 1,3-dimethylpyrrolidinium methanesulfonate, 1-methyl-3-ethylpyrrolidinium methanesulfonate, 1-methyl-3-propylpyrrolidinium methanesulfonate, 1-methyl-3-butylpyrrolidinium methanesulfonate, N-methylpyrrolidinium acetate, 1,1-dimethylpyrrolidinium acetate, 1-methyl-1-ethylpyrrolidinium acetate, 1-methyl-1-propylpyrrolidinium acetate, 1-methyl-1-butylpyrrolidinium acetate, 1,2-dimethylpyrrolidinium acetate, 1-methyl-2-ethylpyrrolidinium acetate, 1-methyl-2-propylpyrrolidinium acetate, 1-methyl-2-butylpyrrolidinium acetate, 1,3-dimethylpyrrolidinium acetate, 1-methyl-3-ethylpyrrolidinium acetate, 1-methyl-3-propylpyrrolidinium acetate, 1-methyl-3-butylpyrrolidinium acetate, N-methylpyrrolidinium cyanide, 1,1-dimethylpyrrolidinium cyanide, 1-methyl-1-ethylpyrrolidinium cyanide, 1-methyl-1-propylpyrrolidinium cyanide, 1-methyl-1-butylpyrrolidinium cyanide, 1,2-dimethylpyrrolidinium cyanide, 1-methyl-2-ethylpyrrolidinium cyanide, 1-methyl-2-propylpyrrolidinium cyanide, 1-methyl-2-butylpyrrolidinium cyanide, 1,3-dimethylpyrrolidinium cyanide, 1-methyl-3-ethylpyrrolidinium cyanide, 1-methyl-3-propylpyrrolidinium cyanide, 1-methyl-3-butylpyrrolidinium cyanide.

It can be seen that a compound according to formula (25) may, for example, may be selected from the group comprising N-ethylpyrrolidinium chloride, 1,1-diethylpyrrolidinium chloride, 1-ethyl-1-methylpyrrolidinium chloride, 1-ethyl-1-propylpyrrolidinium chloride, 1-ethyl-1-butylpyrrolidinium chloride, 1-ethyl-2-methylpyrrolidinium chloride, 1,2-diethylpyrrolidinium chloride, 1-ethyl-2-propylpyrrolidinium chloride, 1-ethyl-2-butylpyrrolidinium chloride, 1-ethyl-3-methylpyrrolidinium chloride, 1,3-diethylpyrrolidinium chloride, 1-ethyl-3-propylpyrrolidinium chloride, 1-ethyl-3-butylpyrrolidinium chloride, N-ethylpyrrolidinium fluoride, 1,1-diethylpyrrolidinium fluoride, 1-ethyl-1-methylpyrrolidinium fluoride, 1-ethyl-1-propylpyrrolidinium fluoride, 1-ethyl-1-butylpyrrolidinium fluoride, 1-ethyl-2-methylpyrrolidinium fluoride, 1,2-diethylpyrrolidinium fluoride, 1-ethyl-2-propylpyrrolidinium fluoride, 1-ethyl-2-butylpyrrolidinium fluoride, 1-ethyl-3-methylpyrrolidinium fluoride, 1,3-diethylpyrrolidinium fluoride, 1-ethyl-3-propylpyrrolidinium fluoride, 1-ethyl-3-butylpyrrolidinium fluoride, N-ethylpyrrolidinium triflate, 1,1-diethylpyrrolidinium triflate, 1-ethyl-1-methylpyrrolidinium triflate, 1-ethyl-1-propylpyrrolidinium triflate, 1-ethyl-1-butylpyrrolidinium triflate, 1-ethyl-2-methylpyrrolidinium triflate, 1,2-diethylpyrrolidinium triflate, 1-ethyl-2-propylpyrrolidinium triflate, 1-ethyl-2-butylpyrrolidinium triflate, 1-ethyl-3-methylpyrrolidinium triflate, 1,3-diethylpyrrolidinium triflate, 1-ethyl-3-propylpyrrolidinium triflate, 1-ethyl-3-butylpyrrolidinium triflate, N-ethylpyrrolidinium methanesulfonate, 1,1-diethylpyrrolidinium methanesulfonate, 1-ethyl-1-methylpyrrolidinium methanesulfonate, 1-ethyl-1-propylpyrrolidinium methanesulfonate, 1-ethyl-1-butylpyrrolidinium methanesulfonate, 1-ethyl-2-methylpyrrolidinium methanesulfonate, 1,2-diethylpyrrolidinium methanesulfonate, 1-ethyl-2-propylpyrrolidinium methanesulfonate, 1-ethyl-2-butylpyrrolidinium methanesulfonate, 1-ethyl-3-methylpyrrolidinium methanesulfonate, 1,3-diethylpyrrolidinium methanesulfonate, 1-ethyl-3-propylpyrrolidinium methanesulfonate, 1-ethyl-3-butylpyrrolidinium methanesulfonate, N-ethylpyrrolidinium acetate, 1,1-diethylpyrrolidinium acetate, 1-ethyl-1-methylpyrrolidinium acetate, 1-ethyl-1-propylpyrrolidinium acetate, 1-ethyl-1-butylpyrrolidinium acetate, 1-ethyl-2-methylpyrrolidinium acetate, 1,2-diethylpyrrolidinium acetate, 1-ethyl-2-propylpyrrolidinium acetate, 1-ethyl-2-butylpyrrolidinium acetate, 1-ethyl-3-methylpyrrolidinium acetate, 1,3-diethylpyrrolidinium acetate, 1-ethyl-3-propylpyrrolidinium acetate, 1-ethyl-3-butylpyrrolidinium acetate, N-ethylpyrrolidinium cyanide, 1,1-diethylpyrrolidinium cyanide, 1-ethyl-1-methylpyrrolidinium cyanide, 1-ethyl-1-propylpyrrolidinium cyanide, 1-ethyl-1-butylpyrrolidinium cyanide, 1-ethyl-2-methylpyrrolidinium cyanide, 1,2-diethylpyrrolidinium cyanide, 1-ethyl-2-propylpyrrolidinium cyanide, 1-ethyl-2-butylpyrrolidinium cyanide, 1-ethyl-3-methylpyrrolidinium cyanide, 1,3-diethylpyrrolidinium cyanide, 1-ethyl-3-propylpyrrolidinium cyanide, 1-ethyl-3-butylpyrrolidinium cyanide.

It can be seen that a compound according to formula (26) may, for example, be selected from the group comprising N-propylpyrrolidinium chloride, 1,1-dipropylpyrrolidinium chloride, 1-propyl-1-methylpyrrolidinium chloride, 1-propyl-1-ethylpyrrolidinium chloride, 1-propyl-1-butylpyrrolidinium chloride, 1-propyl-2-methylpyrrolidinium chloride, 1-propyl-2-ethylpyrrolidinium chloride, 1,2-dipropylpyrrolidinium chloride, 1-propyl-2-butylpyrrolidinium chloride, 1-propyl-3-methylpyrrolidinium chloride, 1-propyl-3-ethylpyrrolidinium chloride, 1,3-dipropylpyrrolidinium chloride, 1-propyl-3-butylpyrrolidinium chloride, N-propylpyrrolidinium fluoride, 1,1-dipropylpyrrolidinium fluoride, 1-propyl-1-methylpyrrolidinium fluoride, 1-propyl-1-ethylpyrrolidinium fluoride, 1-propyl-1-butylpyrrolidinium fluoride, 1-propyl-2-methylpyrrolidinium fluoride, 1-propyl-2-ethylpyrrolidinium fluoride, 1,2-dipropylpyrrolidinium fluoride, 1-propyl-2-butylpyrrolidinium fluoride, 1-propyl-3-methylpyrrolidinium fluoride, 1-propyl-3-ethylpyrrolidinium fluoride, 1,3-dipropylpyrrolidinium fluoride, 1-propyl-3-butylpyrrolidinium fluoride, N-propylpyrrolidinium triflate, 1,1-dipropylpyrrolidinium triflate, 1-propyl-1-methylpyrrolidinium triflate, 1-propyl-1-ethylpyrrolidinium triflate, 1-propyl-1-butylpyrrolidinium triflate, 1-propyl-2-methylpyrrolidinium triflate, 1-propyl-2-ethylpyrrolidinium triflate, 1,2-dipropylpyrrolidinium triflate, 1-propyl-2-butylpyrrolidinium triflate, 1-propyl-3-methylpyrrolidinium triflate, 1-propyl-3-ethylpyrrolidinium triflate, 1,3-dipropylpyrrolidinium triflate, 1-propyl-3-butylpyrrolidinium triflate, N-propylpyrrolidinium methanesulfonate, 1,1-dipropylpyrrolidinium methanesulfonate, 1-propyl-1-methylpyrrolidinium methanesulfonate, 1-propyl-1-ethylpyrrolidinium methanesulfonate, 1-propyl-1-butylpyrrolidinium methanesulfonate, 1-propyl-2-methylpyrrolidinium methanesulfonate, 1-propyl-2-ethylpyrrolidinium methanesulfonate, 1,2-dipropylpyrrolidinium methanesulfonate, 1-propyl-2-butylpyrrolidinium methanesulfonate, 1-propyl-3-methylpyrrolidinium methanesulfonate, 1-propyl-3-ethylpyrrolidinium methanesulfonate, 1,3-dipropylpyrrolidinium methanesulfonate, 1-propyl-3-butylpyrrolidinium methanesulfonate, N-propylpyrrolidinium acetate, 1,1-dipropylpyrrolidinium acetate, 1-propyl-1-methylpyrrolidinium acetate, 1-propyl-1-ethylpyrrolidinium acetate, 1-propyl-1-butylpyrrolidinium acetate, 1-propyl-2-methylpyrrolidinium acetate, 1-propyl-2-ethylpyrrolidinium acetate, 1,2-dipropylpyrrolidinium acetate, 1-propyl-2-butylpyrrolidinium acetate, 1-propyl-3-methylpyrrolidinium acetate, 1-propyl-3-ethylpyrrolidinium acetate, 1,3-dipropylpyrrolidinium acetate, 1-propyl-3-butylpyrrolidinium acetate, N-propylpyrrolidinium cyanide, 1,1-dipropylpyrrolidinium cyanide, 1-propyl-1-methylpyrrolidinium cyanide, 1-propyl-1-ethylpyrrolidinium cyanide, 1-propyl-1-butylpyrrolidinium cyanide, 1-propyl-2-methylpyrrolidinium cyanide, 1-propyl-2-ethylpyrrolidinium cyanide, 1,2-dipropylpyrrolidinium cyanide, 1-propyl-2-butylpyrrolidinium cyanide, 1-propyl-3-methylpyrrolidinium cyanide, 1-propyl-3-ethylpyrrolidinium cyanide, 1,3-dipropylpyrrolidinium cyanide, 1-propyl-3-butylpyrrolidinium cyanide.

It can be seen that a compound according to formula (27) may, for example, be selected from the group comprising N-butylpyrrolidinium chloride, 1-butyl-1-methylpyrrolidinium chloride, 1-butyl-1-ethylpyrrolidinium chloride, 1-butyl-1-propylpyrrolidinium chloride, 1,1-dibutylpyrrolidinium chloride, 1-butyl-2-methylpyrrolidinium chloride, 1-butyl-2-ethylpyrrolidinium chloride, 1-butyl-2-propylpyrrolidinium chloride, 1,2-dibutylpyrrolidinium chloride, 1-butyl-3-methylpyrrolidinium chloride, 1-butyl-3-ethylpyrrolidinium chloride, 1-butyl-3-propylpyrrolidinium chloride, 1,3-dibutylpyrrolidinium chloride, N-butylpyrrolidinium fluoride, 1-butyl-1-methylpyrrolidinium fluoride, 1-butyl-1-ethylpyrrolidinium fluoride, 1-butyl-1-propylpyrrolidinium fluoride, 1,1-dibutylpyrrolidinium fluoride, 1-butyl-2-methylpyrrolidinium fluoride, 1-butyl-2-ethylpyrrolidinium fluoride, 1-butyl-2-propylpyrrolidinium fluoride, 1,2-dibutylpyrrolidinium fluoride, 1-butyl-3-methylpyrrolidinium fluoride, 1-butyl-3-ethylpyrrolidinium fluoride, 1-butyl-3-propylpyrrolidinium fluoride, 1,3-dibutylpyrrolidinium fluoride, N-butylpyrrolidinium triflate, 1-butyl-1-methylpyrrolidinium triflate, 1-butyl-1-ethylpyrrolidinium triflate, 1-butyl-1-propylpyrrolidinium triflate, 1,1-dibutylpyrrolidinium triflate, 1-butyl-2-methylpyrrolidinium triflate, 1-butyl-2-ethylpyrrolidinium triflate, 1-butyl-2-propylpyrrolidinium triflate, 1,2-dibutylpyrrolidinium triflate, 1-butyl-3-methylpyrrolidinium triflate, 1-butyl-3-ethylpyrrolidinium triflate, 1-butyl-3-propylpyrrolidinium triflate, 1,3-dibutylpyrrolidinium triflate, N-butylpyrrolidinium methanesulfonate, 1-butyl-1-methylpyrrolidinium methanesulfonate, 1-butyl-1-ethylpyrrolidinium methanesulfonate, 1-butyl-1-propylpyrrolidinium methanesulfonate, 1,1-dibutylpyrrolidinium methanesulfonate, 1-butyl-2-methylpyrrolidinium methanesulfonate, 1-butyl-2-ethylpyrrolidinium methanesulfonate, 1-butyl-2-propylpyrrolidinium methanesulfonate, 1,2-dibutylpyrrolidinium methanesulfonate, 1-butyl-3-methylpyrrolidinium methanesulfonate, 1-butyl-3-ethylpyrrolidinium methanesulfonate, 1-butyl-3-propylpyrrolidinium methanesulfonate, 1,3-dibutylpyrrolidinium methanesulfonate, N-butylpyrrolidinium acetate, 1-butyl-1-methylpyrrolidinium acetate, 1-butyl-1-ethylpyrrolidinium acetate, 1-butyl-1-propylpyrrolidinium acetate, 1,1-dibutylpyrrolidinium acetate, 1-butyl-2-methylpyrrolidinium acetate, 1-butyl-2-ethylpyrrolidinium acetate, 1-butyl-2-propylpyrrolidinium acetate, 1,2-dibutylpyrrolidinium acetate, 1-butyl-3-methylpyrrolidinium acetate, 1-butyl-3-ethylpyrrolidinium acetate, 1-butyl-3-propylpyrrolidinium acetate, 1,3-dibutylpyrrolidinium acetate, N-butylpyrrolidinium cyanide, 1-butyl-1-methylpyrrolidinium cyanide, 1-butyl-1-ethylpyrrolidinium cyanide, 1-butyl-1-propylpyrrolidinium cyanide, 1,1-dibutylpyrrolidinium cyanide, 1-butyl-2-methylpyrrolidinium cyanide, 1-butyl-2-ethylpyrrolidinium cyanide, 1-butyl-2-propylpyrrolidinium cyanide, 1,2-dibutylpyrrolidinium cyanide, 1-butyl-3-methylpyrrolidinium cyanide, 1-butyl-3-ethylpyrrolidinium cyanide, 1-butyl-3-propylpyrrolidinium cyanide, 1,3-dibutylpyrrolidinium cyanide.

It can be seen that a compound according to formula (28) may, for example, be selected from the group comprising N-pentylpyrrolidinium chloride, 1-pentyl-1-methylpyrrolidinium chloride, 1-pentyl-1-ethylpyrrolidinium chloride, 1-pentyl-1-propylpyrrolidinium chloride, 1-pentyl-1-butylpyrrolidinium chloride, 1-pentyl-2-methylpyrrolidinium chloride, 1-pentyl-2-ethylpyrrolidinium chloride, 1-pentyl-2-propylpyrrolidinium chloride, 1-pentyl-2-butylpyrrolidinium chloride, 1-pentyl-3-methylpyrrolidinium chloride, 1-pentyl-3-ethylpyrrolidinium chloride, 1-pentyl-3-propylpyrrolidinium chloride, 1-pentyl-3-butylpyrrolidinium chloride, N-pentylpyrrolidinium fluoride, 1-pentyl-1-methylpyrrolidinium fluoride, 1-pentyl-1-ethylpyrrolidinium fluoride, 1-pentyl-1-propylpyrrolidinium fluoride, 1-pentyl-1-butylpyrrolidinium fluoride, 1-pentyl-2-methylpyrrolidinium fluoride, 1-pentyl-2-ethylpyrrolidinium fluoride, 1-pentyl-2-propylpyrrolidinium fluoride, 1-pentyl-2-butylpyrrolidinium fluoride, 1-pentyl-3-methylpyrrolidinium fluoride, 1-pentyl-3-ethylpyrrolidinium fluoride, 1-pentyl-3-propylpyrrolidinium fluoride, 1-pentyl-3-butylpyrrolidinium fluoride, N-pentylpyrrolidinium triflate, 1-pentyl-1-methylpyrrolidinium triflate, 1-pentyl-1-ethylpyrrolidinium triflate, 1-pentyl-1-propylpyrrolidinium triflate, 1-pentyl-1-butylpyrrolidinium triflate, 1-pentyl-2-methylpyrrolidinium triflate, 1-pentyl-2-ethylpyrrolidinium triflate, 1-pentyl-2-propylpyrrolidinium triflate, 1-pentyl-2-butylpyrrolidinium triflate, 1-pentyl-3-methylpyrrolidinium triflate, 1-pentyl-3-ethylpyrrolidinium triflate, 1-pentyl-3-propylpyrrolidinium triflate, 1-pentyl-3-butylpyrrolidinium triflate, N-pentylpyrrolidinium methanesulfonate, 1-pentyl-1-methylpyrrolidinium methanesulfonate, 1-pentyl-1-ethylpyrrolidinium methanesulfonate, 1-pentyl-1-propylpyrrolidinium methanesulfonate, 1-pentyl-1-butylpyrrolidinium methanesulfonate, 1-pentyl-2-methylpyrrolidinium methanesulfonate, 1-pentyl-2-ethylpyrrolidinium methanesulfonate, 1-pentyl-2-propylpyrrolidinium methanesulfonate, 1-pentyl-2-butylpyrrolidinium methanesulfonate, 1-pentyl-3-methylpyrrolidinium methanesulfonate, 1-pentyl-3-ethylpyrrolidinium methanesulfonate, 1-pentyl-3-propylpyrrolidinium methanesulfonate, 1-pentyl-3-butylpyrrolidinium methanesulfonate, N-pentylpyrrolidinium acetate, 1-pentyl-1-methylpyrrolidinium acetate, 1-pentyl-1-ethylpyrrolidinium acetate, 1-pentyl-1-propylpyrrolidinium acetate, 1-pentyl-1-butylpyrrolidinium acetate, 1-pentyl-2-methylpyrrolidinium acetate, 1-pentyl-2-ethylpyrrolidinium acetate, 1-pentyl-2-propylpyrrolidinium acetate, 1-pentyl-2-butylpyrrolidinium acetate, 1-pentyl-3-methylpyrrolidinium acetate, 1-pentyl-3-ethylpyrrolidinium acetate, 1-pentyl-3-propylpyrrolidinium acetate, 1-pentyl-3-butylpyrrolidinium acetate, N-pentylpyrrolidinium cyanide, 1-pentyl-1-methylpyrrolidinium cyanide, 1-pentyl-1-ethylpyrrolidinium cyanide, 1-pentyl-1-propylpyrrolidinium cyanide, 1-pentyl-1-butylpyrrolidinium cyanide, 1-pentyl-2-methylpyrrolidinium cyanide, 1-pentyl-2-ethylpyrrolidinium cyanide, 1-pentyl-2-propylpyrrolidinium cyanide, 1-pentyl-2-butylpyrrolidinium cyanide, 1-pentyl-3-methylpyrrolidinium cyanide, 1-pentyl-3-ethylpyrrolidinium cyanide, 1-pentyl-3-propylpyrrolidinium cyanide, 1-pentyl-3-butylpyrrolidinium cyanide.

It can further be seen that a compound according to formula (29) may be selected from the group comprising N-hexylpyrrolidinium chloride, 1-hexyl-1-methylpyrrolidinium chloride, 1-hexyl-1-ethylpyrrolidinium chloride, 1-hexyl-1-propylpyrrolidinium chloride, 1-hexyl-1-butylpyrrolidinium chloride, 1-hexyl-2-methylpyrrolidinium chloride, 1-hexyl-2-ethylpyrrolidinium chloride, 1-hexyl-2-propylpyrrolidinium chloride, 1-hexyl-2-butylpyrrolidinium chloride, 1-hexyl-3-methylpyrrolidinium chloride, 1-hexyl-3-ethylpyrrolidinium chloride, 1-hexyl-3-propylpyrrolidinium chloride, 1-hexyl-3-butylpyrrolidinium chloride, N-hexylpyrrolidinium fluoride, 1-hexyl-1-methylpyrrolidinium fluoride, 1-hexyl-1-ethylpyrrolidinium fluoride, 1-hexyl-1-propylpyrrolidinium fluoride, 1-hexyl-1-butylpyrrolidinium fluoride, 1-hexyl-2-methylpyrrolidinium fluoride, 1-hexyl-2-ethylpyrrolidinium fluoride, 1-hexyl-2-propylpyrrolidinium fluoride, 1-hexyl-2-butylpyrrolidinium fluoride, 1-hexyl-3-methylpyrrolidinium fluoride, 1-hexyl-3-ethylpyrrolidinium fluoride, 1-hexyl-3-propylpyrrolidinium fluoride, 1-hexyl-3-butylpyrrolidinium fluoride, N-hexylpyrrolidinium triflate, 1-hexyl-1-methylpyrrolidinium triflate, 1-hexyl-1-ethylpyrrolidinium triflate, 1-hexyl-1-propylpyrrolidinium triflate, 1-hexyl-1-butylpyrrolidinium triflate, 1-hexyl-2-methylpyrrolidinium triflate, 1-hexyl-2-ethylpyrrolidinium triflate, 1-hexyl-2-propylpyrrolidinium triflate, 1-hexyl-2-butylpyrrolidinium triflate, 1-hexyl-3-methylpyrrolidinium triflate, 1-hexyl-3-ethylpyrrolidinium triflate, 1-hexyl-3-propylpyrrolidinium triflate, 1-hexyl-3-butylpyrrolidinium triflate, N-hexylpyrrolidinium methanesulfonate, 1-hexyl-1-methylpyrrolidinium methanesulfonate, 1-hexyl-1-ethylpyrrolidinium methanesulfonate, 1-hexyl-1-propylpyrrolidinium methanesulfonate, 1-hexyl-1-butylpyrrolidinium methanesulfonate, 1-hexyl-2-methylpyrrolidinium methanesulfonate, 1-hexyl-2-ethylpyrrolidinium methanesulfonate, 1-hexyl-2-propylpyrrolidinium methanesulfonate, 1-hexyl-2-butylpyrrolidinium methanesulfonate, 1-hexyl-3-methylpyrrolidinium methanesulfonate, 1-hexyl-3-ethylpyrrolidinium methanesulfonate, 1-hexyl-3-propylpyrrolidinium methanesulfonate, 1-hexyl-3-butylpyrrolidinium methanesulfonate, N-hexylpyrrolidinium acetate, 1-hexyl-1-methylpyrrolidinium acetate, 1-hexyl-1-ethylpyrrolidinium acetate, 1-hexyl-1-propylpyrrolidinium acetate, 1-hexyl-1-butylpyrrolidinium acetate, 1-hexyl-2-methylpyrrolidinium acetate, 1-hexyl-2-ethylpyrrolidinium acetate, 1-hexyl-2-propylpyrrolidinium acetate, 1-hexyl-2-butylpyrrolidinium acetate, 1-hexyl-3-methylpyrrolidinium acetate, 1-hexyl-3-ethylpyrrolidinium acetate, 1-hexyl-3-propylpyrrolidinium acetate, 1-hexyl-3-butylpyrrolidinium acetate, N-hexylpyrrolidinium cyanide, 1-hexyl-1-methylpyrrolidinium cyanide, 1-hexyl-1-ethylpyrrolidinium cyanide, 1-hexyl-1-propylpyrrolidinium cyanide, 1-hexyl-1-butylpyrrolidinium cyanide, 1-hexyl-2-methylpyrrolidinium cyanide, 1-hexyl-2-ethylpyrrolidinium cyanide, 1-hexyl-2-propylpyrrolidinium cyanide, 1-hexyl-2-butylpyrrolidinium cyanide, 1-hexyl-3-methylpyrrolidinium cyanide, 1-hexyl-3-ethylpyrrolidinium cyanide, 1-hexyl-3-propylpyrrolidinium cyanide, 1-hexyl-3-butylpyrrolidinium cyanide.

It can further be seen that a compound according to formula (30) may be selected from the group comprising N-heptylpyrrolidinium chloride, 1-heptyl-1-methylpyrrolidinium chloride, 1-heptyl-1-ethylpyrrolidinium chloride, 1-heptyl-1-propylpyrrolidinium chloride, 1-heptyl-1-butylpyrrolidinium chloride, 1-heptyl-2-methylpyrrolidinium chloride, 1-heptyl-2-ethylpyrrolidinium chloride, 1-heptyl-2-propylpyrrolidinium chloride, 1-heptyl-2-butylpyrrolidinium chloride, 1-heptyl-3-methylpyrrolidinium chloride, 1-heptyl-3-ethylpyrrolidinium chloride, 1-heptyl-3-propylpyrrolidinium chloride, 1-heptyl-3-butylpyrrolidinium chloride, N-heptylpyrrolidinium fluoride, 1-heptyl-1-methylpyrrolidinium fluoride, 1-heptyl-1-ethylpyrrolidinium fluoride, 1-heptyl-1-propylpyrrolidinium fluoride, 1-heptyl-1-butylpyrrolidinium fluoride, 1-heptyl-2-methylpyrrolidinium fluoride, 1-heptyl-2-ethylpyrrolidinium fluoride, 1-heptyl-2-propylpyrrolidinium fluoride, 1-heptyl-2-butylpyrrolidinium fluoride, 1-heptyl-3-methylpyrrolidinium fluoride, 1-heptyl-3-ethylpyrrolidinium fluoride, 1-heptyl-3-propylpyrrolidinium fluoride, 1-heptyl-3-butylpyrrolidinium fluoride, N-heptylpyrrolidinium triflate, 1-heptyl-1-methylpyrrolidinium triflate, 1-heptyl-1-ethylpyrrolidinium triflate, 1-heptyl-1-propylpyrrolidinium triflate, 1-heptyl-1-butylpyrrolidinium triflate, 1-heptyl-2-methylpyrrolidinium triflate, 1-heptyl-2-ethylpyrrolidinium triflate, 1-heptyl-2-propylpyrrolidinium triflate, 1-heptyl-2-butylpyrrolidinium triflate, 1-heptyl-3-methylpyrrolidinium triflate, 1-heptyl-3-ethylpyrrolidinium triflate, 1-heptyl-3-propylpyrrolidinium triflate, 1-heptyl-3-butylpyrrolidinium triflate, N-heptylpyrrolidinium methanesulfonate, 1-heptyl-1-methylpyrrolidinium methanesulfonate, 1-heptyl-1-ethylpyrrolidinium methanesulfonate, 1-heptyl-1-propylpyrrolidinium methanesulfonate, 1-heptyl-1-butylpyrrolidinium methanesulfonate, 1-heptyl-2-methylpyrrolidinium methanesulfonate, 1-heptyl-2-ethylpyrrolidinium methanesulfonate, 1-heptyl-2-propylpyrrolidinium methanesulfonate, 1-heptyl-2-butylpyrrolidinium methanesulfonate, 1-heptyl-3-methylpyrrolidinium methanesulfonate, 1-heptyl-3-ethylpyrrolidinium methanesulfonate, 1-heptyl-3-propylpyrrolidinium methanesulfonate, 1-heptyl-3-butylpyrrolidinium methanesulfonate, N-heptylpyrrolidinium acetate, 1-heptyl-1-methylpyrrolidinium acetate, 1-heptyl-1-ethylpyrrolidinium acetate, 1-heptyl-1-propylpyrrolidinium acetate, 1-heptyl-1-butylpyrrolidinium acetate, 1-heptyl-2-methylpyrrolidinium acetate, 1-heptyl-2-ethylpyrrolidinium acetate, 1-heptyl-2-propylpyrrolidinium acetate, 1-heptyl-2-butylpyrrolidinium acetate, 1-heptyl-3-methylpyrrolidinium acetate, 1-heptyl-3-ethylpyrrolidinium acetate, 1-heptyl-3-propylpyrrolidinium acetate, 1-heptyl-3-butylpyrrolidinium acetate, N-heptylpyrrolidinium cyanide, 1-heptyl-1-methylpyrrolidinium cyanide, 1-heptyl-1-ethylpyrrolidinium cyanide, 1-heptyl-1-propylpyrrolidinium cyanide, 1-heptyl-1-butylpyrrolidinium cyanide, 1-heptyl-2-methylpyrrolidinium cyanide, 1-heptyl-2-ethylpyrrolidinium cyanide, 1-heptyl-2-propylpyrrolidinium cyanide, 1-heptyl-2-butylpyrrolidinium cyanide, 1-heptyl-3-methylpyrrolidinium cyanide, 1-heptyl-3-ethylpyrrolidinium cyanide, 1-heptyl-3-propylpyrrolidinium cyanide, 1-heptyl-3-butylpyrrolidinium cyanide.

It can further be seen that a compound according to formula (31) may be selected from the group comprising N-octylpyrrolidinium chloride, 1-octyl-1-methylpyrrolidinium chloride, 1-octyl-1-ethylpyrrolidinium chloride, 1-octyl-1-propylpyrrolidinium chloride, 1-octyl-1-butylpyrrolidinium chloride, 1-octyl-2-methylpyrrolidinium chloride, 1-octyl-2-ethylpyrrolidinium chloride, 1-octyl-2-propylpyrrolidinium chloride, 1-octyl-2-butylpyrrolidinium chloride, 1-octyl-3-methylpyrrolidinium chloride, 1-octyl-3-ethylpyrrolidinium chloride, 1-octyl-3-propylpyrrolidinium chloride, 1-octyl-3-butylpyrrolidinium chloride, N-octylpyrrolidinium fluoride, 1-octyl-1-methylpyrrolidinium fluoride, 1-octyl-1-ethylpyrrolidinium fluoride, 1-octyl-1-propylpyrrolidinium fluoride, 1-octyl-1-butylpyrrolidinium fluoride, 1-octyl-2-methylpyrrolidinium fluoride, 1-octyl-2-ethylpyrrolidinium fluoride, 1-octyl-2-propylpyrrolidinium fluoride, 1-octyl-2-butylpyrrolidinium fluoride, 1-octyl-3-methylpyrrolidinium fluoride, 1-octyl-3-ethylpyrrolidinium fluoride, 1-octyl-3-propylpyrrolidinium fluoride, 1-octyl-3-butylpyrrolidinium fluoride, N-octylpyrrolidinium triflate, 1-octyl-1-methylpyrrolidinium triflate, 1-octyl-1-ethylpyrrolidinium triflate, 1-octyl-1-propylpyrrolidinium triflate, 1-octyl-1-butylpyrrolidinium triflate, 1-octyl-2-methylpyrrolidinium triflate, 1-octyl-2-ethylpyrrolidinium triflate, 1-octyl-2-propylpyrrolidinium triflate, 1-octyl-2-butylpyrrolidinium triflate, 1-octyl-3-methylpyrrolidinium triflate, 1-octyl-3-ethylpyrrolidinium triflate, 1-octyl-3-propylpyrrolidinium triflate, 1-octyl-3-butylpyrrolidinium triflate, N-octylpyrrolidinium methanesulfonate, 1-octyl-1-methylpyrrolidinium methanesulfonate, 1-octyl-1-ethylpyrrolidinium methanesulfonate, 1-octyl-1-propylpyrrolidinium methanesulfonate, 1-octyl-1-butylpyrrolidinium methanesulfonate, 1-octyl-2-methylpyrrolidinium methanesulfonate, 1-octyl-2-ethylpyrrolidinium methanesulfonate, 1-octyl-2-propylpyrrolidinium methanesulfonate, 1-octyl-2-butylpyrrolidinium methanesulfonate, 1-octyl-3-methylpyrrolidinium methanesulfonate, 1-octyl-3-ethylpyrrolidinium methanesulfonate, 1-octyl-3-propylpyrrolidinium methanesulfonate, 1-octyl-3-butylpyrrolidinium methanesulfonate, N-octylpyrrolidinium acetate, 1-octyl-1-methylpyrrolidinium acetate, 1-octyl-1-ethylpyrrolidinium acetate, 1-octyl-1-propylpyrrolidinium acetate, 1-octyl-1-butylpyrrolidinium acetate, 1-octyl-2-methylpyrrolidinium acetate, 1-octyl-2-ethylpyrrolidinium acetate, 1-octyl-2-propylpyrrolidinium acetate, 1-octyl-2-butylpyrrolidinium acetate, 1-octyl-3-methylpyrrolidinium acetate, 1-octyl-3-ethylpyrrolidinium acetate, 1-octyl-3-propylpyrrolidinium acetate, 1-octyl-3-butylpyrrolidinium acetate, N-octylpyrrolidinium cyanide, 1-octyl-1-methylpyrrolidinium cyanide, 1-octyl-1-ethylpyrrolidinium cyanide, 1-octyl-1-propylpyrrolidinium cyanide, 1-octyl-1-butylpyrrolidinium cyanide, 1-octyl-2-methylpyrrolidinium cyanide, 1-octyl-2-ethylpyrrolidinium cyanide, 1-octyl-2-propylpyrrolidinium cyanide, 1-octyl-2-butylpyrrolidinium cyanide, 1-octyl-3-methylpyrrolidinium cyanide, 1-octyl-3-ethylpyrrolidinium cyanide, 1-octyl-3-propylpyrrolidinium cyanide, 1-octyl-3-butylpyrrolidinium cyanide.

It can further be seen that a compound according to formula (32) may be selected from the group comprising N-nonylpyrrolidinium chloride, 1-nonyl-1-methylpyrrolidinium chloride, 1-nonyl-1-ethylpyrrolidinium chloride, 1-nonyl-1-propylpyrrolidinium chloride, 1-nonyl-1-butylpyrrolidinium chloride, 1-nonyl-2-methylpyrrolidinium chloride, 1-nonyl-2-ethylpyrrolidinium chloride, 1-nonyl-2-propylpyrrolidinium chloride, 1-nonyl-2-butylpyrrolidinium chloride, 1-nonyl-3-methylpyrrolidinium chloride, 1-nonyl-3-ethylpyrrolidinium chloride, 1-nonyl-3-propylpyrrolidinium chloride, 1-nonyl-3-butylpyrrolidinium chloride, N-nonylpyrrolidinium fluoride, 1-nonyl-1-methylpyrrolidinium fluoride, 1-nonyl-1-ethylpyrrolidinium fluoride, 1-nonyl-1-propylpyrrolidinium fluoride, 1-nonyl-1-butylpyrrolidinium fluoride, 1-nonyl-2-methylpyrrolidinium fluoride, 1-nonyl-2-ethylpyrrolidinium fluoride, 1-nonyl-2-propylpyrrolidinium fluoride, 1-nonyl-2-butylpyrrolidinium fluoride, 1-nonyl-3-methylpyrrolidinium fluoride, 1-nonyl-3-ethylpyrrolidinium fluoride, 1-nonyl-3-propylpyrrolidinium fluoride, 1-nonyl-3-butylpyrrolidinium fluoride, N-nonylpyrrolidinium triflate, 1-nonyl-1-methylpyrrolidinium triflate, 1-nonyl-1-ethylpyrrolidinium triflate, 1-nonyl-1-propylpyrrolidinium triflate, 1-nonyl-1-butylpyrrolidinium triflate, 1-nonyl-2-methylpyrrolidinium triflate, 1-nonyl-2-ethylpyrrolidinium triflate, 1-nonyl-2-propylpyrrolidinium triflate, 1-nonyl-2-butylpyrrolidinium triflate, 1-nonyl-3-methylpyrrolidinium triflate, 1-nonyl-3-ethylpyrrolidinium triflate, 1-nonyl-3-propylpyrrolidinium triflate, 1-nonyl-3-butylpyrrolidinium triflate, N-nonylpyrrolidinium methanesulfonate, 1-nonyl-1-methylpyrrolidinium methanesulfonate, 1-nonyl-1-ethylpyrrolidinium methanesulfonate, 1-nonyl-1-propylpyrrolidinium methanesulfonate, 1-nonyl-1-butylpyrrolidinium methanesulfonate, 1-nonyl-2-methylpyrrolidinium methanesulfonate, 1-nonyl-2-ethylpyrrolidinium methanesulfonate, 1-nonyl-2-propylpyrrolidinium methanesulfonate, 1-nonyl-2-butylpyrrolidinium methanesulfonate, 1-nonyl-3-methylpyrrolidinium methanesulfonate, 1-nonyl-3-ethylpyrrolidinium methanesulfonate, 1-nonyl-3-propylpyrrolidinium methanesulfonate, 1-nonyl-3-butylpyrrolidinium methanesulfonate, N-nonylpyrrolidinium acetate, 1-nonyl-1-methylpyrrolidinium acetate, 1-nonyl-1-ethylpyrrolidinium acetate, 1-nonyl-1-propylpyrrolidinium acetate, 1-nonyl-1-butylpyrrolidinium acetate, 1-nonyl-2-methylpyrrolidinium acetate, 1-nonyl-2-ethylpyrrolidinium acetate, 1-nonyl-2-propylpyrrolidinium acetate, 1-nonyl-2-butylpyrrolidinium acetate, 1-nonyl-3-methylpyrrolidinium acetate, 1-nonyl-3-ethylpyrrolidinium acetate, 1-nonyl-3-propylpyrrolidinium acetate, 1-nonyl-3-butylpyrrolidinium acetate, N-nonylpyrrolidinium cyanide, 1-nonyl-1-methylpyrrolidinium cyanide, 1-nonyl-1-ethylpyrrolidinium cyanide, 1-nonyl-1-propylpyrrolidinium cyanide, 1-nonyl-1-butylpyrrolidinium cyanide, 1-nonyl-2-methylpyrrolidinium cyanide, 1-nonyl-2-ethylpyrrolidinium cyanide, 1-nonyl-2-propylpyrrolidinium cyanide, 1-nonyl-2-butylpyrrolidinium cyanide, 1-nonyl-3-methylpyrrolidinium cyanide, 1-nonyl-3-ethylpyrrolidinium cyanide, 1-nonyl-3-propylpyrrolidinium cyanide, 1-nonyl-3-butylpyrrolidinium cyanide.

It can further be seen that a compound according to formula (33) may be selected from the group comprising N-decylpyrrolidinium chloride, 1-decyl-1-methylpyrrolidinium chloride, 1-decyl-1-ethylpyrrolidinium chloride, 1-decyl-1-propylpyrrolidinium chloride, 1-decyl-1-butylpyrrolidinium chloride, 1-decyl-2-methylpyrrolidinium chloride, 1-decyl-2-ethylpyrrolidinium chloride, 1-decyl-2-propylpyrrolidinium chloride, 1-decyl-2-butylpyrrolidinium chloride, 1-decyl-3-methylpyrrolidinium chloride, 1-decyl-3-ethylpyrrolidinium chloride, 1-decyl-3-propylpyrrolidinium chloride, 1-decyl-3-butylpyrrolidinium chloride, N-decylpyrrolidinium fluoride, 1-decyl-1-methylpyrrolidinium fluoride, 1-decyl-1-ethylpyrrolidinium fluoride, 1-decyl-1-propylpyrrolidinium fluoride, 1-decyl-1-butylpyrrolidinium fluoride, 1-decyl-2-methylpyrrolidinium fluoride, 1-decyl-2-ethylpyrrolidinium fluoride, 1-decyl-2-propylpyrrolidinium fluoride, 1-decyl-2-butylpyrrolidinium fluoride, 1-decyl-3-methylpyrrolidinium fluoride, 1-decyl-3-ethylpyrrolidinium fluoride, 1-decyl-3-propylpyrrolidinium fluoride, 1-decyl-3-butylpyrrolidinium fluoride, N-decylpyrrolidinium triflate, 1-decyl-1-methylpyrrolidinium triflate, 1-decyl-1-ethylpyrrolidinium triflate, 1-decyl-1-propylpyrrolidinium triflate, 1-decyl-1-butylpyrrolidinium triflate, 1-decyl-2-methylpyrrolidinium triflate, 1-decyl-2-ethylpyrrolidinium triflate, 1-decyl-2-propylpyrrolidinium triflate, 1-decyl-2-butylpyrrolidinium triflate, 1-decyl-3-methylpyrrolidinium triflate, 1-decyl-3-ethylpyrrolidinium triflate, 1-decyl-3-propylpyrrolidinium triflate, 1-decyl-3-butylpyrrolidinium triflate, N-decylpyrrolidinium methanesulfonate, 1-decyl-1-methylpyrrolidinium methanesulfonate, 1-decyl-1-ethylpyrrolidinium methanesulfonate, 1-decyl-1-propylpyrrolidinium methanesulfonate, 1-decyl-1-butylpyrrolidinium methanesulfonate, 1-decyl-2-methylpyrrolidinium methanesulfonate, 1-decyl-2-ethylpyrrolidinium methanesulfonate, 1-decyl-2-propylpyrrolidinium methanesulfonate, 1-decyl-2-butylpyrrolidinium methanesulfonate, 1-decyl-3-methylpyrrolidinium methanesulfonate, 1-decyl-3-ethylpyrrolidinium methanesulfonate, 1-decyl-3-propylpyrrolidinium methanesulfonate, 1-decyl-3-butylpyrrolidinium methanesulfonate, N-decylpyrrolidinium acetate, 1-decyl-1-methylpyrrolidinium acetate, 1-decyl-1-ethylpyrrolidinium acetate, 1-decyl-1-propylpyrrolidinium acetate, 1-decyl-1-butylpyrrolidinium acetate, 1-decyl-2-methylpyrrolidinium acetate, 1-decyl-2-ethylpyrrolidinium acetate, 1-decyl-2-propylpyrrolidinium acetate, 1-decyl-2-butylpyrrolidinium acetate, 1-decyl-3-methylpyrrolidinium acetate, 1-decyl-3-ethylpyrrolidinium acetate, 1-decyl-3-propylpyrrolidinium acetate, 1-decyl-3-butylpyrrolidinium acetate, N-decylpyrrolidinium cyanide, 1-decyl-1-methylpyrrolidinium cyanide, 1-decyl-1-ethylpyrrolidinium cyanide, 1-decyl-1-propylpyrrolidinium cyanide, 1-decyl-1-butylpyrrolidinium cyanide, 1-decyl-2-methylpyrrolidinium cyanide, 1-decyl-2-ethylpyrrolidinium cyanide, 1-decyl-2-propylpyrrolidinium cyanide, 1-decyl-2-butylpyrrolidinium cyanide, 1-decyl-3-methylpyrrolidinium cyanide, 1-decyl-3-ethylpyrrolidinium cyanide, 1-decyl-3-propylpyrrolidinium cyanide, 1-decyl-3-butylpyrrolidinium cyanide.

It can further be seen that a compound according to formula (34) may be selected from the group comprising N-undecylpyrrolidinium chloride, 1-undecyl-1-methylpyrrolidinium chloride, 1-undecyl-1-ethylpyrrolidinium chloride, 1-undecyl-1-propylpyrrolidinium chloride, 1-undecyl-1-butylpyrrolidinium chloride, 1-undecyl-2-methylpyrrolidinium chloride, 1-undecyl-2-ethylpyrrolidinium chloride, 1-undecyl-2-propylpyrrolidinium chloride, 1-undecyl-2-butylpyrrolidinium chloride, 1-undecyl-3-methylpyrrolidinium chloride, 1-undecyl-3-ethylpyrrolidinium chloride, 1-undecyl-3-propylpyrrolidinium chloride, 1-undecyl-3-butylpyrrolidinium chloride, N-undecylpyrrolidinium fluoride, 1-undecyl-1-methylpyrrolidinium fluoride, 1-undecyl-1-ethylpyrrolidinium fluoride, 1-undecyl-1-propylpyrrolidinium fluoride, 1-undecyl-1-butylpyrrolidinium fluoride, 1-undecyl-2-methylpyrrolidinium fluoride, 1-undecyl-2-ethylpyrrolidinium fluoride, 1-undecyl-2-propylpyrrolidinium fluoride, 1-undecyl-2-butylpyrrolidinium fluoride, 1-undecyl-3-methylpyrrolidinium fluoride, 1-undecyl-3-ethylpyrrolidinium fluoride, 1-undecyl-3-propylpyrrolidinium fluoride, 1-undecyl-3-butylpyrrolidinium fluoride, N-undecylpyrrolidinium triflate, 1-undecyl-1-methylpyrrolidinium triflate, 1-undecyl-1-ethylpyrrolidinium triflate, 1-undecyl-1-propylpyrrolidinium triflate, 1-undecyl-1-butylpyrrolidinium triflate, 1-undecyl-2-methylpyrrolidinium triflate, 1-undecyl-2-ethylpyrrolidinium triflate, 1-undecyl-2-propylpyrrolidinium triflate, 1-undecyl-2-butylpyrrolidinium triflate, 1-undecyl-3-methylpyrrolidinium triflate, 1-undecyl-3-ethylpyrrolidinium triflate, 1-undecyl-3-propylpyrrolidinium triflate, 1-undecyl-3-butylpyrrolidinium triflate, N-undecylpyrrolidinium methanesulfonate, 1-undecyl-1-methylpyrrolidinium methanesulfonate, 1-undecyl-1-ethylpyrrolidinium methanesulfonate, 1-undecyl-1-propylpyrrolidinium methanesulfonate, 1-undecyl-1-butylpyrrolidinium methanesulfonate, 1-undecyl-2-methylpyrrolidinium methanesulfonate, 1-undecyl-2-ethylpyrrolidinium methanesulfonate, 1-undecyl-2-propylpyrrolidinium methanesulfonate, 1-undecyl-2-butylpyrrolidinium methanesulfonate, 1-undecyl-3-methylpyrrolidinium methanesulfonate, 1-undecyl-3-ethylpyrrolidinium methanesulfonate, 1-undecyl-3-propylpyrrolidinium methanesulfonate, 1-undecyl-3-butylpyrrolidinium methanesulfonate, N-undecylpyrrolidinium acetate, 1-undecyl-1-methylpyrrolidinium acetate, 1-undecyl-1-ethylpyrrolidinium acetate, 1-undecyl-1-propylpyrrolidinium acetate, 1-undecyl-1-butylpyrrolidinium acetate, 1-undecyl-2-methylpyrrolidinium acetate, 1-undecyl-2-ethylpyrrolidinium acetate, 1-undecyl-2-propylpyrrolidinium acetate, 1-undecyl-2-butylpyrrolidinium acetate, 1-undecyl-3-methylpyrrolidinium acetate, 1-undecyl-3-ethylpyrrolidinium acetate, 1-undecyl-3-propylpyrrolidinium acetate, 1-undecyl-3-butylpyrrolidinium acetate, N-undecylpyrrolidinium cyanide, 1-undecyl-1-methylpyrrolidinium cyanide, 1-undecyl-1-ethylpyrrolidinium cyanide, 1-undecyl-1-propylpyrrolidinium cyanide, 1-undecyl-1-butylpyrrolidinium cyanide, 1-undecyl-2-methylpyrrolidinium cyanide, 1-undecyl-2-ethylpyrrolidinium cyanide, 1-undecyl-2-propylpyrrolidinium cyanide, 1-undecyl-2-butylpyrrolidinium cyanide, 1-undecyl-3-methylpyrrolidinium cyanide, 1-undecyl-3-ethylpyrrolidinium cyanide, 1-undecyl-3-propylpyrrolidinium cyanide, 1-undecyl-3-butylpyrrolidinium cyanide.

It can further be seen that a compound according to formula (35) may be selected from the group comprising N-dodecylpyrrolidinium chloride, 1-dodecyl-1-methylpyrrolidinium chloride, 1-dodecyl-1-ethylpyrrolidinium chloride, 1-dodecyl-1-propylpyrrolidinium chloride, 1-dodecyl-1-butylpyrrolidinium chloride, 1-dodecyl-2-methylpyrrolidinium chloride, 1-dodecyl-2-ethylpyrrolidinium chloride, 1-dodecyl-2-propylpyrrolidinium chloride, 1-dodecyl-2-butylpyrrolidinium chloride, 1-dodecyl-3-methylpyrrolidinium chloride, 1-dodecyl-3-ethylpyrrolidinium chloride, 1-dodecyl-3-propylpyrrolidinium chloride, 1-dodecyl-3-butylpyrrolidinium chloride, N-dodecylpyrrolidinium fluoride, 1-dodecyl-1-methylpyrrolidinium fluoride, 1-dodecyl-1-ethylpyrrolidinium fluoride, 1-dodecyl-1-propylpyrrolidinium fluoride, 1-dodecyl-1-butylpyrrolidinium fluoride, 1-dodecyl-2-methylpyrrolidinium fluoride, 1-dodecyl-2-ethylpyrrolidinium fluoride, 1-dodecyl-2-propylpyrrolidinium fluoride, 1-dodecyl-2-butylpyrrolidinium fluoride, 1-dodecyl-3-methylpyrrolidinium fluoride, 1-dodecyl-3-ethylpyrrolidinium fluoride, 1-dodecyl-3-propylpyrrolidinium fluoride, 1-dodecyl-3-butylpyrrolidinium fluoride, N-dodecylpyrrolidinium triflate, 1-dodecyl-1-methylpyrrolidinium triflate, 1-dodecyl-1-ethylpyrrolidinium triflate, 1-dodecyl-1-propylpyrrolidinium triflate, 1-dodecyl-1-butylpyrrolidinium triflate, 1-dodecyl-2-methylpyrrolidinium triflate, 1-dodecyl-2-ethylpyrrolidinium triflate, 1-dodecyl-2-propylpyrrolidinium triflate, 1-dodecyl-2-butylpyrrolidinium triflate, 1-dodecyl-3-methylpyrrolidinium triflate, 1-dodecyl-3-ethylpyrrolidinium triflate, 1-dodecyl-3-propylpyrrolidinium triflate, 1-dodecyl-3-butylpyrrolidinium triflate, N-dodecylpyrrolidinium methanesulfonate, 1-dodecyl-1-methylpyrrolidinium methanesulfonate, 1-dodecyl-1-ethylpyrrolidinium methanesulfonate, 1-dodecyl-1-propylpyrrolidinium methanesulfonate, 1-dodecyl-1-butylpyrrolidinium methanesulfonate, 1-dodecyl-2-methylpyrrolidinium methanesulfonate, 1-dodecyl-2-ethylpyrrolidinium methanesulfonate, 1-dodecyl-2-propylpyrrolidinium methanesulfonate, 1-dodecyl-2-butylpyrrolidinium methanesulfonate, 1-dodecyl-3-methylpyrrolidinium methanesulfonate, 1-dodecyl-3-ethylpyrrolidinium methanesulfonate, 1-dodecyl-3-propylpyrrolidinium methanesulfonate, 1-dodecyl-3-butylpyrrolidinium methanesulfonate, N-dodecylpyrrolidinium acetate, 1-dodecyl-1-methylpyrrolidinium acetate, 1-dodecyl-1-ethylpyrrolidinium acetate, 1-dodecyl-1-propylpyrrolidinium acetate, 1-dodecyl-1-butylpyrrolidinium acetate, 1-dodecyl-2-methylpyrrolidinium acetate, 1-dodecyl-2-ethylpyrrolidinium acetate, 1-dodecyl-2-propylpyrrolidinium acetate, 1-dodecyl-2-butylpyrrolidinium acetate, 1-dodecyl-3-methylpyrrolidinium acetate, 1-dodecyl-3-ethylpyrrolidinium acetate, 1-dodecyl-3-propylpyrrolidinium acetate, 1-dodecyl-3-butylpyrrolidinium acetate, N-dodecylpyrrolidinium cyanide, 1-dodecyl-1-methylpyrrolidinium cyanide, 1-dodecyl-1-ethylpyrrolidinium cyanide, 1-dodecyl-1-propylpyrrolidinium cyanide, 1-dodecyl-1-butylpyrrolidinium cyanide, 1-dodecyl-2-methylpyrrolidinium cyanide, 1-dodecyl-2-ethylpyrrolidinium cyanide, 1-dodecyl-2-propylpyrrolidinium cyanide, 1-dodecyl-2-butylpyrrolidinium cyanide, 1-dodecyl-3-methylpyrrolidinium cyanide, 1-dodecyl-3-ethylpyrrolidinium cyanide, 1-dodecyl-3-propylpyrrolidinium cyanide, 1-dodecyl-3-butylpyrrolidinium cyanide.

In this respect, it can be seen that especially compounds according to the following formulas (47), (48), (49), (50), (51), (52), (53), (54), (55), (56), (57) or (58)

(47)

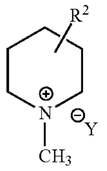

(48)

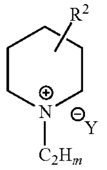

(49)

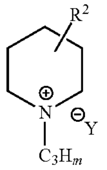

(50)

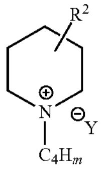

(51)

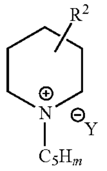

(52)

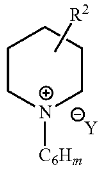

(53)

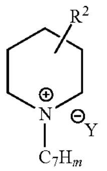

-continued (54)

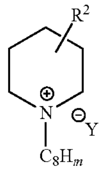

(55)

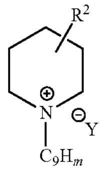

(56)

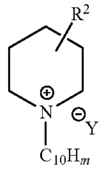

(57)

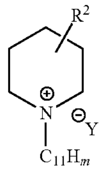

(58)

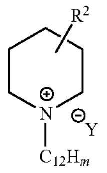

are comprised of formula VII, wherein $R^2$ is a hydrogen atom or a hydrocarbon radical with 1, 2, 3 or 4 C atoms and Y is selected from the group comprising halide, cyanide, alkyl sulfonate, halogenated alkyl sulfonate, acetate, and wherein m is selected from 3 or 5 for formula (48), wherein m is selected from 3, 5 or 7 for formula (49), wherein m is selected from 3, 5, 7, or 9 for formula (50), wherein m is selected from 3, 5, 7, 9 or 11 for formula (51), wherein m is selected from 3, 5, 7, 9, 11 or 13 for formula (52), wherein m is selected from 3, 5, 7, 9, 11, 13 or 15 for formula (53), wherein m is selected from 3, 5, 7, 9, 11, 13, 15 or 17 for formula (54), wherein m is selected from 3, 5, 7, 9, 11, 13, 15, 17 or 19 for formula (55), wherein m is selected from 3, 5, 7, 9, 11, 13, 15, 17, 19 or 21 for formula (56), wherein m is selected from 3, 5, 7, 9, 11, 13, 15, 17, 19, 21 or 23 for formula (57), wherein m is selected from 3, 5, 7, 9, 11, 13, 15, 17, 19, 21, 23 or 25 for formula (58). The radical $R^1$ is preferably either saturated, monounsaturated or diunsaturated, so that m is selected from 3 or 5 for formula (48), m is selected from 3, 5 or 7 for formula (49), m is selected from 5, 7 or 9 for formula (50), m is selected from 7, 9 or 11 for formula (51), m is selected from 9, 11 or 13 for formula (52), m is selected from 11, 13 or 15 for formula (53), m is selected from 13, 15 or 17 for formula (54), m is selected from 15, 17 or 19 for formula (55), m is selected from 17, 19 or 21 for formula (56), m is selected from 19, 21 or 23 for formula (57), and m is selected from 21, 23 or 25 for formula (58).

The radical $R^1$ is especially preferably a saturated alkyl radical, so that formula VII especially comprises compounds according to formula (47) as well as according to the following formulas (59), (60), (61), (62), (63), (64), (65), (66), (67), (68) and (69)

(59)

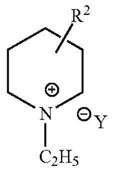

(60)

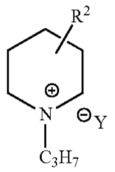

(61)

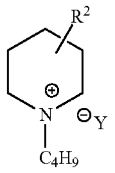

(62)

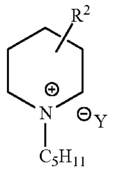

(63)

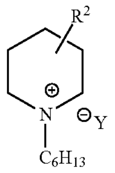

(64)

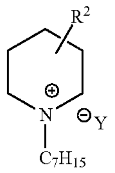

(65)

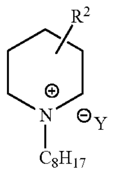

(66)

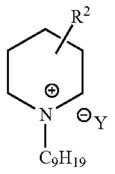

-continued (67)

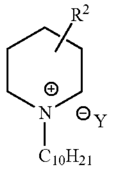

(68)

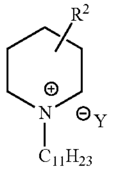

(69)

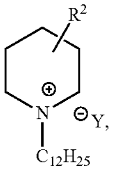

wherein $R^2$ is a hydrogen atom or a hydrocarbon radical with 1, 2, 3 or 4 C atoms and Y is selected from the group comprising halide, cyanide, alkyl sulfonate, halogenated alkyl sulfonate, acetate.

It can be seen that a compound according to formula (47) may, for example, be selected from the group comprising N-methylpiperidinium chloride, 1,1-dimethylpiperidinium chloride, 1-methyl-1-ethylpiperidinium chloride, 1-methyl-1-propylpiperidinium chloride, 1-methyl-1-butylpiperidinium chloride, 1,2-dimethylpiperidinium chloride, 1-methyl-2-ethylpiperidinium chloride, 1-methyl-2-propylpiperidinium chloride, 1-methyl-2-butylpiperidinium chloride, 1,3-dimethylpiperidinium chloride, 1-methyl-3-ethylpiperidinium chloride, 1-methyl-3-propylpiperidinium chloride, 1-methyl-3-butylpiperidinium chloride, 1,4-dimethylpiperidinium chloride, 1-methyl-4-ethylpiperidinium chloride, 1-methyl-4-propylpiperidinium chloride, 1-methyl-4-butylpiperidinium chloride, N-methylpiperidinium fluoride, 1,1-dimethylpiperidinium fluoride, 1-methyl-1-ethylpiperidinium fluoride, 1-methyl-1-propylpiperidinium fluoride, 1-methyl-1-butylpiperidinium fluoride, 1,2-dimethylpiperidinium fluoride, 1-methyl-2-ethylpiperidinium fluoride, 1-methyl-2-propylpiperidinium fluoride, 1-methyl-2-butylpiperidinium fluoride, 1,3-dimethylpiperidinium fluoride, 1-methyl-3-ethylpiperidinium fluoride, 1-methyl-3-propylpiperidinium fluoride, 1-methyl-3-butylpiperidinium fluoride, 1,4-dimethylpiperidinium fluoride, 1-methyl-4-ethylpiperidinium fluoride, 1-methyl-4-propylpiperidinium fluoride, 1-methyl-4-butylpiperidinium fluoride, N-methylpiperidinium triflate, 1,1-dimethylpiperidinium triflate, 1-methyl-1-ethylpiperidinium triflate, 1-methyl-1-propylpiperidinium triflate, 1-methyl-1-butylpiperidinium triflate, 1,2-dimethylpiperidinium triflate, 1-methyl-2-ethylpiperidinium triflate, 1-methyl-2-propylpiperidinium triflate, 1-methyl-2-butylpiperidinium triflate, 1,3-dimethylpiperidinium triflate, 1-methyl-3-ethylpiperidinium triflate, 1-methyl-3-propylpiperidinium triflate, 1-methyl-3-butylpiperidinium triflate, 1,4-dimethylpiperidinium triflate, 1-methyl-4-ethylpiperidinium triflate, 1-methyl-4-propylpiperidinium triflate, 1-methyl-4-butylpiperidinium triflate, N-methylpiperidinium methanesulfonate, 1,1-dimethylpiperidinium methanesulfonate, 1-methyl-1-ethylpiperidinium methanesulfonate, 1-methyl-1-propylpiperidinium methanesulfonate, 1-methyl-1-butylpiperidinium methanesulfonate, 1,2-dimethylpiperidinium methanesulfonate, 1-methyl-2-ethylpiperidinium methanesulfonate, 1-methyl-2-propylpiperidinium methanesulfonate, 1-methyl-2-butylpiperidinium methanesulfonate, 1,3-dimethylpiperidinium methanesulfonate, 1-methyl-3-ethylpiperidinium methanesulfonate, 1-methyl-3-propylpiperidinium methanesulfonate, 1-methyl-3-butylpiperidinium methanesulfonate, 1,4-dimethylpiperidinium methanesulfonate, 1-methyl-4-ethylpiperidinium methanesulfonate, 1-methyl-4-propylpiperidinium methanesulfonate, 1-methyl-4-butylpiperidinium methanesulfonate, N-methylpiperidinium acetate, 1,1-dimethylpiperidinium acetate, 1-methyl-1-ethylpiperidinium acetate, 1-methyl-1-propylpiperidinium acetate, 1-methyl-1-butylpiperidinium acetate, 1,2-dimethylpiperidinium acetate, 1-methyl-2-ethylpiperidinium acetate, 1-methyl-2-propylpiperidinium acetate, 1-methyl-2-butylpiperidinium acetate, 1,3-dimethylpiperidinium acetate, 1-methyl-3-ethylpiperidinium acetate, 1-methyl-3-propylpiperidinium acetate, 1-methyl-3-butylpiperidinium acetate, 1,4-dimethylpiperidinium acetate, 1-methyl-4-ethylpiperidinium acetate, 1-methyl-4-propylpiperidinium acetate, 1-methyl-4-butylpiperidinium acetate, N-methylpiperidinium cyanide, 1,1-dimethylpiperidinium cyanide, 1-methyl-1-ethylpiperidinium cyanide, 1-methyl-1-propylpiperidinium cyanide, 1-methyl-1-butylpiperidinium cyanide, 1,2-dimethylpiperidinium cyanide, 1-methyl-2-ethylpiperidinium cyanide, 1-methyl-2-propylpiperidinium cyanide, 1-methyl-2-butylpiperidinium cyanide, 1,3-dimethylpiperidinium cyanide, 1-methyl-3-ethylpiperidinium cyanide, 1-methyl-3-propylpiperidinium cyanide, 1-methyl-3-butylpiperidinium cyanide, 1,4-dimethylpiperidinium cyanide, 1-methyl-4-ethylpiperidinium cyanide, 1-methyl-4-propylpiperidinium cyanide, 1-methyl-4-butylpiperidinium cyanide.

It can be seen that a compound according to formula (48) may, for example, be selected from the group comprising N-ethylpiperidinium chloride, 1,1-diethylpiperidinium chloride, 1-ethyl-1-methylpiperidinium chloride, 1-ethyl-1-propylpiperidinium chloride, 1-ethyl-1-butylpiperidinium chloride, 1-ethyl-2-methylpiperidinium chloride, 1,2-diethylpiperidinium chloride, 1-ethyl-2-propylpiperidinium chloride, 1-ethyl-2-butylpiperidinium chloride, 1-ethyl-3-methylpiperidinium chloride, 1,3-diethylpiperidinium chloride, 1-ethyl-3-propylpiperidinium chloride, 1-ethyl-3-butylpiperidinium chloride, 1-ethyl-4-methylpiperidinium chloride, 1,4-diethylpiperidinium chloride, 1-ethyl-4-propylpiperidinium chloride, 1-ethyl-4-butylpiperidinium chloride, N-ethylpiperidinium fluoride, 1,1-diethylpiperidinium fluoride, 1-ethyl-1-methylpiperidinium fluoride, 1-ethyl-1-propylpiperidinium fluoride, 1-ethyl-1-butylpiperidinium fluoride, 1-ethyl-2-methylpiperidinium fluoride, 1,2-diethylpiperidinium fluoride, 1-ethyl-2-propylpiperidinium fluoride, 1-ethyl-2-butylpiperidinium fluoride, 1-ethyl-3-methylpiperidinium fluoride, 1,3-diethylpiperidinium fluoride, 1-ethyl-3-propylpiperidinium fluoride, 1-ethyl-3-butylpiperidinium fluoride, 1-ethyl-4-methylpiperidinium fluoride, 1,4-diethylpiperidinium fluoride, 1-ethyl-4-propylpiperidinium fluoride, 1-ethyl-4-butylpiperidinium fluoride, N-ethylpiperidinium triflate, 1,1-diethylpiperidinium triflate, 1-ethyl-1-methylpiperidinium triflate, 1-ethyl-1-propylpiperidinium triflate, 1-ethyl-1-butylpiperidinium triflate, 1-ethyl-2-methylpiperidinium triflate, 1,2-diethylpiperidinium triflate, 1-ethyl-2-propylpiperidinium triflate, 1-ethyl-2-butylpiperidinium triflate, 1-ethyl-3-methylpiperidinium triflate, 1,3-diethylpiperidinium triflate, 1-ethyl-3-propylpiperidinium triflate, 1-ethyl-3-butylpiperidinium triflate, 1-ethyl-4-methylpiperidinium triflate, 1,4-diethylpiperidinium triflate, 1-ethyl-4-propylpiperidinium triflate, 1-ethyl-4-butylpiperidinium triflate, N-ethylpiperidinium methanesulfonate, 1,1-diethylpiperidinium methanesulfonate, 1-ethyl-1-methylpiperidinium methanesulfonate, 1-ethyl-1-propylpiperidinium methanesulfonate, 1-ethyl-1-butylpiperidinium methanesulfonate, 1-ethyl-2-methylpiperidinium methanesulfonate, 1,2-diethylpiperidinium methanesulfonate, 1-ethyl-2-propylpiperidinium methanesulfonate, 1-ethyl-2-butylpiperidinium methanesulfonate, 1-ethyl-3-methylpiperidinium methanesulfonate, 1,3-diethylpiperidinium methanesulfonate, 1-ethyl-3-propylpiperidinium methanesulfonate, 1-ethyl-3-butylpiperidinium methanesulfonate, 1-ethyl-4-methylpiperidinium methanesulfonate, 1,4-diethylpiperidinium methanesulfonate, 1-ethyl-4-propylpiperidinium methanesulfonate, 1-ethyl-4-butylpiperidinium methanesulfonate, N-ethylpiperidinium acetate, 1,1-diethylpiperidinium acetate, 1-ethyl-1-methylpiperidinium acetate, 1-ethyl-1-propylpiperidinium acetate, 1-ethyl-1-butylpiperidinium acetate, 1-ethyl-2-methylpiperidinium acetate, 1,2-diethylpiperidinium acetate, 1-ethyl-2-propylpiperidinium acetate, 1-ethyl-2-butylpiperidinium acetate, 1-ethyl-3-methylpiperidinium acetate, 1,3-diethylpiperidinium acetate, 1-ethyl-3-propylpiperidinium acetate, 1-ethyl-3-butylpiperidinium acetate, 1-ethyl-4-methylpiperidinium acetate, 1,4-diethylpiperidinium acetate, 1-ethyl-4-propylpiperidinium acetate, 1-ethyl-4-butylpiperidinium acetate, N-ethylpiperidinium cyanide, 1,1-diethylpiperidinium cyanide, 1-ethyl-1-methylpiperidinium cyanide, 1-ethyl-1-propylpiperidinium cyanide, 1-ethyl-1-butylpiperidinium cyanide, 1-ethyl-2-methylpiperidinium cyanide, 1,2-diethylpiperidinium cyanide, 1-ethyl-2-propylpiperidinium cyanide, 1-ethyl-2-butylpiperidinium cyanide, 1-ethyl-3-methylpiperidinium cyanide, 1,3-diethylpiperidinium cyanide, 1-ethyl-3-propylpiperidinium cyanide, 1-ethyl-3-butylpiperidinium cyanide, 1-ethyl-4-methylpiperidinium cyanide, 1,4-diethylpiperidinium cyanide, 1-ethyl-4-propylpiperidinium cyanide, 1-ethyl-4-butylpiperidinium cyanide.

It can be seen that a compound according to formula (49) may, for example, be selected from the group comprising N-propylpiperidinium chloride, 1,1-dipropylpiperidinium chloride, 1-propyl-1-methylpiperidinium chloride, 1-propyl-1-ethylpiperidinium chloride, 1-propyl-1-butylpiperidinium chloride, 1-propyl-2-methylpiperidinium chloride, 1-propyl-2-ethylpiperidinium chloride, 1,2-dipropylpiperidinium chloride, 1-propyl-2-butylpiperidinium chloride, 1-propyl-3-methylpiperidinium chloride, 1-propyl-3-ethylpiperidinium chloride, 1,3-dipropylpiperidinium chloride, 1-propyl-3-butylpiperidinium chloride, 1-propyl-4-methylpiperidinium chloride, 1-propyl-4-ethylpiperidinium chloride, 1,4-dipropylpiperidinium chloride, 1-propyl-4-butylpiperidinium chloride, N-propylpiperidinium fluoride, 1,1-dipropylpiperidinium fluoride, 1-propyl-1-methylpiperidinium fluoride, 1-propyl-1-ethylpiperidinium fluoride, 1-propyl-1-butylpiperidinium fluoride, 1-propyl-2-methylpiperidinium fluoride, 1-propyl-2-ethylpiperidinium fluoride, 1,2-dipropylpiperidinium fluoride, 1-propyl-2-butylpiperidinium fluoride, 1-propyl-3-methylpiperidinium fluoride, 1-propyl-3-ethylpiperidinium fluoride, 1,3-dipropylpiperidinium fluoride, 1-propyl-3-butylpiperidinium fluoride, 1-propyl-4-methylpiperidinium fluoride, 1-propyl-4-ethylpiperidinium fluoride, 1,4-dipropylpiperidinium fluoride, 1-propyl-4-butylpiperidinium fluoride, N-propylpiperidinium triflate, 1,1-dipropylpiperidinium triflate, 1-propyl-1-methylpiperidinium triflate, 1-propyl-1-ethylpiperidinium triflate, 1-propyl-1-butylpiperidinium triflate, 1-propyl-2-methylpiperidinium triflate, 1-propyl-2-ethylpiperidinium triflate, 1,2-dipropylpiperidinium triflate, 1-propyl-2-butylpiperidinium triflate, 1-propyl-3-methylpiperidinium triflate, 1-propyl-3-ethylpiperidinium triflate, 1,3-dipropylpiperidinium triflate, 1-propyl-3-butylpiperidinium triflate, 1-propyl-4-methylpiperidinium triflate, 1-propyl-4-ethylpiperidinium triflate, 1,4-dipropylpiperidinium triflate, 1-propyl-4-butylpiperidinium triflate, N-propylpiperidinium methanesulfonate, 1,1-dipropylpiperidinium methanesulfonate, 1-propyl-1-methylpiperidinium methanesulfonate, 1-propyl-1-ethylpiperidinium methanesulfonate, 1-propyl-1-butylpiperidinium methanesulfonate, 1-propyl-2-methylpiperidinium methanesulfonate, 1-propyl-2-ethylpiperidinium methanesulfonate, 1,2-dipropylpiperidinium methanesulfonate, 1-propyl-2-butylpiperidinium methanesulfonate, 1-propyl-3-methylpiperidinium methanesulfonate, 1-propyl-3-ethylpiperidinium methanesulfonate, 1,3-dipropylpiperidinium methanesulfonate, 1-propyl-3-butylpiperidinium methanesulfonate, 1-propyl-4-methylpiperidinium methanesulfonate, 1-propyl-4-ethylpiperidinium methanesulfonate, 1,4-dipropylpiperidinium methanesulfonate, 1-propyl-4-butylpiperidinium methanesulfonate, N-propylpiperidinium acetate, 1,1-dipropylpiperidinium acetate, 1-propyl-1-methylpiperidinium acetate, 1-propyl-1-ethylpiperidinium acetate, 1-propyl-1-butylpiperidinium acetate, 1-propyl-2-methylpiperidinium acetate, 1-propyl-2-ethylpiperidinium acetate, 1,2-dipropylpiperidinium acetate, 1-propyl-2-butylpiperidinium acetate, 1-propyl-3-methylpiperidinium acetate, 1-propyl-3-ethylpiperidinium acetate, 1,3-dipropylpiperidinium acetate, 1-propyl-3-butylpiperidinium acetate, 1-propyl-4-methylpiperidinium acetate, 1-propyl-4-ethylpiperidinium acetate, 1,4-dipropylpiperidinium acetate, 1-propyl-4-butylpiperidinium acetate, N-propylpiperidinium cyanide, 1,1-dipropylpiperidinium cyanide, 1-propyl-1-methylpiperidinium cyanide, 1-propyl-1-ethylpiperidinium cyanide, 1-propyl-1-butylpiperidinium cyanide, 1-propyl-2-methylpiperidinium cyanide, 1-propyl-2-ethylpiperidinium cyanide, 1,2-dipropylpiperidinium cyanide, 1-propyl-2-butylpiperidinium cyanide, 1-propyl-3-methylpiperidinium cyanide, 1-propyl-3-ethylpiperidinium cyanide, 1,3-dipropylpiperidinium cyanide, 1-propyl-3-butylpiperidinium cyanide, 1-propyl-4-methylpiperidinium cyanide, 1-propyl-4-ethylpiperidinium cyanide, 1,4-dipropylpiperidinium cyanide, 1-propyl-4-butylpiperidinium cyanide.

It can be seen that a compound according to formula (50) may, for example, be selected from the group comprising N-butylpiperidinium chloride, 1-butyl-1-methylpiperidinium chloride, 1-butyl-1-ethylpiperidinium chloride, 1-butyl-1-propylpiperidinium chloride, 1,1-dibutylpiperidinium chloride, 1-butyl-2-methylpiperidinium chloride, 1-butyl-2-ethylpiperidinium chloride, 1-butyl-2-propylpiperidinium chloride, 1,2-dibutylpiperidinium chloride, 1-butyl-3-methylpiperidinium chloride, 1-butyl-3-ethylpiperidinium chloride, 1-butyl-3-propylpiperidinium chloride, 1,3-dibutylpiperidinium chloride, 1-butyl-4-methylpiperidinium chloride, 1-butyl-4-ethylpiperidinium chloride, 1-butyl-4-propylpiperidinium chloride, 1,4-dibutylpiperidinium chloride, N-butylpiperidinium fluoride, 1-butyl-1-methylpiperidinium fluoride, 1-butyl-1-ethylpiperidinium fluoride, 1-butyl-1-propylpiperidinium fluoride, 1,1-dibutylpiperidinium fluoride, 1-butyl-2-methylpiperidinium fluoride, 1-butyl-2-ethylpiperidinium fluoride, 1-butyl-2-propylpiperidinium fluoride, 1,2-dibutylpiperidinium fluoride, 1-butyl-3-methylpiperidinium fluoride, 1-butyl-3-ethylpiperidinium fluoride, 1-butyl-3-propylpiperidinium fluoride, 1,3-dibutylpiperidinium fluoride, 1-butyl-4-methylpiperidinium fluoride, 1-butyl-4-ethylpiperidinium fluoride, 1-butyl-4-propylpiperidinium fluoride, 1,4-dibutylpiperidinium fluoride, N-butylpiperidinium triflate, 1-butyl-1-methylpiperidinium triflate, 1-butyl-1-ethylpiperidinium triflate, 1-butyl-1-propylpiperidinium triflate, 1,1-dibutylpiperidinium triflate, 1-butyl-2-methylpiperidinium triflate, 1-butyl-2-ethylpiperidinium triflate, 1-butyl-2-propylpiperidinium triflate, 1,2-dibutylpiperidinium triflate, 1-butyl-3-methylpiperidinium triflate, 1-butyl-3-ethylpiperidinium triflate, 1-butyl-3-propylpiperidinium triflate, 1,3-dibutylpiperidinium triflate, 1-butyl-4-methylpiperidinium triflate, 1-butyl-4-ethylpiperidinium triflate, 1-butyl-4-propylpiperidinium triflate, 1,4-dibutylpiperidinium triflate, N-butylpiperidinium methanesulfonate, 1-butyl-1-methylpiperidinium methanesulfonate, 1-butyl-1-ethylpiperidinium methanesulfonate, 1-butyl-1-propylpiperidinium methanesulfonate, 1,1-dibutylpiperidinium methanesulfonate, 1-butyl-2-methylpiperidinium methanesulfonate, 1-butyl-2-ethylpiperidinium methanesulfonate, 1-butyl-2-propylpiperidinium methanesulfonate, 1,2-dibutylpiperidinium methanesulfonate, 1-butyl-3-methylpiperidinium methanesulfonate, 1-butyl-3-ethylpiperidinium methanesulfonate, 1-butyl-3-propylpiperidinium methanesulfonate, 1,3-dibutylpiperidinium methanesulfonate, 1-butyl-4-methylpiperidinium methanesulfonate, 1-butyl-4-ethylpiperidinium methanesulfonate, 1-butyl-4-propylpiperidinium methanesulfonate, 1,4-dibutylpiperidinium methanesulfonate, N-butylpiperidinium acetate, 1-butyl-1-methylpiperidinium acetate, 1-butyl-1-ethylpiperidinium acetate, 1-butyl-1-propylpiperidinium acetate, 1,1-dibutylpiperidinium acetate, 1-butyl-2-methylpiperidinium acetate, 1-butyl-2-ethylpiperidinium acetate, 1-butyl-2-propylpiperidinium acetate, 1,2-dibutylpiperidinium acetate, 1-butyl-3-methylpiperidinium acetate, 1-butyl-3-ethylpiperidinium acetate, 1-butyl-3-propylpiperidinium acetate, 1,3-dibutylpiperidinium acetate, 1-butyl-4-methylpiperidinium acetate, 1-butyl-4-ethylpiperidinium acetate, 1-butyl-4-propylpiperidinium acetate, 1,4-dibutylpiperidinium acetate, N-butylpiperidinium cyanide, 1-butyl-1-methylpiperidinium cyanide, 1-butyl-1-ethylpiperidinium cyanide, 1-butyl-1-propylpiperidinium cyanide, 1,1-dibutylpiperidinium cyanide, 1-butyl-2-methylpiperidinium cyanide, 1-butyl-2-ethylpiperidinium cyanide, 1-butyl-2-propylpiperidinium cyanide, 1,2-dibutylpiperidinium cyanide, 1-butyl-3-methylpiperidinium cyanide, 1-butyl-3-ethylpiperidinium cyanide, 1-butyl-3-propylpiperidinium cyanide, 1,3-dibutylpiperidinium cyanide, 1-butyl-4-methylpiperidinium cyanide, 1-butyl-4-ethylpiperidinium cyanide, 1-butyl-4-propylpiperidinium cyanide, 1,4-dibutylpiperidinium cyanide.

It can be seen that a compound according to formula (51) may, for example, be selected from the group comprising N-pentylpiperidinium chloride, 1-pentyl-1-methylpiperidinium chloride, 1-pentyl-1-ethylpiperidinium chloride, 1-pentyl-1-propylpiperidinium chloride, 1-pentyl-1-butylpiperidinium chloride, 1-pentyl-2-methylpiperidinium chloride, 1-pentyl-2-ethylpiperidinium chloride, 1-pentyl-2-propylpiperidinium chloride, 1-pentyl-2-butylpiperidinium chloride, 1-pentyl-3-methylpiperidinium chloride, 1-pentyl-3-ethylpiperidinium chloride, 1-pentyl-3-propylpiperidinium chloride, 1-pentyl-3-butylpiperidinium chloride, 1-pentyl-4-methylpiperidinium chloride, 1-pentyl-4-ethylpiperidinium chloride, 1-pentyl-4-propylpiperidinium chloride, 1-pentyl-4-butylpiperidinium chloride, N-pentylpiperidinium fluoride, 1-pentyl-1-methylpiperidinium fluoride, 1-pentyl-1-ethylpiperidinium fluoride, 1-pentyl-1-propylpiperidinium fluoride, 1-pentyl-1-butylpiperidinium fluoride, 1-pentyl-2-methylpiperidinium fluoride, 1-pentyl-2-ethylpiperidinium fluoride, 1-pentyl-2-propylpiperidinium fluoride, 1-pentyl-2-butylpiperidinium fluoride, 1-pentyl-3-methylpiperidinium fluoride, 1-pentyl-3-ethylpiperidinium fluoride, 1-pentyl-3-propylpiperidinium fluoride, 1-pentyl-3-butylpiperidinium fluoride, 1-pentyl-4-methylpiperidinium fluoride, 1-pentyl-4-ethylpiperidinium fluoride, 1-pentyl-4-propylpiperidinium fluoride, 1-pentyl-4-butylpiperidinium fluoride, N-pentylpiperidinium triflate, 1-pentyl-1-methylpiperidinium triflate, 1-pentyl-1-ethylpiperidinium triflate, 1-pentyl-1-propylpiperidinium triflate, 1-pentyl-1-butylpiperidinium triflate, 1-pentyl-2-methylpiperidinium triflate, 1-pentyl-2-ethylpiperidinium triflate, 1-pentyl-2-propylpiperidinium triflate, 1-pentyl-2-butylpiperidinium triflate, 1-pentyl-3-methylpiperidinium triflate, 1-pentyl-3-ethylpiperidinium triflate, 1-pentyl-3-propylpiperidinium triflate, 1-pentyl-3-butylpiperidinium triflate, 1-pentyl-4-methylpiperidinium triflate, 1-pentyl-4-ethylpiperidinium triflate, 1-pentyl-4-propylpiperidinium triflate, 1-pentyl-4-butylpiperidinium triflate, N-pentylpiperidinium methanesulfonate, 1-pentyl-1-methylpiperidinium methanesulfonate, 1-pentyl-1-ethylpiperidinium methanesulfonate, 1-pentyl-1-propylpiperidinium methanesulfonate, 1-pentyl-1-butylpiperidinium methanesulfonate, 1-pentyl-2-methylpiperidinium methanesulfonate, 1-pentyl-2-ethylpiperidinium methanesulfonate, 1-pentyl-2-propylpiperidinium methanesulfonate, 1-pentyl-2-butylpiperidinium methanesulfonate, 1-pentyl-3-methylpiperidinium methanesulfonate, 1-pentyl-3-ethylpiperidinium methanesulfonate, 1-pentyl-3-propylpiperidinium methanesulfonate, 1-pentyl-3-butylpiperidinium methanesulfonate, 1-pentyl-4-methylpiperidinium methanesulfonate, 1-pentyl-4-ethylpiperidinium methanesulfonate, 1-pentyl-4-propylpiperidinium methanesulfonate, 1-pentyl-4-butylpiperidinium methanesulfonate, N-pentylpiperidinium acetate, 1-pentyl-1-methylpiperidinium acetate, 1-pentyl-1-ethylpiperidinium acetate, 1-pentyl-1-propylpiperidinium acetate, 1-pentyl-1-butylpiperidinium acetate, 1-pentyl-2-methylpiperidinium acetate, 1-pentyl-2-ethylpiperidinium acetate, 1-pentyl-2-propylpiperidinium acetate, 1-pentyl-2-butylpiperidinium acetate, 1-pentyl-3-methylpiperidinium acetate, 1-pentyl-3-ethylpiperidinium acetate, 1-pentyl-3-propylpiperidinium acetate, 1-pentyl-3-butylpiperidinium acetate, 1-pentyl-4-methylpiperidinium acetate, 1-pentyl-4-ethylpiperidinium acetate, 1-pentyl-4-propylpiperidinium acetate, 1-pentyl-4-butylpiperidinium acetate, N-pentylpiperidinium cyanide, 1-pentyl-1-methylpiperidinium cyanide, 1-pentyl-1-ethylpiperidinium cyanide, 1-pentyl-1-propylpiperidinium cyanide, 1-pentyl-1-butylpiperidinium cyanide, 1-pentyl-2-methylpiperidinium cyanide, 1-pentyl-2-ethylpiperidinium cyanide, 1-pentyl-2-propylpiperidinium cyanide, 1-pentyl-2-butylpiperidinium cyanide, 1-pentyl-3-methylpiperidinium cyanide, 1-pentyl-3-ethylpiperidinium cyanide, 1-pentyl-3-propylpiperidinium cyanide, 1-pentyl-3-butylpiperidinium cyanide, 1-pentyl-4-methylpiperidinium cyanide, 1-pentyl-4-ethylpiperidinium cyanide, 1-pentyl-4-propylpiperidinium cyanide, 1-pentyl-4-butylpiperidinium cyanide.

It can further be seen that a compound according to formula (52) may be selected from the group comprising N-hexylpiperidinium chloride, 1-hexyl-1-methylpiperidinium chloride, 1-hexyl-1-ethylpiperidinium chloride, 1-hexyl-1-propylpiperidinium chloride, 1-hexyl-1-butylpiperidinium chloride, 1-hexyl-2-methylpiperidinium chloride, 1-hexyl-2-ethylpiperidinium chloride, 1-hexyl-2-propylpiperidinium chloride, 1-hexyl-2-butylpiperidinium chloride, 1-hexyl-3-methylpiperidinium chloride, 1-hexyl-3-ethylpiperidinium chloride, 1-hexyl-3-propylpiperidinium chloride, 1-hexyl-3-butylpiperidinium chloride, 1-hexyl-4-methylpiperidinium chloride, 1-hexyl-4-ethylpiperidinium chloride, 1-hexyl-4-propylpiperidinium chloride, 1-hexyl-4-butylpiperidinium chloride, N-hexylpiperidinium fluoride, 1-hexyl-1-methylpiperidinium fluoride, 1-hexyl-1-ethylpiperidinium fluoride, 1-hexyl-1-propylpiperidinium fluoride, 1-hexyl-1-butylpiperidinium fluoride, 1-hexyl-2-methylpiperidinium fluoride, 1-hexyl-2-ethylpiperidinium fluoride, 1-hexyl-2-propylpiperidinium fluoride, 1-hexyl-2-butylpiperidinium fluoride, 1-hexyl-3-methylpiperidinium fluoride, 1-hexyl-3-ethylpiperidinium fluoride, 1-hexyl-3-propylpiperidinium fluoride, 1-hexyl-3-butylpiperidinium fluoride, 1-hexyl-4-methylpiperidinium fluoride, 1-hexyl-4-ethylpiperidinium fluoride, 1-hexyl-4-propylpiperidinium fluoride, 1-hexyl-4-butylpiperidinium fluoride, N-hexylpiperidinium triflate, 1-hexyl-1-methylpiperidinium triflate, 1-hexyl-1-ethylpiperidinium triflate, 1-hexyl-1-propylpiperidinium triflate, 1-hexyl-1-butylpiperidinium triflate, 1-hexyl-2-methylpiperidinium triflate, 1-hexyl-2-ethylpiperidinium triflate, 1-hexyl-2-propylpiperidinium triflate, 1-hexyl-2-butylpiperidinium triflate, 1-hexyl-3-methylpiperidinium triflate, 1-hexyl-3-ethylpiperidinium triflate, 1-hexyl-3-propylpiperidinium triflate, 1-hexyl-3-butylpiperidinium triflate, 1-hexyl-4-methylpiperidinium triflate, 1-hexyl-4-ethylpiperidinium triflate, 1-hexyl-4-propylpiperidinium triflate, 1-hexyl-4-butylpiperidinium triflate, N-hexylpiperidinium methanesulfonate, 1-hexyl-1-methylpiperidinium methanesulfonate, 1-hexyl-1-ethylpiperidinium methanesulfonate, 1-hexyl-1-propylpiperidinium methanesulfonate, 1-hexyl-1-butylpiperidinium methanesulfonate, 1-hexyl-2-methylpiperidinium methanesulfonate, 1-hexyl-2-ethylpiperidinium methanesulfonate, 1-hexyl-2-propylpiperidinium methanesulfonate, 1-hexyl-2-butylpiperidinium methanesulfonate, 1-hexyl-3-methylpiperidinium methanesulfonate, 1-hexyl-3-ethylpiperidinium methanesulfonate, 1-hexyl-3-propylpiperidinium methanesulfonate, 1-hexyl-3-butylpiperidinium methanesulfonate, 1-hexyl-4-methylpiperidinium methanesulfonate, 1-hexyl-4-ethylpiperidinium methanesulfonate, 1-hexyl-4-propylpiperidinium methanesulfonate, 1-hexyl-4-butylpiperidinium methanesulfonate, N-hexylpiperidinium acetate, 1-hexyl-1-methylpiperidinium acetate, 1-hexyl-1-ethylpiperidinium acetate, 1-hexyl-1-propylpiperidinium acetate, 1-hexyl-1-butylpiperidinium acetate, 1-hexyl-2-methylpiperidinium acetate, 1-hexyl-2-ethylpiperidinium acetate, 1-hexyl-2-propylpiperidinium acetate, 1-hexyl-2-butylpiperidinium acetate, 1-hexyl-3-methylpiperidinium acetate, 1-hexyl-3-ethylpiperidinium acetate, 1-hexyl-3-propylpiperidinium acetate, 1-hexyl-3-butylpiperidinium acetate, 1-hexyl-4-methylpiperidinium acetate, 1-hexyl-4-ethylpiperidinium acetate, 1-hexyl-4-propylpiperidinium acetate, 1-hexyl-4-butylpiperidinium acetate, N-hexylpiperidinium cyanide, 1-hexyl-1-methylpiperidinium cyanide, 1-hexyl-1-ethylpiperidinium cyanide, 1-hexyl-1-propylpiperidinium cyanide, 1-hexyl-1-butylpiperidinium cyanide, 1-hexyl-2-methylpiperidinium cyanide, 1-hexyl-2-ethylpiperidinium cyanide, 1-hexyl-2-propylpiperidinium cyanide, 1-hexyl-2-butylpiperidinium cyanide, 1-hexyl-3-methylpiperidinium cyanide, 1-hexyl-3-ethylpiperidinium cyanide, 1-hexyl-3-propylpiperidinium cyanide, 1-hexyl-3-butylpiperidinium cyanide, 1-hexyl-4-methylpiperidinium cyanide, 1-hexyl-4-ethylpiperidinium cyanide, 1-hexyl-4-propylpiperidinium cyanide, 1-hexyl-4-butylpiperidinium cyanide.

It can further be seen that a compound according to formula (53) may be selected from the group comprising N-heptylpiperidinium chloride, 1-heptyl-1-methylpiperidinium chloride, 1-heptyl-1-ethylpiperidinium chloride, 1-heptyl-1-propylpiperidinium chloride, 1-heptyl-1-butylpiperidinium chloride, 1-heptyl-2-methylpiperidinium chloride, 1-heptyl-2-ethylpiperidinium chloride, 1-heptyl-2-propylpiperidinium chloride, 1-heptyl-2-butylpiperidinium chloride, 1-heptyl-3-methylpiperidinium chloride, 1-heptyl-3-ethylpiperidinium chloride, 1-heptyl-3-propylpiperidinium chloride, 1-heptyl-3-butylpiperidinium chloride, 1-heptyl-4-methylpiperidinium chloride, 1-heptyl-4-ethylpiperidinium chloride, 1-heptyl-4-propylpiperidinium chloride, 1-heptyl-4-butylpiperidinium chloride, N-heptylpiperidinium fluoride, 1-heptyl-1-methylpiperidinium fluoride, 1-heptyl-1-ethylpiperidinium fluoride, 1-heptyl-1-propylpiperidinium fluoride, 1-heptyl-1-butylpiperidinium fluoride, 1-heptyl-2-methylpiperidinium fluoride, 1-heptyl-2-ethylpiperidinium fluoride, 1-heptyl-2-propylpiperidinium fluoride, 1-heptyl-2-butylpiperidinium fluoride, 1-heptyl-3-methylpiperidinium fluoride, 1-heptyl-3-ethylpiperidinium fluoride, 1-heptyl-3-propylpiperidinium fluoride, 1-heptyl-3-butylpiperidinium fluoride, 1-heptyl-4-methylpiperidinium fluoride, 1-heptyl-4-ethylpiperidinium fluoride, 1-heptyl-4-propylpiperidinium fluoride, 1-heptyl-4-butylpiperidinium fluoride, N-heptylpiperidinium triflate, 1-heptyl-1-methylpiperidinium triflate, 1-heptyl-1-ethylpiperidinium triflate, 1-heptyl-1-propylpiperidinium triflate, 1-heptyl-1-butylpiperidinium triflate, 1-heptyl-2-methylpiperidinium triflate, 1-heptyl-2-ethylpiperidinium triflate, 1-heptyl-2-propylpiperidinium triflate, 1-heptyl-2-butylpiperidinium triflate, 1-heptyl-3-methylpiperidinium triflate, 1-heptyl-3-ethylpiperidinium triflate, 1-heptyl-3-propylpiperidinium triflate, 1-heptyl-3-butylpiperidinium triflate, 1-heptyl-4-methylpiperidinium triflate, 1-heptyl-4-ethylpiperidinium triflate, 1-heptyl-4-propylpiperidinium triflate, 1-heptyl-4-butylpiperidinium triflate, N-heptylpiperidinium methanesulfonate, 1-heptyl-1-methylpiperidinium methanesulfonate, 1-heptyl-1-ethylpiperidinium methanesulfonate, 1-heptyl-1-propylpiperidinium methanesulfonate, 1-heptyl-1-butylpiperidinium methanesulfonate, 1-heptyl-2-methylpiperidinium methanesulfonate, 1-heptyl-2-ethylpiperidinium methanesulfonate, 1-heptyl-2-propylpiperidinium methanesulfonate, 1-heptyl-2-butylpiperidinium methanesulfonate, 1-heptyl-3-methylpiperidinium methanesulfonate, 1-heptyl-3-ethylpiperidinium methanesulfonate, 1-heptyl-3-propylpiperidinium methanesulfonate, 1-heptyl-3-butylpiperidinium methanesulfonate, 1-heptyl-4-methylpiperidinium methanesulfonate, 1-heptyl-4-ethylpiperidinium methanesulfonate, 1-heptyl-4-propylpiperidinium methanesulfonate, 1-heptyl-4-butylpiperidinium methanesulfonate, N-heptylpiperidinium acetate, 1-heptyl-1-methylpiperidinium acetate, 1-heptyl-1-ethylpiperidinium acetate, 1-heptyl-1-propylpiperidinium acetate, 1-heptyl-1-butylpiperidinium acetate, 1-heptyl-2-methylpiperidinium acetate, 1-heptyl-2-ethylpiperidinium acetate, 1-heptyl-2-propylpiperidinium acetate, 1-heptyl-2-butylpiperidinium acetate, 1-heptyl-3-methylpiperidinium acetate, 1-heptyl-3-ethylpiperidinium acetate, 1-heptyl-3-propylpiperidinium acetate, 1-heptyl-3-butylpiperidinium acetate, 1-heptyl-4-methylpiperidinium acetate, 1-heptyl-4-ethylpiperidinium acetate, 1-heptyl-4-propylpiperidinium acetate, 1-heptyl-4-butylpiperidinium acetate, N-heptylpiperidinium cyanide, 1-heptyl-1-methylpiperidinium cyanide, 1-heptyl-1-ethylpiperidinium cyanide, 1-heptyl-1-propylpiperidinium cyanide, 1-heptyl-1-butylpiperidinium cyanide, 1-heptyl-2-methylpiperidinium cyanide, 1-heptyl-2-ethylpiperidinium cyanide, 1-heptyl-2-propylpiperidinium cyanide, 1-heptyl-2-butylpiperidinium cyanide, 1-heptyl-3-methylpiperidinium cyanide, 1-heptyl-3-ethylpiperidinium cyanide, 1-heptyl-3-propylpiperidinium cyanide, 1-heptyl-3-butylpiperidinium cyanide, 1-heptyl-4-methylpiperidinium cyanide, 1-heptyl-4-ethylpiperidinium cyanide, 1-heptyl-4-propylpiperidinium cyanide, 1-heptyl-4-butylpiperidinium cyanide.

It can further be seen that a compound according to formula (54) may be selected from the group comprising N-octylpiperidinium chloride, 1-octyl-1-methylpiperidinium chloride, 1-octyl-1-ethylpiperidinium chloride, 1-octyl-1-propylpiperidinium chloride, 1-octyl-1-butylpiperidinium chloride, 1-octyl-2-methylpiperidinium chloride, 1-octyl-2-ethylpiperidinium chloride, 1-octyl-2-propylpiperidinium chloride, 1-octyl-2-butylpiperidinium chloride, 1-octyl-3-methylpiperidinium chloride, 1-octyl-3-ethylpiperidinium chloride, 1-octyl-3-propylpiperidinium chloride, 1-octyl-3-butylpiperidinium chloride, 1-octyl-4-methylpiperidinium chloride, 1-octyl-4-ethylpiperidinium chloride, 1-octyl-4-propylpiperidinium chloride, 1-octyl-4-butylpiperidinium chloride, N-octylpiperidinium fluoride, 1-octyl-1-methylpiperidinium fluoride, 1-octyl-1-ethylpiperidinium fluoride, 1-octyl-1-propylpiperidinium fluoride, 1-octyl-1-butylpiperidinium fluoride, 1-octyl-2-methylpiperidinium fluoride, 1-octyl-2-ethylpiperidinium fluoride, 1-octyl-2-propylpiperidinium fluoride, 1-octyl-2-butylpiperidinium fluoride, 1-octyl-3-methylpiperidinium fluoride, 1-octyl-3-ethylpiperidinium fluoride, 1-octyl-3-propylpiperidinium fluoride, 1-octyl-3-butylpiperidinium fluoride, 1-octyl-4-methylpiperidinium fluoride, 1-octyl-4-ethylpiperidinium fluoride, 1-octyl-4-propylpiperidinium fluoride, 1-octyl-4-butylpiperidinium fluoride, N-octylpiperidinium triflate, 1-octyl-1-methylpiperidinium triflate, 1-octyl-1-ethylpiperidinium triflate, 1-octyl-1-propylpiperidinium triflate, 1-octyl-1-butylpiperidinium triflate, 1-octyl-2-methylpiperidinium triflate, 1-octyl-2-ethylpiperidinium triflate, 1-octyl-2-propylpiperidinium triflate, 1-octyl-2-butylpiperidinium triflate, 1-octyl-3-methylpiperidinium triflate, 1-octyl-3-ethylpiperidinium triflate, 1-octyl-3-propylpiperidinium triflate, 1-octyl-3-butylpiperidinium triflate, 1-octyl-4-methylpiperidinium triflate, 1-octyl-4-ethylpiperidinium triflate, 1-octyl-4-propylpiperidinium triflate, 1-octyl-4-butylpiperidinium triflate, N-octylpiperidinium methanesulfonate, 1-octyl-1-methylpiperidinium methanesulfonate, 1-octyl-1-ethylpiperidinium methanesulfonate, 1-octyl-1-propylpiperidinium methanesulfonate, 1-octyl-1-butylpiperidinium methanesulfonate, 1-octyl-2-methylpiperidinium methanesulfonate, 1-octyl-2-ethylpiperidinium methanesulfonate, 1-octyl-2-propylpiperidinium methanesulfonate, 1-octyl-2-butylpiperidinium methanesulfonate, 1-octyl-3-methylpiperidinium methanesulfonate, 1-octyl-3-ethylpiperidinium methanesulfonate, 1-octyl-3-propylpiperidinium methanesulfonate, 1-octyl-3-butylpiperidinium methanesulfonate, 1-octyl-4-methylpiperidinium methanesulfonate, 1-octyl-4-ethylpiperidinium methanesulfonate, 1-octyl-4-propylpiperidinium methanesulfonate, 1-octyl-4-butylpiperidinium methanesulfonate, N-octylpiperidinium acetate, 1-octyl-1-methylpiperidinium acetate, 1-octyl-1-ethylpiperidinium acetate, 1-octyl-1-propylpiperidinium acetate, 1-octyl-1-butylpiperidinium acetate, 1-octyl-2-methylpiperidinium acetate, 1-octyl-2-ethylpiperidinium acetate, 1-octyl-2-propylpiperidinium acetate, 1-octyl-2-butylpiperidinium acetate, 1-octyl-3-methylpiperidinium acetate, 1-octyl-3-ethylpiperidinium acetate, 1-octyl-3-propylpiperidinium acetate, 1-octyl-3-butylpiperidinium acetate, 1-octyl-4-methylpiperidinium acetate, 1-octyl-4-ethylpiperidinium acetate, 1-octyl-4-propylpiperidinium acetate, 1-octyl-4-butylpiperidinium acetate, N-octylpiperidinium cyanide, 1-octyl-1-methylpiperidinium cyanide, 1-octyl-1-ethylpiperidinium cyanide, 1-octyl-1-propylpiperidinium cyanide, 1-octyl-1-butylpiperidinium cyanide, 1-octyl-2-methylpiperidinium cyanide, 1-octyl-2-ethylpiperidinium cyanide, 1-octyl-2-propylpiperidinium cyanide, 1-octyl-2-butylpiperidinium cyanide, 1-octyl-3-methylpiperidinium cyanide, 1-octyl-3-ethylpiperidinium cyanide, 1-octyl-3-propylpiperidinium cyanide, 1-octyl-3-butylpiperidinium cyanide, 1-octyl-4-methylpiperidinium cyanide, 1-octyl-4-ethylpiperidinium cyanide, 1-octyl-4-propylpiperidinium cyanide, 1-octyl-4-butylpiperidinium cyanide.

It can further be seen that a compound according to formula (55) may be selected from the group comprising N-nonylpiperidinium chloride, 1-nonyl-1-methylpiperidinium chloride, 1-nonyl-1-ethylpiperidinium chloride, 1-nonyl-1-propylpiperidinium chloride, 1-nonyl-1-butylpiperidinium chloride, 1-nonyl-2-methylpiperidinium chloride, 1-nonyl-2-ethylpiperidinium chloride, 1-nonyl-2-propylpiperidinium chloride, 1-nonyl-2-butylpiperidinium chloride, 1-nonyl-3-methylpiperidinium chloride, 1-nonyl-3-ethylpiperidinium chloride, 1-nonyl-3-propylpiperidinium chloride, 1-nonyl-3-butylpiperidinium chloride, 1-nonyl-4-methylpiperidinium chloride, 1-nonyl-4-ethylpiperidinium chloride, 1-nonyl-4-propylpiperidinium chloride, 1-nonyl-4-butylpiperidinium chloride, N-nonylpiperidinium fluoride, 1-nonyl-1-methylpiperidinium fluoride, 1-nonyl-1-ethylpiperidinium fluoride, 1-nonyl-1-propylpiperidinium fluoride, 1-nonyl-1-butylpiperidinium fluoride, 1-nonyl-2-methylpiperidinium fluoride, 1-nonyl-2-ethylpiperidinium fluoride, 1-nonyl-2-propylpiperidinium fluoride, 1-nonyl-2-butylpiperidinium fluoride, 1-nonyl-3-methylpiperidinium fluoride, 1-nonyl-3-ethylpiperidinium fluoride, 1-nonyl-3-propylpiperidinium fluoride, 1-nonyl-3-butylpiperidinium fluoride, 1-nonyl-4-methylpiperidinium fluoride, 1-nonyl-4-ethylpiperidinium fluoride, 1-nonyl-4-propylpiperidinium fluoride, 1-nonyl-4-butylpiperidinium fluoride, N-nonylpiperidinium triflate, 1-nonyl-1-methylpiperidinium triflate, 1-nonyl-1-ethylpiperidinium triflate, 1-nonyl-1-propylpiperidinium triflate, 1-nonyl-1-butylpiperidinium triflate, 1-nonyl-2-methylpiperidinium triflate, 1-nonyl-2-ethylpiperidinium triflate, 1-nonyl-2-propylpiperidinium triflate, 1-nonyl-2-butylpiperidinium triflate, 1-nonyl-3-methylpiperidinium triflate, 1-nonyl-3-ethylpiperidinium triflate, 1-nonyl-3-propylpiperidinium triflate, 1-nonyl-3-butylpiperidinium triflate, 1-nonyl-4-methylpiperidinium triflate, 1-nonyl-4-ethylpiperidinium triflate, 1-nonyl-4-propylpiperidinium triflate, 1-nonyl-4-butylpiperidinium triflate, N-nonylpiperidinium methanesulfonate, 1-nonyl-1-methylpiperidinium methanesulfonate, 1-nonyl-1-ethylpiperidinium methanesulfonate, 1-nonyl-1-propylpiperidinium methanesulfonate, 1-nonyl-1-butylpiperidinium methanesulfonate, 1-nonyl-2-methylpiperidinium methanesulfonate, 1-nonyl-2-ethylpiperidinium methanesulfonate, 1-nonyl-2-propylpiperidinium methanesulfonate, 1-nonyl-2-butylpiperidinium methanesulfonate, 1-nonyl-3-methylpiperidinium methanesulfonate, 1-nonyl-3-ethylpiperidinium methanesulfonate, 1-nonyl-3-propylpiperidinium methanesulfonate, 1-nonyl-3-butylpiperidinium methanesulfonate, 1-nonyl-4-methylpiperidinium methanesulfonate, 1-nonyl-4-ethylpiperidinium methanesulfonate, 1-nonyl-4-propylpiperidinium methanesulfonate, 1-nonyl-4-butylpiperidinium methanesulfonate, N-nonylpiperidinium acetate, 1-nonyl-1-methylpiperidinium acetate, 1-nonyl-1-ethylpiperidinium acetate, 1-nonyl-1-propylpiperidinium acetate, 1-nonyl-1-butylpiperidinium acetate, 1-nonyl-2-methylpiperidinium acetate, 1-nonyl-2-ethylpiperidinium acetate, 1-nonyl-2-propylpiperidinium acetate, 1-nonyl-2-butylpiperidinium acetate, 1-nonyl-3-methylpiperidinium acetate, 1-nonyl-3-ethylpiperidinium acetate, 1-nonyl-3-propylpiperidinium acetate, 1-nonyl-3-butylpiperidinium acetate, 1-nonyl-4-methylpiperidinium acetate, 1-nonyl-4-ethylpiperidinium acetate, 1-nonyl-4-propylpiperidinium eridinium acetate, 1-nonyl-4-butylpiperidinium acetate, N-nonylpiperidinium cyanide, 1-nonyl-1-methylpiperidinium cyanide, 1-nonyl-1-ethylpiperidinium cyanide, 1-nonyl-1-propylpiperidinium cyanide, 1-nonyl-1-butylpiperidinium cyanide, 1-nonyl-2-methylpiperidinium cyanide, 1-nonyl-2-ethylpiperidinium cyanide, 1-nonyl-2-propylpiperidinium cyanide, 1-nonyl-2-butylpiperidinium cyanide, 1-nonyl-3-methylpiperidinium cyanide, 1-nonyl-3-ethylpiperidinium cyanide, 1-nonyl-3-propylpiperidinium cyanide, 1-nonyl-3-butylpiperidinium cyanide, 1-nonyl-4-methylpiperidinium cyanide, 1-nonyl-4-ethylpiperidinium cyanide, 1-nonyl-4-propylpiperidinium cyanide, 1-nonyl-4-butylpiperidinium cyanide.

It can further be seen that a compound according to formula (56) may be selected from the group comprising N-decylpiperidinium chloride, 1-decyl-1-methylpiperidinium chloride, 1-decyl-1-ethylpiperidinium chloride, 1-decyl-1-propylpiperidinium chloride, 1-decyl-1-butylpiperidinium chloride, 1-decyl-2-methylpiperidinium chloride, 1-decyl-2-ethylpiperidinium chloride, 1-decyl-2-propylpiperidinium chloride, 1-decyl-2-butylpiperidinium chloride, 1-decyl-3-methylpiperidinium chloride, 1-decyl-3-ethylpiperidinium chloride, 1-decyl-3-propylpiperidinium chloride, 1-decyl-3-butylpiperidinium chloride, 1-decyl-4-methylpiperidinium chloride, 1-decyl-4-ethylpiperidinium chloride, 1-decyl-4-propylpiperidinium chloride, 1-decyl-4-butylpiperidinium chloride, N-decylpiperidinium fluoride, 1-decyl-1-methylpiperidinium fluoride, 1-decyl-1-ethylpiperidinium fluoride, 1-decyl-1-propylpiperidinium fluoride, 1-decyl-1-butylpiperidinium fluoride, 1-decyl-2-methylpiperidinium fluoride, 1-decyl-2-ethylpiperidinium fluoride, 1-decyl-2-propylpiperidinium fluoride, 1-decyl-2-butylpiperidinium fluoride, 1-decyl-3-methylpiperidinium fluoride, 1-decyl-3-ethylpiperidinium fluoride, 1-decyl-3-propylpiperidinium fluoride, 1-decyl-3-butylpiperidinium fluoride, 1-decyl-4-methylpiperidinium fluoride, 1-decyl-4-ethylpiperidinium fluoride, 1-decyl-4-propylpiperidinium fluoride, 1-decyl-4-butylpiperidinium fluoride, N-decylpiperidinium triflate, 1-decyl-1-methylpiperidinium triflate, 1-decyl-1-ethylpiperidinium triflate, 1-decyl-1-propylpiperidinium triflate, 1-decyl-1-butylpiperidinium triflate, 1-decyl-2-methylpiperidinium triflate, 1-decyl-2-ethylpiperidinium triflate, 1-decyl-2-propylpiperidinium triflate, 1-decyl-2-butylpiperidinium triflate, 1-decyl-3-methylpiperidinium triflate, 1-decyl-3-ethylpiperidinium triflate, 1-decyl-3-propylpiperidinium triflate, 1-decyl-3-butylpiperidinium triflate, 1-decyl-4-methylpiperidinium triflate, 1-decyl-4-ethylpiperidinium triflate, 1-decyl-4-propylpiperidinium triflate, 1-decyl-4-butylpiperidinium triflate, N-decylpiperidinium methanesulfonate, 1-decyl-1-methylpiperidinium methanesulfonate, 1-decyl-1-ethylpiperidinium methanesulfonate, 1-decyl-1-propylpiperidinium methanesulfonate, 1-decyl-1-butylpiperidinium methanesulfonate, 1-decyl-2-methylpiperidinium methanesulfonate, 1-decyl-2-ethylpiperidinium methanesulfonate, 1-decyl-2-propylpiperidinium methanesulfonate, 1-decyl-2-butylpiperidinium methanesulfonate, 1-decyl-3-methylpiperidinium methanesulfonate, 1-decyl-3-ethylpiperidinium methanesulfonate, 1-decyl-3-propylpiperidinium methanesulfonate, 1-decyl-3-butylpiperidinium methanesulfonate, 1-decyl-4-methylpiperidinium methanesulfonate, 1-decyl-4-ethylpiperidinium methanesulfonate, 1-decyl-4-propylpiperidinium methanesulfonate, 1-decyl-4-butylpiperidinium methanesulfonate, N-decylpiperidinium acetate, 1-decyl-1-methylpiperidinium acetate, 1-decyl-1-ethylpiperidinium acetate, 1-decyl-1-propylpiperidinium acetate, 1-decyl-1-butylpiperidinium acetate, 1-decyl-2-methylpiperidinium acetate, 1-decyl-2-ethylpiperidinium acetate, 1-decyl-2-propylpiperidinium acetate, 1-decyl-2-butylpiperidinium acetate, 1-decyl-3-methylpiperidinium acetate, 1-decyl-3-ethylpiperidinium acetate, 1-decyl-3-propylpiperidinium acetate, 1-decyl-3-butylpiperidinium acetate, 1-decyl-4-methylpiperidinium acetate, 1-decyl-4-ethylpiperidinium acetate, 1-decyl-4-propylpiperidinium acetate, 1-decyl-4-butylpiperidinium acetate, N-decylpiperidinium cyanide, 1-decyl-1-methylpiperidinium cyanide, 1-decyl-1-ethylpiperidinium cyanide, 1-decyl-1-propylpiperidinium cyanide, 1-decyl-1-butylpiperidinium cyanide, 1-decyl-2-methylpiperidinium cyanide, 1-decyl-2-ethylpiperidinium cyanide, 1-decyl-2-propylpiperidinium cyanide, 1-decyl-2-butylpiperidinium cyanide, 1-decyl-3-methylpiperidinium cyanide, 1-decyl-3-ethylpiperidinium cyanide, 1-decyl-3-propylpiperidinium cyanide, 1-decyl-3-butylpiperidinium cyanide, 1-decyl-4-methylpiperidinium cyanide, 1-decyl-4-ethylpiperidinium cyanide, 1-decyl-4-propylpiperidinium cyanide, 1-decyl-4-butylpiperidinium cyanide.

It can further be seen that a compound according to formula (57) may be selected from the group comprising N-undecylpiperidinium chloride, 1-undecyl-1-methylpiperidinium chloride, 1-undecyl-1-ethylpiperidinium chloride, 1-undecyl-1-propylpiperidinium chloride, 1-undecyl-1-butylpiperidinium chloride, 1-undecyl-2-methylpiperidinium chloride, 1-undecyl-2-ethylpiperidinium chloride, 1-undecyl-2-propylpiperidinium chloride, 1-undecyl-2-butylpiperidinium chloride, 1-undecyl-3-methylpiperidinium chloride, 1-undecyl-3-ethylpiperidinium chloride, 1-undecyl-3-propylpiperidinium chloride, 1-undecyl-3-butylpiperidinium chloride, 1-undecyl-4-methylpiperidinium chloride, 1-undecyl-4-ethylpiperidinium chloride, 1-undecyl-4-propylpiperidinium chloride, 1-undecyl-4-butylpiperidinium chloride, N-undecylpiperidinium fluoride, 1-undecyl-1-methylpiperidinium fluoride, 1-undecyl-1-ethylpiperidinium fluoride, 1-undecyl-1-propylpiperidinium fluoride, 1-undecyl-1-butylpiperidinium fluoride, 1-undecyl-2-methylpiperidinium fluoride, 1-undecyl-2-ethylpiperidinium fluoride, 1-undecyl-2-propylpiperidinium fluoride, 1-undecyl-2-butylpiperidinium fluoride, 1-undecyl-3-methylpiperidinium fluoride, 1-undecyl-3-ethylpiperidinium fluoride, 1-undecyl-3-propylpiperidinium fluoride, 1-undecyl-3-butylpiperidinium fluoride, 1-undecyl-4-methylpiperidinium fluoride, 1-undecyl-4-ethylpiperidinium fluoride, 1-undecyl-4-propylpiperidinium fluoride, 1-undecyl-4-butylpiperidinium fluoride, N-undecylpiperidinium triflate, 1-undecyl-1-methylpiperidinium triflate, 1-undecyl-1-ethylpiperidinium triflate, 1-undecyl-1-propylpiperidinium triflate, 1-undecyl-1-butylpiperidinium triflate, 1-undecyl-2-methylpiperidinium triflate, 1-undecyl-2-ethylpiperidinium triflate, 1-undecyl-2-propylpiperidinium triflate, 1-undecyl-2-butylpiperidinium triflate, 1-undecyl-3-methylpiperidinium triflate, 1-undecyl-3-ethylpiperidinium triflate, 1-undecyl-3-propylpiperidinium triflate, 1-undecyl-3-butylpiperidinium triflate, 1-undecyl-4-methylpiperidinium triflate, 1-undecyl-4-ethylpiperidinium triflate, 1-undecyl-4-propylpiperidinium triflate, 1-undecyl-4-butylpiperidinium triflate, N-undecylpiperidinium methanesulfonate, 1-undecyl-1-methylpiperidinium methanesulfonate, 1-undecyl-1-ethylpiperidinium methanesulfonate, 1-undecyl-1-propylpiperidinium methanesulfonate, 1-undecyl-1-butylpiperidinium methanesulfonate, 1-undecyl-2-methylpiperidinium methanesulfonate, 1-undecyl-2-ethylpiperidinium methanesulfonate, 1-undecyl-2-propylpiperidinium methanesulfonate, 1-undecyl-2-butylpiperidinium methanesulfonate, 1-undecyl-3-methylpiperidinium methanesulfonate, 1-undecyl-3-ethylpiperidinium methanesulfonate, 1-undecyl-3-propylpiperidinium methanesulfonate, 1-undecyl-3-butylpiperidinium methanesulfonate, 1-undecyl-4-methylpiperidinium methanesulfonate, 1-undecyl-4-ethylpiperidinium methanesulfonate, 1-undecyl-4-propylpiperidinium methanesulfonate, 1-undecyl-4-butylpiperidinium methanesulfonate, N-undecylpiperidinium acetate, 1-undecyl-1-methylpiperidinium acetate, 1-undecyl-1-ethylpiperidinium acetate, 1-undecyl-1-propylpiperidinium acetate, 1-undecyl-1-butylpiperidinium acetate, 1-undecyl-2-methylpiperidinium acetate, 1-undecyl-2-ethylpiperidinium acetate, 1-undecyl-2-propylpiperidinium acetate, 1-undecyl-2-butylpiperidinium acetate, 1-undecyl-3-methylpiperidinium acetate, 1-undecyl-3-ethylpiperidinium acetate, 1-undecyl-3-propylpiperidinium acetate, 1-undecyl-3-butylpiperidinium acetate, 1-undecyl-4-methylpiperidinium acetate, 1-undecyl-4-ethylpiperidinium acetate, 1-undecyl-4-propylpiperidinium acetate, 1-undecyl-4-butylpiperidinium acetate, N-undecylpiperidinium cyanide, 1-undecyl-1-methylpiperidinium cyanide, 1-undecyl-1-ethylpiperidinium cyanide, 1-undecyl-1-propylpiperidinium cyanide, 1-undecyl-1-butylpiperidinium cyanide, 1-undecyl-2-methylpiperidinium cyanide, 1-undecyl-2-ethylpiperidinium cyanide, 1-undecyl-2-propylpiperidinium cyanide, 1-undecyl-2-butylpiperidinium cyanide, 1-undecyl-3-methylpiperidinium cyanide, 1-undecyl-3-ethylpiperidinium cyanide, 1-undecyl-3-propylpiperidinium cyanide, 1-undecyl-3-butylpiperidinium cyanide, 1-undecyl-4-methylpiperidinium cyanide, 1-undecyl-4-ethylpiperidinium cyanide, 1-undecyl-4-propylpiperidinium cyanide, 1-undecyl-4-butylpiperidinium cyanide.

It can further be seen that a compound according to formula (58) may be selected from the group comprising N-dodecylpiperidinium chloride, 1-dodecyl-1-methylpiperidinium chloride, 1-dodecyl-1-ethylpiperidinium chloride, 1-dodecyl-1-propylpiperidinium chloride, 1-dodecyl-1-butylpiperidinium chloride, 1-dodecyl-2-methylpiperidinium chloride, 1-dodecyl-2-ethylpiperidinium chloride, 1-dodecyl-2-propylpiperidinium chloride, 1-dodecyl-2-butylpiperidinium chloride, 1-dodecyl-3-methylpiperidinium chloride, 1-dodecyl-3-ethylpiperidinium chloride, 1-dodecyl-3-propylpiperidinium chloride, 1-dodecyl-3-butylpiperidinium chloride, 1-dodecyl-4-methylpiperidinium chloride, 1-dodecyl-4-ethylpiperidinium chloride, 1-dodecyl-4-propylpiperidinium chloride, 1-dodecyl-4-butylpiperidinium chloride, N-dodecylpiperidinium fluoride, 1-dodecyl-1-methylpiperidinium fluoride, 1-dodecyl-1-ethylpiperidinium fluoride, 1-dodecyl-1-propylpiperidinium fluoride, 1-dodecyl-1-butylpiperidinium fluoride, 1-dodecyl-2-methylpiperidinium fluoride, 1-dodecyl-2-ethylpiperidinium fluoride, 1-dodecyl-2-propylpiperidinium fluoride, 1-dodecyl-2-butylpiperidinium fluoride, 1-dodecyl-3-methylpiperidinium fluoride, 1-dodecyl-3-ethylpiperidinium fluoride, 1-dodecyl-3-propylpiperidinium fluoride, 1-dodecyl-3-butylpiperidinium fluoride, 1-dodecyl-4-methylpiperidinium fluoride, 1-dodecyl-4-ethylpiperidinium fluoride, 1-dodecyl-4-propylpiperidinium fluoride, 1-dodecyl-4-butylpiperidinium fluoride, N-dodecylpiperidinium triflate, 1-dodecyl-1-methylpiperidinium triflate, 1-dodecyl-1-ethylpiperidinium triflate, 1-dodecyl-1-propylpiperidinium triflate, 1-dodecyl-1-butylpiperidinium triflate, 1-dodecyl-2-methylpiperidinium triflate, 1-dodecyl-2-ethylpiperidinium triflate, 1-dodecyl-2-propylpiperidinium triflate, 1-dodecyl-2-butylpiperidinium triflate, 1-dodecyl-3-methylpiperidinium triflate, 1-dodecyl-3-ethylpiperidinium triflate, 1-dodecyl-3-propylpiperidinium triflate, 1-dodecyl-3-butylpiperidinium triflate, 1-dodecyl-4-methylpiperidinium triflate, 1-dodecyl-4-ethylpiperidinium triflate, 1-dodecyl-4-propylpiperidinium triflate, 1-dodecyl-4-butylpiperidinium triflate, N-dodecylpiperidinium methanesulfonate, 1-dodecyl-1-methylpiperidinium methanesulfonate, 1-dodecyl-1-ethylpiperidinium methanesulfonate, 1-dodecyl-1-propylpiperidinium methanesulfonate, 1-dodecyl-1-butylpiperidinium methanesulfonate, 1-dodecyl-2-methylpiperidinium methanesulfonate, 1-dodecyl-2-ethylpiperidinium methanesulfonate, 1-dodecyl-2-propylpiperidinium methanesulfonate, 1-dodecyl-2-butylpiperidinium methanesulfonate, 1-dodecyl-3-methylpiperidinium methanesulfonate, 1-dodecyl-3-ethylpiperidinium methanesulfonate, 1-dodecyl-3-propylpiperidinium methanesulfonate, 1-dodecyl-3-butylpiperidinium methanesulfonate, 1-dodecyl-4-methylpiperidinium methanesulfonate, 1-dodecyl-4-ethylpiperidinium methanesulfonate, 1-dodecyl-4-propylpiperidinium methanesulfonate, 1-dodecyl-4-butylpiperidinium methanesulfonate, N-dodecylpiperidinium acetate, 1-dodecyl-1-methylpiperidinium acetate, 1-dodecyl-1-ethylpiperidinium acetate, 1-dodecyl-1-propylpiperidinium acetate, 1-dodecyl-1-butylpiperidinium acetate, 1-dodecyl-2-methylpiperidinium acetate, 1-dodecyl-2-ethylpiperidinium acetate, 1-dodecyl-2-propylpiperidinium acetate, 1-dodecyl-2-butylpiperidinium acetate, 1-dodecyl-3-methylpiperidinium acetate, 1-dodecyl-3-ethylpiperidinium acetate, 1-dodecyl-3-propylpiperidinium acetate, 1-dodecyl-3-butylpiperidinium acetate, 1-dodecyl-4-methylpiperidinium acetate, 1-dodecyl-4-ethylpiperidinium acetate, 1-dodecyl-4-propylpiperidinium acetate, 1-dodecyl-4-butylpiperidinium acetate, N-dodecylpiperidinium cyanide, 1-dodecyl-1-methylpiperidinium cyanide, 1-dodecyl-1-ethylpiperidinium cyanide, 1-dodecyl-1-propylpiperidinium cyanide, 1-dodecyl-1-butylpiperidinium cyanide, 1-dodecyl-2-methylpiperidinium cyanide, 1-dodecyl-2-ethylpiperidinium cyanide, 1-dodecyl-2-propylpiperidinium cyanide, 1-dodecyl-2-butylpiperidinium cyanide, 1-dodecyl-3-methylpiperidinium cyanide, 1-dodecyl-3-ethylpiperidinium cyanide, 1-dodecyl-3-propylpiperidinium cyanide, 1-dodecyl-3-butylpiperidinium cyanide, 1-dodecyl-4-methylpiperidinium cyanide, 1-dodecyl-4-ethylpiperidinium cyanide, 1-dodecyl-4-propylpiperidinium cyanide, 1-dodecyl-4-butylpiperidinium cyanide.

In this respect, it can be seen that especially compounds according to the following formulas (70), (71), (72), (73), (74), (75), (76), (77), (78), (79), (80) or (81)

(70)

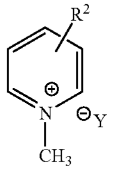

(71)

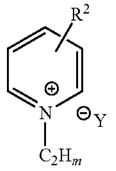

-continued (72)

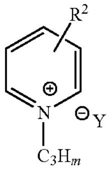

(73)

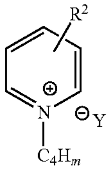

(74)

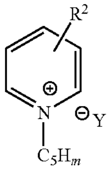

(75)

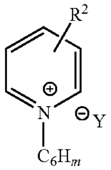

(76)

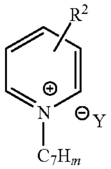

(77)

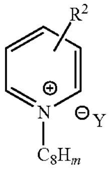

(78)

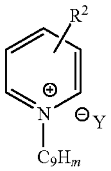

(79)

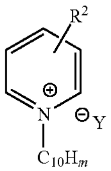

(80)

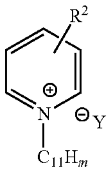

-continued (81)

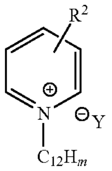

are comprised of formula VI, wherein $R^2$ is a hydrogen atom or a hydrocarbon radical with 1, 2, 3 or 4 C atoms and Y is selected from the group comprising halide, cyanide, alkyl sulfonate, halogenated alkyl sulfonate, acetate and wherein m is selected from 3 or 5 for formula (71), wherein m is selected from 3, 5 or 7 for formula (72), wherein m is selected from 3, 5, 7 or 9 for formula (73), wherein m is selected from 3, 5, 7, 9 or 11 for formula (74), wherein m is selected from 3, 5, 7, 9, 11 or 13 for formula (75), wherein m is selected from 3, 5, 7, 9, 11, 13 or 15 for formula (76), wherein m is selected from 3, 5, 7, 9, 11, 13, 15 or 17 for formula (77), wherein m is selected from 3, 5, 7, 9, 11, 13, 15, 17 or 19 for formula (78), wherein m is selected from 3, 5, 7, 9, 11, 13, 15, 17, 19 or 21 for formula (79), wherein m is selected from 3, 5, 7, 9, 11, 13, 15, 17, 19, 21 or 23 for formula (80), wherein m is selected from 3, 5, 7, 9, 11, 13, 15, 17, 19, 21, 23 or 25 for formula (81). The radical $R^1$ is preferably either saturated, monounsaturated or diunsaturated, so that m is selected from 3 or 5 for formula (71), m is selected from 3, 5 or 7 for formula (72), m is selected from 5, 7 or 9 for formula (73), m is selected from 7, 9 or 11 for formula (74), m is selected from 9, 11 or 13 for formula (75), m is selected from 11, 13 or 15 for formula (76), m is selected from 13, 15 or 17 for formula (77), m is selected from 15, 17 or 19 for formula (78), m is selected from 17, 19 or 21 for formula (79), m is selected from 19, 21 or 23 for formula (80), and m is selected from 21, 23 or 25 for formula (81).

The radical $R^1$ is especially preferably a saturated alkyl radical, so that formula VI especially comprises compounds according to formula (70) as well as according to the following formulas (82), (83), (84), (85), (86), (87), (88), (89), (90), (91) and (92)

(82)

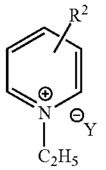

(83)

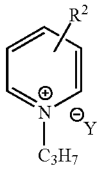

(84)

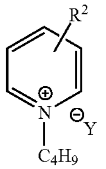

-continued (85)

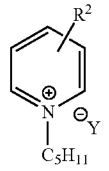

(86)

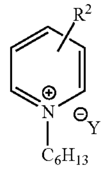

(87)

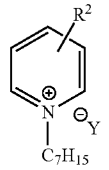

(88)

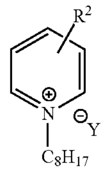

(89)

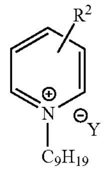

(90)

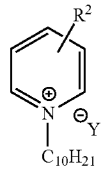

(91)

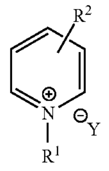

(92)

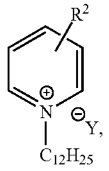

wherein $R^2$ is a hydrogen atom or a hydrocarbon radical with 1, 2, 3 or 4 C atoms and Y is selected from the group comprising halide, cyanide, alkyl sulfonate, halogenated alkyl sulfonate, acetate.

It can be seen that a compound according to formula (70) may, for example, be selected from the group comprising N-methylpyridinium chloride, 1,2-dimethylpyridinium chloride, 1-methyl-2-ethylpyridinium chloride, 1-methyl-2-propylpyridinium chloride, 1-methyl-2-butylpyridinium chloride, 1,3-dimethylpyridinium chloride, 1-methyl-3-ethylpyridinium chloride, 1-methyl-3-propylpyridinium chloride, 1-methyl-3-butylpyridinium chloride, 1,4-dimethylpyridinium chloride, 1-methyl-4-ethylpyridinium chloride, 1-methyl-4-propylpyridinium chloride, 1-methyl-4-butylpyridinium chloride, N-methylpyridinium fluoride, 1,2-dimethylpyridinium fluoride, 1-methyl-2-ethylpyridinium fluoride, 1-methyl-2-propylpyridinium fluoride, 1-methyl-2-butylpyridinium fluoride, 1,3-dimethylpyridinium fluoride, 1-methyl-3-ethylpyridinium fluoride, 1-methyl-3-propylpyridinium fluoride, 1-methyl-3-butylpyridinium fluoride, 1,4-dimethylpyridinium fluoride, 1-methyl-4-ethylpyridinium fluoride, 1-methyl-4-propylpyridinium fluoride, 1-methyl-4-butylpyridinium fluoride, N-methylpyridinium triflate, 1,2-dimethylpyridinium triflate, 1-methyl-2-ethylpyridinium triflate, 1-methyl-2-propylpyridinium triflate, 1-methyl-2-butylpyridinium triflate, 1,3-dimethylpyridinium triflate, 1-methyl-3-ethylpyridinium triflate, 1-methyl-3-propylpyridinium triflate, 1-methyl-3-butylpyridinium triflate, 1,4-dimethylpyridinium triflate, 1-methyl-4-ethylpyridinium triflate, 1-methyl-4-propylpyridinium triflate, 1-methyl-4-butylpyridinium triflate, N-methylpyridinium methanesulfonate, 1,2-dimethylpyridinium methanesulfonate, 1-methyl-2-ethylpyridinium methanesulfonate, 1-methyl-2-propylpyridinium methanesulfonate, 1-methyl-2-butylpyridinium methanesulfonate, 1,3-dimethylpyridinium methanesulfonate, 1-methyl-3-ethylpyridinium methanesulfonate, 1-methyl-3-propylpyridinium methanesulfonate, 1-methyl-3-butylpyridinium methanesulfonate, 1,4-dimethylpyridinium methanesulfonate, 1-methyl-4-ethylpyridinium methanesulfonate, 1-methyl-4-propylpyridinium methanesulfonate, 1-methyl-4-butylpyridinium methanesulfonate, N-methylpyridinium acetate, 1,2-dimethylpyridinium acetate, 1-methyl-2-ethylpyridinium acetate, 1-methyl-2-propylpyridinium acetate, 1-methyl-2-butylpyridinium acetate, 1,3-dimethylpyridinium acetate, 1-methyl-3-ethylpyridinium acetate, 1-methyl-3-propylpyridinium acetate, 1-methyl-3-butylpyridinium acetate, 1,4-dimethylpyridinium acetate, 1-methyl-4-ethylpyridinium acetate, 1-methyl-4-propylpyridinium acetate, 1-methyl-4-butylpyridinium acetate, N-methylpyridinium cyanide, 1,2-dimethylpyridinium cyanide, 1-methyl-2-ethylpyridinium cyanide, 1-methyl-2-propylpyridinium cyanide, 1-methyl-2-butylpyridinium cyanide, 1,3-dimethylpyridinium cyanide, 1-methyl-3-ethylpyridinium cyanide, 1-methyl-3-propylpyridinium cyanide, 1-methyl-3-butylpyridinium cyanide, 1,4-dimethylpyridinium cyanide, 1-methyl-4-ethylpyridinium cyanide, 1-methyl-4-propylpyridinium cyanide, 1-methyl-4-butylpyridinium cyanide.

It can be seen that a compound according to formula (71) may, for example, be selected from the group comprising N-ethylpyridinium chloride, 1-ethyl-2-methylpyridinium chloride, 1,2-diethylpyridinium chloride, 1-ethyl-2-propylpyridinium chloride, 1-ethyl-2-butylpyridinium chloride, 1-ethyl-3-methylpyridinium chloride, 1,3-diethylpyridinium chloride, 1-ethyl-3-propylpyridinium chloride, 1-ethyl-3-butylpyridinium chloride, 1-ethyl-4-methylpyridinium chloride, 1,4-diethylpyridinium chloride, 1-ethyl-4-propylpyridinium chloride, 1-ethyl-4-butylpyridinium chloride, N-ethylpyridinium fluoride, 1-ethyl-2-methylpyridinium fluoride, 1,2-diethylpyridinium fluoride, 1-ethyl-2-propylpyridinium fluoride, 1-ethyl-2-butylpyridinium fluoride, 1-ethyl-3-methylpyridinium fluoride, 1,3-diethylpyridinium fluoride, 1-ethyl-3-propylpyridinium fluoride, 1-ethyl-3-butylpyridinium fluoride, 1-ethyl-4-methylpyridinium fluoride, 1,4-diethylpyridinium fluoride, 1-ethyl-4-propylpyridinium fluoride, 1-ethyl-4-butylpyridinium fluoride, N-ethylpyridinium triflate, 1-ethyl-2-methylpyridinium triflate, 1,2-diethylpyridinium triflate, 1-ethyl-2-propylpyridinium triflate, 1-ethyl-2-butylpyridinium triflate, 1-ethyl-3-methylpyridinium triflate, 1,3-diethylpyridinium triflate, 1-ethyl-3-propylpyridinium triflate, 1-ethyl-3-butylpyridinium triflate, 1-ethyl-4-methylpyridinium triflate, 1,4-diethylpyridinium triflate, 1-ethyl-4-propylpyridinium triflate, 1-ethyl-4-butylpyridinium triflate, N-ethylpyridinium methanesulfonate, 1-ethyl-2-methylpyridinium methanesulfonate, 1,2-diethylpyridinium methanesulfonate, 1-ethyl-2-propylpyridinium methanesulfonate, 1-ethyl-2-butylpyridinium methanesulfonate, 1-ethyl-3-methylpyridinium methanesulfonate, 1,3-diethylpyridinium methanesulfonate, 1-ethyl-3-propylpyridinium methanesulfonate, 1-ethyl-3-butylpyridinium methanesulfonate, 1-ethyl-4-methylpyridinium methanesulfonate, 1,4-diethylpyridinium methanesulfonate, 1-ethyl-4-propylpyridinium methanesulfonate, 1-ethyl-4-butylpyridinium methanesulfonate, N-ethylpyridinium acetate, 1-ethyl-2-methylpyridinium acetate, 1,2-diethylpyridinium acetate, 1-ethyl-2-propylpyridinium acetate, 1-ethyl-2-butylpyridinium acetate, 1-ethyl-3-methylpyridinium acetate, 1,3-diethylpyridinium acetate, 1-ethyl-3-propylpyridinium acetate, 1-ethyl-3-butylpyridinium acetate, 1-ethyl-4-methylpyridinium acetate, 1,4-diethylpyridinium acetate, 1-ethyl-4-propylpyridinium acetate, 1-ethyl-4-butylpyridinium acetate, N-ethylpyridinium cyanide, 1-ethyl-2-methylpyridinium cyanide, 1,2-diethylpyridinium cyanide, 1-ethyl-2-propylpyridinium cyanide, 1-ethyl-2-butylpyridinium cyanide, 1-ethyl-3-methylpyridinium cyanide, 1,3-diethylpyridinium cyanide, 1-ethyl-3-propylpyridinium cyanide, 1-ethyl-3-butylpyridinium cyanide, 1-ethyl-4-methylpyridinium cyanide, 1,4-diethylpyridinium cyanide, 1-ethyl-4-propylpyridinium cyanide, 1-ethyl-4-butylpyridinium cyanide.

It can be seen that a compound according to formula (72) may, for example, be selected from the group comprising N-propylpyridinium chloride, 1-propyl-2-methylpyridinium chloride, 1-propyl-2-ethylpyridinium chloride, 1,2-dipropylpyridinium chloride, 1-propyl-2-butylpyridinium chloride, 1-propyl-3-methylpyridinium chloride, 1-propyl-3-ethylpyridinium chloride, 1,3-dipropylpyridinium chloride, 1-propyl-3-butylpyridinium chloride, 1-propyl-4-methylpyridinium chloride, 1-propyl-4-ethylpyridinium chloride, 1,4-dipropylpyridinium chloride, 1-propyl-4-butylpyridinium chloride, N-propylpyridinium fluoride, 1-propyl-2-methylpyridinium fluoride, 1-propyl-2-ethylpyridinium fluoride, 1,2-dipropylpyridinium fluoride, 1-propyl-2-butylpyridinium fluoride, 1-propyl-3-methylpyridinium fluoride, 1-propyl-3-ethylpyridinium fluoride, 1,3-dipropylpyridinium fluoride, 1-propyl-3-butylpyridinium fluoride, 1-propyl-4-methylpyridinium fluoride, 1-propyl-4-ethylpyridinium fluoride, 1,4-dipropylpyridinium fluoride, 1-propyl-4-butylpyridinium fluoride, N-propylpyridinium triflate, 1-propyl-2-methylpyridinium triflate, 1-propyl-2-ethylpyridinium triflate, 1,2-dipropylpyridinium triflate, 1-propyl-2-butylpyridinium triflate, 1-propyl-3-methylpyridinium triflate, 1-propyl-3-ethylpyridinium triflate, 1,3-dipropylpyridinium triflate, 1-propyl-3-butylpyridinium triflate, 1-propyl-4-methylpyridinium triflate, 1-propyl-4-ethylpyridinium triflate, 1,4-dipropylpyridinium triflate, 1-propyl-4-butylpyridinium triflate, N-propylpyridinium methanesulfonate, 1-propyl-2-methylpyridinium methanesulfonate, 1-propyl-2-ethylpyridinium methanesulfonate, 1,2-dipropylpyridinium methanesulfonate, 1-propyl-2-butylpyridinium methanesulfonate, 1-propyl-3-methylpyridinium methanesulfonate, 1-propyl-3-ethylpyridinium methanesulfonate, 1,3-dipropylpyridinium methanesulfonate, 1-propyl-3-butylpyridinium methanesulfonate, 1-propyl-4-methylpyridinium methanesulfonate, 1-propyl-4-ethylpyridinium methanesulfonate, 1,4-dipropylpyridinium methanesulfonate, 1-propyl-4-butylpyridinium methanesulfonate, N-propylpyridinium acetate, 1-propyl-2-methylpyridinium acetate, 1-propyl-2-ethylpyridinium acetate, 1,2-dipropylpyridinium acetate, 1-propyl-2-butylpyridinium acetate, 1-propyl-3-methylpyridinium acetate, 1-propyl-3-ethylpyridinium acetate, 1,3-dipropylpyridinium acetate, 1-propyl-3-butylpyridinium acetate, 1-propyl-4-methylpyridinium acetate, 1-propyl-4-ethylpyridinium acetate, 1,4-dipropylpyridinium acetate, 1-propyl-4-butylpyridinium acetate, N-propylpyridinium cyanide, 1-propyl-2-methylpyridinium cyanide, 1-propyl-2-ethylpyridinium cyanide, 1,2-dipropylpyridinium cyanide, 1-propyl-2-butylpyridinium cyanide, 1-propyl-3-methylpyridinium cyanide, 1-propyl-3-ethylpyridinium cyanide, 1,3-dipropylpyridinium cyanide, 1-propyl-3-butylpyridinium cyanide, 1-propyl-4-methylpyridinium cyanide, 1-propyl-4-ethylpyridinium cyanide, 1,4-dipropylpyridinium cyanide, 1-propyl-4-butylpyridinium cyanide.

It can be seen that a compound according to formula (73) may, for example, be selected from the group comprising N-butylpyridinium chloride, 1-butyl-2-methylpyridinium chloride, 1-butyl-2-ethylpyridinium chloride, 1-butyl-2-propylpyridinium chloride, 1,2-dibutylpyridinium chloride, 1-butyl-3-methylpyridinium chloride, 1-butyl-3-ethylpyridinium chloride, 1-butyl-3-propylpyridinium chloride, 1,3-dibutylpyridinium chloride, 1-butyl-4-methylpyridinium chloride, 1-butyl-4-ethylpyridinium chloride, 1-butyl-4-propylpyridinium chloride, 1,4-dibutylpyridinium chloride, N-butylpyridinium fluoride, 1-butyl-2-methylpyridinium fluoride, 1-butyl-2-ethylpyridinium fluoride, 1-butyl-2-propylpyridinium fluoride, 1,2-dibutylpyridinium fluoride, 1-butyl-3-methylpyridinium fluoride, 1-butyl-3-ethylpyridinium fluoride, 1-butyl-3-propylpyridinium fluoride, 1,3-dibutylpyridinium fluoride, 1-butyl-4-methylpyridinium fluoride, 1-butyl-4-ethylpyridinium fluoride, 1-butyl-4-propylpyridinium fluoride, 1,4-dibutylpyridinium fluoride, N-butylpyridinium triflate, 1-butyl-2-methylpyridinium triflate, 1-butyl-2-ethylpyridinium triflate, 1-butyl-2-propylpyridinium triflate, 1,2-dibutylpyridinium triflate, 1-butyl-3-methylpyridinium triflate, 1-butyl-3-ethylpyridinium triflate, 1-butyl-3-propylpyridinium triflate, 1,3-dibutylpyridinium triflate, 1-butyl-4-methylpyridinium triflate, 1-butyl-4-ethylpyridinium triflate, 1-butyl-4-propylpyridinium triflate, 1,4-dibutylpyridinium triflate, N-butylpyridinium methanesulfonate, 1-butyl-2-methylpyridinium methanesulfonate, 1-butyl-2-ethylpyridinium methanesulfonate, 1-butyl-2-propylpyridinium methanesulfonate, 1,2-dibutylpyridinium methanesulfonate, 1-butyl-3-methylpyridinium methanesulfonate, 1-butyl-3-ethylpyridinium methanesulfonate, 1-butyl-3-propylpyridinium methanesulfonate, 1,3-dibutylpyridinium methanesulfonate, 1-butyl-4-methylpyridinium methanesulfonate, 1-butyl-4-ethylpyridinium methanesulfonate, 1-butyl-4-propylpyridinium methanesulfonate, 1,4-dibutylpyridinium methanesulfonate, N-butylpyridinium acetate, 1-butyl-2-methylpyridinium acetate, 1-butyl-2-ethylpyridinium acetate, 1-butyl-2-propylpyridinium acetate, 1,2-dibutylpyridinium acetate, 1-butyl-3-methylpyridinium acetate, 1-butyl-3-ethylpyridinium acetate, 1-butyl-3-propylpyridinium acetate, 1,3-dibutylpyridinium acetate, 1-butyl- 4-methylpyridinium acetate, 1-butyl-4-ethylpyridinium acetate, 1-butyl-4-propylpyridinium acetate, 1,4-dibutylpyridinium acetate, N-butylpyridinium cyanide, 1-butyl-2-methylpyridinium cyanide, 1-butyl-2-ethylpyridinium cyanide, 1-butyl-2-propylpyridinium cyanide, 1,2-dibutylpyridinium cyanide, 1-butyl-3-methylpyridinium cyanide, 1-butyl-3-ethylpyridinium cyanide, 1-butyl-3-propylpyridinium cyanide, 1,3-dibutylpyridinium cyanide, 1-butyl-4-methylpyridinium cyanide, 1-butyl-4-ethylpyridinium cyanide, 1-butyl-4-propylpyridinium cyanide, 1,4-dibutylpyridinium cyanide.

It can be seen that a compound according to formula (74) may, for example, be selected from the group comprising N-pentylpyridinium chloride, 1-pentyl-2-methylpyridinium chloride, 1-pentyl-2-ethylpyridinium chloride, 1-pentyl-2-propylpyridinium chloride, 1-pentyl-2-butylpyridinium chloride, 1-pentyl-3-methylpyridinium chloride, 1-pentyl-3-ethylpyridinium chloride, 1-pentyl-3-propylpyridinium chloride, 1-pentyl-3-butylpyridinium chloride, 1-pentyl-4-methylpyridinium chloride, 1-pentyl-4-ethylpyridinium chloride, 1-pentyl-4-propylpyridinium chloride, 1-pentyl-4-butylpyridinium chloride, N-pentylpyridinium fluoride, 1-pentyl-2-methylpyridinium fluoride, 1-pentyl-2-ethylpyridinium fluoride, 1-pentyl-2-propylpyridinium fluoride, 1-pentyl-2-butylpyridinium fluoride, 1-pentyl-3-methylpyridinium fluoride, 1-pentyl-3-ethylpyridinium fluoride, 1-pentyl-3-propylpyridinium fluoride, 1-pentyl-3-butylpyridinium fluoride, 1-pentyl-4-methylpyridinium fluoride, 1-pentyl-4-ethylpyridinium fluoride, 1-pentyl-4-propylpyridinium fluoride, 1-pentyl-4-butylpyridinium fluoride, N-pentylpyridinium triflate, 1-pentyl-2-methylpyridinium triflate, 1-pentyl-2-ethylpyridinium triflate, 1-pentyl-2-propylpyridinium triflate, 1-pentyl-2-butylpyridinium triflate, 1-pentyl-3-methylpyridinium triflate, 1-pentyl-3-ethylpyridinium triflate, 1-pentyl-3-propylpyridinium triflate, 1-pentyl-3-butylpyridinium triflate, 1-pentyl-4-methylpyridinium triflate, 1-pentyl-4-ethylpyridinium triflate, 1-pentyl-4-propylpyridinium triflate, 1-pentyl-4-butylpyridinium triflate, N-pentylpyridinium methanesulfonate, 1-pentyl-2-methylpyridinium methanesulfonate, 1-pentyl-2-ethylpyridinium methanesulfonate, 1-pentyl-2-propylpyridinium methanesulfonate, 1-pentyl-2-butylpyridinium methanesulfonate, 1-pentyl-3-methylpyridinium methanesulfonate, 1-pentyl-3-ethylpyridinium methanesulfonate, 1-pentyl-3-propylpyridinium methanesulfonate, 1-pentyl-3-butylpyridinium methanesulfonate, 1-pentyl-4-methylpyridinium methanesulfonate, 1-pentyl-4-ethylpyridinium methanesulfonate, 1-pentyl-4-propylpyridinium methanesulfonate, 1-pentyl-4-butylpyridinium methanesulfonate, N-pentylpyridinium acetate, 1-pentyl-2-methylpyridinium acetate, 1-pentyl-2-ethylpyridinium acetate, 1-pentyl-2-propylpyridinium acetate, 1-pentyl-2-butylpyridinium acetate, 1-pentyl-3-methylpyridinium acetate, 1-pentyl-3-ethylpyridinium acetate, 1-pentyl-3-propylpyridinium acetate, 1-pentyl-3-butylpyridinium acetate, 1-pentyl-4-methylpyridinium acetate, 1-pentyl-4-ethylpyridinium acetate, 1-pentyl-4-propylpyridinium acetate, 1-pentyl-4-butylpyridinium acetate, N-pentylpyridinium cyanide, 1-pentyl-2-methylpyridinium cyanide, 1-pentyl-2-ethylpyridinium cyanide, 1-pentyl-2-propylpyridinium cyanide, 1-pentyl-2-butylpyridinium cyanide, 1-pentyl-3-methylpyridinium cyanide, 1-pentyl-3-ethylpyridinium cyanide, 1-pentyl-3-propylpyridinium cyanide, 1-pentyl-3-butylpyridinium cyanide, 1-pentyl-4-methylpyridinium cyanide, 1-pentyl-4-ethylpyridinium cyanide, 1-pentyl-4-propylpyridinium cyanide, 1-pentyl-4-butylpyridinium cyanide.

It can further be seen that a compound according to formula (75) may be selected from the group comprising N-hexylpyridinium chloride, 1-hexyl-2-methylpyridinium chloride, 1-hexyl-2-ethylpyridinium chloride, 1-hexyl-2-propylpyridinium chloride, 1-hexyl-2-butylpyridinium chloride, 1-hexyl-3-methylpyridinium chloride, 1-hexyl-3-ethylpyridinium chloride, 1-hexyl-3-propylpyridinium chloride, 1-hexyl-3-butylpyridinium chloride, 1-hexyl-4-methylpyridinium chloride, 1-hexyl-4-ethylpyridinium chloride, 1-hexyl-4-propylpyridinium chloride, 1-hexyl-4-butylpyridinium chloride, N-hexylpyridinium fluoride, 1-hexyl-2-methylpyridinium fluoride, 1-hexyl-2-ethylpyridinium fluoride, 1-hexyl-2-propylpyridinium fluoride, 1-hexyl-2-butylpyridinium fluoride, 1-hexyl-3-methylpyridinium fluoride, 1-hexyl-3-ethylpyridinium fluoride, 1-hexyl-3-propylpyridinium fluoride, 1-hexyl-3-butylpyridinium fluoride, 1-hexyl-4-methylpyridinium fluoride, 1-hexyl-4-ethylpyridinium fluoride, 1-hexyl-4-propylpyridinium fluoride, 1-hexyl-4-butylpyridinium fluoride, N-hexylpyridinium triflate, 1-hexyl-2-methylpyridinium triflate, 1-hexyl-2-ethylpyridinium triflate, 1-hexyl-2-propylpyridinium triflate, 1-hexyl-2-butylpyridinium triflate, 1-hexyl-3-methylpyridinium triflate, 1-hexyl-3-ethylpyridinium triflate, 1-hexyl-3-propylpyridinium triflate, 1-hexyl-3-butylpyridinium triflate, 1-hexyl-4-methylpyridinium triflate, 1-hexyl-4-ethylpyridinium triflate, 1-hexyl-4-propylpyridinium triflate, 1-hexyl-4-butylpyridinium triflate, N-hexylpyridinium methanesulfonate, 1-hexyl-2-methylpyridinium methanesulfonate, 1-hexyl-2-ethylpyridinium methanesulfonate, 1-hexyl-2-propylpyridinium methanesulfonate, 1-hexyl-2-butylpyridinium methanesulfonate, 1-hexyl-3-methylpyridinium methanesulfonate, 1-hexyl-3-ethylpyridinium methanesulfonate, 1-hexyl-3-propylpyridinium methanesulfonate, 1-hexyl-3-butylpyridinium methanesulfonate, 1-hexyl-4-methylpyridinium methanesulfonate, 1-hexyl-4-ethylpyridinium methanesulfonate, 1-hexyl-4-propylpyridinium methanesulfonate, 1-hexyl-4-butylpyridinium methanesulfonate, N-hexylpyridinium acetate, 1-hexyl-2-methylpyridinium acetate, 1-hexyl-2-ethylpyridinium acetate, 1-hexyl-2-propylpyridinium acetate, 1-hexyl-2-butylpyridinium acetate, 1-hexyl-3-methylpyridinium acetate, 1-hexyl-3-ethylpyridinium acetate, 1-hexyl-3-propylpyridinium acetate, 1-hexyl-3-butylpyridinium acetate, 1-hexyl-4-methylpyridinium acetate, 1-hexyl-4-ethylpyridinium acetate, 1-hexyl-4-propylpyridinium acetate, 1-hexyl-4-butylpyridinium acetate, N-hexylpyridinium cyanide, 1-hexyl-2-methylpyridinium cyanide, 1-hexyl-2-ethylpyridinium cyanide, 1-hexyl-2-propylpyridinium cyanide, 1-hexyl-2-butylpyridinium cyanide, 1-hexyl-3-methylpyridinium cyanide, 1-hexyl-3-ethylpyridinium cyanide, 1-hexyl-3-propylpyridinium cyanide, 1-hexyl-3-butylpyridinium cyanide, 1-hexyl-4-methylpyridinium cyanide, 1-hexyl-4-ethylpyridinium cyanide, 1-hexyl-4-propylpyridinium cyanide, 1-hexyl-4-butylpyridinium cyanide.

It can further be seen that a compound according to formula (76) may be selected from the group comprising N-heptylpyridinium chloride, 1-heptyl-2-methylpyridinium chloride, 1-heptyl-2-ethylpyridinium chloride, 1-heptyl-2-propylpyridinium chloride, 1-heptyl-2-butylpyridinium chloride, 1-heptyl-3-methylpyridinium chloride, 1-heptyl-3-ethylpyridinium chloride, 1-heptyl-3-propylpyridinium chloride, 1-heptyl-3-butylpyridinium chloride, 1-heptyl-4-methylpyridinium chloride, 1-heptyl-4-ethylpyridinium chloride, 1-heptyl-4-propylpyridinium chloride, 1-heptyl-4-butylpyridinium chloride, N-heptylpyridinium fluoride, 1-heptyl-2-methylpyridinium fluoride, 1-heptyl-2-ethylpyridinium fluoride, 1-heptyl-2-propylpyridinium fluoride, 1-heptyl-2-butylpyridinium fluoride, 1-heptyl-3-methylpyridinium fluoride, 1-heptyl-3-ethylpyridinium fluoride, 1-heptyl-3-propylpyridinium fluoride, 1-heptyl-3-butylpyridinium fluoride, 1-heptyl-4-methylpyridinium fluoride, 1-heptyl-4-ethylpyridinium fluoride, 1-heptyl-4-propylpyridinium fluoride, 1-heptyl-4-butylpyridinium fluoride, N-heptylpyridinium triflate, 1-heptyl-2-methylpyridinium triflate, 1-heptyl-2-ethylpyridinium triflate, 1-heptyl-2-propylpyridinium triflate, 1-heptyl-2-butylpyridinium triflate, 1-heptyl-3-methylpyridinium triflate, 1-heptyl-3-ethylpyridinium triflate, 1-heptyl-3-propylpyridinium triflate, 1-heptyl-3-butylpyridinium triflate, 1-heptyl-4-methylpyridinium triflate, 1-heptyl-4-ethylpyridinium triflate, 1-heptyl-4-propylpyridinium triflate, 1-heptyl-4-butylpyridinium triflate, N-heptylpyridinium methanesulfonate, 1-heptyl-2-methylpyridinium methanesulfonate, 1-heptyl-2-ethylpyridinium methanesulfonate, 1-heptyl-2-propylpyridinium methanesulfonate, 1-heptyl-2-butylpyridinium methanesulfonate, 1-heptyl-3-methylpyridinium methanesulfonate, 1-heptyl-3-ethylpyridinium methanesulfonate, 1-heptyl-3-propylpyridinium methanesulfonate, 1-heptyl-3-butylpyridinium methanesulfonate, 1-heptyl-4-methylpyridinium methanesulfonate, 1-heptyl-4-ethylpyridinium methanesulfonate, 1-heptyl-4-propylpyridinium methanesulfonate, 1-heptyl-4-butylpyridinium methanesulfonate, N-heptylpyridinium acetate, 1-heptyl-2-methylpyridinium acetate, 1-heptyl-2-ethylpyridinium acetate, 1-heptyl-2-propylpyridinium acetate, 1-heptyl-2-butylpyridinium acetate, 1-heptyl-3-methylpyridinium acetate, 1-heptyl-3-ethylpyridinium acetate, 1-heptyl-3-propylpyridinium acetate, 1-heptyl-3-butylpyridinium acetate, 1-heptyl-4-methylpyridinium acetate, 1-heptyl-4-ethylpyridinium acetate, 1-heptyl-4-propylpyridinium acetate, 1-heptyl-4-butylpyridinium acetate, N-heptylpyridinium cyanide, 1-heptyl-2-methylpyridinium cyanide, 1-heptyl-2-ethylpyridinium cyanide, 1-heptyl-2-propylpyridinium cyanide, 1-heptyl-2-butylpyridinium cyanide, 1-heptyl-3-methylpyridinium cyanide, 1-heptyl-3-ethylpyridinium cyanide, 1-heptyl-3-propylpyridinium cyanide, 1-heptyl-3-butylpyridinium cyanide, 1-heptyl-4-methylpyridinium cyanide, 1-heptyl-4-ethylpyridinium cyanide, 1-heptyl-4-propylpyridinium cyanide, 1-heptyl-4-butylpyridinium cyanide.

It can further be seen that a compound according to formula (77) may be selected from the group comprising N-octylpyridinium chloride, 1-octyl-2-methylpyridinium chloride, 1-octyl-2-ethylpyridinium chloride, 1-octyl-2-propylpyridinium chloride, 1-octyl-2-butylpyridinium chloride, 1-octyl-3-methylpyridinium chloride, 1-octyl-3-ethylpyridinium chloride, 1-octyl-3-propylpyridinium chloride, 1-octyl-3-butylpyridinium chloride, 1-octyl-4-methylpyridinium chloride, 1-octyl-4-ethylpyridinium chloride, 1-octyl-4-propylpyridinium chloride, 1-octyl-4-butylpyridinium chloride, N-octylpyridinium fluoride, 1-octyl-2-methylpyridinium fluoride, 1-octyl-2-ethylpyridinium fluoride, 1-octyl-2-propylpyridinium fluoride, 1-octyl-2-butylpyridinium fluoride, 1-octyl-3-methylpyridinium fluoride, 1-octyl-3-ethylpyridinium fluoride, 1-octyl-3-propylpyridinium fluoride, 1-octyl-3-butylpyridinium fluoride, 1-octyl-4-methylpyridinium fluoride, 1-octyl-4-ethylpyridinium fluoride, 1-octyl-4-propylpyridinium fluoride, 1-octyl-4-butylpyridinium fluoride, N-octylpyridinium triflate, 1-octyl-2-methylpyridinium triflate, 1-octyl-2-ethylpyridinium triflate, 1-octyl-2-propylpyridinium triflate, 1-octyl-2-butylpyridinium triflate, 1-octyl-3-methylpyridinium triflate, 1-octyl-3-ethylpyridinium triflate, 1-octyl-3-propylpyridinium triflate, 1-octyl-3-butylpyridinium triflate, 1-octyl-4-methylpyridinium triflate, 1-octyl-4-ethylpyridinium triflate, 1-octyl-4-propylpyridinium triflate, 1-octyl-4-butylpyridinium triflate, N-octylpyridinium methanesulfonate, 1-octyl-2-methylpyridinium methanesulfonate, 1-octyl-2-ethylpyridinium methanesulfonate, 1-octyl-2-propylpyridinium methanesulfonate, 1-octyl-2-butylpyridinium methanesulfonate, 1-octyl-3-methylpyridinium methanesulfonate, 1-octyl-3-ethylpyridinium methanesulfonate, 1-octyl-3-propylpyridinium methanesulfonate, 1-octyl-3-butylpyridinium methanesulfonate, 1-octyl-4-methylpyridinium methanesulfonate, 1-octyl-4-ethylpyridinium methanesulfonate, 1-octyl-4-propylpyridinium methanesulfonate, 1-octyl-4-butylpyridinium methanesulfonate, N-octylpyridinium acetate, 1-octyl-2-methylpyridinium acetate, 1-octyl-2-ethylpyridinium acetate, 1-octyl-2-propylpyridinium acetate, 1-octyl-2-butylpyridinium acetate, 1-octyl-3-methylpyridinium acetate, 1-octyl-3-ethylpyridinium acetate, 1-octyl-3-propylpyridinium acetate, 1-octyl-3-butylpyridinium acetate, 1-octyl-4-methylpyridinium acetate, 1-octyl-4-ethylpyridinium acetate, 1-octyl-4-propylpyridinium acetate, 1-octyl-4-butylpyridinium acetate, N-octylpyridinium cyanide, 1-octyl-2-methylpyridinium cyanide, 1-octyl-2-ethylpyridinium cyanide, 1-octyl-2-propylpyridinium cyanide, 1-octyl-2-butylpyridinium cyanide, 1-octyl-3-methylpyridinium cyanide, 1-octyl-3-ethylpyridinium cyanide, 1-octyl-3-propylpyridinium cyanide, 1-octyl-3-butylpyridinium cyanide, 1-octyl-4-methylpyridinium cyanide, 1-octyl-4-ethylpyridinium cyanide, 1-octyl-4-propylpyridinium cyanide, 1-octyl-4-butylpyridinium cyanide.

It can further be seen that a compound according to formula (78) may be selected from the group comprising N-nonylpyridinium chloride, 1-nonyl-2-methylpyridinium chloride, 1-nonyl-2-ethylpyridinium chloride, 1-nonyl-2-propylpyridinium chloride, 1-nonyl-2-butylpyridinium chloride, 1-nonyl-3-methylpyridinium chloride, 1-nonyl-3-ethylpyridinium chloride, 1-nonyl-3-propylpyridinium chloride, 1-nonyl-3-butylpyridinium chloride, 1-nonyl-4-methylpyridinium chloride, 1-nonyl-4-ethylpyridinium chloride, 1-nonyl-4-propylpyridinium chloride, 1-nonyl-4-butylpyridinium chloride, N-nonylpyridinium fluoride, 1-nonyl-2-methylpyridinium fluoride, 1-nonyl-2-ethylpyridinium fluoride, 1-nonyl-2-propylpyridinium fluoride, 1-nonyl-2-butylpyridinium fluoride, 1-nonyl-3-methylpyridinium fluoride, 1-nonyl-3-ethylpyridinium fluoride, 1-nonyl-3-propylpyridinium fluoride, 1-nonyl-3-butylpyridinium fluoride, 1-nonyl-4-methylpyridinium fluoride, 1-nonyl-4-ethylpyridinium fluoride, 1-nonyl-4-propylpyridinium fluoride, 1-nonyl-4-butylpyridinium fluoride, N-nonylpyridinium triflate, 1-nonyl-2-methylpyridinium triflate, 1-nonyl-2-ethylpyridinium triflate, 1-nonyl-2-propylpyridinium triflate, 1-nonyl-2-butylpyridinium triflate, 1-nonyl-3-methylpyridinium triflate, 1-nonyl-3-ethylpyridinium triflate, 1-nonyl-3-propylpyridinium triflate, 1-nonyl-3-butylpyridinium triflate, 1-nonyl-4-methylpyridinium triflate, 1-nonyl-4-ethylpyridinium triflate, 1-nonyl-4-propylpyridinium triflate, 1-nonyl-4-butylpyridinium triflate, N-nonylpyridinium methanesulfonate, 1-nonyl-2-methylpyridinium methanesulfonate, 1-nonyl-2-ethylpyridinium methanesulfonate, 1-nonyl-2-propylpyridinium methanesulfonate, 1-nonyl-2-butylpyridinium methanesulfonate, 1-nonyl-3-methylpyridinium methanesulfonate, 1-nonyl-3-ethylpyridinium methanesulfonate, 1-nonyl-3-propylpyridinium methanesulfonate, 1-nonyl-3-butylpyridinium methanesulfonate, 1-nonyl-4-methylpyridinium methanesulfonate, 1-nonyl-4-ethylpyridinium methanesulfonate, 1-nonyl-4-propylpyridinium methanesulfonate, 1-nonyl-4-butylpyridinium methanesulfonate, N-nonylpyridinium acetate, 1-nonyl-2-methylpyridinium acetate, 1-nonyl-2-ethylpyridinium acetate, 1-nonyl-2-propylpyridinium acetate, 1-nonyl-2-butylpyridinium acetate, 1-nonyl-3-methylpyridinium acetate, 1-nonyl-3-ethylpyridinium acetate, 1-nonyl-3-propylpyridinium acetate, 1-nonyl-3-butylpyridinium acetate, 1-nonyl-4-methylpyridinium acetate, 1-nonyl-4-ethylpyridinium acetate, 1-nonyl-4-propylpyridinium acetate, 1-nonyl-4-butylpyridinium acetate, N-nonylpyridinium cyanide, 1-nonyl-2-methylpyridinium cyanide, 1-nonyl-2-ethylpyridinium cyanide, 1-nonyl-2-propylpyridinium cyanide, 1-nonyl-2-butylpyridinium cyanide, 1-nonyl-3-methylpyridinium cyanide, 1-nonyl-3-ethylpyridinium cyanide, 1-nonyl-3-propylpyridinium cyanide, 1-nonyl-3-butylpyridinium cyanide, 1-nonyl-4-methylpyridinium cyanide, 1-nonyl-4-ethylpyridinium cyanide, 1-nonyl-4-propylpyridinium cyanide, 1-nonyl-4-butylpyridinium cyanide.

It can further be seen that a compound according to formula (79) may be selected from the group comprising N-decylpyridinium chloride, 1-decyl-2-methylpyridinium chloride, 1-decyl-2-ethylpyridinium chloride, 1-decyl-2-propylpyridinium chloride, 1-decyl-2-butylpyridinium chloride, 1-decyl-3-methylpyridinium chloride, 1-decyl-3-ethylpyridinium chloride, 1-decyl-3-propylpyridinium chloride, 1-decyl-3-butylpyridinium chloride, 1-decyl-4-methylpyridinium chloride, 1-decyl-4-ethylpyridinium chloride, 1-decyl-4-propylpyridinium chloride, 1-decyl-4-butylpyridinium chloride, N-decylpyridinium fluoride, 1-decyl-2-methylpyridinium fluoride, 1-decyl-2-ethylpyridinium fluoride, 1-decyl-2-propylpyridinium fluoride, 1-decyl-2-butylpyridinium fluoride, 1-decyl-3-methylpyridinium fluoride, 1-decyl-3-ethylpyridinium fluoride, 1-decyl-3-propylpyridinium fluoride, 1-decyl-3-butylpyridinium fluoride, 1-decyl-4-methylpyridinium fluoride, 1-decyl-4-ethylpyridinium fluoride, 1-decyl-4-propylpyridinium fluoride, 1-decyl-4-butylpyridinium fluoride, N-decylpyridinium triflate, 1-decyl-2-methylpyridinium triflate, 1-decyl-2-ethylpyridinium triflate, 1-decyl-2-propylpyridinium triflate, 1-decyl-2-butylpyridinium triflate, 1-decyl-3-methylpyridinium triflate, 1-decyl-3-ethylpyridinium triflate, 1-decyl-3-propylpyridinium triflate, 1-decyl-3-butylpyridinium triflate, 1-decyl-4-methylpyridinium triflate, 1-decyl-4-ethylpyridinium triflate, 1-decyl-4-propylpyridinium triflate, 1-decyl-4-butylpyridinium triflate, N-decylpyridinium methanesulfonate, 1-decyl-2-methylpyridinium methanesulfonate, 1-decyl-2-ethylpyridinium methanesulfonate, 1-decyl-2-propylpyridinium methanesulfonate, 1-decyl-2-butylpyridinium methanesulfonate, 1-decyl-3-methylpyridinium methanesulfonate, 1-decyl-3-ethylpyridinium methanesulfonate, 1-decyl-3-propylpyridinium methanesulfonate, 1-decyl-3-butylpyridinium methanesulfonate, 1-decyl-4-methylpyridinium methanesulfonate, 1-decyl-4-ethylpyridinium methanesulfonate, 1-decyl-4-propylpyridinium methanesulfonate, 1-decyl-4-butylpyridinium methanesulfonate, N-decylpyridinium acetate, 1-decyl-2-methylpyridinium acetate, 1-decyl-2-ethylpyridinium acetate, 1-decyl-2-propylpyridinium acetate, 1-decyl-2-butylpyridinium acetate, 1-decyl-3-methylpyridinium acetate, 1-decyl-3-ethylpyridinium acetate, 1-decyl-3-propylpyridinium acetate, 1-decyl-3-butylpyridinium acetate, 1-decyl-4-methylpyridinium acetate, 1-decyl-4-ethylpyridinium acetate, 1-decyl-4-propylpyridinium acetate, 1-decyl-4-butylpyridinium acetate, N-decylpyridinium cyanide, 1-decyl-2-methylpyridinium cyanide, 1-decyl-2-ethylpyridinium cyanide, 1-decyl-2-propylpyridinium cyanide, 1-decyl-2-butylpyridinium cyanide, 1-decyl-3-methylpyridinium cyanide, 1-decyl-3-ethylpyridinium cyanide, 1-decyl-3-propylpyridinium cyanide, 1-decyl-3-butylpyridinium cyanide, 1-decyl-4-methylpyridinium cyanide, 1-decyl-4-ethylpyridinium cyanide, 1-decyl-4-propylpyridinium cyanide, 1-decyl-4-butylpyridinium cyanide.

It can further be seen that a compound according to formula (80) may be selected from the group comprising N-undecylpyridinium chloride, 1-undecyl-2-methylpyridinium chloride, 1-undecyl-2-ethylpyridinium chloride, 1-undecyl-2-propylpyridinium chloride, 1-undecyl-2-butylpyridinium chloride, 1-undecyl-3-methylpyridinium chloride, 1-undecyl-3-ethylpyridinium chloride, 1-undecyl-3-propylpyridinium chloride, 1-undecyl-3-butylpyridinium chloride, 1-undecyl-4-methylpyridinium chloride, 1-undecyl-4-ethylpyridinium chloride, 1-undecyl-4-propylpyridinium chloride, 1-undecyl-4-butylpyridinium chloride, N-undecylpyridinium fluoride, 1-undecyl-2-methylpyridinium fluoride, 1-undecyl-2-ethylpyridinium fluoride, 1-undecyl-2-propylpyridinium fluoride, 1-undecyl-2-butylpyridinium fluoride, 1-undecyl-3-methylpyridinium fluoride, 1-undecyl-3-ethylpyridinium fluoride, 1-undecyl-3-propylpyridinium fluoride, 1-undecyl-3-butylpyridinium fluoride, 1-undecyl-4-methylpyridinium fluoride, 1-undecyl-4-ethylpyridinium fluoride, 1-undecyl-4-propylpyridinium fluoride, 1-undecyl-4-butylpyridinium fluoride, N-undecylpyridinium triflate, 1-undecyl-2-methylpyridinium triflate, 1-undecyl-2-ethylpyridinium triflate, 1-undecyl-2-propylpyridinium triflate, 1-undecyl-2-butylpyridinium triflate, 1-undecyl-3-methylpyridinium triflate, 1-undecyl-3-ethylpyridinium triflate, 1-undecyl-3-propylpyridinium triflate, 1-undecyl-3-butylpyridinium triflate, 1-undecyl-4-methylpyridinium triflate, 1-undecyl-4-ethylpyridinium triflate, 1-undecyl-4-propylpyridinium triflate, 1-undecyl-4-butylpyridinium triflate, N-undecylpyridinium methanesulfonate, 1-undecyl-2-methylpyridinium methanesulfonate, 1-undecyl-2-ethylpyridinium methanesulfonate, 1-undecyl-2-propylpyridinium methanesulfonate, 1-undecyl-2-butylpyridinium methanesulfonate, 1-undecyl-3-methylpyridinium methanesulfonate, 1-undecyl-3-ethylpyridinium methanesulfonate, 1-undecyl-3-propylpyridinium methanesulfonate, 1-undecyl-3-butylpyridinium methanesulfonate, 1-undecyl-4-methylpyridinium methanesulfonate, 1-undecyl-4-ethylpyridinium methanesulfonate, 1-undecyl-4-propylpyridinium methanesulfonate, 1-undecyl-4-butylpyridinium methanesulfonate, N-undecylpyridinium acetate, 1-undecyl-2-methylpyridinium acetate, 1-undecyl-2-ethylpyridinium acetate, 1-undecyl-2-propylpyridinium acetate, 1-undecyl-2-butylpyridinium acetate, 1-undecyl-3-methylpyridinium acetate, 1-undecyl-3-ethylpyridinium acetate, 1-undecyl-3-propylpyridinium acetate, 1-undecyl-3-butylpyridinium acetate, 1-undecyl-4-methylpyridinium acetate, 1-undecyl-4-ethylpyridinium acetate, 1-undecyl-4-propylpyridinium acetate, 1-undecyl-4-butylpyridinium acetate, N-undecylpyridinium cyanide, 1-undecyl-2-methylpyridinium cyanide, 1-undecyl-2-ethylpyridinium cyanide, 1-undecyl-2-propylpyridinium cyanide, 1-undecyl-2-butylpyridinium cyanide, 1-undecyl-3-methylpyridinium cyanide, 1-undecyl-3-ethylpyridinium cyanide, 1-undecyl-3-propylpyridinium cyanide, 1-undecyl-3-butylpyridinium cyanide, 1-undecyl-4-methylpyridinium cyanide, 1-undecyl-4-ethylpyridinium cyanide, 1-undecyl-4-propylpyridinium cyanide, 1-undecyl-4-butylpyridinium cyanide.

It can further be seen that a compound according to formula (81) may be selected from the group comprising N-dodecylpyridinium chloride, 1-dodecyl-2-methylpyridinium chloride, 1-dodecyl-2-ethylpyridinium chloride, 1-dodecyl-2-propylpyridinium chloride, 1-dodecyl-2-butylpyridinium chloride, 1-dodecyl-3-methylpyridinium chloride, 1-dodecyl-3-ethylpyridinium chloride, 1-dodecyl-3-propylpyridinium chloride, 1-dodecyl-3-butylpyridinium chloride, 1-dodecyl-4-methylpyridinium chloride, 1-dodecyl-4-ethylpyridinium chloride, 1-dodecyl-4-propylpyridinium chloride, 1-dodecyl-4-butylpyridinium chloride, N-dodecylpyridinium fluoride, 1-dodecyl-2-methylpyridinium fluoride, 1-dodecyl-2-ethylpyridinium fluoride, 1-dodecyl-2-propylpyridinium fluoride, 1-dodecyl-2-butylpyridinium fluoride, 1-dodecyl-3-methylpyridinium fluoride, 1-dodecyl-3-ethylpyridinium fluoride, 1-dodecyl-3-propylpyridinium fluoride, 1-dodecyl-3-butylpyridinium fluoride, 1-dodecyl-4-methylpyridinium fluoride, 1-dodecyl-4-ethylpyridinium fluoride, 1-dodecyl-4-propylpyridinium fluoride, 1-dodecyl-4-butylpyridinium fluoride, N-dodecylpyridinium triflate, 1-dodecyl-2-methylpyridinium triflate, 1-dodecyl-2-ethylpyridinium triflate, 1-dodecyl-2-propylpyridinium triflate, 1-dodecyl-2-butylpyridinium triflate, 1-dodecyl-3-methylpyridinium triflate, 1-dodecyl-3-ethylpyridinium triflate, 1-dodecyl-3-propylpyridinium triflate, 1-dodecyl-3-butylpyridinium triflate, 1-dodecyl-4-methylpyridinium triflate, 1-dodecyl-4-ethylpyridinium triflate, 1-dodecyl-4-propylpyridinium triflate, 1-dodecyl-4-butylpyridinium triflate, N-dodecylpyridinium methanesulfonate, 1-dodecyl-2-methylpyridinium methanesulfonate, 1-dodecyl-2-ethylpyridinium methanesulfonate, 1-dodecyl-2-propylpyridinium methanesulfonate, 1-dodecyl-2-butylpyridinium methanesulfonate, 1-dodecyl-3-methylpyridinium methanesulfonate, 1-dodecyl-3-ethylpyridinium methanesulfonate, 1-dodecyl-3-propylpyridinium methanesulfonate, 1-dodecyl-3-butylpyridinium methanesulfonate, 1-dodecyl-4-methylpyridinium methanesulfonate, 1-dodecyl-4-ethylpyridinium methanesulfonate, 1-dodecyl-4-propylpyridinium methanesulfonate, 1-dodecyl-4-butylpyridinium methanesulfonate, N-dodecylpyridinium acetate, 1-dodecyl-2-methylpyridinium acetate, 1-dodecyl-2-ethylpyridinium acetate, 1-dodecyl-2-propylpyridinium acetate, 1-dodecyl-2-butylpyridinium acetate, 1-dodecyl-3-methylpyridinium acetate, 1-dodecyl-3-ethylpyridinium acetate, 1-dodecyl-3-propylpyridinium acetate, 1-dodecyl-3-butylpyridinium acetate, 1-dodecyl-4-methylpyridinium acetate, 1-dodecyl-4-ethylpyridinium acetate, 1-dodecyl-4-propylpyridinium acetate, 1-dodecyl-4-butylpyridinium acetate, N-dodecylpyridinium cyanide, 1-dodecyl-2-methylpyridinium cyanide, 1-dodecyl-2-ethylpyridinium cyanide, 1-dodecyl-2-propylpyridinium cyanide, 1-dodecyl-2-butylpyridinium cyanide, 1-dodecyl-3-methylpyridinium cyanide, 1-dodecyl-3-ethylpyridinium cyanide, 1-dodecyl-3-propylpyridinium cyanide, 1-dodecyl-3-butylpyridinium cyanide, 1-dodecyl-4-methylpyridinium cyanide, 1-dodecyl-4-ethylpyridinium cyanide, 1-dodecyl-4-propylpyridinium cyanide, 1-dodecyl-4-butylpyridinium cyanide.

Provided that $R^2$ is an alkyl radical, $R^2$ may be arranged in the ortho position, in the meta position or in the para position to $R^1$ in all the examples given. For example, provisions are made in one embodiment variant for $R^2$ to be a hydrocarbon radical, which is arranged in the meta position to $R^1$, for at least one of the cyclic compounds. Provisions may be made in another embodiment variant for $R^2$ to be a hydrocarbon radical, which is arranged in the ortho position to $R^1$, for at least one of the cyclic compounds. Provisions may be made in yet another embodiment variant for $R^2$ to be a hydrocarbon radical, which is arranged in the para position to $R^1$, for at least one of the cyclic compounds.

In an especially preferred embodiment, the electrolyte has, in addition to the first cyclic compound, another second cyclic compound, wherein the second cyclic compound also corresponds to formula (I)

$$[(A)R^1R^2]^+[Y]^-$$

- wherein (A) is a ring structure, which is selected from the group comprising pyridinium, piperidinium, pyrrolidinium;
- wherein the radical $R^1$ is arranged at the nitrogen atom of the ring structure A;
- wherein $R^1$ is a hydrocarbon radical with 1, 2, 3, 4, 5, 6, 7, 8, 9, 10, 11 or 12 C atoms;
- wherein $R^2$ is a hydrogen atom or a hydrocarbon radical with 1, 2, 3 or 4 C atoms;
- and wherein Y is selected from the group comprising halide, cyanide, alkyl sulfonate, halogenated alkyl sulfonate, acetate;
- and wherein the second cyclic compound is a different compound than the first cyclic compound.

In this connection, it is, of course, expedient when the first cyclic compound and the second cyclic compound are different compounds.

It can be seen in any case that it is advantageous when the alkyl radical $R^1$ is a saturated alkyl radical. In other words, it is advantageous when $R^1$ is selected from $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, $C_{11}H_{23}$, $C_{12}H_{25}$. It is especially preferable when $R^1$ is selected from $C_4H_9$, $C_6H_{13}$, $C_{12}H_{25}$ in this case.

Furthermore, it is conceivable that the first cyclic compound and the second cyclic compound have in any case the same radical $R^1$. As an alternative, it is conceivable that they have different radicals $R^1$ as well. In any case, the first compound is, however, different from the second cyclic compound. When the first cyclic compound and the second cyclic compound have the same radical $R^1$, it is conceivable in this respect that either the radicals $R^2$ have different positions at the ring, that the compounds have different radicals $R^2$ or that the compounds have different radicals $R^2$, which have different positions at the ring.

In this respect, it is expedient when $R^2$ is either a hydrogen atom or a saturated alkyl radical. It is, in other words, advantageous when $R^2$ is selected from H, $CH_3$, $C_2H_5$, $C_3H_7$, $C_4H_9$. In this case, it is especially preferable when $R^2$ is selected from H, $CH_3$.

Provisions are made in one variant for the cyclic compounds to be pyridinium compounds and/or piperidinium compounds. Here, either both cyclic compounds may be pyridinium compounds, or both cyclic compounds may be piperidinium compounds, or the first cyclic compound may be a pyridinium compound and the second cyclic compound may be a piperidinium compound. In other words, the ring structure is a ring with six ring atoms for these embodiment variants.

In other words, the first cyclic compound may be a pyridine compound according to formula (VI) and the second cyclic compound may be a piperidine compound according to formula (VII) in case of an electrolyte, which contains a first cyclic compound according to formula (I), a second cyclic compound according to formula (I), at least 5 wt. % water and optionally one or more additional components as described above.

In another embodiment variant, the following is conceivable: Both the first cyclic compound and the second cyclic compound may be a pyridine compound according to formula (VI) in case of an electrolyte, which contains a first cyclic compound according to formula (I), a second cyclic compound according to formula (I), at least 5 wt. % water and optionally one or more additional components as described above.

In another embodiment variant, the following is conceivable: Both the first cyclic compound and the second cyclic compound may be a piperidine compound according to formula (VII) in case of an electrolyte, which contains a first cyclic compound according to formula (I), a second cyclic compound according to formula (I), at least 5 wt. % water and optionally one or more additional components as described above.

If both cyclic compounds are pyridine compounds and the cyclic compounds have different radicals $R^1$, then the following embodiment variants are conceivable, for example, but without limitations.

It is conceivable in a first embodiment variant that the first cyclic compound is a compound according to formula (70), especially one of the compounds listed above according to formula (70), and that the second cyclic compound is selected from the group comprising compounds according to one of the formulas (71), (72), (73), (74), (75), (76), (77), (78), (79), (80), (81), especially one of the compounds listed above.

It is conceivable in another embodiment variant that the first cyclic compound is a compound according to formula (71), especially one of the compounds listed above, and that the second cyclic compound is selected from the group comprising compounds according to one of the formulas (70), (72), (73), (74), (75), (76), (77), (78), (79), (80), (81), especially one of the compounds listed above. In this case, it is especially conceivable that the first cyclic compound is a compound according to formula (82) and that the second cyclic compound is a compound according to one of the formulas (83), (84), (85), (86), (87), (88), (89), (90), (91) or (92).

It is conceivable in another embodiment variant that the first cyclic compound is a compound according to formula (72), especially one of the compounds listed above, and that the second cyclic compound is selected from the group comprising compounds according to one of the formulas (70), (71), (73), (74), (75), (76), (77), (78), (79), (80), (81), especially one of the compounds listed above. In this case, it is especially conceivable that the first cyclic compound is a compound according to formula (83) and that the second cyclic compound is a compound according to one of the formulas (70), (82), (84), (85), (86), (87), (88), (89), (90), (91) or (92).

It is conceivable in another embodiment variant that the first cyclic compound is a compound according to formula (73), especially one of the compounds listed above, and that the second cyclic compound is selected from the group comprising compounds according to one of the formulas (70), (71), (72), (74), (75), (76), (77), (78), (79), (80), (81), especially one of the compounds listed above. In this case, it is especially conceivable that the first cyclic compound is a compound according to formula (84) and that the second cyclic compound is a compound according to one of the formulas (70), (82), (83), (85), (86), (87), (88), (89), (90), (91) or (92).

It is conceivable in another embodiment variant that the first cyclic compound is a compound according to formula (74), especially one of the compounds listed above, and that the second cyclic compound is selected from the group comprising compounds according to one of the formulas (70), (71), (72), (73), (75), (76), (77), (78), (79), (80), (81), especially one of the compounds listed above. In this case, it is especially conceivable that the first cyclic compound is a compound according to formula (85) and that the second cyclic compound is a compound according to one of the formulas (70), (82), (83), (84), (86), (87), (88), (89), (90), (91) or (92).

It is conceivable in another embodiment variant that the first cyclic compound is a compound according to formula (75), especially one of the compounds listed above, and that the second cyclic compound is selected from the group comprising compounds according to one of the formulas (70), (71), (72), (73), (74), (76), (77), (78), (79), (80), (81), especially one of the compounds listed above. In this case, it is especially conceivable that the first cyclic compound is a compound according to formula (86) and that the second cyclic compound is a compound according to one of the formulas (70), (82), (83), (84), (85), (87), (88), (89), (90), (91) or (92).

It is conceivable in another embodiment variant that the first cyclic compound is a compound according to formula (76), especially one of the compounds listed above, and that the second cyclic compound is selected from the group comprising compounds according to one of the formulas (70), (71), (72), (73), (74), (75), (77), (78), (79), (80), (81), especially one of the compounds listed above. In this case, it is especially conceivable that the first cyclic compound is a compound according to formula (87) and that the second cyclic compound is a compound according to one of the formulas (70), (82), (83), (84), (85), (86), (88), (89), (90), (91) or (92).

It is conceivable in another embodiment variant that the first cyclic compound is a compound according to formula (77), especially one of the compounds listed above, and that the second cyclic compound is selected from the group comprising compounds according to one of the formulas (70), (71), (72), (73), (74), (75), (76), (78), (79), (80), (81), especially one of the compounds listed above. In this case, it is especially conceivable that the first cyclic compound is a compound according to formula (88) and that the second cyclic compound is a compound according to one of the formulas (70), (82), (83), (84), (85), (86), (87), (89), (90), (91) or (92).

It is conceivable in another embodiment variant that the first cyclic compound is a compound according to formula (78), especially one of the compounds listed above, and that the second cyclic compound is selected from the group comprising compounds according to one of the formulas (70), (71), (72), (73), (74), (75), (76), (77), (79), (80), (81), especially one of the compounds listed above. In this case, it is especially conceivable that the first cyclic compound is a compound according to formula (89) and that the second cyclic compound is a compound according to one of the formulas (70), (82), (83), (84), (85), (86), (87), (88), (90), (91) or (92).

It is conceivable in another embodiment variant that the first cyclic compound is a compound according to formula (79), especially one of the compounds listed above, and that the second cyclic compound is selected from the group comprising compounds according to one of the formulas (70), (71), (72), (73), (74), (75), (76), (77), (78), (80), (81), especially one of the compounds listed above. In this case, it is especially conceivable that the first cyclic compound is a compound according to formula (90) and that the second cyclic compound is a compound according to one of the formulas (70), (82), (83), (84), (85), (86), (87), (88), (89), (91) or (92).

It is conceivable in another embodiment variant that the first cyclic compound is a compound according to formula (80), especially one of the compounds listed above, and that the second cyclic compound is selected from the group comprising compounds according to one of the formulas (70), (71), (72), (73), (74), (75), (76), (77), (78), (79), (81), especially one of the compounds listed above. In this case, it is especially conceivable that the first cyclic compound is a compound according to formula (91) and that the second cyclic compound is a compound according to one of the formulas (70), (82), (83), (84), (85), (86), (87), (88), (89), (90) or (92).

It is conceivable in another embodiment variant that the first cyclic compound is a compound according to formula (81), especially one of the compounds listed above, and that the second cyclic compound is selected from the group comprising compounds according to one of the formulas (70), (71), (72), (73), (74), (75), (76), (77), (78), (79), (80), especially one of the compounds listed above. In this case, it is especially conceivable that the first cyclic compound is a compound according to formula (92) and that the second cyclic compound is a compound according to one of the formulas (70), (82), (83), (84), (85), (86), (87), (88), (89), (90) or (91).

If both cyclic compounds are piperidine compounds and the cyclic compounds contain different radicals $R^1$, then the following embodiment variants are conceivable, for example, but without limitations.

In this connection, it is conceivable in one embodiment variant that the first cyclic compound is a compound according to formula (47), especially one of the compounds listed above according to formula (47), and that the second cyclic compound is selected from the group comprising compounds according to one of the formulas (48), (49), (50), (51), (52), (53), (54), (55), (56), (57), (58), especially one of the compounds listed above.

It is conceivable in another embodiment variant that the first cyclic compound is a compound according to formula (48), especially one of the compounds listed above, and that the second cyclic compound is selected from the group comprising compounds according to one of the formulas (47), (49), (50), (51), (52), (53), (54), (55), (56), (57), (58), especially one of the compounds listed above. In this case, it is especially conceivable that the first cyclic compound is a compound according to formula (59) and that the second cyclic compound is a compound according to one of the formulas (47), (60), (61), (62), (63), (64), (65), (66), (67), (68) or (69).

It is conceivable in another embodiment variant that the first cyclic compound is a compound according to formula (49), especially one of the compounds listed above, and that the second cyclic compound is selected from the group comprising compounds according to one of the formulas (47), (48), (50), (51), (52), (53), (54), (55), (56), (57), (58), especially one of the compounds listed above. In this case, it is especially conceivable that the first cyclic compound is a compound according to formula (60) and that the second cyclic compound is a compound according to one of the formulas (47), (59), (61), (62), (63), (64), (65), (66), (67), (68) or (69).

It is conceivable in another embodiment variant that the first cyclic compound is a compound according to formula (50), especially one of the compounds listed above, and that the second cyclic compound is selected from the group comprising compounds according to one of the formulas (47), (48), (49), (51), (52), (53), (54), (55), (56), (57), (58), especially one of the compounds listed above. In this case, it is especially conceivable that the first cyclic compound is a compound according to formula (61) and that the second cyclic compound is a compound according to one of the formulas (47), (59), (60), (62), (63), (64), (65), (66), (67), (68) or (69).

It is conceivable in another embodiment variant that the first cyclic compound is a compound according to formula (51), especially one of the compounds listed above, and that the second cyclic compound is selected from the group comprising compounds according to one of the formulas (47), (48), (49), (50), (52), (53), (54), (55), (56), (57), (58), especially one of the compounds listed above. In this case, it is especially conceivable that the first cyclic compound is a compound according to formula (62) and that the second cyclic compound is a compound according to one of the formulas (47), (59), (60), (61), (63), (64), (65), (66), (67), (68) or (69).

It is conceivable in another embodiment variant that the first cyclic compound is a compound according to formula (52), especially one of the compounds listed above, and that the second cyclic compound is selected from the group comprising compounds according to one of the formulas (47), (48), (49), (50), (51), (53), (54), (55), (56), (57), (58), especially one of the compounds listed above. In this case, it is especially conceivable that the first cyclic compound is a compound according to formula (63) and that the second cyclic compound is a compound according to one of the formulas (47), (59), (60), (61), (62), (64), (65), (66), (67), (68) or (69).

It is conceivable in another embodiment variant that the first cyclic compound is a compound according to formula (53), especially one of the compounds listed above, and that the second cyclic compound is selected from the group comprising compounds according to one of the formulas (47), (48), (49), (50), (51), (52), (54), (55), (56), (57), (58), especially one of the compounds listed above. In this case, it is especially conceivable that the first cyclic compound is a compound according to formula (64) and that the second cyclic compound is a compound according to one of the formulas (47), (59), (60), (61), (62), (63), (65), (66), (67), (68) or (69).

It is conceivable in another embodiment variant that the first cyclic compound is a compound according to formula (54), especially one of the compounds listed above, and that the second cyclic compound is selected from the group comprising compounds according to one of the formulas (47), (48), (49), (50), (51), (52), (53), (55), (56), (57), (58), especially one of the compounds listed above. In this case, it is especially conceivable that the first cyclic compound is a compound according to formula (65) and that the second cyclic compound is a compound according to one of the formulas (47), (59), (60), (61), (62), (63), (64), (66), (67), (68) or (69).

It is conceivable in another embodiment variant that the first cyclic compound is a compound according to formula (55), especially one of the compounds listed above, and that the second cyclic compound is selected from the group comprising compounds according to one of the formulas (47), (48), (49), (50), (51), (52), (53), (54), (56), (57), (58), especially one of the compounds listed above. In this case, it is especially conceivable that the first cyclic compound is a compound according to formula (66) and that the second cyclic compound is a compound according to one of the formulas (47), (59), (60), (61), (62), (63), (64), (65), (67), (68) or (69).

It is conceivable in another embodiment variant that the first cyclic compound is a compound according to formula (56), especially one of the compounds listed above, and that the second cyclic compound is selected from the group comprising compounds according to one of the formulas (47), (48), (49), (50), (51), (52), (53), (54), (55), (57), (58), especially one of the compounds listed above. In this case, it is especially conceivable that the first cyclic compound is a compound according to formula (67) and that the second cyclic compound is a compound according to one of the formulas (47), (59), (60), (61), (62), (63), (64), (65), (66), (68) or (69).

It is conceivable in another embodiment variant that the first cyclic compound is a compound according to formula (57), especially one of the compounds listed above, and that the second cyclic compound is selected from the group comprising compounds according to one of the formulas (47), (48), (49), (50), (51), (52), (53), (54), (55), (56), (58), especially one of the compounds listed above. In this case, it is especially conceivable that the first cyclic compound is a compound according to formula (68) and that the second cyclic compound is a compound according to one of the formulas (47), (59), (60), (61), (62), (63), (64), (65), (66), (67) or (69).

It is conceivable in another embodiment variant that the first cyclic compound is a compound according to formula (58), especially one of the compounds listed above, and that the second cyclic compound is selected from the group comprising compounds according to one of the formulas (47), (48), (49), (50), (51), (52), (53), (54), (55), (56), (57), especially one of the compounds listed above. In this case, it is especially conceivable that the first cyclic compound is a compound according to formula (69) and that the second cyclic compound is a compound according to one of the formulas (47), (59), (60), (61), (62), (63), (64), (65), (66), (67) or (68).

If the first cyclic compound is a pyridine compound and the second cyclic compound is a piperidine compound or vice versa, then the following embodiment variants are conceivable, for example, but without limitations.

It is conceivable in a first embodiment variant that the first cyclic compound is a compound according to formula (70), especially one of the compounds listed above according to formula (70), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (71), especially one of the compounds listed above according to formula (71), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (72), especially one of the compounds listed above according to formula (72), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (73), especially one of the compounds listed above according to formula (73), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (74), especially one of the compounds listed above according to formula (74), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (75), especially one of the compounds listed above according to formula (75), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (76), especially one of the compounds listed above according to formula (76), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (77), especially one of the compounds listed above according to formula (77), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (78), especially one of the compounds listed above according to formula (78), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (79), especially one of the compounds listed above according to formula (79), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (80), especially one of the compounds listed above according to formula (80), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (81), especially one of the compounds listed above according to formula (81), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (47), especially one of the compounds listed above according to formula (47), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (48), especially one of the compounds listed above according to formula (48), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (49), especially one of the compounds listed above according to formula (49), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (50), especially one of the compounds listed above according to formula (50), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (51), especially one of the compounds listed above according to formula (51), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (52), especially one of the compounds listed above according to formula (52), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (53), especially one of the compounds listed above according to formula (53), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to Formula (54), especially one of the compounds listed above according to formula (54), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (55), especially one of the compounds listed above according to formula (55), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (56), especially one of the compounds listed above according to formula (56), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (57), especially one of the compounds listed above according to formula (57), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (58), especially one of the compounds listed above according to formula (58), and that the second cyclic compound is selected from the group comprising compounds according to one of the formulas (70), (71), (72), (73), (74), (75), (76), (77), (78), (79), (80), (81), especially one of the compounds listed above.

Provisions are made in another variant for the cyclic compounds to be pyrrolidinium compounds and/or pyrrolium compounds. In this case, either both cyclic compounds may be pyrrolidinium compounds, or both cyclic compounds may be pyrrolium compounds, or the first cyclic compound may be a pyrrolidinium compound and the second cyclic compound may be a pyrrolium compound. In other words, the ring structure is a ring with five ring atoms for these embodiment variants.

In other words, the first cyclic compound may be a pyrrolidine compound according to formula (VIII) and the second cyclic compound may be a pyrrole compound according to formula (IX) in case of an electrolyte, which contains a first cyclic compound according to formula (I), a second cyclic compound according to formula (I), at least 5 wt. % water and optionally one or more additional components as described above.

The following is conceivable in another embodiment variant: Both the first cyclic compound and the second cyclic compound may be a pyrrolidine compound according to formula (VIII) in case of an electrolyte, which contains a first cyclic compound according to formula (I), a second cyclic compound according to formula (I), at least 5 wt. % water and optionally one or more additional components as described above.

The following is conceivable in another embodiment variant: Both the first cyclic compound and the second cyclic compound may be a pyrrole compound according to formula (IX) in case of an electrolyte, which contains a first cyclic compound according to formula (I), a second cyclic compound according to formula (I), at least 5 wt. % water and optionally one or more additional components as described above.

If both cyclic compounds are pyrrolidine compounds and the cyclic compounds have different radicals $R^1$, then the following embodiment variants are conceivable, for example, but without limitations.

It is conceivable in one embodiment variant that the first cyclic compound is a compound according to formula (24), especially one of the compounds listed above according to formula (24), and that the second cyclic compound is selected from the group comprising compounds according to one of the formulas (25), (26), (27), (28), (29), (30), (31), (32), (33), (34), (35), especially one of the compounds listed above.

It is conceivable in one embodiment variant that the first cyclic compound is a compound according to formula (25), especially one of the compounds listed above according to formula (25), and that the second cyclic compound is selected from the group comprising compounds according to one of the formulas (24), (26), (27), (28), (29), (30), (31), (32), (33), (34), (35), especially one of the compounds listed above.

It is conceivable in one embodiment variant that the first cyclic compound is a compound according to formula (26), especially one of the compounds listed above according to formula (26), and that the second cyclic compound is selected from the group comprising compounds according to one of the formulas (24), (25), (27), (28), (29), (30), (31), (32), (33), (34), (35), especially one of the compounds listed above.

It is conceivable in one embodiment variant that the first cyclic compound is a compound according to formula (27), especially one of the compounds listed above according to formula (27), and that the second cyclic compound is selected from the group comprising compounds according to one of the formulas (24), (25), (26), (28), (29), (30), (31), (32), (33), (34), (35), especially one of the compounds listed above.

It is conceivable in one embodiment variant that the first cyclic compound is a compound according to formula (28), especially one of the compounds listed above according to formula (28), and that the second cyclic compound is selected from the group comprising compounds according to one of the formulas (24), (25), (26), (27), (29), (30), (31), (32), (33), (34), (35), especially one of the compounds listed above.

It is conceivable in one embodiment variant that the first cyclic compound is a compound according to formula (29), especially one of the compounds listed above according to formula (29), and that the second cyclic compound is selected from the group comprising compounds according to one of the formulas (24), (25), (26), (27), (28), (30), (31), (32), (33), (34), (35), especially one of the compounds listed above.

It is conceivable in one embodiment variant that the first cyclic compound is a compound according to formula (30), especially one of the compounds listed above according to formula (30), and that the second cyclic compound is selected from the group comprising compounds according to one of the formulas (24), (25), (26), (27), (28), (29), (31), (32), (33), (34), (35), especially one of the compounds listed above.

It is conceivable in one embodiment variant that the first cyclic compound is a compound according to formula (31), especially one of the compounds listed above according to formula (31), and that the second cyclic compound is selected from the group comprising compounds according to one of the formulas (24), (25), (26), (27), (28), (29), (30), (32), (33), (34), (35), especially one of the compounds listed above.

It is conceivable in one embodiment variant that the first cyclic compound is a compound according to formula (32), especially one of the compounds listed above according to formula (32), and that the second cyclic compound is selected from the group comprising compounds according to one of the formulas (24), (25), (26), (27), (28), (29), (30), (31), (33), (34), (35), especially one of the compounds listed above.

It is conceivable in one embodiment variant that the first cyclic compound is a compound according to formula (33), especially one of the compounds listed above according to formula (33), and that the second cyclic compound is selected from the group comprising compounds according to one of the formulas (24), (25), (26), (27), (28), (29), (30), (31), (32), (34), (35), especially one of the compounds listed above.

It is conceivable in one embodiment variant that the first cyclic compound is a compound according to formula (34), especially one of the compounds listed above according to formula (34), and that the second cyclic compound is selected from the group comprising compounds according to one of the formulas (24), (25), (26), (27), (28), (29), (30), (31), (32), (33), (35), especially one of the compounds listed above.

It is conceivable in one embodiment variant that the first cyclic compound is a compound according to formula (35), especially one of the compounds listed above according to formula (35), and that the second cyclic compound is selected from the group comprising compounds according to one of the formulas (24), (25), (26), (27), (28), (29), (30), (31), (32), (33), (34), especially one of the compounds listed above.

If both cyclic compounds are pyrrole compounds and the cyclic compounds have different radicals $R^1$, then the following embodiment variants are conceivable, for example, but without limitations.

It is conceivable in one embodiment variant that the first cyclic compound is a compound according to formula (1), especially one of the compounds listed above according to formula (1), and that the second cyclic compound is selected from the group comprising compounds according to one of the formulas (2), (3), (4), (5), (6), (7), (8), (9), (10), (11), (12), especially one of the compounds listed above.

It is conceivable in one embodiment variant that the first cyclic compound is a compound according to formula (2), especially one of the compounds listed above according to formula (2), and that the second cyclic compound is selected from the group comprising compounds according to one of the formulas (1), (3), (4), (5), (6), (7), (8), (9), (10), (11), (12), especially one of the compounds listed above.

It is conceivable in one embodiment variant that the first cyclic compound is a compound according to formula (3), especially one of the compounds listed above according to formula (3), and that the second cyclic compound is selected from the group comprising compounds according to one of the formulas (1), (2), (4), (5), (6), (7), (8), (9), (10), (11), (12), especially one of the compounds listed above.

It is conceivable in one embodiment variant that the first cyclic compound is a compound according to formula (4), especially one of the compounds listed above according to formula (4), and that the second cyclic compound is selected from the group comprising compounds according to one of the formulas (1), (2), (3), (5), (6), (7), (8), (9), (10), (11), (12), especially one of the compounds listed above.

It is conceivable in one embodiment variant that the first cyclic compound is a compound according to formula (5), especially one of the compounds listed above according to formula (5), and that the second cyclic compound is selected from the group comprising compounds according to one of the formulas (1), (2), (3), (4), (6), (7), (8), (9), (10), (11), (12), especially one of the compounds listed above.

It is conceivable in one embodiment variant that the first cyclic compound is a compound according to formula (6), especially one of the compounds listed above according to formula (6), and that the second cyclic compound is selected from the group comprising compounds according to one of the formulas (1), (2), (3), (4), (5), (7), (8), (9), (10), (11), (12), especially one of the compounds listed above.

It is conceivable in one embodiment variant that the first cyclic compound is a compound according to formula (7), especially one of the compounds listed above according to formula (7), and that the second cyclic compound is selected from the group comprising compounds according to one of the formulas (1), (2), (3), (4), (5), (6), (8), (9), (10), (11), (12), especially one of the compounds listed above.

It is conceivable in one embodiment variant that the first cyclic compound is a compound according to formula (8), especially one of the compounds listed above according to formula (8), and that the second cyclic compound is selected from the group comprising compounds according to one of the formulas (1), (2), (3), (4), (5), (6), (7), (9), (10), (11), (12), especially one of the compounds listed above.

It is conceivable in one embodiment variant that the first cyclic compound is a compound according to formula (9), especially one of the compounds listed above according to formula (9), and that the second cyclic compound is selected from the group comprising compounds according to one of the formulas (1), (2), (3), (4), (5), (6), (7), (8), (10), (11), (12), especially one of the compounds listed above.

It is conceivable in one embodiment variant that the first cyclic compound is a compound according to formula (10), especially one of the compounds listed above according to formula (10), and that the second cyclic compound is selected from the group comprising compounds according to one of the formulas (1), (2), (3), (4), (5), (6), (7), (8), (9), (11), (12), especially one of the compounds listed above.

It is conceivable in one embodiment variant that the first cyclic compound is a compound according to formula (11), especially one of the compounds listed above according to formula (11), and that the second cyclic compound is selected from the group comprising compounds according to one of the formulas (1), (2), (3), (4), (5), (6), (7), (8), (9), (10), (12), especially one of the compounds listed above.

It is conceivable in one embodiment variant that the first cyclic compound is a compound according to formula (12), especially one of the compounds listed above according to formula (12), and that the second cyclic compound is selected from the group comprising compounds according to one of the formulas (1), (2), (3), (4), (5), (6), (7), (8), (9), (10), (11), especially one of the compounds listed above.

If the first cyclic compound is a pyrrolidine compound and the second cyclic compound is a pyrrole compound or vice versa, then the following embodiment variants are conceivable, for example, but without limitations.

It is conceivable in a first embodiment variant that the first cyclic compound is a compound according to formula (24), especially one of the compounds listed above according to formula (24), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (25), especially one of the compounds listed above according to formula (25), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (26), especially one of the compounds listed above according to formula (26), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (27), especially one of the compounds listed above according to formula (27), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (28), especially one of the compounds listed above according to formula (28), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (29), especially one of the compounds listed above according to formula (29), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (30), especially one of the compounds listed above according to formula (30), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (31), especially one of the compounds listed above according to formula (31), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (32), especially one of the compounds listed above according to formula (32), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (33), especially one of the compounds listed above according to formula (33), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (34), especially one of the compounds listed above according to formula (34), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (35), especially one of the compounds listed above according to formula (35), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (1), especially one of the compounds listed above according to formula (1), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (2), especially one of the compounds listed above according to formula (2), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (3), especially one of the compounds listed above according to formula (3), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (4), especially one of the compounds listed above according to formula (4), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (5), especially one of the compounds listed above according to formula (5), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (6), especially one of the compounds listed above according to formula (6), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (7), especially one of the compounds listed above according to formula (7), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (8), especially one of the compounds listed above according to formula (8), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (9), especially one of the compounds listed above according to formula (9), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (10), especially one of the compounds listed above according to formula (10), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (11), especially one of the compounds listed above according to formula (11), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (12), especially one of the compounds listed above according to formula (12), and that the second cyclic compound is selected from the group comprising compounds according to one of the formulas (24), (25), (26), (27), (28), (29), (30), (31), (32), (33), (34), (35), especially one of the compounds listed above.

Provisions are made in another variant for one of the cyclic compounds to be a ring compound with a ring structure, which has six ring atoms, and that the other cyclic compound is a ring compound with a ring structure, which has five ring atoms. In this respect, the first cyclic compound may be a pyrrolidine compounds according to formula (VIII) or a pyrrole compounds according to formula (IX), while the second cyclic compound is a piperidinium compound according to formula (VII) or a pyridine compound according to formula (VI).

In other words, the first cyclic compound may be a pyrrolidine compound according to formula (VIII) and the second cyclic compound may be a pyridine compound according to formula (VI) in case of an electrolyte, which has a first cyclic compound according to formula (I), a second cyclic compound according to formula (I), at least 5 wt. % water and optionally one or more additional components as described above.

In this respect, the following can be seen: If the first cyclic compound is a pyrrolidine compound and the second cyclic compound is a pyridine compound or vice versa, then the following embodiment variants are conceivable, for example, but without limitations.

It is conceivable in a first embodiment variant that the first cyclic compound is a compound according to formula (24), especially one of the compounds listed above according to formula (24), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (25), especially one of the compounds listed above according to formula (25), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (26), especially one of the compounds listed above according to formula (26), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (27), especially one of the compounds listed above according to formula (27), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (28), especially one of the compounds listed above according to formula (28), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (29), especially one of the compounds listed above according to formula (29), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (30), especially one of the compounds listed above according to formula (30), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (31), especially one of the compounds listed above according to formula (31), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (32), especially one of the compounds listed above according to formula (32), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (33), especially one of the compounds listed above according to formula (33), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (34), especially one of the compounds listed above according to formula (34), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (35), especially one of the compounds listed above according to formula (35), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (70), especially one of the compounds listed above according to formula (70), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (71), especially one of the compounds listed above according to formula (71), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (72), especially one of the compounds listed above according to formula (72), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (73), especially one of the compounds listed above according to formula (73), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (74), especially one of the compounds listed above according to formula (74), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (75), especially one of the compounds listed above according to formula (75), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (76), especially one of the compounds listed above according to formula (76), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (77), especially one of the compounds listed above according to formula (77), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (78), especially one of the compounds listed above according to formula (78), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (79), especially one of the compounds listed above according to formula (79), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (80), especially one of the compounds listed above according to formula (80), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (81), especially one of the compounds listed above according to formula (81), and that the second cyclic compound is selected from the group comprising compounds according to one of the formulas (24), (25), (26), (27), (28), (29), (30), (31), (32), (33), (34), (35), especially one of the compounds listed above.

In other words, the first cyclic compound may be a pyrrolidine compound according to formula (VIII) and the second cyclic compound may be a piperidine compound according to formula (VII) in case of an electrolyte, which has a first cyclic compound according to formula (I), a second cyclic compound according to formula (I), at least 5 wt. % water and optionally one or more additional components as described above.

In this respect, the following can be seen: If the first cyclic compound is a pyrrolidine compound and the second cyclic compound is a piperidine compound or vice versa, the following embodiment variants are conceivable, for example, but without limitations.

It is conceivable in a first embodiment variant that the first cyclic compound is a compound according to formula (24), especially one of the compounds listed above according to formula (24), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (25), especially one of the compounds listed above according to formula (25), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (26), especially one of the compounds listed above according to formula (26), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (27), especially one of the compounds listed above according to formula (27), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (28), especially one of the compounds listed above according to formula (28), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (29), especially one of the compounds listed above according to formula (29), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (30), especially one of the compounds listed above according to formula (30), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (31), especially one of the compounds listed above according to formula (31), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (32), especially one of the compounds listed above according to formula (32), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (33), especially one of the compounds listed above according to formula (33), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (34), especially one of the compounds listed above according to formula (34), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (35), especially one of the compounds listed above according to formula (35), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (47), especially one of the compounds listed above according to formula (47), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (48), especially one of the compounds listed above according to formula (48), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (49), especially one of the compounds listed above according to formula (49), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (50), especially one of the compounds listed above according to formula (50), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (51), especially one of the compounds listed above according to formula (51), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (52), especially one of the compounds listed above according to formula (52), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (53), especially one of the compounds listed above according to formula (53), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (54), especially one of the compounds listed above according to formula (54), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (55), especially one of the compounds listed above according to formula (55), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (56), especially one of the compounds listed above according to formula (56), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (57), especially one of the compounds listed above according to formula (57), and that the second cyclic compound is selected from the group comprising compounds according to one of the formulas (24), (25), (26), (27), (28), (29), (30), (31), (32), (33), (34), (35), especially one of the compounds listed above.

It is conceivable in another embodiment variant that the first cyclic compound is a compound according to formula (58), especially one of the compounds listed above according to formula (58), and that the second cyclic compound is selected from the group comprising compounds according to one of the formulas (24), (25), (26), (27), (28), (29), (30), (31), (32), (33), (34), (35), especially one of the compounds listed above.

In other words, the first cyclic compound may be a pyrrole compound according to formula (IX) and the second cyclic compound may be a pyridine compound according to formula (VI) in case of an electrolyte, which has a first cyclic compound according to formula (I), a second cyclic compound according to formula (I), at least 5 wt. % water and optionally one or more additional components as described above.

In this respect, the following can be seen: If the first cyclic compound is a pyrrole compound and the second cyclic compound is a pyridine compound or vice versa, then the following embodiment variants are conceivable, for example, but without limitations.

It is conceivable in a first embodiment variant that the first cyclic compound is a compound according to formula (1), especially one of the compounds listed above according to formula (1), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (2), especially one of the compounds listed above according to formula (2), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (3), especially one of the compounds listed above according to formula (3), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (4), especially one of the compounds listed above according to formula (4), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (5), especially one of the compounds listed above according to formula (5), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (6), especially one of the compounds listed above according to formula (6), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (7), especially one of the compounds listed above according to formula (7), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (8), especially one of the compounds listed above according to formula (8), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (9), especially one of the compounds listed above according to formula (9), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (10), especially one of the compounds listed above according to formula (10), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (11), especially one of the compounds listed above according to formula (11), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (12), especially one of the compounds listed above according to formula (12), and that the second cyclic compound is selected from the group comprising compounds according to one of the formulas (70), (71), (72), (73), (74), (75), (76), (77), (78), (79), (80), (81), especially one of the compounds listed above.

It is conceivable in another embodiment variant that the first cyclic compound is a compound according to formula (70), especially one of the compounds listed above according to formula (70), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (71), especially one of the compounds listed above according to formula (71), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (72), especially one of the compounds listed above according to formula (72), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (73), especially one of the compounds listed above according to formula (73), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (74), especially one of the compounds listed above according to formula (74), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (75), especially one of the compounds listed above according to formula (75), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (76), especially one of the compounds listed above according to formula (76), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (77), especially one of the compounds listed above according to formula (77), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (78), especially one of the compounds listed above according to formula (78), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (79), especially one of the compounds listed above according to formula (79), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (80), especially one of the compounds listed above according to formula (80), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (81), especially one of the compounds listed above according to formula (81), and that the second cyclic compound is selected from the group comprising compounds according to one of the formulas (1), (2), (3), (4), (5), (6), (7), (8), (9), (10), (11), (12), especially one of the compounds listed above.

In other words, the first cyclic compound may be a pyrrole compound according to formula (IX) and the second cyclic compound may be a piperidine compound according to formula (VII) in case of an electrolyte, which has a first cyclic compound according to formula (I), a second cyclic compound according to formula (I), at least 5 wt. % water and optionally one or more additional components as described above.

In this respect, the following can be seen: If the first cyclic compound is a pyrrole compound and the second cyclic compound is a piperidine compound or vice versa, then the following embodiment variants are conceivable, for example, but without limitations.

It is conceivable in a first embodiment variant that the first cyclic compound is a compound according to formula (1), especially one of the compounds listed above according to formula (1), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (2), especially one of the compounds listed above according to formula (2), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (3), especially one of the compounds listed above according to formula (3), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (4), especially one of the compounds listed above according to formula (4), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (5), especially one of the compounds listed above according to formula (5), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (6), especially one of the compounds listed above according to formula (6), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (7), especially one of the compounds listed above according to formula (7), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (8), especially one of the compounds listed above according to formula (8), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (9), especially one of the compounds listed above according to formula (9), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (10), especially one of the compounds listed above according to formula (10), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (11), especially one of the compounds listed above according to formula (11), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (12), especially one of the compounds listed above according to formula (12), and that the second cyclic compound is selected from the group comprising compounds according to one of the formulas (47), (48), (49), (50), (51), (52), (53), (54), (55), (56), (57), (58), especially one of the compounds listed above.

It is conceivable in another embodiment variant that the first cyclic compound is a compound according to formula (47), especially one of the compounds listed above according to formula (47), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (48), especially one of the compounds listed above according to formula (48), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (49), especially one of the compounds listed above according to formula (49), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (50), especially one of the compounds listed above according to formula (50), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (51), especially one of the compounds listed above according to formula (51), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (52), especially one of the compounds listed above according to formula (52), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (53), especially one of the compounds listed above according to formula (53), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (54), especially one of the compounds listed above according to formula (54), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (55), especially one of the compounds listed above according to formula (55), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (56), especially one of the compounds listed above according to formula (56), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (57), especially one of the compounds listed above according to formula (57), and that the second cyclic compound is selected from the group comprising compounds according to one of the formulas (1), (2), (3), (4), (5), (6), (7), (8), (9), (10), (11), (12), especially one of the compounds listed above.

It is conceivable in another embodiment variant that the first cyclic compound is a compound according to formula (58), especially one of the compounds listed above according to formula (58), and that the second cyclic compound is selected from the group comprising compounds according to one of the formulas (1), (2), (3), (4), (5), (6), (7), (8), (9), (10), (11), (12), especially one of the compounds listed above.

Regardless of the selection of the cyclic compounds according to formula (I), it has been shown that it is advantageous when the first cyclic compound and the second cyclic compound are present in a ratio to one another of 1:1 to 9:1.

It is clear that the ratio between the first cyclic compound and the second cyclic compound is not limited to the exact values here, but rather is within certain tolerance limits. Thus, it is conceivable that the first cyclic compound and the second cyclic compound are present in a ratio of 1:1 to 1:9 or in one of the ranges mentioned below within a respective tolerance limit of ±5% to ±10%.

For example, it is conceivable that the first cyclic compound and the second cyclic compound are present in a ratio of 1:1 to 1:9, 1:1.5 to 1:9, 1:2 to 1:9, 1:2.5 to 1:9, 1:3 to 1:9, 1:3.5 to 1:9, 1:4 to 1:9, 1:4.5 to 1:9, 1:5 to 1:9, 1:5.5 to 1:9, 1:6 to 1:9, 1:6.5 to 1:9, 1:7 to 1:9, 1:7.5 to 1:9, 1:8 to 1:9, or 1:8.5 to 1:9.

Of course, it is also conceivable that the first cyclic compound and the second cyclic compound are in a ratio of 1:1 to 1:8.5, 1:1.5 to 1:8.5, 1:2 to 1:8.5, 1:2.5 to 1:8.5, 1:3 to 1:8.5, 1:3.5 to 1:8.5, 1:4 to 1:8.5, 1:4.5 to 1:8.5, 1:5 to 1:8.5, 1:5.5 to 1:8.5, 1:6 to 1:8.5, 1:6.5 to 1:8.5, 1:7: to 1:8.5, 1:7.5 to 1:8.5, 1:8 to 1:8.5, 1:1 to 1:8, 1:1.5 to 1:8, 1:2 to 1:8, 1:2.5 to 1:8, 1:3 to 1:8, 1:3.5 to 1:8, 1:4 to 1:8, 1:4.5 to 1:8, 1:5 to 1:8, 1:5.5 to 1:8, 1:6 to 1:8, 1:6.5 to 1:8, 1:7 to 1:8, 1:7.5 to 1:8, 1:1 to 1:7.5, 1:1.5 to 1:7.5, 1:2 to 1:7.5, 1:2.5 to 1:7.5, 1:3 to 1:7.5, 1:3.5 to 1:7.5, 1:4 to 1:7.5, 1:4.5 to 1:7.5, 1:5 to 1:7.5, 1:5.5 to 1:7.5, 1:6 to 1:7.5, 1:6.5 to 1:7.5, 1:7 to 1:7.5, 1:1 to 1:7, 1:1.5 to 1:7, 1:2 to 1:7, 1:2.5 to 1:7, 1:3 to 1:7, 1:3.5 to 1:7, 1:4 to 1:7, 1:4.5 to 1:7, 1:5 to 1:7, 1:5.5 to 1:7, 1:6 to 1:7, 1:6.5 to 1:7, 1:1 to 1:6.5, 1:1.5 to 1:6.5, 1:2 to 1:6.5, 1:2.5 to 1:6.5, 1:3 to 1:6.5, 1:3.5 to 1:6.5, 1:4 to 1:6.5, 1:4.5 to 1:6.5, 1:5 to 1:6.5, 1:5.5 to 1:6.5, 1:6 to 1:6.5, 1:1 to 1:6, 1:1.5 to 1:6, 1:2 to 1:6, 1:2.5 to 1:6, 1:3 to 1:6, 1:3.5 to 1:6, 1:4 to 1:6, 1:4.5 to 1:6, 1:5 to 1:6, 1:5.5 to 1:6, 1:1 to 1:5.5, 1:1.5 to 1:5.5, 1:2 to 1:5.5, 1:2.5 to 1:5.5, 1:3 to 1:5.5, 1:3.5 to 1:5.5, 1:4 to 1:5.5, 1:4.5 to 1:5.5, 1:5 to 1:5.5, 1:1 to 1:5, 1:1.5 to 1:5, 1:2 to 1:5, 1:2.5 to 1:5, 1:3 to 1:5, 1:3.5 to 1:5, 1:4 to 1:5, 1:4.5 to 1:5, 1:1 to 1:4.5, 1:1.5 to 1:4.5, 1:2 to 1:4.5, 1:2.5 to 1:4.5, 1:3 to 1:4.5, 1:3.5 to 1:4.5, 1:4 to 1:4.5, 1:1 to 1:4, 1:1.5 to 1:4, 1:2 to 1:4, 1:2.5 to 1:4, 1:3 to 1:4, 1:3.5 to 1:4, 1:1 to 1:3.5, 1:1.5 to 1:3.5, 1:2 to 1:3.5, 1:2.5 to 1:3.5, 1:3 to 1:3.5, 1:1 to 1:3, 1:1.5 to 1:3, 1:2 to 1:3, 1:2.5 to 1:3, 1:1 to 1:2.5, 1:1.5 to 1:2.5, 1:2 to 1:2.5, 1:1 to 1:2, 1:1.5 to 1:2.

It is also conceivable in another embodiment variant that the electrolyte has more than two different cyclic compounds. The electrolyte may have, for example, three, four or five cyclic compounds that are different from one another. In this case, each of the cyclic compounds may be selected from the compounds described above. It is advantageous in this case when $R^1$ is H or $CH_3$ and when Y is selected from Cl, F or $CH_3SO_3$. It is also preferable when the ring structure is a pyridine structure or a piperidine structure. It is also conceivable here that the cyclic compounds have either the same radical $R^1$ or different radicals $R^1$. As in the case of an electrolyte with two cyclic compounds, it is also conceivable that the cyclic compounds have the same anion Y. As an alternative, it is also conceivable here that the cyclic compounds have different anions Y. Moreover, what was already mentioned above, especially in relation to the possible water content, the selection of the electrodes and all the other features described above, also explicitly applies to an electrolyte with more than two cyclic compounds and an electrochemical gas sensor with such an electrolyte. For example, it is also conceivable here that all cyclic compounds are present in equal portions.

It can further be seen that it is especially advantageous when the halide, which forms Y, is selected from Cl, Br, F or I, preferably from Cl or F. The cyanide radical, which may form Y, is CN in a preferred exemplary embodiment. An example of an alkyl sulfonate which may form Y according to the present invention is methyl sulfonate. An example of a halogenated alkyl sulfonate is triflate. In this respect, it can be seen that it is advantageous if Y is selected from Cl, Br, F, I, CN, $CH_3SO_3$. In this case, it is especially preferable when Y is selected from Cl, F, $MeSO_3$.

If the electrolyte contains more than one cyclic compound according to formula (I), then it is conceivable that Y is identical for all cyclic compounds of the electrolyte. As an alternative, it is also conceivable that Y is different for both cyclic compounds of the electrolyte.

In any case, it has proven to be advantageous when the electrolyte contains between at least 5 wt. % and at most 50 wt. % $H_2O$, between at least 5 wt. % and at most 40 wt. %, between at least 5 wt. % and at most 30 wt. % $H_2O$ or it contains between at least 5 wt. % and at most 20 wt. % $H_2O$. In this case, the terms at least and at most include the respective value, to which they refer, in the sense of the present application. Therefore, at least 5 wt. % is defined as 5 wt. % or more. At most 50 wt. % is therefore defined as 50 wt. % or less. Moreover, it is clear that the values indicated are purely exemplary and may vary within certain limits, for example, ±0.25 wt. %, ±0.5 wt. % or ±1 wt. %. In this sense, for example, the wording "20±0.25 wt. %" is defined below in this respect as "20 wt. % with an upward or downward variation of 0.25 wt. %".

In this respect, it can be seen that it is advantageous when the electrolyte contains at least 5±0.25 wt. % water, at least 5.5±0.25 wt. % water, at least 6±0.25 wt. % water, at least 6.5±0.25 wt. % water, at least 7±0.25 wt. % water, at least 7.5±0.25 wt. % water, at least 8±0.25 wt. % water, at least 8.5±0.25 wt. % water, at least 9±0.25 wt. % water, at least 9.5±0.25 wt. % water or at least 10±0.25 wt. % water.

It can further be seen that it is advantageous when the electrolyte contains at most 50±1 wt. % water, at most 47.5±1 wt. % water, at most 45±1 wt. % water, at most 42.5±1 wt. % water, at most 40±1 wt. % water, at most 37.5±1 wt. % water, at most 35±1 wt. % water, at most 32.5±1 wt. % water, at most 30±1 wt. % water, at most 27.5±1 wt. % water, at most 25±1 Wt. % water, at most 22.5±1 wt. % water or at most 20±1 wt. % water.

Overall, it is therefore advantageous when the electrolyte contains at least 5±0.25 wt. % water and at most 50±1 wt. % water, at least 5±0.25 wt. % water and at most 47.5±1 wt. % water, at least 5±0.25 wt. % water and at most 45±1 wt. % water, at least 5±0.25 wt. % water and at most 45±1 wt. % water, at least 5±0.25 wt. % water and at most 40±1 wt. % water, at least 5±0.25 wt. % water and at most 37.5±1 wt. % water, at least 5±0.25 wt. % water and at most 35±1 wt.

% water, at least 5±0.25 wt. % water and at most 35±1 wt. % water, at least 5±0.25 wt. % water and at most 30±1 wt. % water, at least 5±0.25 wt. % water and at most 27.5±1 wt. % water, at least 5±0.25 wt. % water and at most 25±1 wt. % water, at least 5±0.25 wt. % water and at most 25±1 wt. % water or at least 5±0.25 wt. % water and at most 20±1 wt. % water, at least 5.5±0.25 wt. % water and at most 50±1 wt. % water, at least 5.5±0.25 wt. % water and at most 47.5±1 wt. % water, at least 5.5±0.25 wt. % water and at most 45±1 wt. % water, at least 5.5±0.25 wt. % water and at most 45.5±1 wt. % water, at least 5.5±0.25 wt. % water and at most 40±1 wt. % water, at least 5.5±0.25 wt. % water and at most 37.5±1 wt. % water, at least 5.5±0.25 wt. % water and at most 35±1 wt. % water, at least 5.5±0.25 wt. % water and at most 35.5±1 wt. % water, at least 5.5±0.25 wt. % water and at most 30±1 wt. % water, at least 5.5±0.25 wt. % water and at most 27.5±1 wt. % water, at least 5.5±0.25 wt. % water and at most 25±1 wt. % water, at least 5.5±0.25 wt. % water and at most 25.5±1 wt. % water or at least 5.5±0.25 wt. % water and at most 20±1 wt. % water, at least 6±0.25 wt. % water and at most 50±1 wt. % water, at least 6±0.25 wt. % water and at most 47.5±1 wt. % water, at least 6±0.25 wt. % water and at most 45±1 wt. % water, at least 6±0.25 wt. % water and at most 46±1 wt. % water, at least 6±0.25 wt. % water and at most 40±1 wt. % water, at least 6±0.25 wt. % water and at most 37.5±1 wt. % water, at least 6±0.25 wt. % water and at most 35±1 wt. % water, at least 6±0.25 wt. % water and at most 36±1 wt. % water, at least 6±0.25 wt. % water and at most 30±1 wt. % water, at least 6±0.25 wt. % water and at most 27.5±1 wt. % water, at least 6±0.25 wt. % water and at most 25±1 wt. % water, at least 6±0.25 wt. % water and at most 26±1 wt. % water or at least 6±0.25 wt. % water and at most 20±1 wt. % water, at least 6.5±0.25 wt. % water and at most 50±1 wt. % water, at least 6.5±0.25 wt. % water and at most 47.5±1 wt. % water, at least 6.5±0.25 wt. % water and at most 45±1 wt. % water, at least 6.5±0.25 wt. % water and at most 46.5±1 wt. % water, at least 6.5±0.25 wt. % water and at most 40±1 wt. % water, at least 6.5±0.25 wt. % water and at most 37.5±1 wt. % water, at least 6.5±0.25 wt. % water and at most 35±1 wt. % water, at least 6.5±0.25 wt. % water and at most 36.5±1 wt. % water, at least 6.5±0.25 wt. % water and at most 30±1 wt. % water, at least 6.5±0.25 wt. % water and at most 27.5±1 wt. % water, at least 6.5±0.25 wt. % water and at most 25±1 wt. % water, at least 6.5±0.25 wt. % water and at most 26.5±1 wt. % water or at least 6.5±0.25 wt. % water and at most 20±1 wt. % water, at least 7±0.25 wt. % water and at most 50±1 wt. % water, at least 7±0.25 wt. % water and at most 47.5±1 wt. % water, at least 7±0.25 wt. % water and at most 45±1 wt. % water, at least 7±0.25 wt. % water and at most 47±1 wt. % water, at least 7±0.25 wt. % water and at most 40±1 wt. % water, at least 7±0.25 wt. % water and at most 37.5±1 wt. % water, at least 7±0.25 wt. % water and at most 35±1 wt. % water, at least 7±0.25 wt. % water and at most 37±1 wt. % water, at least 7±0.25 wt. % water and at most 30±1 wt. % water, at least 7±0.25 wt. % water and at most 27.5±1 wt. % water, at least 7±0.25 wt. % water and at most 25±1 wt. % water, at least 7±0.25 wt. % water and at most 27±1 wt. % water or at least 7±0.25 wt. % water and at most 20±1 wt. % water, at least 7.5±0.25 wt. % water and at most 50±1 wt. % water, at least 7.5±0.25 wt. % water and at most 47.5±1 wt. % water, at least 7.5±0.25 wt. % water and at most 45±1 wt. % water, at least 7.5±0.25 wt. % water and at most 47.5±1 wt. % water, at least 7.5±0.25 wt. % water and at most 40±1 wt. % water, at least 7.5±0.25 wt. % water and at most 37.5±1 wt. % water, at least 7.5±0.25 wt. % water and at most 35±1 wt. % water, at least 7.5±0.25 wt. % water and at most 37.5±1 wt. % water, at least 7.5±0.25 wt. % water and at most 30±1 wt. % water, at least 7.5±0.25 wt. % water and at most 27.5±1 wt. % water, at least 7.5±0.25 wt. % water and at most 25±1 wt. % water, at least 7.5±0.25 wt. % water and at most 27.5±1 wt. % water or at least 7.5±0.25 wt. % water and at most 20±1 wt. % water, at least 8±0.25 wt. % water and at most 50±1 wt. % water, at least 8±0.25 wt. % water and at most 47.5±1 wt. % water, at least 8±0.25 wt. % water and at most 45±1 wt. % water, at least 8±0.25 wt. % water and at most 48±1 wt. % water, at least 8±0.25 wt. % water and at most 40±1 wt. % water, at least 8±0.25 wt. % water and at most 37.5±1 wt. % water, at least 8±0.25 wt. % water and at most 35±1 wt. % water, at least 8±0.25 wt. % water and at most 38±1 wt. % water, at least 8±0.25 wt. % water and at most 30±1 wt. % water, at least 8±0.25 wt. % water and at most 27.5±1 wt. % water, at least 8±0.25 wt. % water and at most 25±1 wt. % water, at least 8±0.25 wt. % water and at most 28±1 wt. % water or at least 8±0.25 wt. % water and at most 20±1 wt. % water, at least 8.5±0.25 wt. % water and at most 50±1 wt. % water, at least 8.5±0.25 wt. % water and at most 47.5±1 wt. % water, at least 8.5±0.25 wt. % water and at most 45±1 wt. % water, at least 8.5±0.25 wt. % water and at most 48.5±1 wt. % water, at least 8.5±0.25 wt. % water and at most 40±1 wt. % water, at least 8.5±0.25 wt. % water and at most 37.5±1 wt. % water, at least 8.5±0.25 wt. % water and at most 35±1 wt. % water, at least 8.5±0.25 wt. % water and at most 38.5±1 wt. % water, at least 8.5±0.25 wt. % water and at most 30±1 wt. % water, at least 8.5±0.25 wt. % water and at most 27.5±1 wt. % water, at least 8.5±0.25 wt. % water and at most 25±1 wt. % water, at least 8.5±0.25 wt. % water and at most 28.5±1 wt. % water or at least 8.5±0.25 wt. % water and at most 20±1 wt. % water, at least 9±0.25 wt. % water and at most 50±1 wt. % water, at least 9±0.25 wt. % water and at most 47.5±1 wt. % water, at least 9±0.25 wt. % water and at most 45±1 wt. % water, at least 9±0.25 wt. % water and at most 49±1 wt. % water, at least 9±0.25 wt. % water and at most 40±1 wt. % water, at least 9±0.25 wt. % water and at most 37.5±1 wt. % water, at least 9±0.25 wt. % water and at most 35±1 wt. % water, at least 9±0.25 wt. % water and at most 39±1 wt. % water, at least 9±0.25 wt. % water and at most 30±1 wt. % water, at least 9±0.25 wt. % water and at most 27.5±1 wt. % water, at least 9±0.25 wt. % water and at most 25±1 wt. % water, at least 9±0.25 wt. % water and at most 29±1 wt. % water or at least 9±0.25 wt. % water and at most 20±1 wt. % water, at least 9.5±0.25 wt. % water and at most 50±1 wt. % water, at least 9.5±0.25 wt. % water and at most 47.5±1 wt. % water, at least 9.5±0.25 wt. % water and at most 45±1 wt. % water, at least 9.5±0.25 wt. % water and at most 49.5±1 wt. % water, at least 9.5±0.25 wt. % water and at most 40±1 wt. % water, at least 9.5±0.25 wt. % water and at most 37.5±1 wt. % water, at least 9.5±0.25 wt. % water and at most 35±1 wt. % water, at least 9.5±0.25 wt. % water and at most 39.5±1 wt. % water, at least 9.5±0.25 wt. % water and at most 30±1 wt. % water, at least 9.5±0.25 wt. % water and at most 27.5±1 wt. % water, at least 9.5±0.25 wt. % water and at most 25±1 wt. % water, at least 9.5±0.25 wt. % water and at most 29.5±1 wt. % water or at least 9.5±0.25 wt. % water and at most 20±1 wt. % water, at least 10±0.25 wt. % water and at most 50±1 wt. % water, at least 10±0.25 wt. % water and at most 47.5±1 wt. % water, at least 10±0.25 wt. % water and at most 45±1 wt. % water, at least 10±0.25 wt. % water and at most 41±1 wt. % water, at least 10±0.25 wt. % water and at most 40±1 wt. % water, at least 10±0.25 wt. % water and at most 37.5±1 wt. % water, at least 10±0.25 wt. % water and at most 35±1 wt. % water, at least 10±0.25 wt. % water and at most 31±1 wt. % water, at least 10±0.25 wt. % water and at most 30±1 wt. % water, at least 10±0.25 wt. % water and at most 27.5±1 wt. % water, at least 10±0.25 wt. % water and at most 25±1 wt. % water, at least 10±0.25 wt. % water and at most 21±1 wt. % water or at least 10±0.25 wt. % water and at most 20±1 wt. % water.

In another aspect, the present invention pertains to an electrochemical gas sensor with an electrolyte as described above. In other words, the present invention pertains to an electrochemical gas sensor with a first electrode, with at least one second electrode and with an electrolyte in accordance with what was stated above.

In this case, regardless of the selection of the cyclic compounds, it may be advantageous in another exemplary embodiment when the first electrode and/or second electrode consist of a precious metal or a precious metal alloy. For example, it is conceivable that Ir, Pt, Pd or an alloy with one of these substances may be used as the electrode material. A gas sensor according to the present invention with such an electrode as measuring electrode may especially be used for the detection of $SO_2$, $NO_2$, NO, $O_3$ and/or $H_2S$.

It is conceivable in another exemplary embodiment that the first electrode and/or second electrode consist of a carbon material. In particular, the use of CNT (carbon nanotubes), DLC (diamond-like carbon) or graphene electrodes has surprisingly proven to be advantageous. It is possible, in any event, to achieve a markedly improved sensitivity and a markedly reduced noise of the measured signal due to the selection of the electrode material from the group comprising Ir, Pt, Pd, CNT, DLC or graphene electrodes together with the electrolyte according to the present invention described herein. On the other hand, the gas sensor with the electrolyte described herein may also be used when a carbon electrode is used for the detection of $SO_2$, $NO_2$, $O_3$ and/or $H_2S$.

A preferred electrode comprises at least one first cyclic compound and a second cyclic compound and at least 5 wt. % water, wherein, independently of one another, the first cyclic compound and the second cyclic compound correspond each to formula (I)

$$[(A)R^1R^2]^+[Y]^-,$$

- wherein, independently of one another, (A) is a respective ring structure that is selected from the group comprising pyridinium, piperidinium, pyrrolidinium, pyrrolium;
- wherein the radical $R^1$ is arranged at the nitrogen atom of the ring structure A;
- wherein, independently of one another, $R^1$ is a respective hydrocarbon radical with 1, 2, 3, 4, 5, 6, 7, 8, 9, 10, 11 or 12 C atoms;
- wherein, independently of one another, $R^2$ is a respective hydrogen atom or hydrocarbon radical with 1, 2, 3 or 4 C atoms;
- wherein, independently of one another, each Y is selected from the group comprising halide, cyanide, alkyl sulfonate, halogenated alkyl sulfonate, acetate; and
- wherein the second cyclic compound is a different compound than the first cyclic compound.

Further, (A) is preferably a ring structure having a pyridinium, wherein $R^1$ is a hydrocarbon radical with 4, 5, or 6 C atoms, especially $C_4H_9$, $C_5$Hui, $C_6H_{13}$, and wherein $R^2$ is a hydrogen atom.

Furthermore, the electrolyte even more preferably comprises TRIS and/or Bis-Tris.

Even more preferably, Y is a halide and/or an alkyl sulfonate, and is especially a chloride and/or a methyl sulfonate.

Even more preferably, the first cyclic compound and the second cyclic compound are selected from two or more members of the group consisting of: N-butylpyridinium chloride, N-hexylpyridinium chloride, N-butylpyridinium methyl sulfonate and N-hexylpyridinium methyl sulfonate.

Even more preferably, the first cyclic compound and the second cyclic compound are used in a ratio of 1:9 to 9:1, especially preferably in a ratio of 1:1.

The electrolyte may be used in an electrochemical gas sensor.

Further features, details and advantages of the present invention appear from the wording of the claims, as well as from the following description of the drawings, as well as from the exemplary embodiments described below. It is clear that these features, details and advantages are used, by way of example only, to explain the implementation of the present invention, and that the present invention according to the claims is in no way limited to the examples shown here. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic view of an electrochemical gas sensor according to the present invention;

FIG. 2 is the measured curve (time course) for Example 1, wherein time is shown on the x axis and the measured signal strength is shown on the y axis, gassing the sensor with the measured gas was begun at the time t1 and gassing was ended at the time t2;

FIGS. 5*a*, 5*b*, 5*c* and 5*d* are the measured curves for Example 4, wherein FIG. 5*a* shows the insensitivity of the sensor to temperature fluctuations, FIG. 5*b* shows the constancy of the sensor quality at extremely low temperatures, FIG. 5*c* shows the linearity of the sensor to an increasing analyte concentration, and FIG. 5*d* shows the basic measured signal of the sensor;

DESCRIPTION OF PREFERRED EMBODIMENTS

Figure 3:
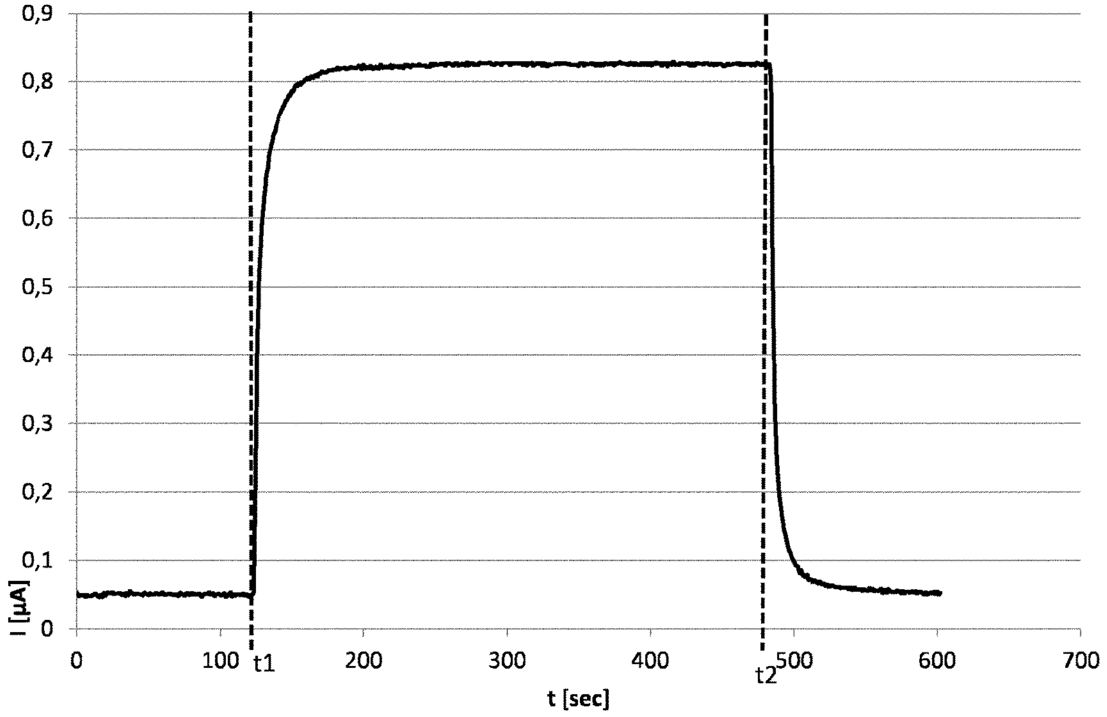
FIG. 3 is the measured curve for Example 2, wherein time is shown on the x axis and the measured signal strength is shown on the y axis, gassing the sensor with the measured gas was begun at the time t1 and gassing was ended at the time t2.

FIG. 1 shows a schematic view of an electrochemical sensor 200. The gas sensor 200 has a housing 203, in which a first electrode 201 and a second electrode 202 are arranged. The electrodes 201, 202 are connected to one another in an electrically conducting manner via an electrical connection 206. The housing 203 has a gas inlet 204 and a gas outlet 205. The gas to be analyzed can flow through the gas inlet 204 into the gas sensor 200. A pressure equalization may take place due to the gas outlet 205 and developing gaseous reaction products may again be released from the gas sensor 200. Multiple variations of this configuration are conceivable. It can thus be seen that a gas-permeable membrane 207, 208 is arranged in front of the gas inlet 204 and the gas outlet 205, respectively, in the example being shown. These membranes may also be absent in an alternative embodiment. In another, alternative embodiment (not shown), the gas sensor 200 may have more than two electrodes.

However, an electrolyte 300 is arranged in the housing 203 in all embodiments, as shown in FIG. 1. The electrolyte 300 consists of a mixture, which contains a first cyclic compound and at least 5 wt. % water, wherein both the first cyclic compound and the second cyclic compound correspond to formula (I)

$$[(A)R^1R^2]^+[Y]^-,$$

- wherein (A) is a ring structure which is selected from the group comprising pyridinium, piperidinium, pyrrolidinium, pyrrolium;
- wherein the radical $R^1$ is arranged at the nitrogen atom of the ring structure A;
- wherein $R^1$ is a hydrocarbon radical with 1, 2, 3, 4, 5, 6, 7, 8, 9, 10, 11 or 12 C atoms;
- wherein $R^2$ is a hydrogen atom or a hydrocarbon radical with 1, 2, 3 or 4 C atoms; and
- wherein Y is selected from the group comprising halide, cyanide, alkyl sulfonate, halogenated alkyl sulfonate, acetate.

The electrolyte 300 is especially an electrolyte according to one of the examples described below. However, it is clear the present invention is not limited to these examples, but rather these are used only for explanation. Of course, other embodiments, which are not mentioned explicitly here and which correspond to the wording of the claims, are also covered by the present invention.

Example 1

In Example 1 an electrochemical gas sensor that had at least one first electrode, a second electrode and an electrolyte was gassed with 10 ppm of $H_2S$ for a defined period of time. FIG. 2 shows the measured curve obtained as a result.

The electrolyte used contains 1-butylpyridinium chloride as the first cyclic compound and 1-hexylpyridinium chloride as the second cyclic compound. Furthermore, the electrolyte contains Tris as a buffer substance. The buffer substance is present in a 0.5-molar concentration. Moreover, the electrolyte contains 30 wt. % water.

The example thus shows an electrolyte and the measuring response of an electrochemical gas sensor with an electrolyte that contains a first cyclic compound according to formula (VI), more precisely according to formula (73) and formula (84), a second cyclic compound according to formula (VI), more precisely according to formula (75) and formula (86), Tris as a buffer in a 0.5-molar concentration, as well as 30% water. Therefore, $R^1$ is a butyl radical, i.e., a hydrocarbon with 4 C atoms, namely $C_4H_7$, for the first cyclic compound according to formula (I), and $R^1$ is therefore a hexyl radical, i.e., a hydrocarbon with 6 C atoms, namely $C_6$Hui, for the second cyclic compound according to formula (I). $R^2$ is a hydrogen for both cyclic compounds. A is a pyridine ring in both cases and Y is chloride in both cases.

FIG. 2 shows the time (t) in seconds on the x axis and the measured signal strength (I) in μA on the y axis. Gassing with $H_2S$ was begun at the time t1. Gassing was ended again at the time t2.

It can be seen that the gas sensor responds to the presence of the analyte, $H_2S$ in this case, by the signal increasing from 0 μA to about 0.6 μA to 0.7 μA immediately after the start of the gassing at the time t1 and again returning to 0 μA with the end of the gassing at the time t2.

Example 2

In Example 2 an electrochemical gas sensor that had at least one first electrode, a second electrode and an electrolyte was gassed with 5 ppm of $SO_2$ for a defined period of time. FIG. 3 shows the measured curve obtained as a result.

The electrolyte used contains 1-butylpyridinium chloride as the first cyclic compound and 1-hexylpyridinium chloride as the second cyclic compound. Furthermore, the electrolyte contains Tris as a buffer substance. The buffer substance is present in a 0.5-molar concentration. Moreover, the electrolyte contains 30 wt. % water. Therefore, $R^1$ is a butyl radical, i.e., a hydrocarbon with 4 C atoms, namely $C_4H_7$, for the first cyclic compound according to formula (I), and $R^1$ is therefore a hexyl radical, i.e., a hydrocarbon with 6 C atoms, namely $C_6H_{11}$ for the second cyclic compound according to formula (I). $R^2$ is a hydrogen for both cyclic compounds. A is a pyridine ring in both cases and Y is chloride in both cases.

The example thus shows an electrolyte and the measuring response of an electrochemical gas sensor with an electrolyte that contains a first cyclic compound according to formula (VI), more precisely according to formula (73) and formula (84), a second cyclic compound according to formula (VI), more precisely according to formula (75) and formula (86), Tris as a buffer in a 0.5-molar concentration, as well as 30% water.

FIG. 3 shows the time (t) in seconds on the x axis and the measured signal strength (I) in μA on the y axis. Gassing with $SO_2$ was begun at the time t1. Gassing was ended again at the time t2.

It can be seen that the gas sensor responds to the presence of the analyte, $SO_2$ in this case, by the signal increasing from 0 μA to just above 2.5 μA immediately after the start of the gassing at the time t1 and again returning to 0 μA with the end of the gassing at the time t2.

Example 3

Figure 4:
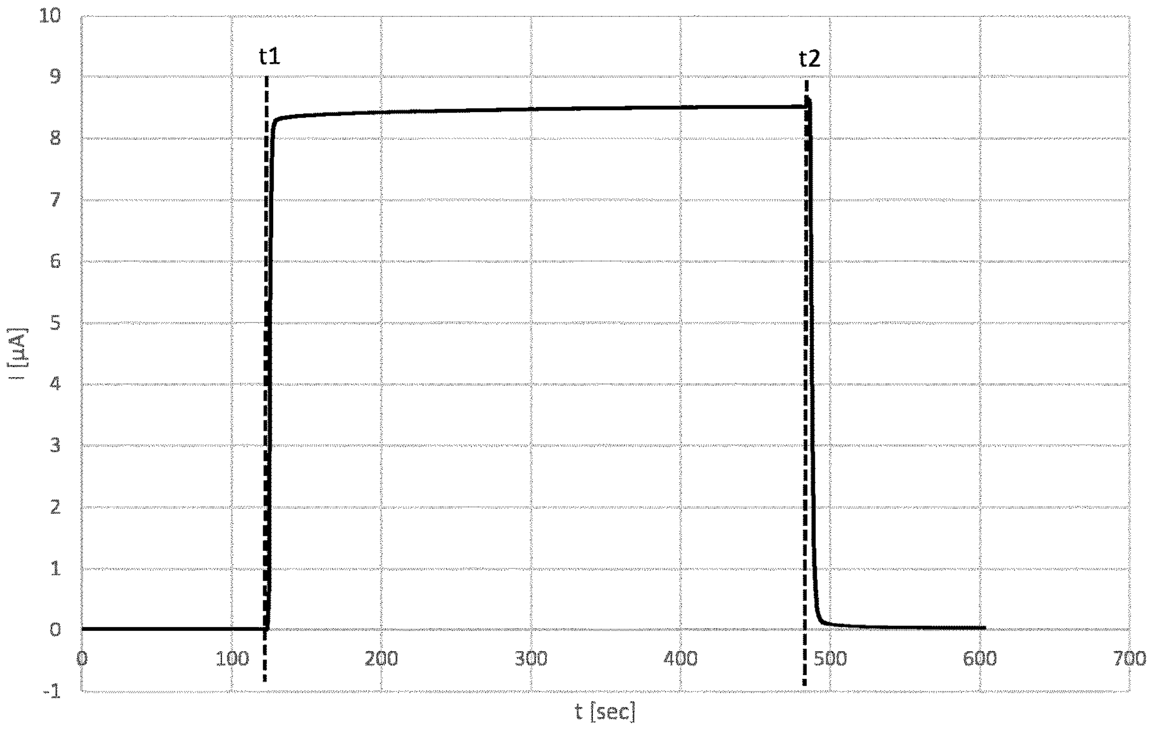
FIG. 4 is the measured curve for Example 3, wherein time is shown on the x axis and the measured signal strength is shown on the y axis, gassing the sensor with the measured gas was begun at the time t1 and gassing was ended at the time t2.

In Example 3 an electrochemical gas sensor that had at least one first electrode, a second electrode and an electrolyte was gassed with 20 ppm of $H_2S$ for a defined period of time. FIG. 4 shows the measured curve obtained as a result.

The electrolyte used contains 1-butylpyridinium chloride as the first cyclic compound and 1-hexylpyridinium chloride as the second cyclic compound. Moreover, the electrolyte contains potassium acetate as an addition. The first cyclic compound, the second cyclic compound and the addition are present in a ratio of 1:1:1. Moreover, the electrolyte contains 20 wt. % water. Therefore, $R^1$ is a butyl radical, i.e., a hydrocarbon with 4 C atoms, namely $C_4H_7$, for the first cyclic compound according to formula (I), and $R^1$ is therefore a hexyl radical, i.e., a hydrocarbon with 6 C atoms, namely $C_6H_{11}$ for the second cyclic compound according to formula (I). $R^2$ is a hydrogen for both cyclic compounds. A is a pyridine ring in both cases and Y is chloride in both cases.

The example thus shows an electrolyte and the measuring response of an electrochemical gas sensor with an electrolyte that contains a first cyclic compound according to formula (VI), more precisely according to formula (73) and formula (84), a second cyclic compound according to formula (VI), more precisely according to formula (75) and formula (86), potassium acetate as an addition, as well as 20% water.

FIG. 4 shows the time (t) in seconds on the x axis and the measured signal strength (I) in μA on the y axis. Gassing with $SO_2$ was begun at the time t1. Gassing was ended again at the time t2.

It can be seen that the gas sensor responds to the presence of the analyte, $H_2S$ in this case, by the signal increasing from 0 μA to about 8.5 μA immediately after the start of the gassing at the time t1 and again returning to 0 μA with the end of the gassing at the time t2.

Example 4

In Example 4 an especially advantageous electrochemical gas sensor, which had at least one first electrode, a second electrode and an electrolyte, was gassed once with 2 ppm of $SO_2$ and once with 5 ppm of $SO_2$ for a defined period of time. FIGS. 5*a*, 5*b*, 5*c* and 5*d* show the measured curves obtained during the analysis of this sensor.

The electrolyte used contains 1-butylpyridinium chloride as the first cyclic compound and 1-hexylpyridinium chloride as the second cyclic compound in a molar ratio of 1:1. Furthermore, the electrolyte contains triethanolamine (TEA) as the buffer in a 0.5-molar concentration. Moreover, the electrolyte contains 30 wt. % water. Therefore, $R^1$ is a butyl radical, i.e., a hydrocarbon with 4 C atoms, namely $C_4H_7$, for the first cyclic compound according to formula (I), and $R^1$ is therefore a hexyl radical, i.e., a hydrocarbon with 6 C atoms, namely $C_6H_{11}$ for the second cyclic compound according to formula (I). $R^2$ is a hydrogen for both cyclic compounds. A is a pyridine ring in both cases and Y is chloride in both cases.

The example thus shows an electrolyte and the measuring response of an electrochemical gas sensor with an electrolyte that contains a first cyclic compound according to formula (VI), more precisely according to formula (73) and formula (84), a second cyclic compound according to formula (VI), more precisely according to formula (75) and formula (86), TEA as the buffer, as well as 30% water.

Figure 5A:
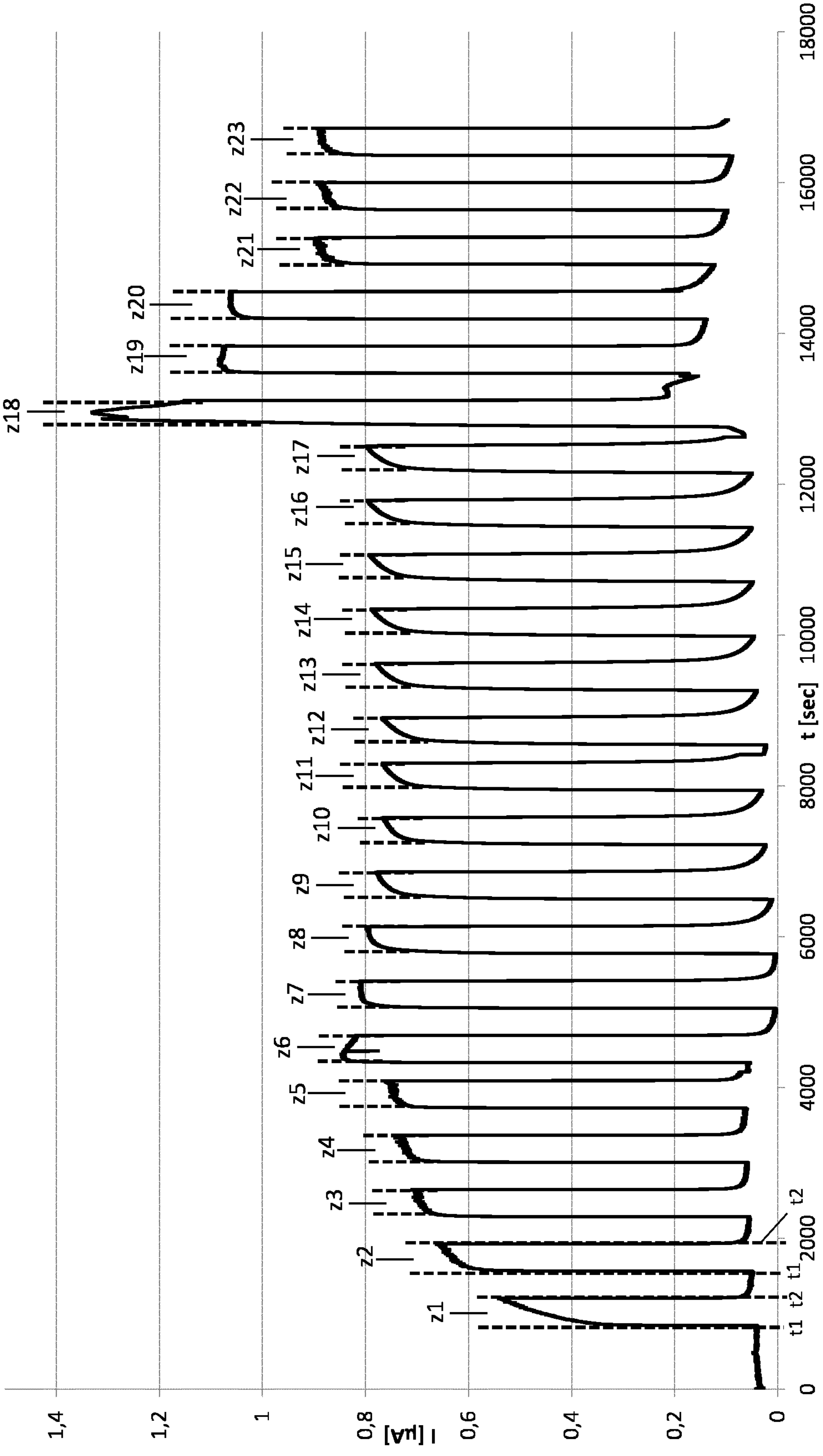

FIG. 5*a* shows the time (t) in seconds on the x axis and the measured signal strength (I) in μA on the y axis. The sensor was observed here under different temperature conditions over a plurality of measuring cycles. In this connection, a respective measuring cycle begins at the time t1 and ends at the respective time t2. Each gassing with $SO_2$ was in this case begun at the time t1. Gassing was ended again at the time t2. Between the end time t2 and the next start time t1 there was a respective brief break, in which the sensor continued to run, but no analyte gassing took place. The sensor was first operated at ambient temperature in the first five cycles z1, z2, z3, z4 and z5. The ambient temperature was then lowered to −40° C. in the course of the next six cycles z6, z7, z8, z9, z10, z11. The sensor was then operated at −40° C. for the next six cycles z12, z13, z14, z15, z16, z17. The ambient temperature was then increased by a total of 70K to 30° C., and the sensor was operated at 30° C. ambient temperature for the last six cycles z18, z19, z20, z21, z22, z23. It can be seen that the sensor sends an almost constant measured signal between 0.6 μA and 1 μA in the presence of the analyte despite the sharp fluctuations of the ambient temperature. The sensor is therefore reliable even under sharply fluctuating climatic conditions.

Figure 5B:
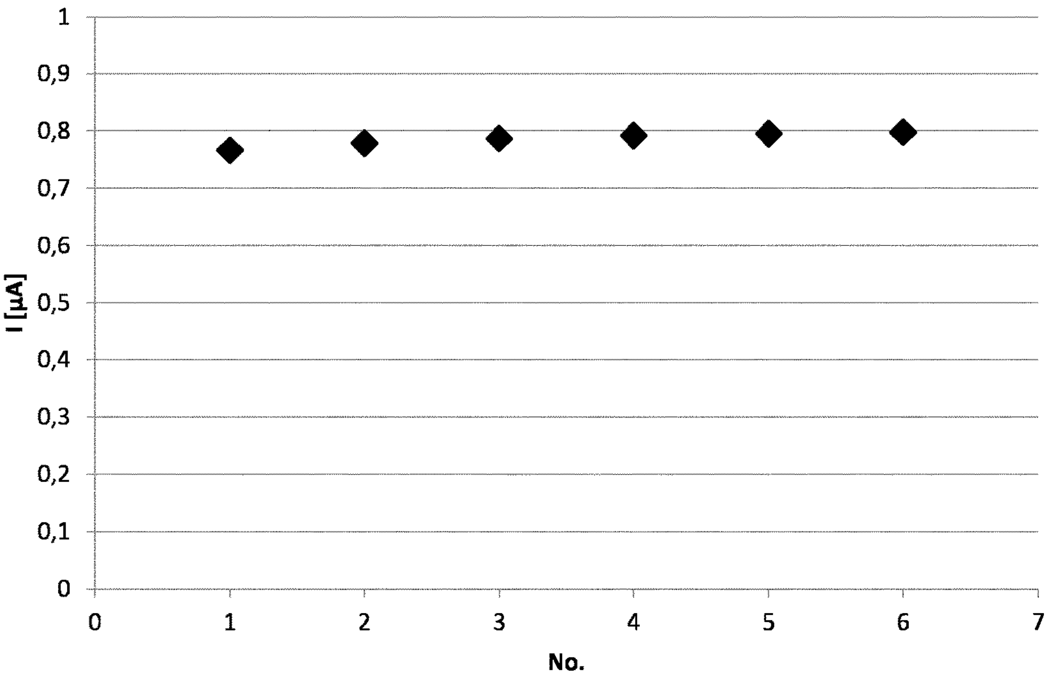

This is also confirmed by the results shown in the figure in FIG. 5*b*. Here, the current number of the measurement is shown on the x axis and the measured signal strength in A is shown on the y axis. The current number of the measurement corresponds here to the measuring cycles shown in FIG. 5*a*, wherein the current number 1 corresponds to the measuring cycle z1, the current number 2 corresponds to the measuring cycle z2, the current number 3 corresponds to the measuring cycle z3, and so on. Overall, six consecutive measurements were carried out at an ambient temperature of −40° C. It can be seen here that the measured signal sent by the sensor was constant in a very narrow range between 0.7 μA and 0.8 μA.

Figure 5C:
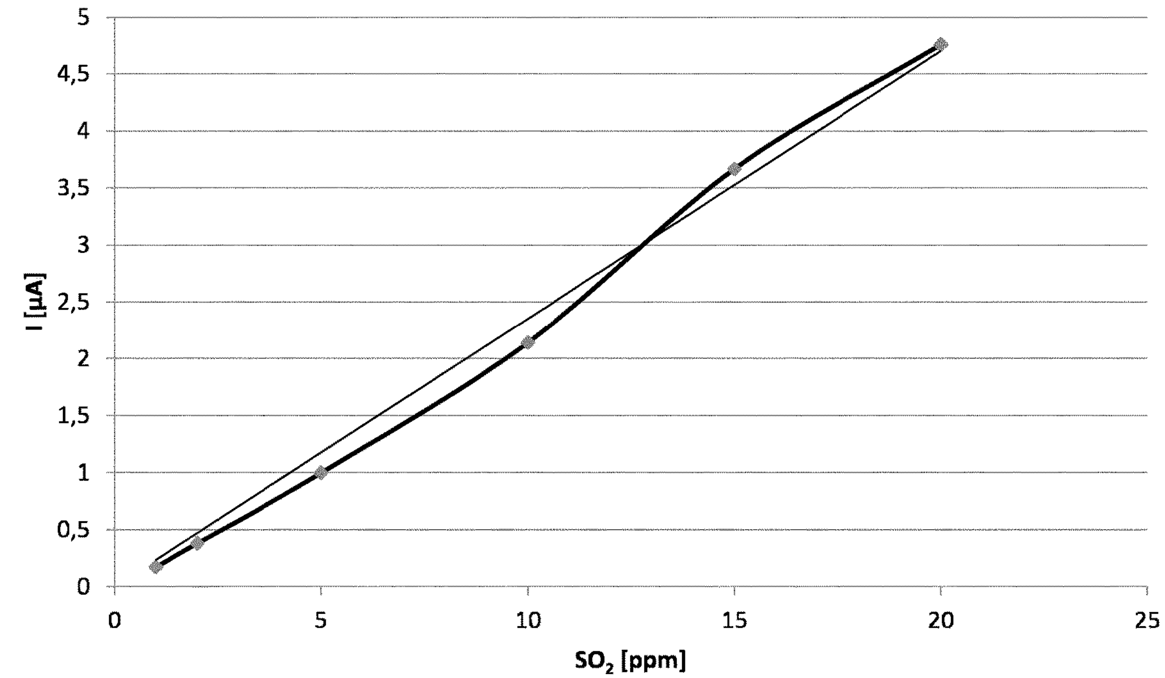

In this case, as can be seen in FIG. 5*c*, the measuring current outputted as a signal is connected linearly with the concentration of the analyte. Here, the concentration of the analyte ($SO_2$ in ppm) is shown on the x axis and the measured signal strength in A is shown on the y axis. The curve K shows in this case the regression line of the mean values of all measurements carried out in total at the concentrations of 1 ppm, 2 ppm, 5 ppm, 10 ppm, 15 ppm und 20 ppm. It can be seen that the measured signal increases linearly with the concentration.

Figure 5D:
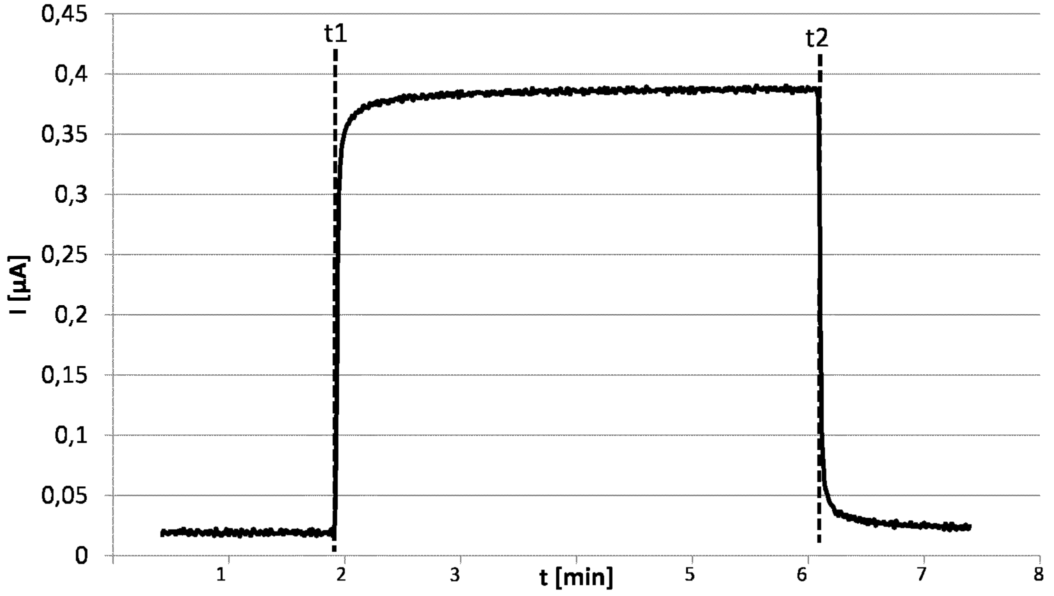

FIG. 5*d* shows the time in seconds on the x axis and the measured signal strength in A on the y axis. Gassing with 2 ppm $SO_2$ was begun at the time t1. Gassing was ended again at the time t2. It can be seen that the gas sensor responds to the presence of the analyte, $SO_2$ in this case, by the signal increasing from 0 μA to about 0.4 μA immediately after the start of the gassing at the time t1 and again returning to 0 μA with the end of the gassing at the time t2.

Example 5

Figure 6:
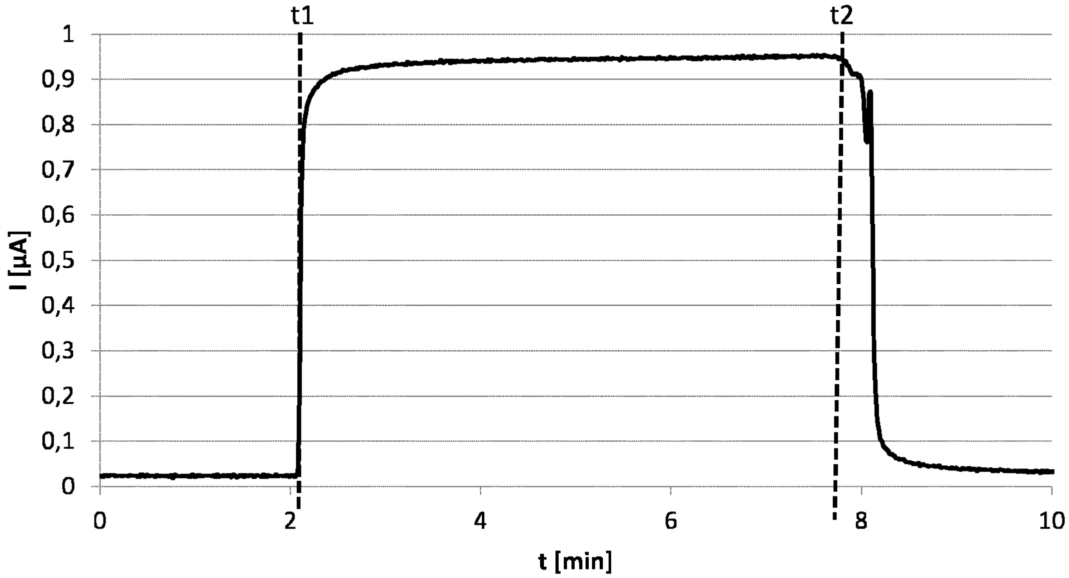
FIG. 6 is the measured curve for Example 5, wherein time is shown on the x axis and the measured signal strength in A is shown on the y axis, gassing the sensor with the measured gas was begun at the time t1 and gassing was ended at the time t2.

In Example 5 an electrochemical gas sensor that had at least one first electrode, a second electrode and an electrolyte was gassed with 5 ppm $SO_2$ for a defined period of time. FIG. 6 shows the measuring curve obtained as a result.

The electrolyte used contains 1-butylpyridinium chloride as the first cyclic compound. Moreover, the electrolyte contains Tris as a buffer substance. The buffer substance is present in a 0.5-molar concentration. Moreover, the electrolyte contains 30 wt. % water. Therefore, $R^1$ is a butyl radical, i.e., a hydrocarbon with 4 C atoms, namely $C_4H_7$, for the cyclic compound according to formula (I). $R^2$ is a hydrogen, A is a pyridine ring and Y is chloride.

The example thus shows an electrolyte and the measuring response of an electrochemical gas sensor with an electrolyte that contain a first cyclic compound according to formula (VI), more precisely according to formula (73) and formula (84), an additional component, namely Tris as a buffer in a 0.5-molar concentration, as well as 30% water.

FIG. 6 shows the time (t) in minutes on the x axis and the measured signal strength (I) in μA on the y axis. Gassing with 5 ppm $SO_2$ was begun at the time t1. Gassing was ended again at the time t2.

It can be seen that the gas sensor responds to the presence of the analyte, $SO_2$ in this case, by the signal increasing from 0 μA to about 0.9 μA immediately after the start of the gassing at the time t1 and again returning to 0 μA with the end of the gassing at the time t2.

Example 6

Figure 7:
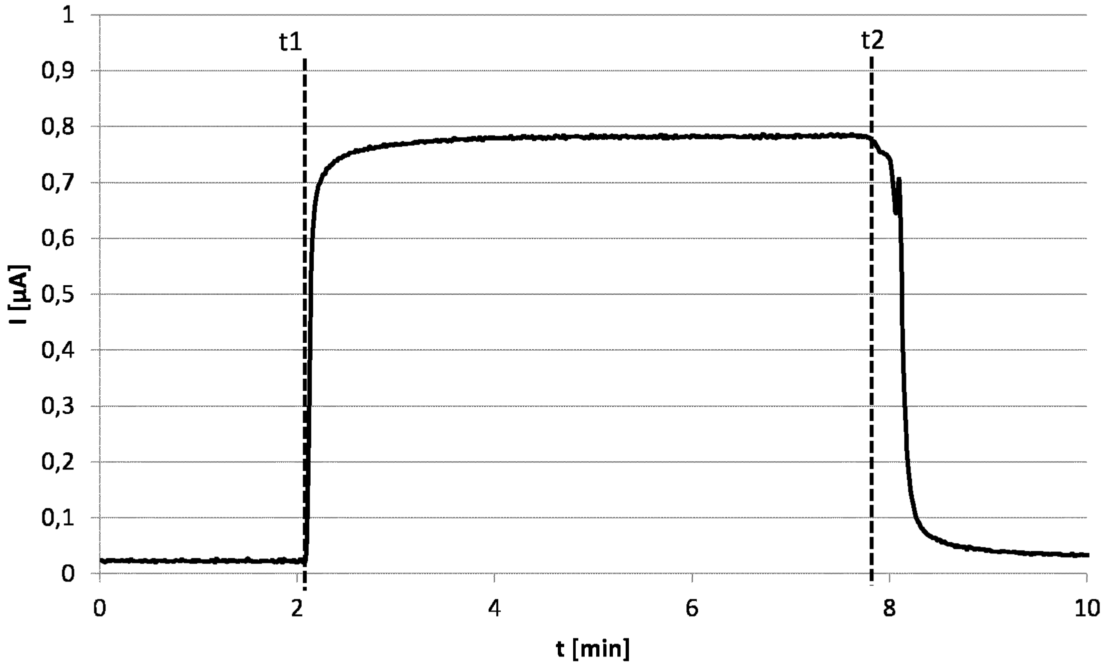
FIG. 7 is the measured curve for Example 6, wherein time is shown on the x axis and the measured signal strength in A is shown on the y axis, gassing the sensor with the measured gas was begun at the time t1 and gassing was ended at the time t2.

In Example 6 an electrochemical gas sensor that had at least one first electrode, a second electrode and an electrolyte was gassed with 5 ppm $SO_2$ for a defined period of time. FIG. 7 shows the measuring curve obtained as a result.

The electrolyte used contains 1-hexylpyridinium chloride as the cyclic compound. Furthermore, the electrolyte contains Tris as a buffer substance. The buffer substance is present in a 0.5-molar concentration. Moreover, the electrolyte contains 30 wt. % water. Therefore, $R^1$ is a hexyl radical, i.e., a hydrocarbon with 6 C atoms, namely $C_6H_{11}$, for the cyclic compound according to formula (I). $R^2$ is a hydrogen, A is a pyridine ring and Y is chloride.

The example thus shows an electrolyte and the measuring response of an electrochemical gas sensor with an electrolyte that contains a first cyclic compound according to formula (VI), more precisely according to formula (75) and formula (86), an additional component, namely Tris as a buffer in a 0.5-molar concentration, as well as 30% water.

FIG. 7 shows the time (t) in minutes on the x axis and the measured signal strength (I) in μA on the y axis. Gassing with 5 ppm $SO_2$ was begun at the time t1. Gassing was ended again at the time t2.

It can be seen that the gas sensor responds to the presence of the analyte, $SO_2$ in this case, by the signal increasing from 0 μA to about 0.8 μA immediately after the start of the gassing at the time t1 and again returning to 0 μA with the end of the gassing at the time t2.

Example 7

Figure 8:
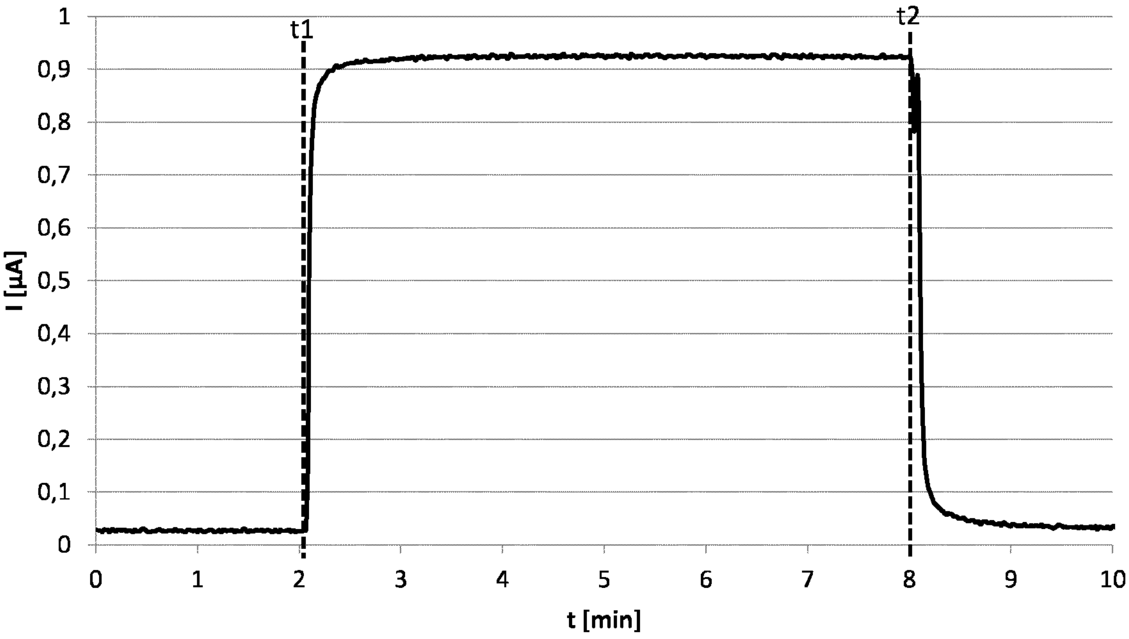
FIG. 8 is the measured curve for Example 7, wherein time is shown on the x axis and the measured signal strength in A is shown on the y axis, gassing the sensor with the measured gas was begun at the time t1 and gassing was ended at the time t2.

In Example 7 an electrochemical gas sensor that had at least one first electrode, a second electrode and an electrolyte was gassed with 5 ppm $SO_2$ for a defined period of time. FIG. 8 shows the measuring curve obtained as a result.

The electrolyte used contains 1-butylpyridinium methanesulfonate as the cyclic compound. The electrolyte contains, moreover, Tris as a buffer substance. The buffer substance is present in a 0.5-molar concentration. Moreover, the electrolyte contains 30 wt. % water.

The example thus shows an electrolyte and the measuring response of an electrochemical gas sensor with an electrolyte that contains a first cyclic compound according to formula (VI), more precisely according to formula (73) and formula (84), an additional component, namely Tris as a buffer in a 0.5-molar concentration, as well as 30% water. Therefore, $R^1$ is a butyl radical, i.e., a hydrocarbon with 4 C atoms, namely $C_4H_7$, for the cyclic compound according to formula (I). $R^2$ is a hydrogen, A is a pyridine ring and Y is methanesulfonate.

FIG. 8 shows the time (t) in minutes on the x axis and the measured signal strength (I) in μA on the y axis. Gassing with 5 ppm $SO_2$ was begun at the time t1. Gassing was ended again at the time t2.

It can be seen that the gas sensor responds to the presence of the analyte, $SO_2$ in this case, by the signal increasing from 0 μA to about 0.9 μA immediately after the start of the gassing at the time t1 and again returning to 0 μA with the end of the gassing at the time t2.

Example 8

Figure 9:
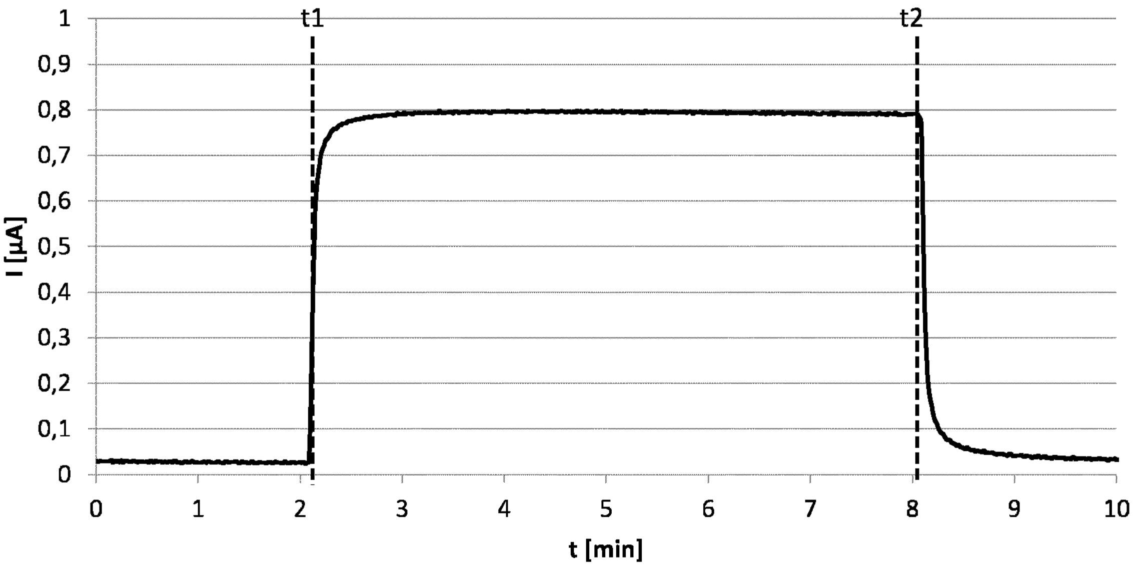
FIG. 9 is the measured curve for Example 8, wherein time is shown on the x axis and the measured signal strength in A is shown on the y axis, gassing the sensor with the measured gas was begun at the time t1 and gassing was ended at the time t2.

In Example 8 an electrochemical gas sensor that had at least one first electrode, a second electrode and an electrolyte was gassed with 5 ppm $SO_2$ for a defined period of time. FIG. 9 shows the measuring curve obtained as a result.

The electrolyte used contains 1-hexylpyridinium methanesulfonate as the cyclic compound. The electrolyte contains, moreover, Tris as a buffer substance. The buffer substance is present in a 0.5-molar concentration. Moreover, the electrolyte contains 30 wt. % water.

Therefore, $R^1$ is a hexyl radical, i.e., a hydrocarbon with 6 C atoms, namely $C_6H_{11}$, for the cyclic compound according to formula (I). $R^2$ is a hydrogen, A is a pyridine ring and Y is methanesulfonate.

The example thus shows an electrolyte and the measuring response of an electrochemical gas sensor with an electrolyte that contains a first cyclic compound according to formula (VI), more precisely according to formula (75) and formula (86), an additional component, namely Tris as a buffer in a 0.5-molar concentration, as well as 30% water.

FIG. 9 shows the time (t) in minutes on the x axis and the measured signal strength (I) in μA on the y axis. Gassing with 5 ppm $SO_2$ was begun at the time t1. Gassing was ended again at the time t2.

It can be seen that the gas sensor responds to the presence of the analyte, $SO_2$ in this case, by the signal increasing from 0 μA to about 0.8 μA immediately after the start of the gassing at the time t1 and again returning to 0 μA with the end of the gassing at the time t2.

Example 9

Figure 10:
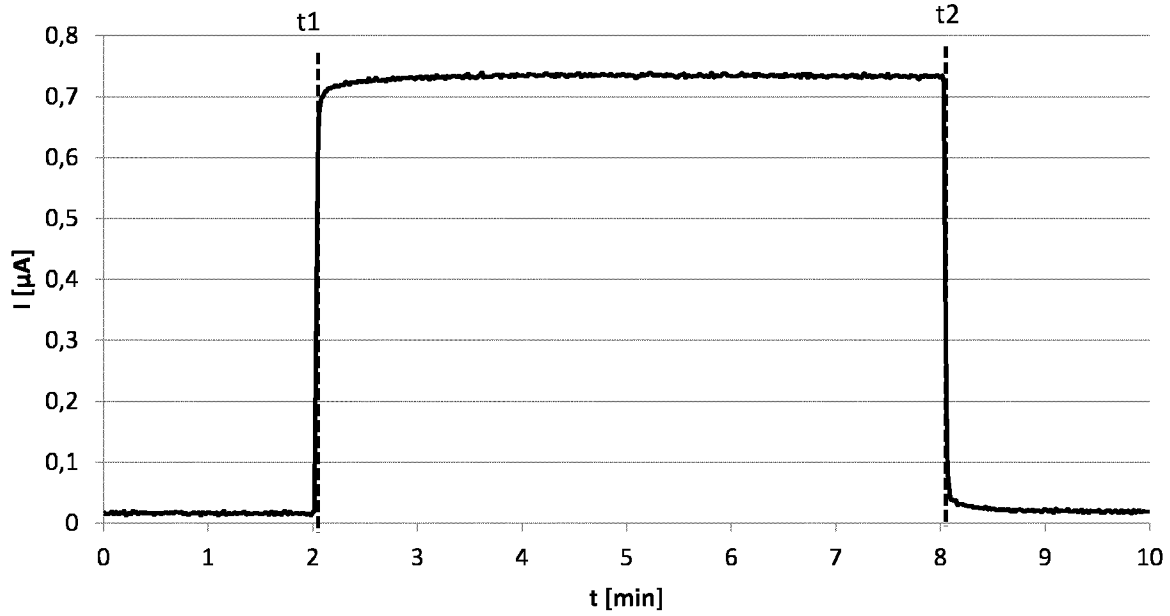
FIG. 10 is the measured curve for Example 9, wherein time is shown on the x axis and the measured signal strength in A is shown on the y axis, gassing the sensor with the measured gas was begun at the time t1 and gassing was ended at the time t2.

In Example 9 an electrochemical gas sensor that had at least one first electrode, a second electrode and an electrolyte was gassed with 5 ppm $SO_2$ for a defined period of time. FIG. 10 shows the measuring curve obtained as a result.

The electrolyte used contains 1-butylpyridinium methanesulfonate as the first cyclic compound and 1-hexylpyridinium methanesulfonate as the second cyclic compound. Furthermore, the electrolyte contains Tris as a buffer substance. The buffer substance is present in a 0.5-molar concentration. The first cyclic compound and the second cyclic compound are present in a ratio to one another of 1:1. Moreover, the electrolyte contains 30 wt. % water. Therefore, $R^1$ is a butyl radical, i.e., a hydrocarbon with 4 C atoms, namely $C_4H_7$, for the first cyclic compound according to formula (I); therefore, $R^1$ is a hexyl radical, i.e., a hydrocarbon with 6 C atoms, namely $C_6H_{11}$, for the second cyclic compound according to formula (I). $R^2$ is a hydrogen for both cyclic compounds. A is a pyridine ring in both cases and Y is methanesulfonate in both cases.

The example thus shows an electrolyte and the measuring response of an electrochemical gas sensor with an electrolyte that contains a first cyclic compound according to formula (VI), more precisely according to formula (73) and formula (84), a second cyclic compound according to formula (VI), more precisely according to formula (75) and formula (86), Tris as a buffer in a 0.5-molar concentration, as well as 30% water.

FIG. 10 shows the time (t) in minutes on the x axis and the measured signal strength (I) in μA on the y axis. Gassing with $SO_2$ was begun at the time t1. Gassing was ended again at the time t2.

It can be seen that the gas sensor responds to the presence of the analyte, $SO_2$ in this case, by the signal increasing from 0 μA to about 0.7 μA immediately after the start of the gassing at the time t1 and again returning to 0 μA with the end of the gassing at the time t2.

Example 10

Figure 11:
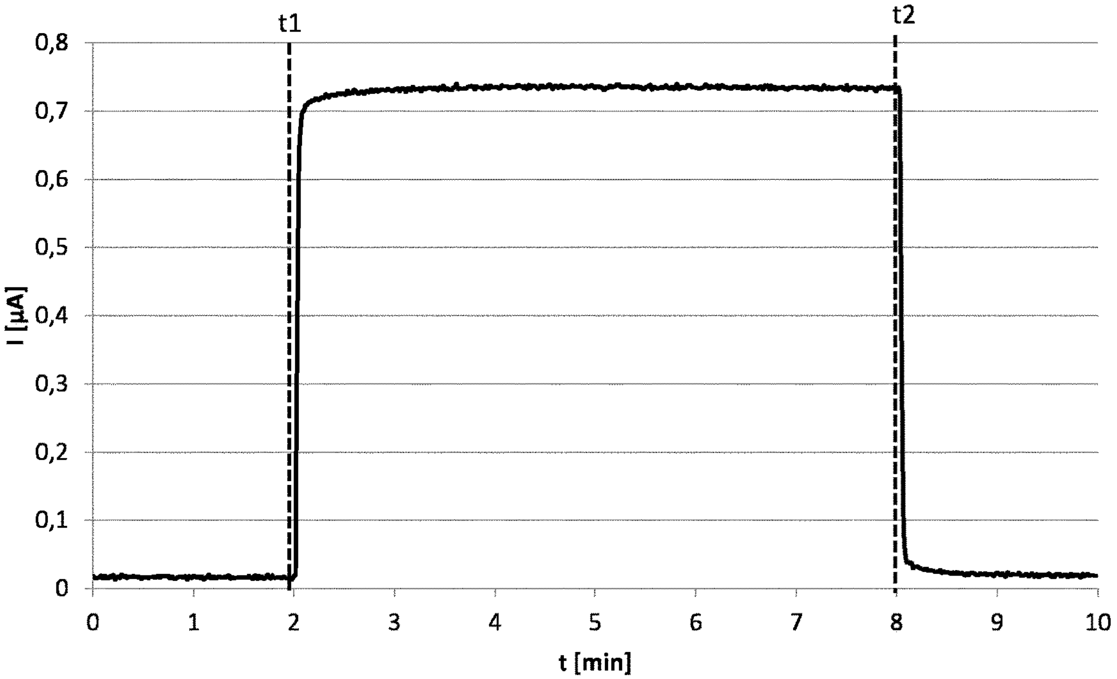
FIG. 11 is the measured curve for Example 10, wherein time is shown on the x axis and the measured signal strength in A is shown on the y axis, gassing the sensor with the measured gas was begun at the time t1 and gassing was ended at the time t2.

In Example 10 an electrochemical gas sensor that had at least one first electrode, a second electrode and an electrolyte was gassed with 5 ppm $SO_2$ for a defined period of time. FIG. 11 shows the measuring curve obtained as a result.

The electrolyte used contains 1-butylpyridinium chloride as the first cyclic compound and 1-butylpyridinium methanesulfonate as the second cyclic compound. Furthermore, the electrolyte contains Tris as a buffer substance. The buffer substance is present in a 0.5-molar concentration. The first cyclic compound and the second cyclic compound are present in a ratio to one another of 1:1. The electrolyte contains, moreover, 20 wt. % water. Therefore, $R^1$ is a butyl radical, i.e., a hydrocarbon with 4 C atoms, namely $C_4H_7$, both for the first cyclic compound according to formula (I) and for the second cyclic compound according to formula (I). $R^2$ is a hydrogen for both cyclic compounds. A is a pyridine ring in both cases. Y is chloride for the first cyclic compound according to formula (I) and Y is methanesulfonate for the second cyclic compound according to formula (I).

The example thus shows an electrolyte and the measuring response of an electrochemical gas sensor with an electrolyte that contains a first cyclic compound according to formula (VI), more precisely according to formula (73) and formula (84), a second cyclic compound according to formula (VI), more precisely according to formula (73) and formula (84), Tris as a buffer in a 0.5-molar concentration, as well as 20% water.

FIG. 11 shows the time (t) in seconds on the x axis and the measured signal strength (I) in μA on the y axis. Gassing with $SO_2$ was begun at the time t1. Gassing was ended again at the time t2.

It can be seen that the gas sensor responds to the presence of the analyte, $SO_2$ in this case, by the signal increasing from 0 μA to about 0.7 μA immediately after the start of the gassing at the time t1 and again returning to 0 μA with the end of the gassing at the time t2.

Example 11

Figure 12:
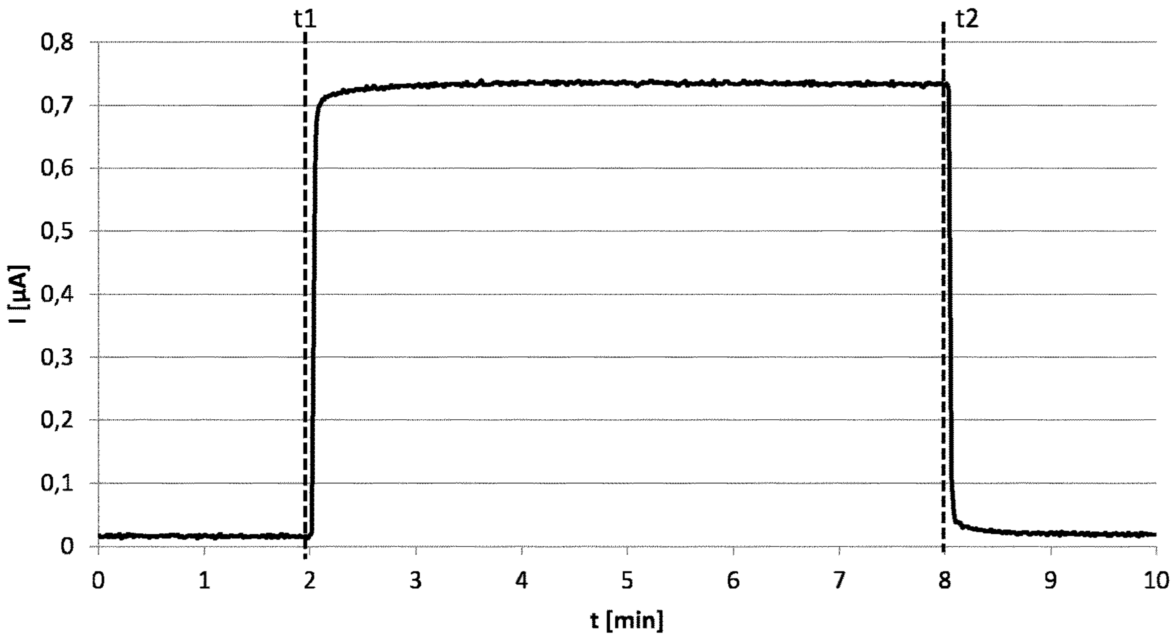
FIG. 12 is the measured curve for Example 11, wherein time is shown on the x axis and the measured signal strength in A is shown on the y axis, gassing the sensor with the measured gas was begun at the time t1 and gassing was ended at the time t2.

In Example 11 an electrochemical gas sensor that had at least one first electrode, a second electrode and an electrolyte was gassed with 5 ppm $SO_2$ for a defined period of time. FIG. 12 shows the measuring curve obtained as a result.

The electrolyte used contains 1-hexylpyridinium chloride as the first cyclic compound and 1-hexylpyridinium methanesulfonate as the second cyclic compound. Furthermore, the electrolyte contains Tris as a buffer substance. The buffer substance is present in a 0.5-molar concentration. The first cyclic compound and the second cyclic compound are present in a ratio to one another of 1:1. The electrolyte contains, moreover, 30 wt. % water. Therefore, $R^1$ is a hexyl radical, i.e., a hydrocarbon with 6 C atoms, namely $C_6H_{11}$, both for the first cyclic compound and for the second cyclic compound according to formula (I). $R^2$ is a hydrogen for both cyclic compounds. A is a pyridine ring in both cases. Y is chloride for the first cyclic compound according to formula (I) and Y is methanesulfonate for the second cyclic compound according to formula (I).

The example thus shows an electrolyte and the measuring response of an electrochemical gas sensor with an electrolyte that contains a first cyclic compound according to formula (VI), more precisely according to formula (75) and formula (86), a second cyclic compound according to formula (VI), more precisely according to formula (75) and formula (86), Tris as a buffer in a 0.5-molar concentration, as well as 30% water.

FIG. 12 shows the time (t) in minutes on the x axis and the measured signal strength (I) in μA on the y axis. Gassing with $SO_2$ was begun at the time t1. Gassing was ended again at the time t2.

It can be seen that the gas sensor responds to the presence of the analyte, $SO_2$ in this case, by the signal increasing from 0 μA to about 0.6 μA immediately after the start of the gassing at the time t1 and again returning to 0 μA with the end of the gassing at the time t2.

Example 12

Figure 13:
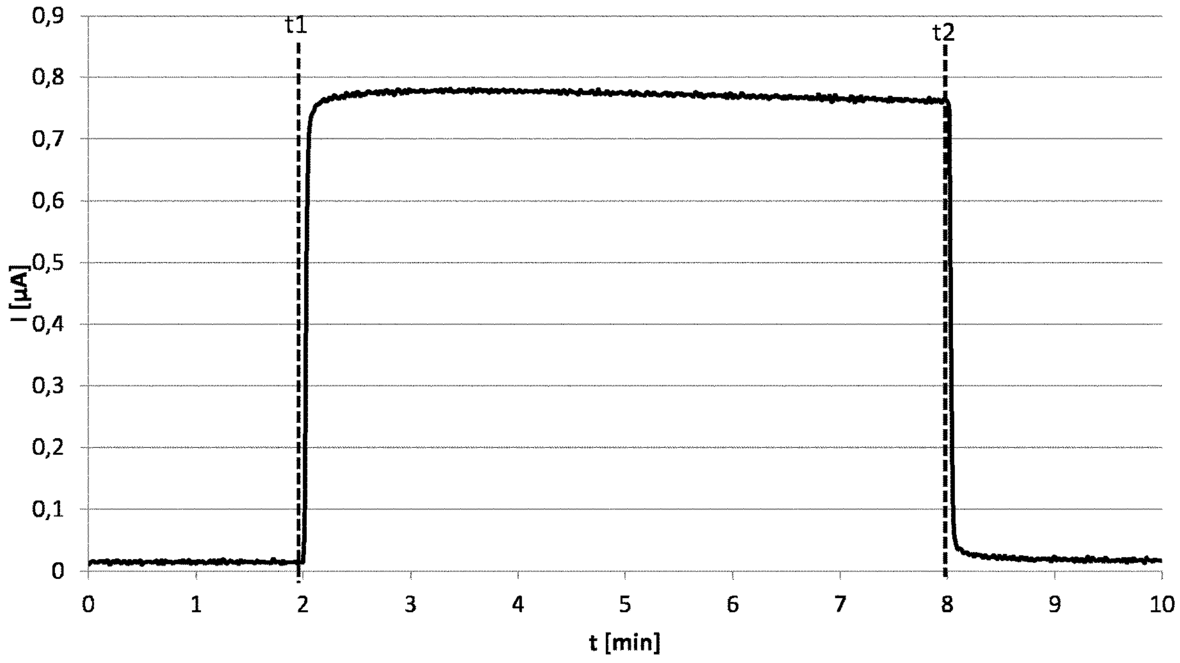
FIG. 13 is the measured curve for Example 12, wherein time is shown on the x axis and the measured signal strength in A is shown on the y axis, gassing the sensor with the measured gas was begun at the time t1 and gassing was ended at the time t2.

In Example 12 an electrochemical gas sensor that had at least one first electrode, a second electrode and an electrolyte was gassed with 5 ppm $SO_2$ for a defined period of time. FIG. 13 shows the measuring curve obtained as a result.

The electrolyte used contains 1-hexylpyridinium chloride as the first cyclic compound and 1-butylpyridinium methanesulfonate as the second cyclic compound. Furthermore, the electrolyte contains Tris as a buffer substance. The buffer substance is present in a 0.5-molar concentration. The first cyclic compound and the second cyclic compound are present in a ratio to one another of 1:1. The electrolyte contains, moreover, 30 wt. % water. Therefore, $R^1$ is a hexyl radical, i.e., a hydrocarbon with 6 C atoms, namely $C_6H_{11}$, for the first cyclic compound according to formula (I) and $R^1$ is a butyl radical, i.e., a hydrocarbon with 4 C atoms, namely $C_4H_7$ for the second cyclic compound according to formula (I). $R^2$ is a hydrogen for both cyclic compounds. A is a pyridine ring in both cases. Y is chloride for the first cyclic compound according to formula (I) and methanesulfonate for the second cyclic compound according to formula (I).

The example thus shows an electrolyte and the measuring response of an electrochemical gas sensor with an electrolyte that contains a first cyclic compound according to formula (VI), more precisely according to formula (75) and formula (86), a second cyclic compound according to formula (VI), more precisely according to formula (73) and formula (84), Tris as a buffer in a 0.5-molar concentration, as well as 30% water.

FIG. 13 shows the time (t) in minutes on the x axis and the measured signal strength (I) in μA on the y axis. Gassing with $SO_2$ was begun at the time t1. Gassing was ended again at the time t2.

It can be seen that the gas sensor responds to the presence of the analyte, $SO_2$ in this case, by the signal increasing from 0 μA to about 0.8 μA immediately after the start of the gassing at the time t1 and again returning to 0 μA with the end of the gassing at the time t2.

Example 13

Figure 14:
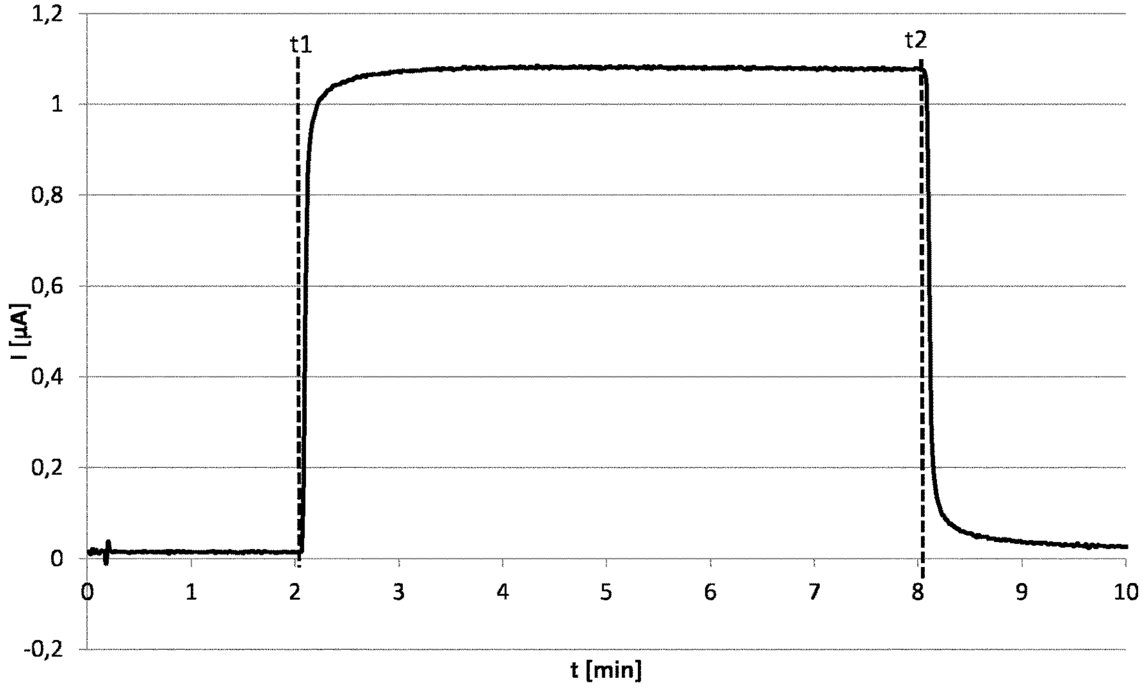
FIG. 14 is the measured curve for Example 13, wherein time is shown on the x axis and the measured signal strength in A is shown on the y axis, gassing the sensor with the measured gas was begun at the time t1 and gassing was ended at the time t2.

In Example 13 an electrochemical gas sensor that had at least one first electrode, a second electrode and an electrolyte was gassed with 5 ppm $SO_2$ for a defined period of time. FIG. 14 shows the measuring curve obtained as a result.

The electrolyte used contains 1-hexylpyridinium chloride as the first cyclic compound and 1-butylpyridinium chloride as the second cyclic compound. Furthermore, the electrolyte contains BisTris as a buffer substance. The buffer substance is present in a 0.5-molar concentration. The first cyclic compound and the second cyclic compound are present in a ratio to one another of 1:1. Moreover, the electrolyte contains 20 wt. % water. Therefore, $R^1$ is a hexyl radical, i.e., a hydrocarbon with 6 C atoms, namely $C_6H_{11}$, for the first cyclic compound according to formula (I), and $R^1$ is a butyl radical, i.e., a hydrocarbon with 4 C atoms, namely $C_4H_7$ for the second cyclic compound according to formula (I). $R^2$ is a hydrogen for both cyclic compounds. A is a pyridine ring and Y is chloride in both cases.

The example thus shows an electrolyte and the measuring response of an electrochemical gas sensor with an electrolyte that contains a first cyclic compound according to formula (VI), more precisely according to formula (75) and formula (86), a second cyclic compound according to formula (VI), more precisely according to formula (73) and formula (84), BisTris as a buffer in a 0.5-molar concentration, as well as 20% water.

FIG. 14 shows the time (t) in minutes on the x axis and the measured signal strength (I) in μA on the y axis. Gassing with $SO_2$ was begun at the time t1. Gassing was ended again at the time t2.

It can be seen that the gas sensor responds to the presence of the analyte, $SO_2$ in this case, by the signal increasing from 0 μA to about 1 μA immediately after the start of the gassing at the time t1 and again returning to 0 μA with the end of the gassing at the time t2.

Example 14

Figure 15:
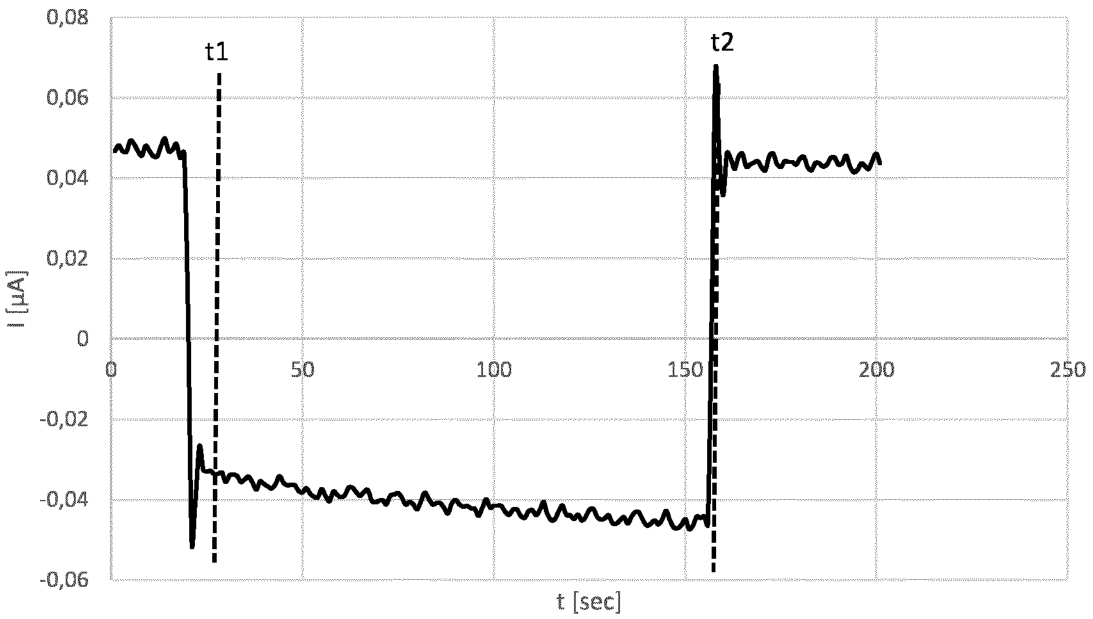
FIG. 15 is the measured curve for Example 14, wherein time is shown on the x axis and the measured signal strength in A is shown on the y axis, gassing the sensor with the measured gas was begun at the time t1 and gassing was ended at the time t2.

In Example 14 an electrochemical gas sensor that had at least one first electrode, a second electrode and an electrolyte was gassed with 5 ppm $NO_2$ for a defined period of time. FIG. 15 shows the measuring curve obtained as a result.

The electrolyte used contains 1-hexylpyridinium chloride as the first cyclic compound and 1-butylpyridinium chloride as the second cyclic compound. Furthermore, the electrolyte contains BisTris as a buffer substance. The buffer substance is present in a 0.5-molar concentration. The first cyclic compound and the second cyclic compound are present in a ratio to one another of 1:1. Moreover, the electrolyte contains 20 wt. % water. Therefore, $R^1$ is a hexyl radical, i.e., a hydrocarbon with 6 C atoms, namely $C_6H_{11}$, for the first cyclic compound according to formula (I); therefore, $R^1$ is a butyl radical, i.e., a hydrocarbon with 4 C atoms, namely $C_4H_7$ for the second cyclic compound according to formula (I). $R^2$ is a hydrogen for both cyclic compounds. A is a pyridine ring and Y is chloride in both cases.

The example thus shows an electrolyte and the measuring response of an electrochemical gas sensor with an electrolyte that contains a first cyclic compound according to formula (VI), more precisely according to formula (75) and formula (86), a second cyclic compound according to formula (VI), more precisely according to formula (73) and formula (84), BisTris as a buffer in a 0.5-molar concentration, as well as 20% water.

FIG. 15 shows the time (t) in seconds on the x axis and the measured signal strength (I) in μA on the y axis. Gassing with $NO_2$ was begun at the time t1. Gassing was ended again at the time t2.

It can be seen that the gas sensor responds to the presence of the analyte, $NO_2$ in this case, by the signal increasing from +0.01 μA to about −0.04 μA immediately after the start of the gassing at the time t1 and again returning to +0.01 μA with the end of the gassing at the time t2.

Example 15

Figure 16:
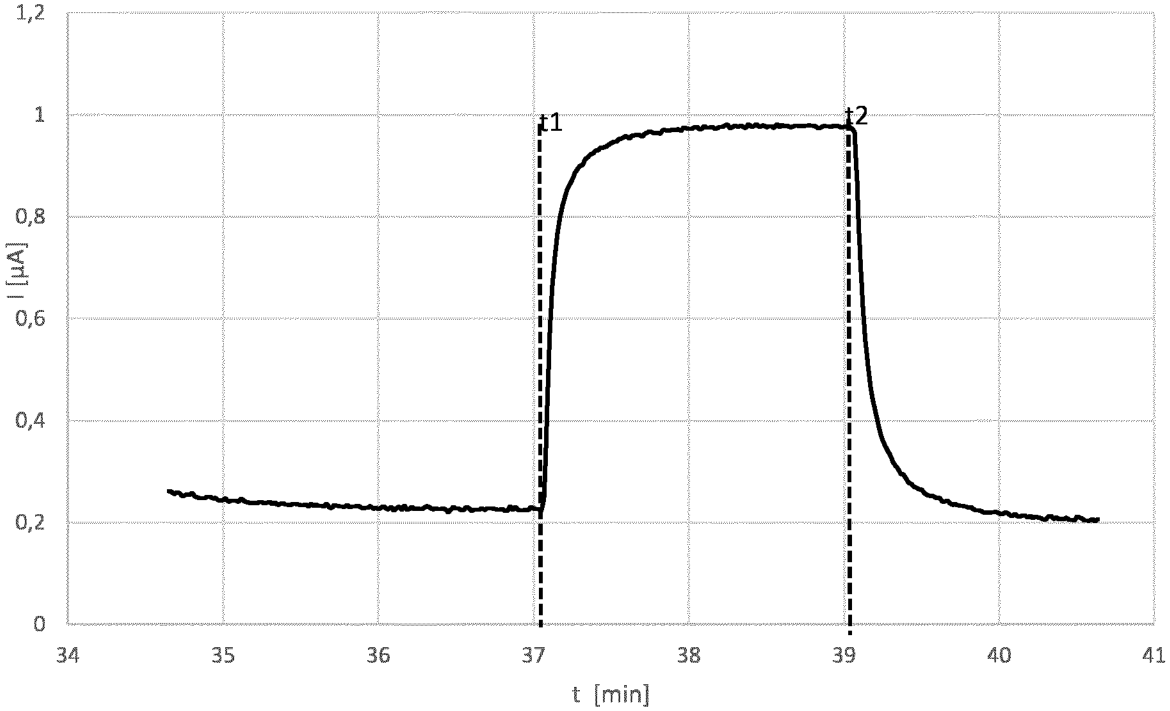
FIG. 16 is the measured curve for Example 15, wherein time is shown on the x axis and the measured signal strength in A is shown on the y axis, gassing the sensor with the measured gas was begun at the time t1 and gassing was ended at the time t2.

In Example 15 an electrochemical gas sensor that had at least one first electrode, a second electrode and an electrolyte was gassed with 5 ppm $SO_2$ for a defined period of time. FIG. 16 shows the measuring curve obtained as a result.

The electrolyte used contains 1-hexylpyridinium chloride as the first cyclic compound and 1-butylpyridinium chloride as the second cyclic compound. Furthermore, the electrolyte contains EGTA as a buffer substance. The buffer substance is present in a 0.25-molar concentration. The first cyclic compound and the second cyclic compound are present in a ratio to one another of 1:1. Moreover, the electrolyte contains 23 wt. % water. Therefore, $R^1$ is a hexyl radical, i.e., a hydrocarbon with 6 C atoms, namely $C_6H_{11}$, for the first cyclic compound according to formula (I); therefore, $R^1$ is a butyl radical, i.e., a hydrocarbon with 4 C atoms, namely $C_4H_7$ for the second cyclic compound according to formula (I). $R^2$ is a hydrogen for both cyclic compounds. A is a pyridine ring and Y is chloride in both cases.

The example thus shows an electrolyte and the measuring response of an electrochemical gas sensor with an electrolyte that contains a first cyclic compound according to formula (VI), more precisely according to formula (75) and formula (86), a second cyclic compound according to formula (VI), more precisely according to formula (73) and formula (84), EGTA as a buffer in a 0.25-molar concentration, as well as 23% water.

FIG. 16 shows the time (t) in minutes on the x axis and the measured signal strength (I) in μA on the y axis. Gassing with $SO_2$ was begun at the time t1. Gassing was ended again at the time t2.

It can be seen that the gas sensor responds to the presence of the analyte, $SO_2$ in this case, by the signal increasing from 0.2 μA to about 1 μA immediately after the start of the gassing at the time t1 and again returning to 0.2 μA with the end of the gassing at the time t2.

Example 16

Figure 17:
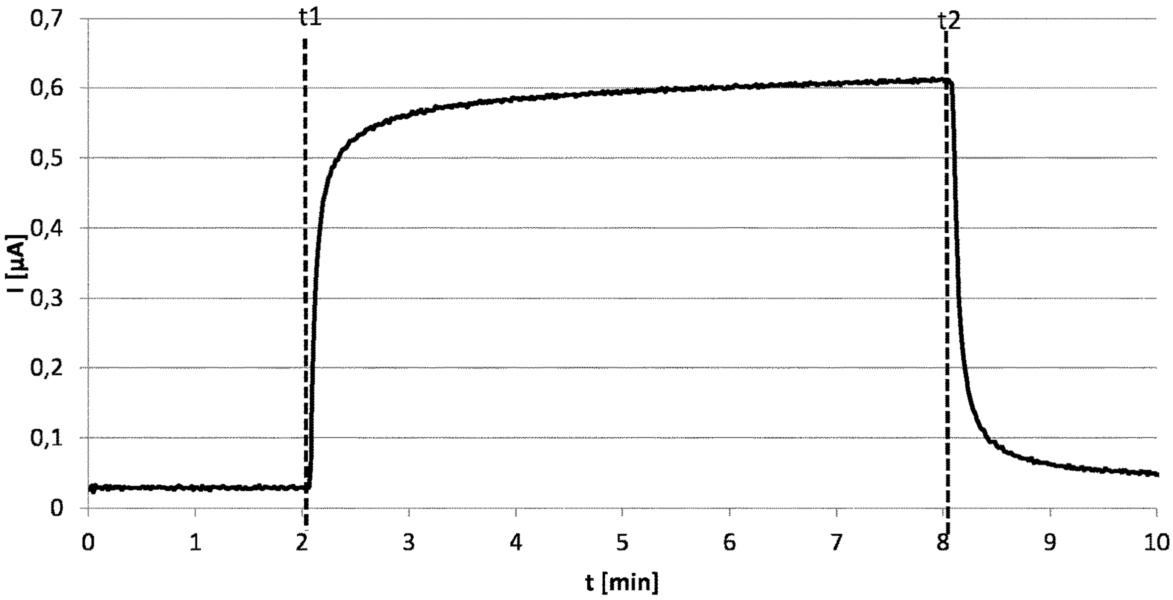
FIG. 17 is the measured curve for Example 16, wherein time is shown on the x axis and the measured signal strength in A is shown on the y axis, gassing the sensor with the measured gas was begun at the time t1 and gassing was ended at the time t2.

In Example 16 an electrochemical gas sensor that had at least one first electrode, a second electrode and an electrolyte was gassed with 5 ppm $SO_2$ for a defined period of time. FIG. 17 shows the measuring curve obtained as a result.

The electrolyte used contains 1-hexylpyridinium chloride as the first cyclic compound and 1-butylpyridinium chloride as the second cyclic compound. Furthermore, the electrolyte contains ADA (N-(2-acetamido)-iminodiacetic acid) as a buffer substance. The buffer substance is present in a 0.5-molar concentration. The first cyclic compound and the second cyclic compound are present in a ratio to one another of 1:1. Moreover, the electrolyte contains 30 wt. % water. Therefore, $R^1$ is a hexyl radical, i.e., a hydrocarbon with 6 C atoms, namely $C_6H_{11}$, for the first cyclic compound according to formula (I); therefore, $R^1$ is a butyl radical, i.e., a hydrocarbon with 4 C atoms, namely $C_4H_7$ for the second cyclic compound according to formula (I). $R^2$ is a hydrogen for both cyclic compounds. A is a pyridine ring and Y is chloride in both cases.

The example thus shows an electrolyte and the measuring response of an electrochemical gas sensor with an electrolyte that contains a first cyclic compound according to formula (VI), more precisely according to formula (75) and formula (86), a second cyclic compound according to formula (VI), more precisely according to formula (73) and formula (84), ADA as a buffer in a 0.5-molar concentration, as well as 30% water.

FIG. 17 shows the time (t) in minutes on the x axis and the measured signal strength (I) in μA on the y axis. Gassing with $SO_2$ was begun at the time t1. Gassing was ended again at the time t2.

It can be seen that the gas sensor responds to the presence of the analyte, $SO_2$ in this case, by the signal increasing from 0 μA to about 0.6 μA immediately after the start of the gassing at the time t1 and again returning to 0 μA with the end of the gassing at the time t2.

Example 17

Figure 18:
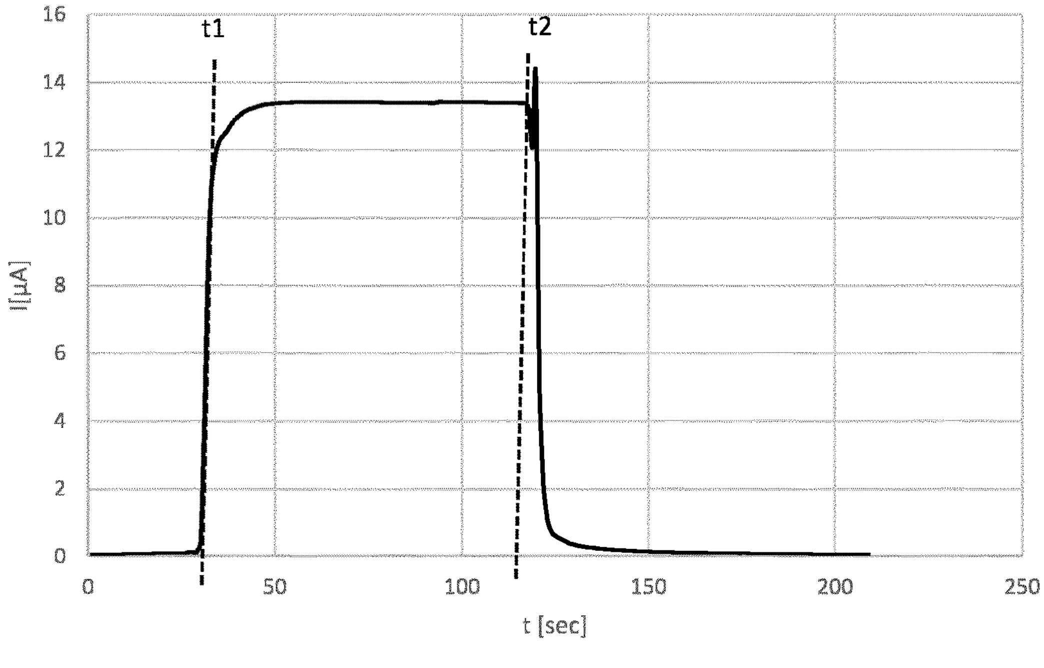
FIG. 18 is the measured curve for Example 17, wherein time is shown on the x axis and the measured signal strength in A is shown on the y axis, gassing the sensor with the measured gas was begun at the time t1 and gassing was ended at the time t2.

In Example 17 an electrochemical gas sensor that had at least one first electrode, a second electrode and an electrolyte was gassed with 20 ppm $SO_2$ for a defined period of time. FIG. 18 shows the measuring curve obtained as a result.

The electrolyte used contains 1-methyl-1-propylpyridinium chloride as the first cyclic compound and 1-butyl-4-methylpyridinium chloride as the second cyclic compound. The electrolyte contains, furthermore, potassium hydrogen phthalate as a buffer substance, as well as $CuCl_2$ as a mediator (reaction mediator). The buffer substance is present in a 0.37-molar concentration, and the reaction mediator is present in a 0.37-molar concentration. The first cyclic compound and the second cyclic compound are present in a ratio to one another of 1:1. Moreover, the electrolyte contains 20 wt. % water. Therefore, $R^1$ is a methyl radical, i.e., a hydrocarbon with 1 C atom, namely $CH_3$, for the first cyclic compound according to formula (I); therefore, $R^1$ is a butyl radical, i.e., a hydrocarbon with 4 C atoms, namely $C_4H_7$, for the second cyclic compound according to formula (I). $R^2$ is a propyl radical, i.e., a hydrocarbon radical with 3 C atoms for the first cyclic compound and it is a methyl radical, i.e., a hydrocarbon radical with 1 C atom for the second cyclic compound. A is a piperidine ring for the first cyclic compound, a pyridine ring for the second cyclic compound, and Y is chloride in both cases.

The example thus shows an electrolyte and the measuring response of an electrochemical gas sensor with an electrolyte that contains a first cyclic compound according to formula (VII), more precisely according to formula (47), a second cyclic compound according to formula (VI), more precisely according to formula (73) and formula (84), potassium hydrogen phthalate as a buffer, $CuCl_2$ as a reaction mediator, as well as 20% water.

FIG. 18 shows the time (t) in minutes on the x axis and the measured signal strength (I) in μA on the y axis. The sensor was gassed over two cycles of about 1.5 minutes each. Each gassing was begun at the times t1 and t3. Each gassing was ended again at the times t2 and t4.

It can be seen that the gas sensor responds to the presence of the analyte, $SO_2$ in this case, by the signal increasing from 0 μA to about 16 μA immediately after the start of the gassing in all three cycles and again returning to 0 μA with the end of the gassing.

Example 18

Figure 19:
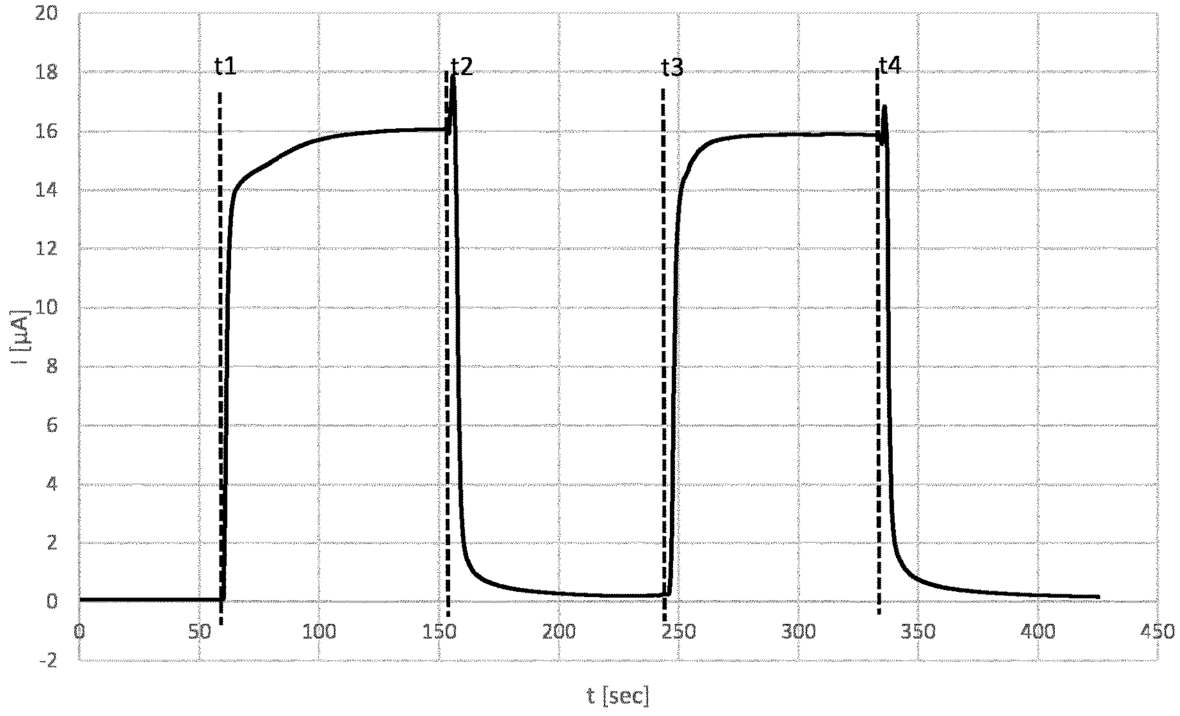
FIG. 19 is the measured curve for Example 18, wherein time is shown on the x axis and the measured signal strength in A is shown on the y axis, gassing the sensor with the measured gas was begun at the times t1 and t3 each and gassing was ended at the times t2 and t4 each.

In Example 18 an electrochemical gas sensor that had at least one first electrode, a second electrode and an electrolyte was gassed with 20 ppm $SO_2$ for a defined period of time. FIG. 19 shows the measuring curve obtained as a result.

The electrolyte used contains 1-methyl-1-propylpyridinium chloride as the first cyclic compound and 1-butyl-3-methylpyridinium chloride as the second cyclic compound. The electrolyte contains, furthermore, potassium hydrogen phthalate as a buffer substance, as well as $CuCl_2$ as a mediator (reaction mediator). The buffer substance is present in a 0.37-molar concentration, and the reaction mediator is present in a 0.37-molar concentration. The first cyclic compound and the second cyclic compound are present in a ratio to one another of 1:1. Moreover, the electrolyte contains 20 wt. % water. Therefore, $R^1$ is a methyl radical, i.e., a hydrocarbon with 1 C atom, namely $CH_3$, for the first cyclic compound according to formula (I); therefore, $R^1$ is a butyl radical, i.e., a hydrocarbon with 4 C atoms, namely $C_4H_7$, for the second cyclic compound according to formula (I). $R^2$ is a propyl radical, i.e., a hydrocarbon radical with 3 C atoms for the first cyclic compound and it is a methyl radical, i.e., a hydrocarbon radical with 1 C atom for the second cyclic compound. A is a piperidine ring for the first cyclic compound, a pyridine ring for the second cyclic compound, and Y is chloride in both cases.

The example thus shows an electrolyte and the measuring response of an electrochemical gas sensor with an electrolyte that contains a first cyclic compound according to formula (VII), more precisely according to formula (47), a second cyclic compound according to formula (VI), more precisely according to formula (73) and formula (84), potassium hydrogen phthalate as a buffer, $CuCl_2$ as a reaction mediator, as well as 20% water.

FIG. 19 shows the time (t) in seconds on the x axis and the measured signal strength (I) in μA on the y axis. The sensor was gassed over two cycles of about 1.5 minutes each. Each gassing was begun at the times t1 and t3. Each gassing was ended again at the times t2 and t4.

It can be seen that the gas sensor responds to the presence of the analyte, $SO_2$ in this case, by the signal increasing from 0 μA to about 16 μA immediately after the start of the gassing in all three cycles and again returning to 0 μA with the end of the gassing.

Example 19

Figure 20:
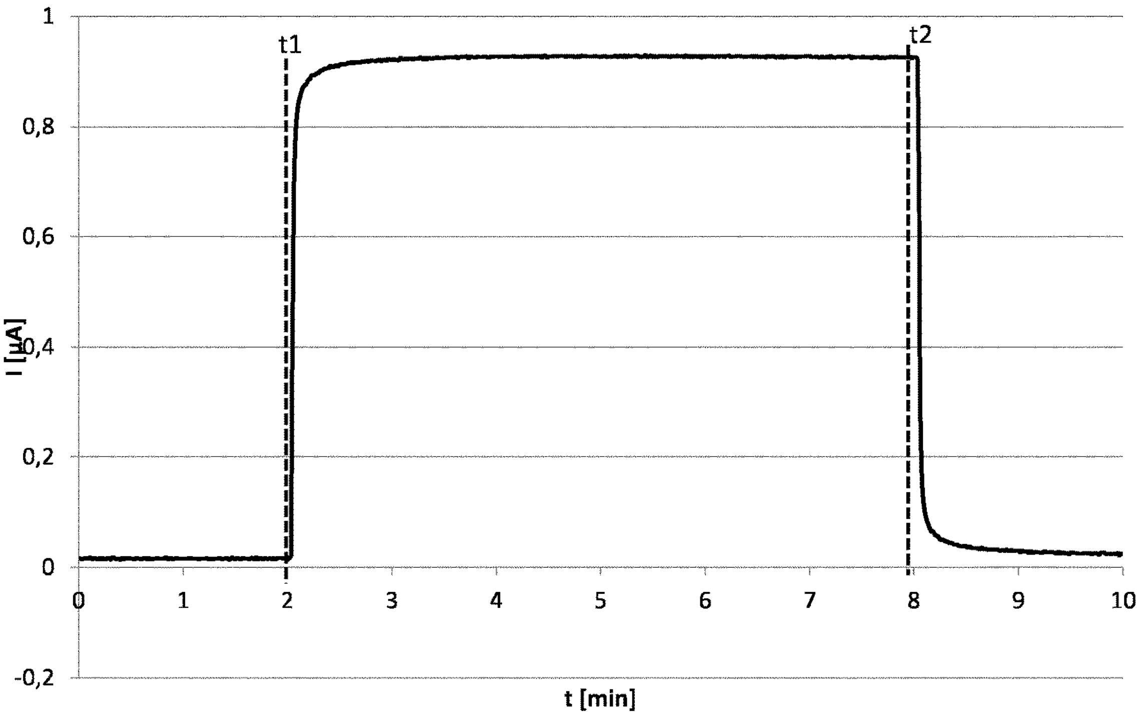
FIG. 20 is the measured curve for Example 19, wherein time is shown on the x axis and the measured signal strength in A is shown on the y axis, gassing the sensor with the measured gas was begun at the time t1 and gassing was ended at the time t2.

In Example 19 an electrochemical gas sensor that had at least one first electrode, a second electrode and an electrolyte was gassed with 5 ppm $SO_2$ for a defined period of time. FIG. 20 shows the measuring curve obtained as a result.

The electrolyte used contains 1-butylpyridinium chloride as the first cyclic compound and 1-hexylpyridinium methanesulfonate as the second cyclic compound. The electrolyte contains, furthermore, BisTris as a buffer substance, as well as ethylene glycol (1,2,3-propanetriol) as an addition. The buffer substance is present in a 0.5-molar concentration, and the addition is present in a 0.16-molar concentration. Moreover, the electrolyte contains 30 wt. % water. Therefore, $R^1$ is a butyl radical, i.e., a hydrocarbon with 4 C atoms, namely $C_4H_7$, for the cyclic compound according to formula (I); $R^2$ is a hydrogen atom, A is a pyridine ring and Y is chloride; therefore, $R^1$ is a hexyl radical, i.e., a hydrocarbon with 6 C atoms, namely $C_6H_{13}$, for the second cyclic compound according to formula (I). $R^2$ is a hydrogen for both cyclic compounds. A is a pyridine ring and Y is methanesulfonate in both cases.

The example thus shows an electrolyte and the measuring response of an electrochemical gas sensor with an electrolyte that contains a cyclic compound according to formula (VI), more precisely according to formula (73) and formula (84), BisTris as a buffer, ethylene glycol as an addition, as well as 30% water.

FIG. 20 shows the time (t) in minutes on the x axis and the measured signal strength (I) in μA on the y axis. The sensor was gassed over a period of about 6 minutes. Each gassing began at the time t1. Gassing was reset at the time t2.

It can be seen that the gas sensor responds to the presence of the analyte, $SO_2$ in this case, by the signal increasing from 0 μA to about 0.9 μA immediately after the start of the gassing at the time t1 and again returning to 0 μA with the end of the gassing.

Example 20

Figure 21:
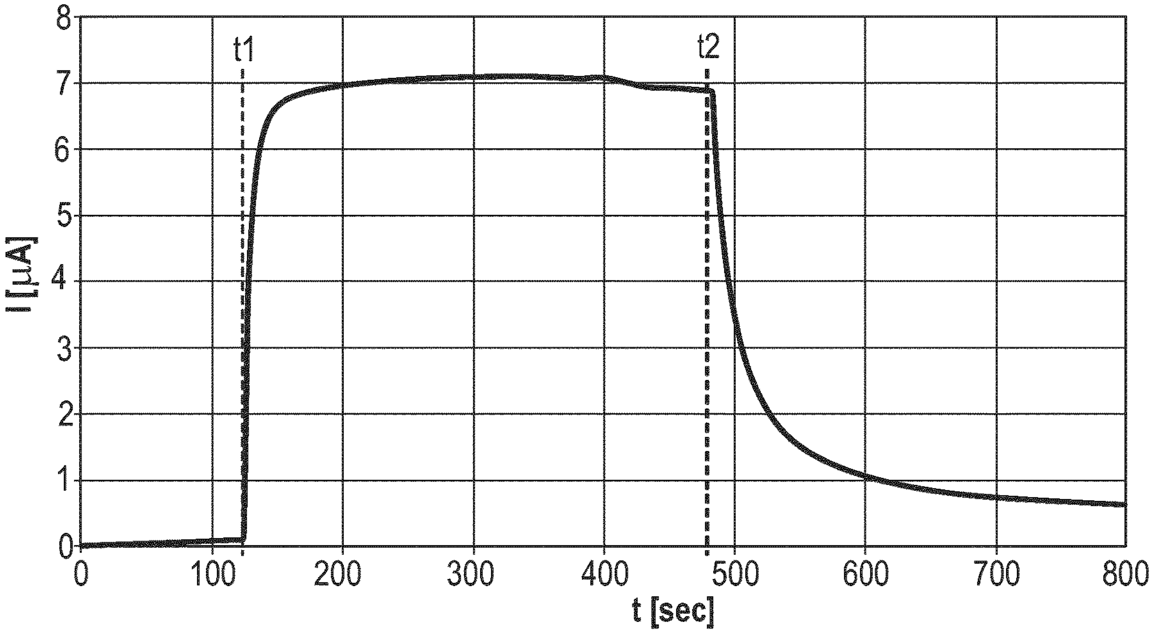
FIG. 21 is the measured curve for Example 20, wherein time is shown on the x axis and the measured signal strength in A is shown on the y axis, gassing the sensor with the measured gas was begun at the time t1 and gassing was ended at the time t2.

In Example 20 an electrochemical gas sensor that had at least one first electrode, a second electrode and an electrolyte was gassed with 20 ppm $SO_2$ for a defined period of time. FIG. 21 shows the measuring curve obtained as a result.

The electrolyte used contains 1-methyl-1-propylpiperidinium chloride as the first cyclic compound and 1-butyl-2-methylpyridinium chloride as the second cyclic compound. The electrolyte contains, furthermore, potassium hydrogen phthalate as a buffer substance, as well as $CuCl_2$ as a mediator (reaction mediator). The buffer substance is present in a 0.5-molar concentration, and the reaction mediator is present in a 0.1-molar concentration. The first cyclic compound and the second cyclic compound are present in a ratio to one another of 1:1. Moreover, the electrolyte contains 30 wt. % water. Therefore, $R^1$ is a methyl radical, i.e., a hydrocarbon with 1 C atom, namely $CH_3$, for the first cyclic compound according to formula (I); therefore, $R^1$ is a butyl radical, i.e., a hydrocarbon with 4 C atoms, namely $C_4H_7$, for the second cyclic compound according to formula (I). $R^2$ is a propyl radical, i.e., a hydrocarbon radical with 3 C atoms, for the first cyclic compound, and it is a methyl radical, i.e., a hydrocarbon radical with 1 C atom for the second cyclic compound. A is a piperidine ring for the first cyclic compound, a pyridine ring for the second cyclic compound, and Y is chloride in both cases.

The example thus shows an electrolyte and the measuring response of an electrochemical gas sensor with an electrolyte that contains a first cyclic compound according to formula (VII), more precisely according to formula (47), a second cyclic compound according to formula (VI), more precisely according to formula (73) and formula (84), potassium hydrogen phthalate as a buffer, $CuCl_2$ as a reaction mediator, as well as 30% water.

FIG. 21 shows the time (t) in seconds on the x axis and the measured signal strength (I) in μA on the y axis. Gassing began at the time t1. The respective gassing was reset at the time t2.

It can be seen that the gas sensor responds to the presence of the analyte, $SO_2$ in this case, by the signal increasing from 0 μA to about 5 μA immediately after the start of the gassing and again dropping to 0.5 μA with the end of the gassing.

Example 21

Figure 22:
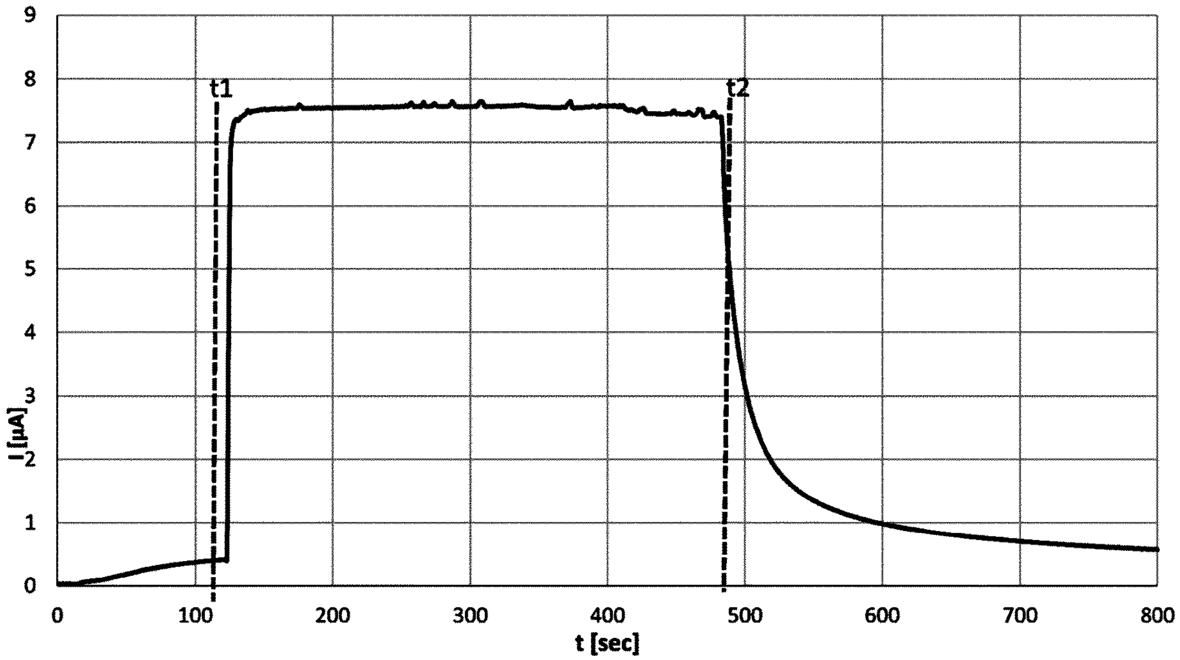
FIG. 22 is the measured curve for Example 21, wherein time is shown on the x axis and the measured signal strength in A is shown on the y axis, gassing the sensor with the measured gas was begun at the time t1 and gassing was ended at the time t2.

In Example 21 an electrochemical gas sensor that had at least one first electrode, a second electrode and an electrolyte was gassed with 20 ppm $SO_2$ for a defined period of time. FIG. 22 shows the measuring curve obtained as a result.

The electrolyte used contains 1-methyl-1-propylpiperidinium chloride as the first cyclic compound and 1-butyl-3-methylpyridinium chloride as the second cyclic compound. The electrolyte contains, furthermore, potassium hydrogen phthalate as a buffer substance, as well as $CuCl_2$ as a mediator (reaction mediator). The buffer substance is present in a 0.5-molar concentration, and the reaction mediator is present in a 0.05-molar concentration. The first cyclic compound and the second cyclic compound are present in a ratio to one another of 1:9. Moreover, the electrolyte contains 22 wt. % water. Therefore, $R^1$ is a methyl radical, i.e., a hydrocarbon with 1 C atom, namely $CH_3$, for the first cyclic compound according to formula (I); therefore, $R^1$ is a butyl radical, i.e., a hydrocarbon with 4 C atoms, namely $C_4H_7$, for the second cyclic compound according to formula (I). $R^2$ is a propyl radical, i.e., a hydrocarbon radical with 3 C atoms, for the first cyclic compound, and it is a methyl radical, i.e., a hydrocarbon radical with 1 C atom for the second cyclic compound. A is a piperidine ring for the first cyclic compound, a pyridine ring for the second cyclic compound, and Y is chloride in both cases.

The example thus shows an electrolyte and the measuring response of an electrochemical gas sensor with an electrolyte that contains a first cyclic compound according to formula (VII), more precisely according to formula (47), a second cyclic compound according to formula (VI), more precisely according to formula (73) and formula (84), potassium hydrogen phthalate as a buffer, $CuCl_2$ as a reaction mediator, as well as 22% water.

FIG. 22 shows the time (t) in seconds on the x axis and the measured signal strength (I) in μA on the y axis. Gassing was begun at the time t1. Gassing was reset at the time t2.

It can be seen that the gas sensor responds to the presence of the analyte, $SO_2$ in this case, by the signal increasing from 0 μA to about 7.5 μA immediately after the start of the gassing in all three cycles and again dropping immediately with the end of the gassing.

Example 22

Figure 23:
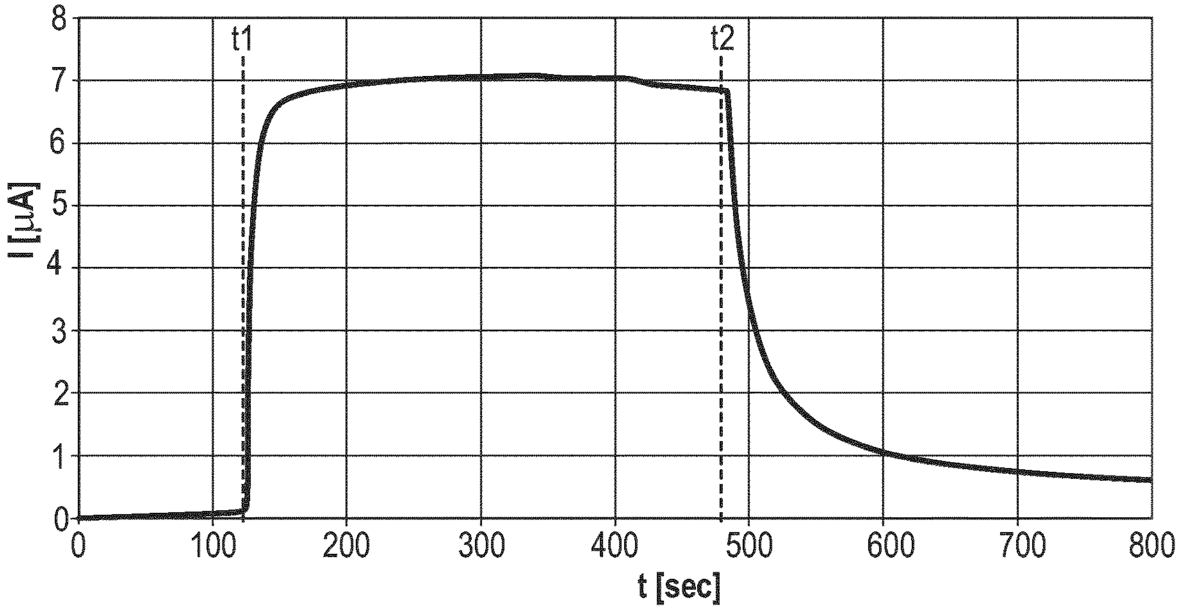
FIG. 23 is the measured curve for Example 22, wherein time is shown on the x axis and the measured signal strength in A is shown on the y axis, gassing the sensor with the measured gas was begun at the time t1 and gassing was ended at the time t2.

In Example 22 an electrochemical gas sensor that had at least one first electrode, a second electrode and an electrolyte was gassed with 20 ppm $SO_2$ for a defined period of time. FIG. 23 shows the measuring curve obtained as a result.

The electrolyte used contains 1-methyl-1-propylpiperidinium chloride as the first cyclic compound and 1-butyl-2-methylpyridinium chloride as the second cyclic compound. The electrolyte contains, furthermore, potassium hydrogen phthalate as a buffer substance, as well as $CuCl_2$ as a mediator (reaction mediator). The buffer substance is present in a 0.5-molar concentration, and the reaction mediator is present in a 0.1-molar concentration. The first cyclic compound and the second cyclic compound are present in a ratio to one another of 1:1. Moreover, the electrolyte contains 22 wt. % water. Therefore, $R^1$ is a methyl radical, i.e., a hydrocarbon with 1 C atom, namely $CH_3$, for the first cyclic compound according to formula (I); therefore, $R^1$ is a butyl radical, i.e., a hydrocarbon with 4 C atoms, namely $C_4H_7$, for the second cyclic compound according to formula (I). $R^2$ is a propyl radical, i.e., a hydrocarbon radical with 3 C atoms, for the first cyclic compound, and it is a methyl radical, i.e., a hydrocarbon radical with 1 C atom for the second cyclic compound. A is a piperidine ring for the first cyclic compound, a pyridine ring for the second cyclic compound, and Y is chloride in both cases.

The example thus shows an electrolyte and the measuring response of an electrochemical gas sensor with an electrolyte that contains a first cyclic compound according to formula (VII), more precisely according to formula (47), a second cyclic compound according to formula (VI), more precisely according to formula (73) and formula (84), potassium hydrogen phthalate as a buffer, $CuCl_2$ as a reaction mediator, as well as 22% water.

FIG. 23 shows the time (t) in seconds on the x axis and the measured signal strength (I) in μA on the y axis. Gassing began at the time t1. The respective gassing was reset at the time t2.

It can be seen that the gas sensor responds to the presence of the analyte, $SO_2$ in this case, by the signal increasing from 0 μA to about 7 μA immediately after the start of the gassing and again dropping to 0.5 μA immediately with the end of the gassing.

Example 23

Figure 24:
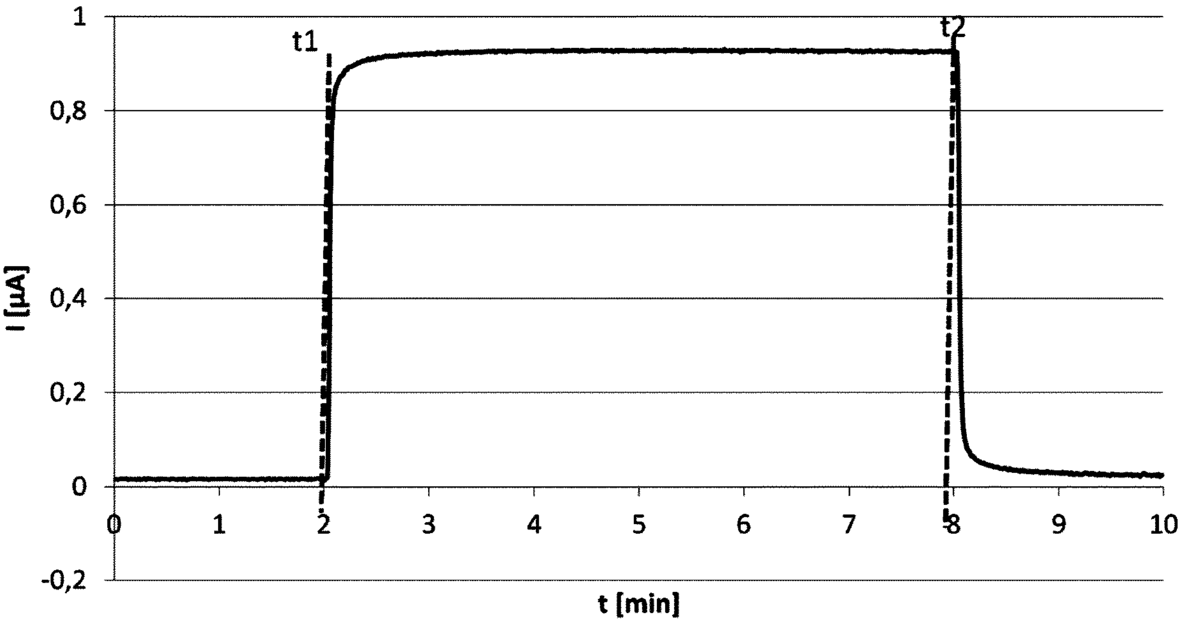
FIG. 24 is the measured curve for Example 23, wherein time is shown on the x axis and the measured signal strength in A is shown on the y axis, gassing the sensor with the measured gas was begun at the time t1 and gassing was ended at the time t2.

In Example 23 an electrochemical gas sensor that had at least one first electrode, a second electrode and an electrolyte was gassed with 5 ppm $SO_2$ for a defined period of time. FIG. 24 shows the measuring curve obtained as a result.

The electrolyte used contains 1-hexylpyridinium methanesulfonate as the first cyclic compound and 1-butylpyridinium chloride as the second cyclic compound. The electrolyte contains, furthermore, BisTris as a buffer substance, as well as 1% ethylene glycol as an addition. The buffer substance is present in a 0.5-molar concentration. The first cyclic compound and the second cyclic compound are present in a ratio to one another of 1:1. Moreover, the electrolyte contains 23 wt. % water. Therefore, $R^1$ is a hexyl radical, i.e., a hydrocarbon with 6 C atoms, namely $C_6H_{11}$, for the first cyclic compound according to formula (I); therefore, $R^1$ is a butyl radical, i.e., a hydrocarbon with 4 C atoms, namely $C_4H_7$, for the second cyclic compound according to formula (I). $R^2$ is a hydrogen for both cyclic compounds. A is a pyridine ring, Y is methanesulfonate for the first cyclic compound and chloride for the second cyclic compound in both cases.

The example thus shows an electrolyte and the measuring response of an electrochemical gas sensor with an electrolyte that contains a first cyclic compound according to formula (VI), more precisely according to formula (75) and formula (86), a second cyclic compound according to formula (VI), more precisely according to formula (73) and formula (84), BisTris as a buffer in a 0.5-molar concentration, ethylene glycol as an addition, as well as 23% water.

FIG. 24 shows the time (t) in minutes on the x axis and the measured signal strength (I) in μA on the y axis. Gassing with $SO_2$ was begun at the time t1. Gassing was ended again at the time t2.

It can be seen that the gas sensor responds to the presence of the analyte, $SO_2$ in this case, by the signal increasing from 0 μA to about 0.9 μA immediately after the start of the gassing at the time t1 and again dropping to the initial value with the end of the gassing at the time t2.

Example 24

Figure 25:
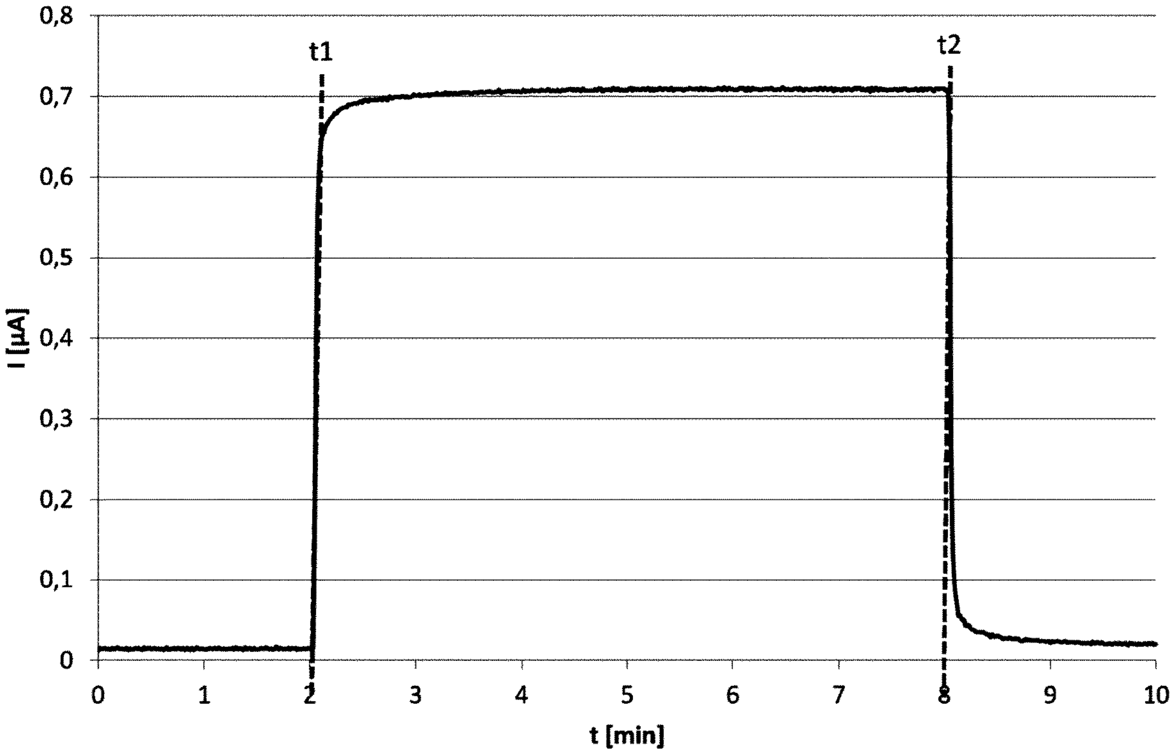
FIG. 25 is the measured curve for Example 24, wherein time is shown on the x axis and the measured signal strength in A is shown on the y axis, gassing the sensor with the measured gas was begun at the time t1 and gassing was ended at the time t2.

In Example 24 an electrochemical gas sensor that had at least one first electrode, a second electrode and an electrolyte was gassed with 5 ppm $SO_2$ for a defined period of time. FIG. 25 shows the measuring curve obtained as a result.

The electrolyte used contains 1-hexylpyridinium chloride as the cyclic compound. Furthermore, the electrolyte contains BisTris as a buffer substance and ethylene glycol as an addition. The buffer substance is present in a 0.5-molar concentration, and the addition is present in a concentration of 1 wt. %. Moreover, the electrolyte contains 28 wt. % water.

The example thus shows an electrolyte and the measuring response of an electrochemical gas sensor with an electrolyte that contains a cyclic compound according to formula (VI), more precisely according to formula (73) and formula (84), an additional component, namely Tris as a buffer in a 0.5-molar concentration, as well as 28 wt. % water. Therefore, $R^1$ is a butyl radical, i.e., a hydrocarbon with 4 C atoms, namely $C_4H_7$ for the cyclic compound according to formula (I). $R^2$ is a hydrogen, A is a pyridine ring and Y is chloride.

FIG. 25 shows the time (t) in minutes on the x axis and the measured signal strength (I) in μA on the y axis. Gassing with 5 ppm $SO_2$ was begun at the time t1. Gassing was ended again at the time t2.

It can be seen that the gas sensor responds to the presence of the analyte, $SO_2$ in this case, by the signal increasing from 0 μA to about 0.7 μA immediately after the start of the gassing at the time t1 and again returning to 0 μA with the end of the gassing at the time t2.

Example 25

Figure 26:
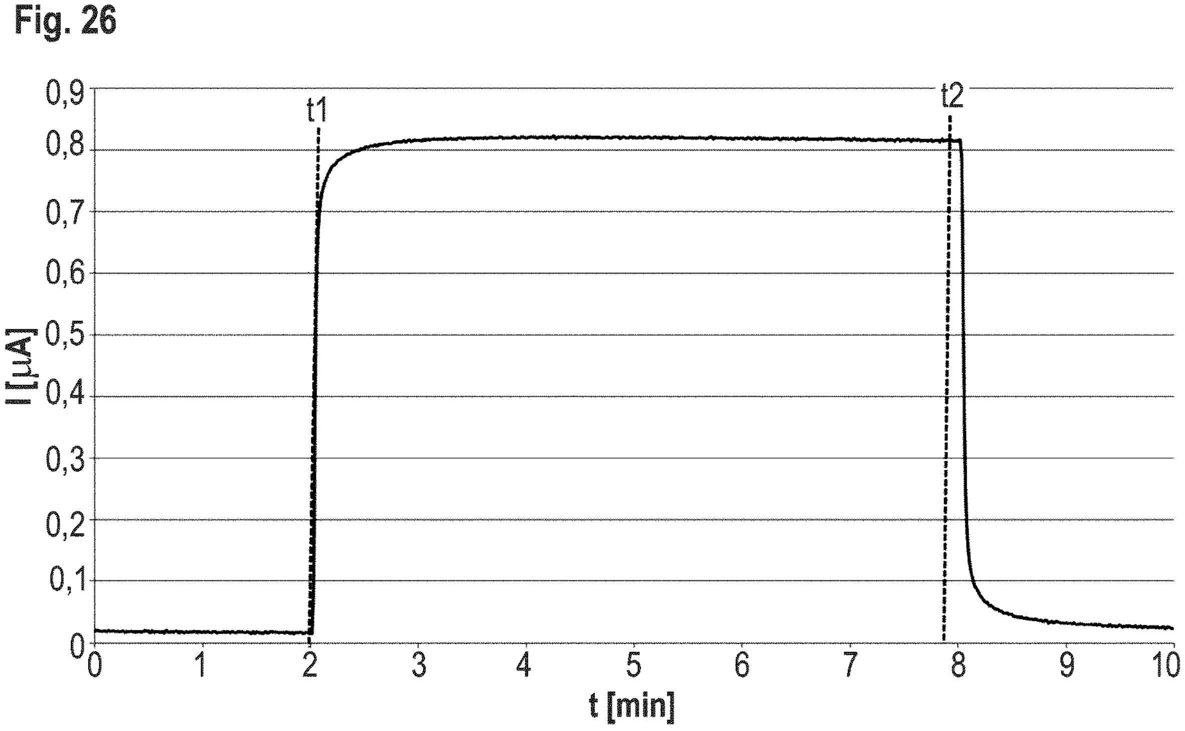
FIG. 26 is the measured curve for Example 25, wherein time is shown on the x axis and the measured signal strength in A is shown on the y axis, gassing the sensor with the measured gas was begun at the time t1 and gassing was ended at the time t2.

In Example 25 an electrochemical gas sensor that had at least one first electrode, a second electrode and an electrolyte was gassed with 5 ppm $SO_2$ for a defined period of time. FIG. 26 shows the measuring curve obtained as a result.

The electrolyte used contains 1-hexylpyridinium methanesulfonate as the cyclic compound. Furthermore, the electrolyte contains BisTris as a buffer substance and 1,2,3-propanetriol (glycerin) as an addition. The buffer substance is present in a 0.5-molar concentration, and the addition is present in a concentration of 1 wt. %. Moreover, the electrolyte contains 28 wt. % water.

The example thus shows an electrolyte and the measuring response of an electrochemical gas sensor with an electrolyte that contains a cyclic compound according to formula (VI), more precisely according to formula (75) and formula (86), an additional component, namely Tris as a buffer in a 0.5-molar concentration, as well as 28 wt. % water. Therefore, $R^1$ is a hexyl radical, i.e., a hydrocarbon with 6 C atoms, namely $C_6H_{11}$ for the cyclic compound according to formula (I). $R^2$ is a hydrogen, A is a pyridine ring and Y is methanesulfonate.

FIG. 26 shows the time (t) in minutes on the x axis and the measured signal strength (I) in μA on the y axis. Gassing with 5 ppm $SO_2$ began at the time t1. Gassing ended again at the time t2.

It can be seen that the gas sensor responds to the presence of the analyte, $SO_2$ in this case, by the signal increasing from 0 μA to about 0.8 μA immediately after the start of the gassing at the time t1 and again returning to 0 μA with the end of the gassing at the time t2.

Example 26

Figure 27:
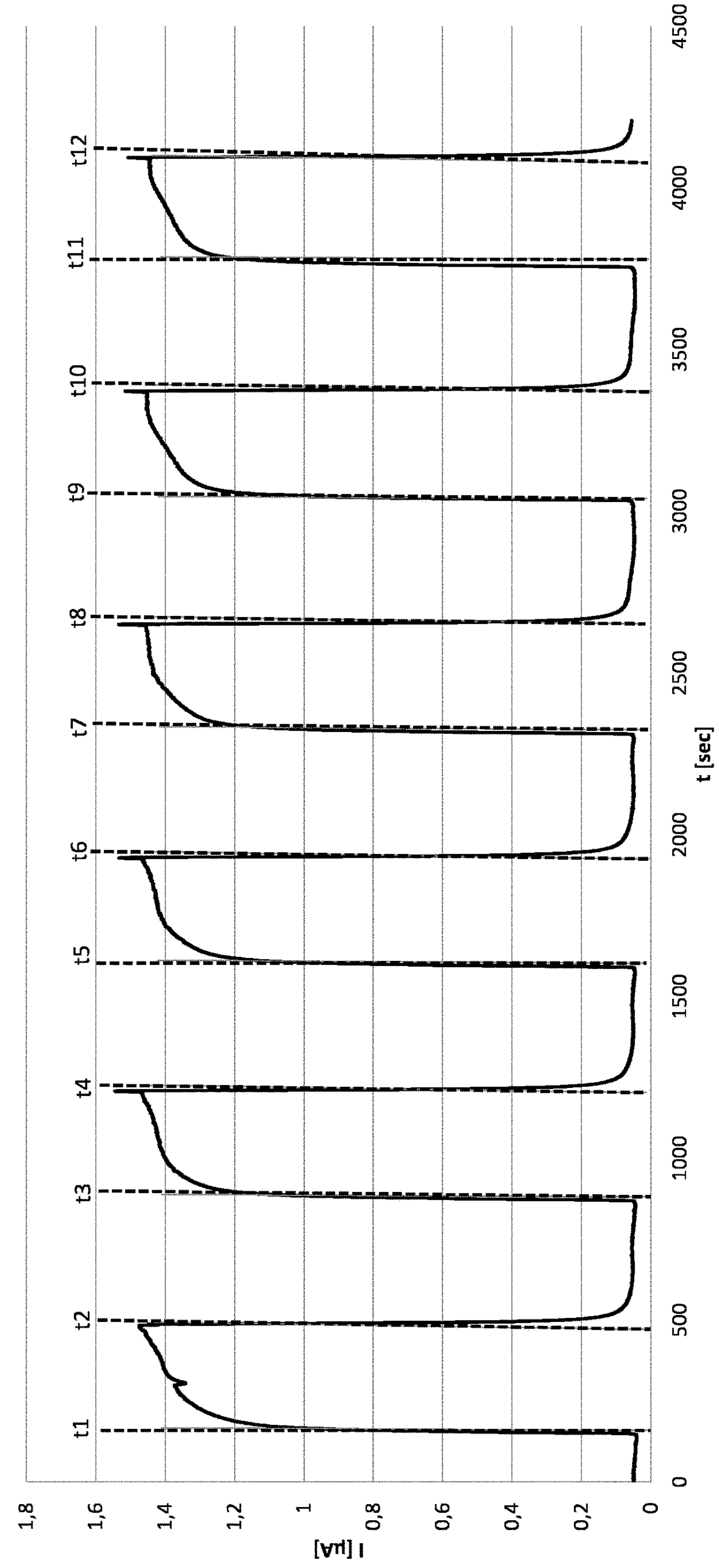
FIG. 27 is the measured curve for Example 26, wherein time is shown on the x axis and the measured signal strength in A is shown on the y axis, gassing the sensor with the measured gas was begun at the times t1, t3, t5, t7, t9 and t11 each and gassing was ended at the times t2, t4, t6, t8, t10 and t12 each.

In Example 26 an electrochemical gas sensor that had at least one first electrode, a second electrode and an electrolyte was gassed with 1 ppm $SO_2$ for a defined period of time. FIG. 27 shows the measuring curve obtained as a result.

The electrolyte used contains 1-methyl-1-propylpiperidinium chloride as the first cyclic compound and 1-butyl-3-methylpyridinium chloride as the second cyclic compound. The electrolyte contains, furthermore, potassium hydrogen phthalate as a buffer substance, as well as $CuCl_2$ as a mediator (reaction mediator). The buffer substance is present in a 0.5-molar concentration, and the reaction mediator is present in a 0.25-molar concentration. The first cyclic compound and the second cyclic compound are present in a ratio to one another of 1:9. Moreover, the electrolyte contains 14 wt. % water. Therefore, $R^1$ is a methyl radical, i.e., a hydrocarbon with 1 C atom, namely $CH_3$, for the first cyclic compound according to formula (I); therefore, $R^1$ is a butyl radical, i.e., a hydrocarbon with 4 C atoms, namely $C_4H_7$, for the second cyclic compound according to formula (I). $R^2$ is a propyl radical, i.e., a hydrocarbon radical with 3 C atoms, for the first cyclic compound, and it is a methyl radical, i.e., a hydrocarbon radical with 1 C atom for the second cyclic compound. A is a piperidine ring for the first cyclic compound, a pyridine ring for the second cyclic compound, Y is chloride for the first cyclic compound and methanesulfonate for the second cyclic compound.

The example thus shows an electrolyte and the measuring response of an electrochemical gas sensor with an electrolyte that contains a cyclic compound according to formula (VII), more precisely according to formula (47), a second cyclic compound according to formula (VI), more precisely according to formula (73) and formula (84), potassium hydrogen phthalate as a buffer, $CuCl_2$ as a reaction mediator, as well as 14% water.

FIG. 27 shows the time (t) in seconds on the x axis and the measured signal strength (I) in μA on the y axis. The sensor was respectively gassed with 1 ppm $SO_2$ over six cycles in total. Gassing was begun at each of the times t1, t3, t5, t6, t7, t9 and t11. Gassing was reset at each of the times t2, t4, t6, t8, t10 and t12.

It can be seen that the gas sensor responds to the presence of the analyte, $SO_2$ in this case, by the signal increasing from 0 μA up to a deflection of about 1.4 μA immediately after the start of the gassing and again dropping to 0 μA immediately with the end of the gassing.

Example 27

Figure 28:
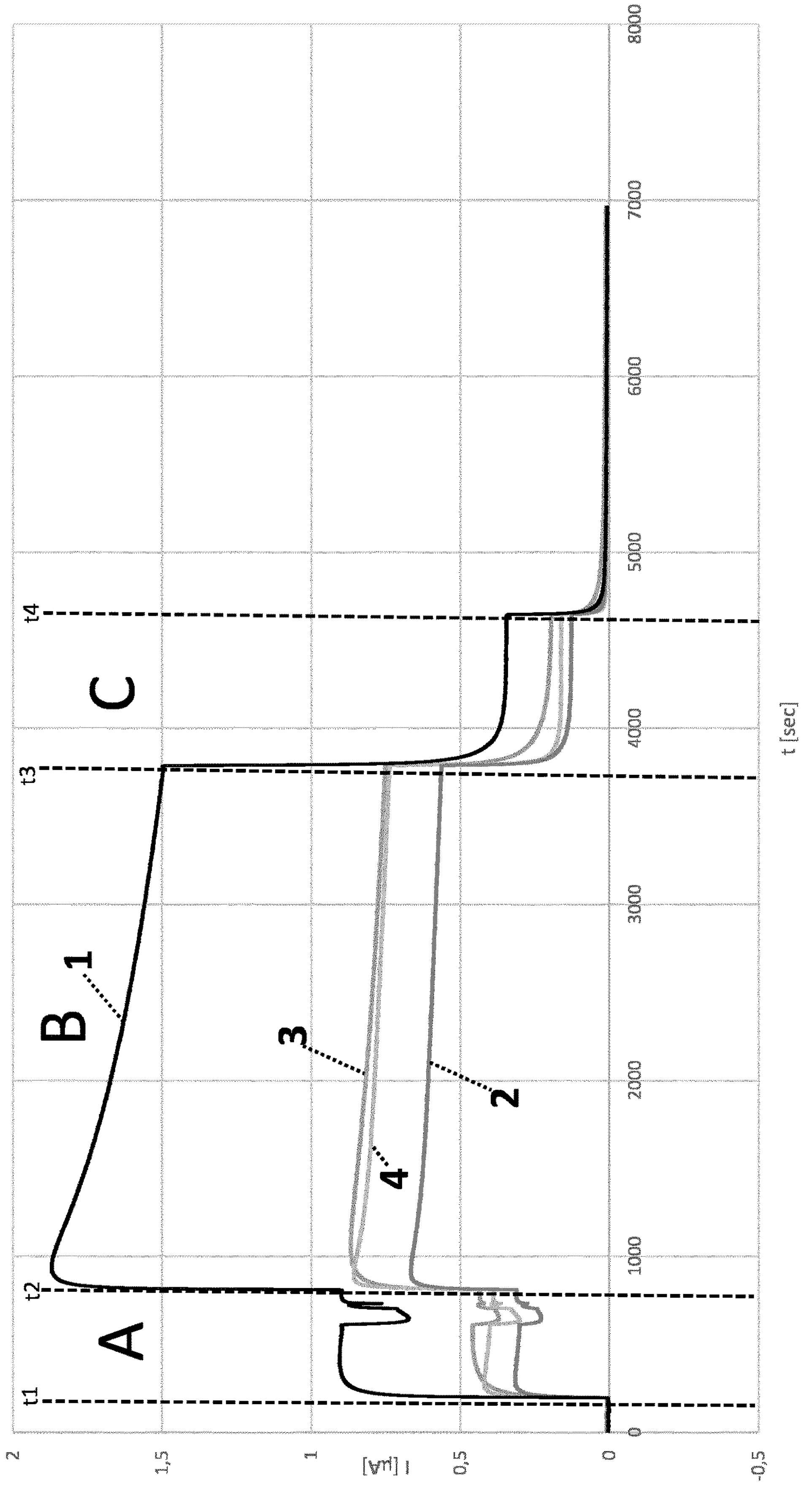
FIG. 28 is the measured curves for Example 27, wherein time is shown on the x axis and the measured signal strength in A is shown on the y axis, gassing the sensor with the measured gas—here 4 ppm of $SO_2$ (A)—was begun at the time t1, gassing was continued with 8 ppm of $SO_2$ (B) at the time t2, and at t3 the gas concentration was lowered to 2 ppm (C) and gassing was ended after the time t4.

In Example 27 four electrochemical gas sensors, each of which had at least one first electrode, a second electrode and an electrolyte, were gassed with different concentrations of $SO_2$, namely with 4 ppm, with 8 ppm and with 2 ppm $SO_2$ for respective defined periods of time. FIG. 28 shows the measuring curve obtained as a result.

The electrolyte used contains 1-butylpyridinium chloride as the cyclic compound, namely without methyl substitution (curve 1) and with methyl substitution in the ortho position (curve 2), in the meta position (curve 3) and in the para position (curve 4) to the butyl group. Furthermore, the electrolyte contains 30 wt. % water.

The example thus shows an electrolyte and the measuring response of an electrochemical gas sensor with an electrolyte that contains a first cyclic compound according to formula (VII) as well as 30% water.

FIG. 28 shows the time (t) in seconds on the x axis and the measured signal strength (I) in μA on the y axis. Gassing with 4 ppm $SO_2$ began at the time t1. Gassing was continued with 8 ppm $SO_2$ at the time t2, the $SO_2$ concentration was lowered at t3 and entirely ended at t4.

It can be seen that all four variants of the gas sensor respond to the presence of the analyte, here $SO_2$. Changes in the analyte concentrations are extensively indicated linearly. There is a gradual difference in the sensor sensitivity, which difference was significant at the unsubstituted ring, between the methyl-substituted electrolytes.

Example 28

Figure 29:
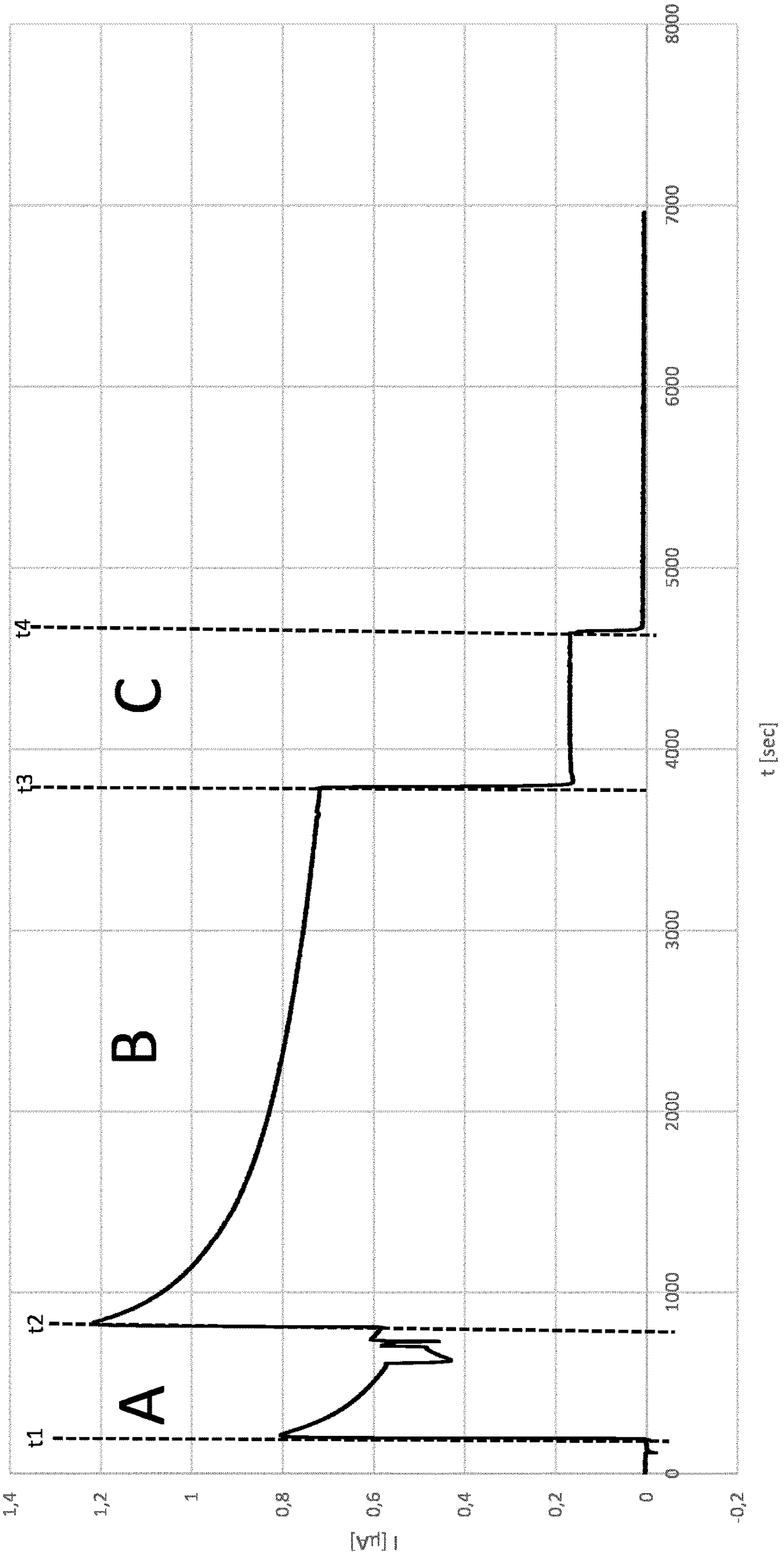
FIG. 29 is the measured curve for Example 28, wherein time is shown on the x axis and the measured signal strength in A is shown on the y axis, gassing the sensor with the measured gas was begun at the time t1, gassing with a higher concentration of the measured gas was continued at the time t2, it was lowered again at the time t3 and was ended at the time t4.

In Example 28 an electrochemical gas sensor that had at least one first electrode, a second electrode and an electrolyte was gassed with different concentrations of $SO_2$, namely with 4 ppm, with 8 ppm and with 2 ppm $SO_2$ for respective defined periods of time. FIG. 29 shows the measuring curves obtained as a result.

The electrolyte used contains 1-methyl-1-propylpiperidinium chloride as the cyclic compound. Furthermore, the electrolyte contains potassium hydrogen phthalate as a buffer in a concentration of 0.5 mol/L as well as 30 wt. % water. Therefore, $R^1$ is a methyl radical, i.e., a hydrocarbon with 1 C atom, namely $C_1H_3$ for the cyclic compound according to formula (I). $R^2$ is a propyl radical, i.e., a hydrocarbon with 3 C atoms. A is a piperidine ring, Y is chloride.

The example thus shows an electrolyte and the measuring response of an electrochemical gas sensor with an electrolyte that contains a first cyclic compound according to formula (VII), more precisely according to formula (47), as well as a buffer substance and 30% water.

FIG. 29 shows the time (t) in seconds on the x axis and the measured signal strength (I) in μA on the y axis.

It can be seen that the gas sensor responds to the presence of the analyte, $SO_2$ in this case, by the signal having a marked change in the signal strength (current strength) in A immediately after the start of the gassing with 4 ppm $SO_2$ at the time t1 and an approximate doubling of the signal occurring with the increase in the gas concentration to 8 ppm at the time t2. When the gas concentration is lowered to 2 ppm at the time t3, the sensor signal follows the change in gas concentration here as well and again returns to the initial value with the end of the gassing at t4.

Example 29

Figure 30:
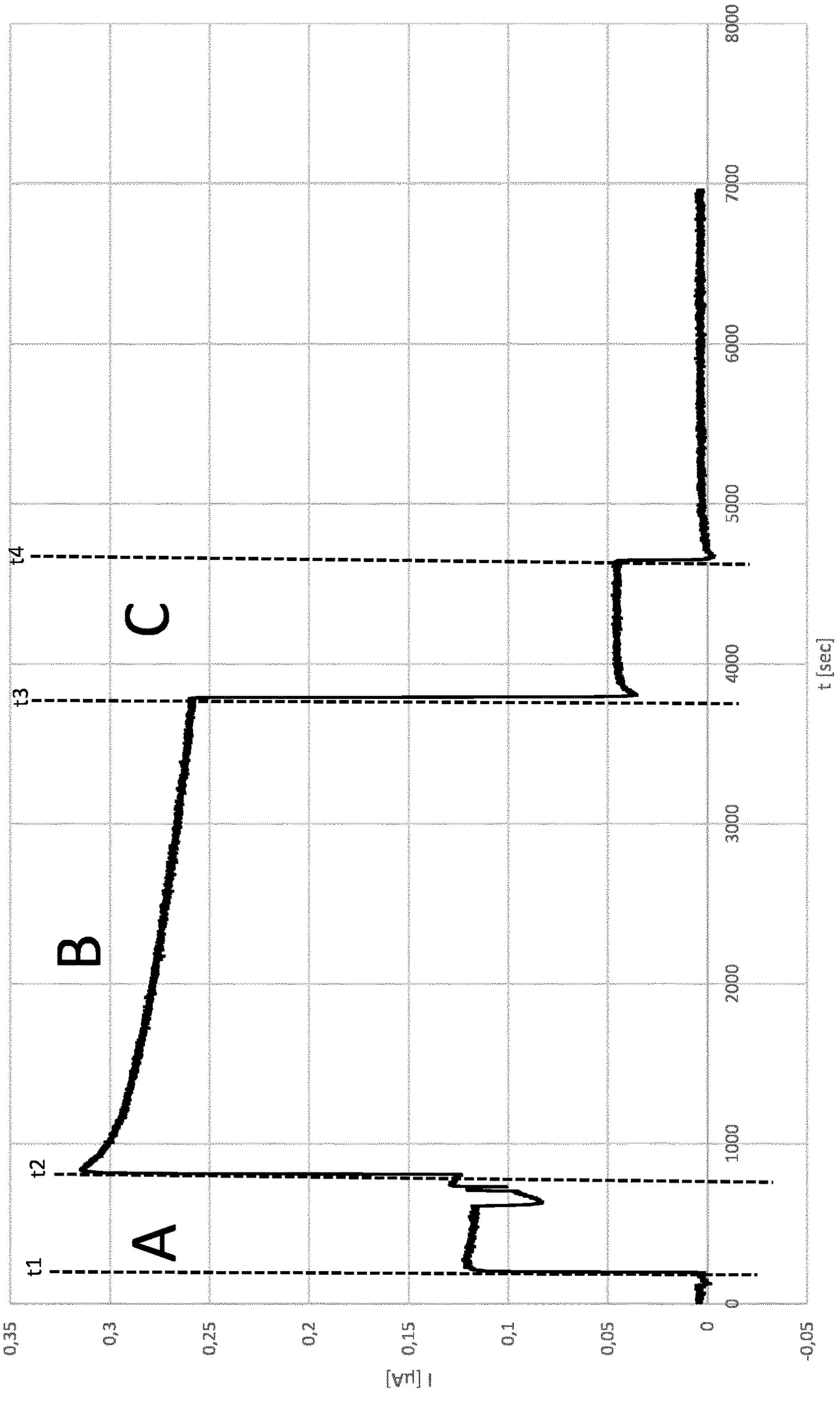
FIG. 30 is the measured curves for Example 29, wherein time is shown on the x axis and the measured signal strength in A is shown on the y axis, gassing the sensor with the measured gas was begun at the time t1 and gassing with a higher concentration of the measured gas was continued at the time t2, it was lowered again at the time t3 and the gassing was ended at the time t4.

In Example 29 an electrochemical gas sensor that had at least one first electrode, a second electrode and an electrolyte was gassed with different concentrations of $SO_2$, namely with 4 ppm, with 8 ppm and with 2 ppm $SO_2$ for respective defined periods of time. FIG. 30 shows the measuring curve obtained as a result.

The electrolyte used contains N-hexylpyridinium chloride as the cyclic compound. Furthermore, the electrolyte contains potassium hydrogen phthalate as a buffer in a concentration of 0.5 mol/L as well as 30 wt. % water. Therefore, $R^1$ is a hexyl radical, i.e., a hydrocarbon with 6 C atoms, namely $C_6H_{11}$ for the cyclic compound according to formula (I). $R^2$ is a hydrogen atom. A is a pyridine ring, and Y is chloride.

The example thus shows an electrolyte and the measuring response of an electrochemical gas sensor with an electrolyte that contains a cyclic compound according to formula (VI), more precisely according to formula (75) and according to formula (86), as well as a buffer substance and 30% water.

FIG. 30 shows the time in seconds on the x axis and the measured signal strength in A on the y axis. Gassing with 4 ppm $SO_2$ was begun at the time t1. The gassing concentration was increased to 8 ppm $SO_2$ at the time t2, lowered to 2 ppm at the time t3 and again ended at the time t4.

It can be seen that the gas sensor responds to the presence of the analyte, $SO_2$ in this case, by the signal having a marked change in the signal strength (current strength) in A immediately after the start of the gassing with 4 ppm $SO_2$ at the time t1 and an approximate doubling of the signal occurring with the increase in the gas concentration to 8 ppm $SO_2$ at the time t2. When the gas concentration is lowered to 2 ppm at the time t3, the sensor signal follows the change in gas concentration here as well and again returns to the initial value with the end of the gassing at t4.

The present invention is not limited o one of the above-described embodiments, but rather can be modified in a variety of ways.

All the features and/or advantages appearing from the claims, from the description and from the drawings, including structural details, arrangements in space and process steps, may be essential for the present invention both in themselves and in the widest variety of combinations.

While specific embodiments of the invention have been shown and described in detail to illustrate the application of the principles of the invention, it will be understood that the invention may be embodied otherwise without departing from such principles.

LIST OF REFERENCE NUMBERS

200 Gas sensor
201 Electrode

202 Electrode
203 Housing
204 Gas inlet
205 Gas outlet
206 Connection
207 Gas-permeable membrane
208 Gas-permeable membrane
300 Electrolyte
t Time
I Signal strength
t1, . . . , t12 Time
z1, . . . , z20 Cycle

The invention claimed is:

1. An electrochemical gas sensor comprising at least one first electrode and at least one second electrode and an electrolyte for the electrochemical gas sensor, wherein the electrolyte contains at least one cyclic compound and at least 5 wt. % water, wherein the cyclic compound has formula (I)[(A) $R^1R^2$]+[Y]−;

wherein (A) is a ring structure, which is selected from the group comprising pyridinium, piperidinium, pyrrolidinium, pyrrolium;

wherein the radical $R^1$ is arranged at the nitrogen atom of the ring structure A;

wherein $R^1$ is a hydrocarbon radical with 1, 2, 3, 4, 5, 6, 7, 8, 9, 10, 11 or 12 C atoms;

wherein $R^2$ is a hydrogen atom or a hydrocarbon radical with 1, 2, 3 or 4 C atoms; and wherein Y is selected from the group comprising halide, cyanide, alkyl sulfonate, halogenated alkyl sulfonate, and acetate.

2. An electrochemical gas sensor in accordance with claim 1, wherein the electrolyte contains at least one additional component comprising a buffer substance, a reaction mediator, or an addition or a mixture consisting of two or more of the buffer substance, the reaction mediator and the addition, wherein the buffer substance is further selected from the group comprising EDTA, EGTA, TEA, Bis-Tris, ADA, Tris, potassium hydrogen phthalate, pyridinium formate, MOPS, HEPES, CHES, TRICIN, PIPES or carbonate, and/or wherein the reaction mediator is further selected from the group comprising $CuCl_2$, $CoCl_3$, quinone, quinone derivatives, $MnCl_2$, and/or wherein the addition is further preferably selected from methane sulfonic acid, potassium acetate, EMIM acetate, pyridinium acetate, $BaCl_2$, $CaCl_2$, $EuCl_2$.

3. An electrochemical gas sensor in accordance with claim 2, wherein the electrolyte contains at least one second cyclic compound, wherein the second cyclic compound has formula (I) [(A)$R^1R^2$]+[Y]−;

wherein (A) is a ring structure, which is selected from the group comprising pyridinium, piperidinium, pyrrolidinium, pyrrolium;

wherein the radical $R^1$ is arranged at the nitrogen atom of the ring structure A;

wherein $R^1$ is a hydrocarbon radical with 1, 2, 3, 4, 5, 6, 7, 8, 9, 10, 11 or 12 C atoms;

wherein $R^2$ is a hydrogen atom or a hydrocarbon radical with 1, 2, 3 or 4 C atoms;

wherein Y is selected from the group comprising halide, cyanide, alkyl sulfonate, halogenated alkyl sulfonate, acetate; and wherein the second cyclic compound is a different compound than the first cyclic compound.

4. An electrochemical gas sensor in accordance with claim 3, wherein $R^1$ is selected from $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, $C_{11}H_{23}$, $C_{12}H_{25}$, and/or $R^2$ is selected from H, $CH_3$, $C_2H_5$, $C_3H_7$, $C_4H_9$, and/or Y is selected from Cl, Br, F, I, CN, $CH_3SO_3$, $CF_3SO_3$, $CH_3COO$.

5. An electrochemical gas sensor in accordance with claim 3, wherein the first cyclic compound is a pyridine compound having a formula (VI) and that the second cyclic compound is a piperidine compound having a formula (VII)

[Formula VI]

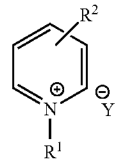

[Formula VII]

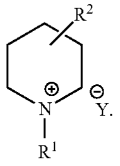

6. An electrochemical gas sensor in accordance with claim 3, wherein both the first cyclic compound and the second cyclic compound are a pyridine compound having a formula (VI), or both the first cyclic compound and the second cyclic compound are a piperidine compound having a formula (VII), or both the first cyclic compound and the second cyclic compound are a pyrrolidine compound having a formula (VIII), or both the first cyclic compound and the second cyclic compound are a pyrrole compound having a formula (IX)

[Formula VI]

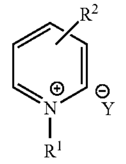

[Formula VII]

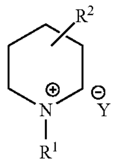

[Formula VIII]

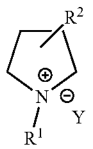

[Formula IX]

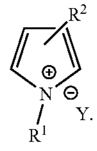

7. An electrochemical gas sensor in accordance with claim 3, wherein the first cyclic compound is a pyrrolidine compound having formula (VIII) and that the second cyclic compound is a pyrrole compound having formula (IX)

[Formula VIII]

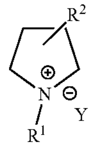

[Formula IX]

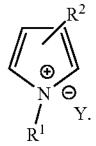

8. An electrochemical gas sensor in accordance with claim 3, wherein the first cyclic compound is a pyrrolidine compound having formula (VII) and that the second cyclic compound is a pyridine compound having formula (VI)

[Formula VI]

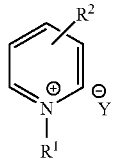

[Formula VII]

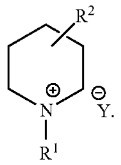

9. An electrochemical gas sensor in accordance with claim 3, wherein the first cyclic compound is a pyrrolidine compound having formula (VIII) and that the second cyclic compound is a piperidine compound having formula (VII)

[Formula VII]

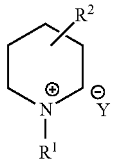

[Formula VIII]

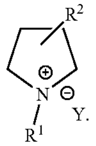

10. An electrochemical gas sensor in accordance with claim 3, wherein the first cyclic compound is a pyrrole compound having formula (IX) and that the second cyclic compound is a pyridine compound having to formula (VI)

[Formula VI]

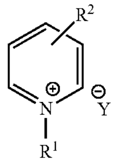

[Formula IX]

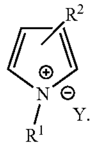

11. An electrochemical gas sensor in accordance with claim 1, wherein the electrolyte contains at least one second cyclic compound, wherein the second cyclic compound also has formula (I) $[(A)R^1R^2]+[Y]-$;

wherein (A) is a ring structure, which is selected from the group comprising pyridinium, piperidinium, pyrrolidinium, pyrrolium;

wherein the radical $R^1$ is arranged at the nitrogen atom of the ring structure A;

wherein $R^1$ is a hydrocarbon radical with 1, 2, 3, 4, 5, 6, 7, 8, 9, 10, 11 or 12 C atoms;

wherein $R^2$ is a hydrogen atom or a hydrocarbon radical with 1, 2, 3 or 4 C atoms;

wherein Y is selected from the group comprising halide, cyanide, alkyl sulfonate, halogenated alkyl sulfonate, acetate; and wherein the second cyclic compound is a different compound than the first cyclic compound.

12. An electrochemical gas sensor in accordance with claim 11, wherein $R^1$ is selected from $CH_3$, $C_2H_5$, $C_3H_7$, $C_4H_9$, $C_3H_{11}$, $C_6H_{13}$, C,$H_{15}$, $C_8H_{17}$, $C_9H_{19}$, $C_{10}H_{21}$, $C_{11}H_{23}$, $C_{12}H_{25}$, and/or $R^2$ is selected from H, $CH_3$, $C_2H_5$, $C_3H_7$, $C_4H_9$, and/or Y is selected from Cl, Br, F, I, CN, $CH_3SO_3$, $CF_3SO_3$, $CH_3COO$.

13. An electrochemical gas sensor in accordance with claim 11, wherein the first cyclic compound and the second cyclic compound are present in a molar ratio to one another of 1:1 to 1:9.

14. An electrochemical gas sensor in accordance with claim 11, wherein the first cyclic compound is a pyridine compound having formula (VI) and that the second cyclic compound is a piperidine compound having formula (VII)

[Formula VI]

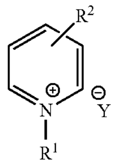

[Formula VII]

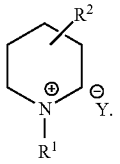

15. An electrochemical gas sensor in accordance with claim 11, wherein both the first cyclic compound and the second cyclic compound are a pyridine compound having formula (VI), or both the first cyclic compound and the second cyclic compound are a piperidine compound having formula (VII), or both the first cyclic compound and the second cyclic compound are a pyrrolidine compound having formula (VIII), or both the first cyclic compound and the second cyclic compound are a pyrrole compound having formula (IX)

[Formula VI]

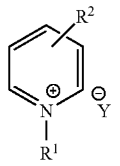

[Formula VII]

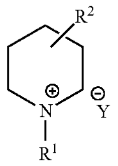

[Formula VIII]

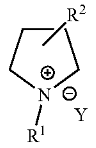

[Formula IX]

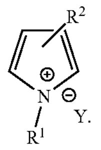

16. An electrochemical gas sensor in accordance with claim 11, wherein the first cyclic compound is a pyrrolidine compound having formula (VIII) and that the second cyclic compound is a pyrrole compound having formula (IX)

[Formula VIII]

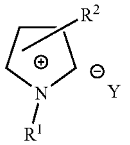

[Formula IX]

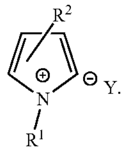

17. An electrochemical gas sensor in accordance with claim 11, wherein the first cyclic compound is a pyrrolidine compound having formula (VII) and that the second cyclic compound is a pyridine compound having formula (VI)

[Formula VI]

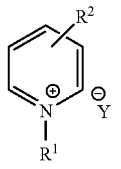

[Formula VII]

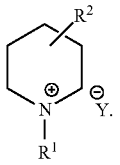

18. An electrochemical gas sensor in accordance with claim 11, wherein the first cyclic compound is a pyrrolidine compound having formula (VIII) and that the second cyclic compound is a piperidine compound having formula (VII)

[Formula VII]

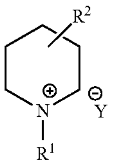

[Formula VIII]

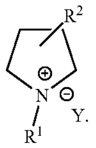

19. An electrochemical gas sensor in accordance with claim 11, wherein the first cyclic compound is a pyrrole compound having formula (IX) and that the second cyclic compound is a pyridine compound having formula (VI)

[Formula VI]

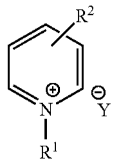

[Formula IX]

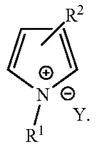

20. An electrochemical gas sensor in accordance with claim 11, wherein the first cyclic compound is a pyrrole compound having formula (IX) and that the second cyclic compound is a piperidine compound having formula (VII)

[Formula VII]

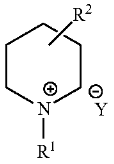

[Formula IX]

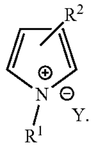

21. An electrochemical gas sensor in accordance with claim 12, wherein the first cyclic compound is a pyridine compound having formula (VI) and that the second cyclic compound is a piperidine compound having formula (VII)

[Formula VI]

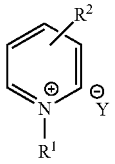

[Formula VII]

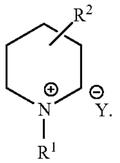

22. An electrochemical gas sensor in accordance with claim 12, wherein both the first cyclic compound and the second cyclic compound are a pyridine compound having formula (VI), or both the first cyclic compound and the second cyclic compound are a piperidine compound having formula (VII), or both the first cyclic compound and the second cyclic compound are a pyrrolidine compound having formula (VIII), or both the first cyclic compound and the second cyclic compound are a pyrrole compound having formula (IX)

[Formula VI]

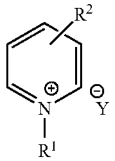

[Formula VII]

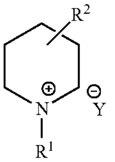

-continued

[Formula VIII]

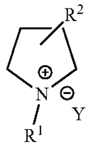

[Formula IX]

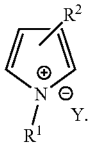

23. An electrochemical gas sensor in accordance with claim 12, wherein the first cyclic compound is a pyrrolidine compound having formula (VIII) and that the second cyclic compound is a pyrrole compound having formula (IX)

[Formula VIII]

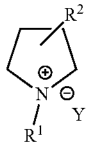

[Formula IX]

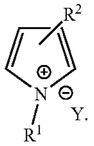

24. An electrochemical gas sensor in accordance with claim 12, wherein the first cyclic compound is a pyrrolidine compound having formula (VII) and that the second cyclic compound is a pyridine compound having formula (VI)

[Formula VI]

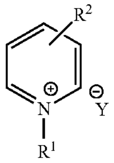

[Formula VII]

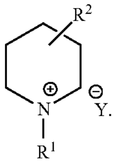

25. An electrochemical gas sensor in accordance with claim 12, wherein the first cyclic compound is a pyrrolidine compound having formula (VIII) and that the second cyclic compound is a piperidine compound having formula (VII)

[Formula VII]

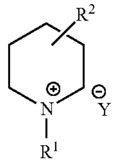

[Formula VIII]

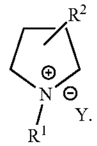

26. An electrochemical gas sensor in accordance with claim 12, wherein the first cyclic compound is a pyrrole compound having formula (IX) and that the second cyclic compound is a pyridine compound having formula (VI)

[Formula VI]

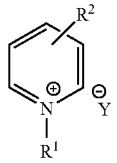

[Formula IX]

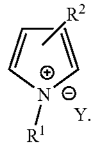

27. An electrochemical gas sensor in accordance with claim 12, wherein the first cyclic compound is a pyrrole compound having formula (IX) and that the second cyclic compound is a piperidine compound having formula (VII)

[Formula VII]

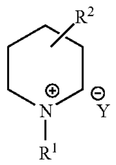

-continued

[Formula IX]

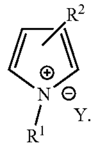

28. An electrochemical gas sensor in accordance with claim 1, wherein $R^1$ is selected from $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, $C_{11}H_{23}$, $C_{12}H_{25}$, and/or $R^2$ is selected from H, $CH_3$, $C_2H_5$, $C_3H_7$, $C_4H_9$, and/or Y is selected from Cl, Br, F, I, CN, $CH_3SO_3$, $CF_3SO_3$, $CH_3COO$.

29. An electrochemical gas sensor in accordance with claim 1, wherein the electrolyte contains between at least 5 wt. % and at most 50 wt. % $H_2O$.

30. An electrochemical gas sensor process comprising the steps of:

providing an electrochemical gas sensor comprising at least one first electrode and at least one second electrode and an electrolyte for the electrochemical gas sensor, wherein the electrolyte contains at least one cyclic compound and at least 5 wt. % water, wherein the cyclic compound corresponds to has formula (I) $[(A)R^1R^2]+[Y]-$;

wherein (A) is a ring structure, which is selected from the group comprising pyridinium, piperidinium, pyrrolidinium, pyrrolium;

wherein the radical $R^1$ is arranged at the nitrogen atom of the ring structure A;

wherein $R^1$ is a hydrocarbon radical with 1, 2, 3, 4, 5, 6, 7, 8, 9, 10, 11 or 12 C atoms;

wherein $R^2$ is a hydrogen atom or a hydrocarbon radical with 1, 2, 3 or 4 C atoms; and wherein Y is selected from the group comprising halide, cyanide, alkyl sulfonate, halogenated alkyl sulfonate, and acetate; and detecting $SO_2$, $NO_2$, $O_3$ and/or $H_2S$ with the electrochemical gas sensor.

* * * * *